United States Patent [19]

Koenck et al.

[11] Patent Number: 5,680,633

[45] Date of Patent: *Oct. 21, 1997

[54] MODULAR, PORTABLE DATA PROCESSING TERMINAL FOR USE IN A RADIO FREQUENCY COMMUNICATION NETWORK

[75] Inventors: Steven E. Koenck; Phillip Miller; Guy J. West; Ronald L. Mahany; Patrick W. Kinney, all of Cedar Rapids, Iowa

[73] Assignee: Norand Corporation, Cedar Rapids, Iowa

[ * ] Notice: The portion of the term of this patent subsequent to Jun. 8, 2010, has been disclaimed.

[21] Appl. No.: 114,872

[22] Filed: Aug. 31, 1993

Related U.S. Application Data

[63] Continuation-in-part of Ser. No. 898,908, Jun. 12, 1992, abandoned, Ser. No. 71,555, Jun. 4, 1993, Pat. No. 5,331,136, Ser. No. 107,470, Aug. 17, 1993, abandoned, Ser. No. 97,462, Jul. 26, 1993, Pat. No. 5,428,636, and Ser. No. 59,447, May 7, 1993, Pat. No. 5,428,636, which is a continuation-in-part of Ser. No. 56,827, May 3, 1993, Pat. No. 5,295,154, which is a continuation of Ser. No. 769,425, Oct. 1, 1991, abandoned, said Ser. No. 898,908, is a continuation-in-part of Ser. No. 835,718, Feb. 12, 1992, abandoned, said Ser. No. 71,555, is a continuation of Ser. No. 660,615, filed as PCT/US90/03282, Jun. 7, 1990, Pat. No. 5,218,187, which is a continuation-in-part of Ser. No. 467,096, Jan. 18, 1990, Pat. No. 5,052,020, said Ser. No. 107,470, Aug. 17, 1993, abandoned, is a continuation-in-part of Ser. No. 81,411, Jun. 22, 1993, abandoned, which is a continuation-in-part of Ser. No. 53,901, May 20, 1993, abandoned.

[51] Int. Cl.$^6$ .................... G06F 1/00; H05K 7/10; H05K 7/14
[52] U.S. Cl. ................... 395/800; 361/680; 361/731
[58] Field of Search ............ 395/800; 364/DIG. 1; 455/11.1, 89, 90; 358/257; 340/712, 311.1; 235/472, 375; 370/85.2; 379/66

[56] References Cited

U.S. PATENT DOCUMENTS

| | | | |
|---|---|---|---|
| 4,058,838 | 11/1977 | Crager et al. | 358/257 |
| 4,519,068 | 5/1985 | Krebs et al. | 370/82 |
| 4,569,421 | 2/1986 | Sandstedt | 186/39 |
| 4,628,193 | 12/1986 | Blum | 235/375 |
| 4,680,787 | 7/1987 | Marry | 379/63 |
| 4,761,822 | 8/1988 | Maile | 455/82 |
| 4,806,906 | 2/1989 | Oda et al. | 340/311.1 |
| 4,850,009 | 7/1989 | Zook et al. | 379/66 |
| 4,916,441 | 4/1990 | Gombrich | 340/712 |
| 4,969,206 | 11/1990 | Desrochers | 455/89 |
| 5,008,879 | 4/1991 | Fischer et al. | 370/85.2 |
| 5,033,109 | 7/1991 | Kawano et al. | 455/90 |
| 5,055,660 | 10/1991 | Bertagna et al. | 235/472 |
| 5,117,501 | 5/1992 | Chidress et al. | 455/11.1 |

*Primary Examiner*—Alyssa H. Bowler
*Assistant Examiner*—Walter D. Davis
*Attorney, Agent, or Firm*—Stanford & Bennett, L.L.P.

[57] ABSTRACT

Modular, portable data collection terminals are disclosed for use in mixed wireless and hard-wired RF communication networks, wherein various radio transmitter modules and associated antennas may be selectively added to a base terminal unit to solve networking problems associated with specific types of business environments. Modularity exists in both the hardware (splitting data collection and processing control circuitry from radio transceiver control circuitry) and software (splitting transceiver-specific, lower level communication protocol from generic, higher level communication protocol). The control circuitry, including associated microprocessors devices, interact to selectively activate communication circuits to perform necessary communication or data processing functions and enter and remain in a power-saving dormant state during other times. To support such dormant or "sleeping" states, a series of communication protocols provide for channel access to the communication network. The disclosed modular design also provides for automatic selection from a variety of available built-in and externally mounted antennas based on the particular type of radio transceiver(s) selected.

10 Claims, 38 Drawing Sheets

MODULAR, PORTABLE DATA PROCESSING TERMINAL FOR USE IN A RADIO FREQUENCY COMMUNICATION NETWORK

This application is a continuation-in-part application of the following:

1. U.S. application Ser. No. 07/898,908 (Attorney Docket Nos. 92 P 447 & DN36767XZAA), by Koenck et al., filed Jun. 12, 1992, now abandoned, which is itself a continuation-in-part application of U.S. application Ser. No. 07/835,718 (Attorney Docket Nos. 92 P 148 & DN36767XZA), by Koenck et al., filed Feb. 12, 1992, now abandoned.

2. U.S. application Ser. No. 08/071,555 (Attorney Docket Nos. 10168US04 & DN36767XZX), by Koenck et al., filed Jun. 4, 1993, now U.S. Pat. No. 5,331,136, which is in turn a continuation application of U.S. application Ser. No. 07/660,615 (Attorney Docket Nos. 91 P 398 & DN36767XZ), by Danielson et al., filed Feb. 25, 1991, now U.S. Pat. No. 5,218,187, which is itself a continuation-in-part of:

a. U.S. application Ser. No. 07/467,096 (Attorney Docket Nos. 91 P 402 & DN37139), by Koenck et al., filed Jan. 18, 1990, now issued U.S. Pat. No. 5,052,020; and b. PCT application Ser. No. PCT/US90/03282 (Attorney Docket Nos. 91 P 392 & DN36767X-PCT), by Koenck et al., filed Jun. 7, 1990, now abandoned, which claims priority from two applications:

1) U.S. application Ser. No. 07/364,594 (Attorney Docket Nos. 91 P 859 & DN36808X), by Cargin et al., filed Jun. 7, 1989, now abandoned, which is itself a continuation-in-part of U.S. application Ser. No. 07/339,330 (Attorney Docket Nos. 91 P 856 & DN36808), by Cargin et al., filed Apr. 14, 1989, now abandoned; and 2) U.S. application Ser. No. 07/364,902 (Attorney Docket Nos. 91 P 393 & DN36767), by Danielson et al., filed Jun. 8, 1989, now abandoned.

3. U.S. application Ser. No. 08/107,470 (Attorney Docket Nos. 10126US03 a DN38000B), by Kinney et al., filed Aug. 17, 1993, now abandoned, which is itself a continuation-in-part of U.S. application Ser. No. 08/081,411 (Attorney Docket Nos. 10126US02 & DN38000A), by P. Kinney, filed Jun. 22, 1993, now abandoned, which is in turn a continuation-in-part of U.S. application Ser. No. 08/053,901 (Attorney Docket Nos. 10126US01 & DN38000), by Kinney et al., filed May 20, 1993, now abandoned.

4. U.S. application Ser. No. 08/097,462 (Attorney Docket Nos. 10222US01 & DN38017), by West et al., filed Jul. 26, 1993, now U.S. Pat. No. 5,428,636.

5. U.S. application Ser. No. 08/059,447 (Attorney Docket Nos. 10132US03 & DN37882XA), by R. Meier, filed May 7, 1993, now U.S. Pat. No. 5,428,636 which is a continuation-in-part of U.S. application Ser. No. 08/056,827 (Attorney Docket Nos. 10127US02 & DN37882X), by R. Meier, filed May 3, 1993, now U.S. Pat. No. 5,295,154 which is a continuation application of U.S. application Ser. No. 07/769,425 (Attorney Docket Nos. 91 P 668 & DN37882), by Meier et al., filed Oct. 1, 1991, now abandoned.

The following applications are hereby incorporated herein by reference in their entirety and made part of this application.

1. U.S. application Ser. No. 07/898,908 (Attorney Docket Nos. 92 P 447 & DN36767XZAA), by Koenck et al., filed Jun. 12, 1992.

2. U.S. application Serial No. 08/071,555 (Attorney Docket Nos. 10168US04 & DN36767XZX), by Koenck et al., filed Jun. 4, 1993.

3. U.S. application Ser. No. 08/107,470 (Attorney Docket Nos. 10126US03 & DN38000B), by Kinney et al., filed Aug. 17, 1993.

4. U.S. application Ser. No. 08/097,462 (Attorney Docket Nos. 10222US01 & DN38017), by West et al., filed Jul. 26, 1993.

5. U.S. application Ser. No. 08/059,447 (Attorney Docket Nos. 10132US03 & DN37882XA), by R. Meier, filed May 7, 1993.

6. U.S. application Ser. No. 08/101,254 (Attorney Docket Nos. 10092US04 & DN37998C), by R. Mahany, filed Aug. 3, 1993.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to portable data collection and processing terminals for use in a Radio Frequency (RF) communication network, and, more specifically to portable terminals supporting a variety of RF transceivers and associated antenna systems. Additionally, this invention relates to methods in which a portable terminal gains access to the RF communication network.

In particular, portable data processing terminals have taken an increasingly significant role in business environments. For example, battery powered, hand-held data collection terminals are used extensively for inventory control in warehousing and merchandising operations. Other uses of such terminals include invoicing, delivery route management, order taking and return control operations—as might be found in automobile rental operations.

In many business environments, portable data processing terminals often need to communicate in real-time with other portable terminals, peripheral devices, work stations, and host computers. To meet such communication needs, a variety of mixed hard-wired and wireless communication networks with associated communication protocols have been developed, each addressing the specific requirements of a given business environment. In the process of such development, portable terminals have undergone tailoring of both hardware and software to fully support a specific communication network and associated protocol.

As a result of such tailoring, each type of portable data collection terminal is generally only capable of operating in a single type of business environment. Tailoring also results in unreasonable additional costs associated with developing, manufacturing, documenting, etc., each variety of portable data collection terminals.

More specifically, each portable data collection terminal includes a built-in radio transceiver. The built-in transceiver operates pursuant to only one of a variety of types of RF (Radio Frequency) communication characteristics, characteristics that are dictated per FCC (Federal Communication Commission) specification.

The choice of the type of radio transceiver, i.e., the type of RF communication characteristics, to build in is based on the nature of the business environment. For example, a digital cellular radio might be chosen in an environment having great distances between the radio and the destination transceiver. Similarly, data might be exchanged using a single channel UHF (Ultra-High Frequency), direct-sequence spread-spectrum, or frequency-hopping spread-spectrum band. Each of these bands have particular characteristics which make them attractive for a given business environment, and each generally requiring a different transceiver.

After choosing the appropriate radio transceiver, an appropriate antenna must also be selected. Each type of transceiver often requires a different type of antenna based on the corresponding RF communication characteristics, the shape of the portable terminal, and the business environment at issue.

Thus, there is need to provide a portable data collection terminal capable of easily supporting any of the plurality of types of radio transceivers and associated antennas, minimizing needed modifications to the terminal's hardware and software design.

In addition, to support real-time access to a communication network, each portable data collection terminal needs to establish and maintain radio connectivity to the network. However, portable terminals must also address conflicting concerns of battery power conservation, i.e., maintaining connectivity places a substantial load on battery power. Moreover, the mobile nature of portable terminals also presents difficulties in maintaining connectivity. It would therefore be desirable to implement communication protocol techniques which address power saving and mobility concerns while providing virtually real-time access to the communication link.

Thus, an object of the present invention is to provide a modular hardware and software radio design for a portable data collection terminal which supports multiple types of radio transceivers and associated antennas.

It is also an object of the present invention to provide for the selection of ones of a plurality of modular radio transceivers for use by a portable data terminal, the selection of which addresses the specific concerns of a given business environment.

Another object of the present invention is to provide for the selection of ones of a plurality of modular radio transceivers for use by a portable data terminal, wherein each modular transceiver selected isolates the data collection terminal from transceiver specific operations by providing hardware and software control over such functions.

A further object of the present invention is to provide a communication protocol which addresses power saving and mobility concerns while providing virtually real-time access to the communication link.

Another object of the present invention is to provide a communication protocol for use by a portable data collection terminal which minimizes transmission collisions while providing for virtually real-time access to the communication network.

Another object of the present invention is to provide a communication protocol for use by a portable data collection terminal which eliminates the need for random number generation and random back-off techniques.

A further object of the present invention is to provide an improved computer device apparatus for connecting a removable card type radio to a protected, interchangeable, environmentally sealed antenna which uses contacts located on the housing of the radio card.

An object of the present invention is to provide an improved antenna connector for use with radio cards which can be inserted into various computer devices.

An object of the present invention is to provide an antenna cap, for use with computer devices utilizing radio cards, which is reliable, economical and easy to use.

A further object of the present invention is to provide an antenna cap whereby an appropriate antenna will be connected to a radio card by selectively positioning the antenna contacts on the radio card.

Another object of the present invention is to provide an antenna cap whereby a radio card may simultaneously connect to and utilize more than one radio antenna, and where the radio card may contain more than one type of radio transceiver.

A further object of the present invention is to provide an improved antenna connector whereby an appropriate antenna(s) will be connected to a radio card by selectively positioning the antenna contacts on the radio card.

A further object of the present invention is to provide an improved apparatus which utilizes only one set of contacts on a radio card or modem card and uses a switching matrix to connect the radio card or modem card to the appropriate antenna or telephone line.

Other objects, advantages, and novel features of the present invention will become apparent from the following detailed description of the invention when considered in conjunction with the accompanying drawings.

SUMMARY OF THE INVENTION

These and other objects of the invention are achieved in a portable data collection terminal comprising a first and second data processing unit as well as a radio transceiver selected from a plurality of transceivers. The first processing unit is capable of executing its own set of communication software routines. Further, each of the plurality of radio transceivers has different operating characteristics. The second processing unit is capable of isolating the first processing unit from the differences in the operating characteristics of the plurality of radio transceivers.

In one embodiment of the portable data collection terminal, the first processing unit is contained in a base module while the second processing unit and the selected radio transceiver are located in a communication module. In another embodiment, antennas are connected to the base module, and the portable data collection terminal unit includes a means for selectively interconnecting one of the antennas to the communication module. In a further embodiment, a preinstalled antenna is connected to the base module. The portable data collection terminal includes an antenna connector capable of connecting a variety of external antennas as well as a means for selectively interconnecting the preinstalled antenna or the antenna connector to the selected radio transceiver.

The objects of the invention are also achieved in a portable data collection terminal that operates in a communication network having a first and second subnetwork. The portable data collection terminal comprises a base processing unit and a communication processor, as well as a first and second radio transceiver selected from a plurality of radio transceivers. The base processing unit is capable of executing its own set of communication software routines. Further, each of the plurality of radio transceivers has different operating characteristics. The communication processor is capable of isolating the base processing unit from the differences in the operating characteristics of the first and second radio transceivers.

In one embodiment, the base processing unit is contained in a base module of the portable data collection terminal.

The data collection terminal also has a communication module that contains the communication processor and the first and second radio transceivers.

The objects of the invention are also achieved in a method used by a second device for beginning a data exchange over an RF communication link with a polling device. (The polling device having an interpoll gap time.) The method comprises identifying that an RF communication link is clear throughout a period which is at least as long as the interpoll gap time and transmitting a request for poll frame. In one embodiment, the method also includes generating a first pseudo-random time which is also at least as long as the interpoll gap time. The channel is then sensed for a time substantially shorter than the first pseudo-random time. Such sensing is repeated until the channel is detected as being busy, or until the channel is detected as being clear at every sense until the first pseudo-random time is reached. If the channel is busy, a second pseudo-random time delay back-off is executed and the process beginning at the generation of the first pseudo-random time is repeated. If the channel is clear for the entire first pseudo-random time, a request for poll is transmitted.

DETAILED DESCRIPTION OF THE INVENTION

Figure 1:
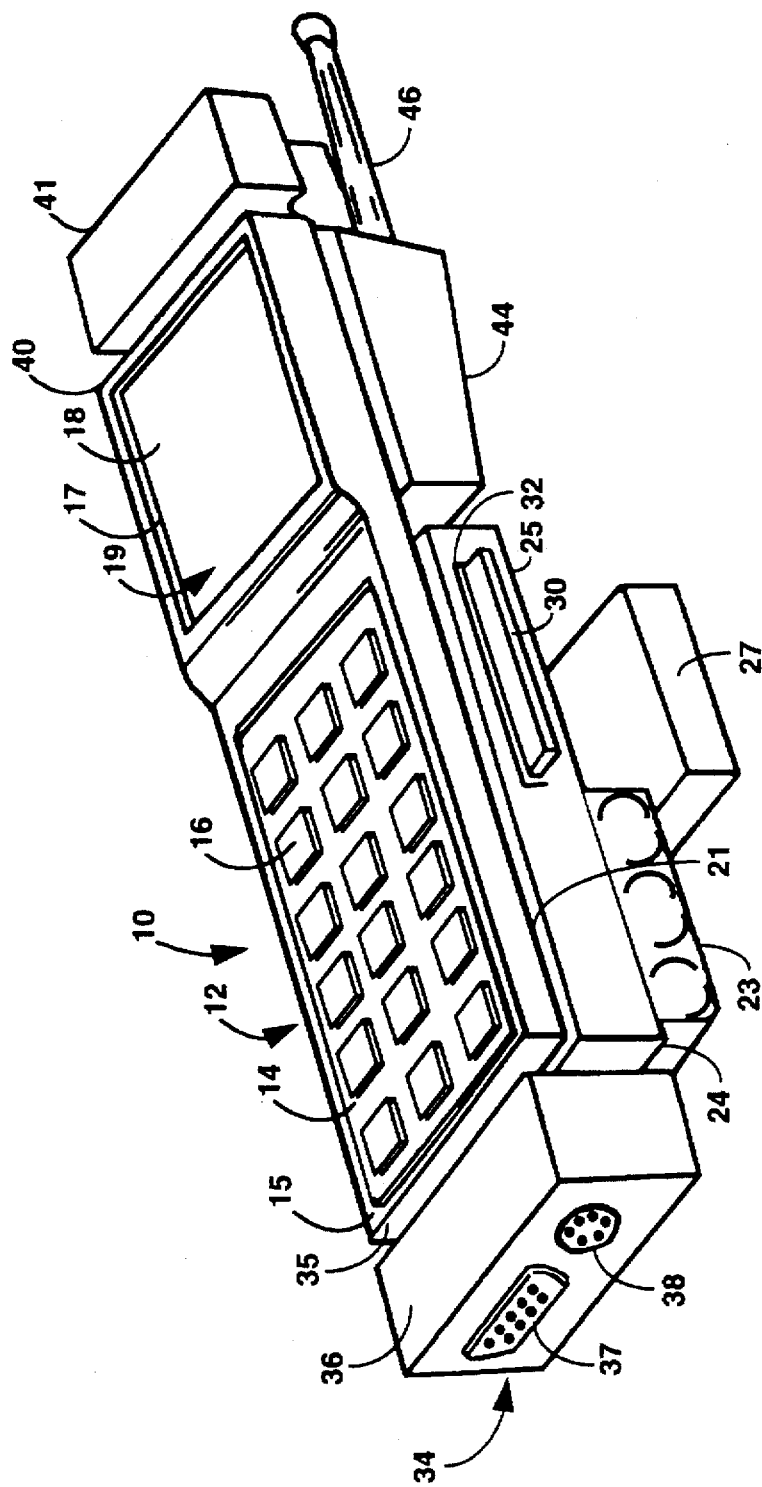
FIG. 1 is a schematic pictorial representation of a modular data collection terminal unit to which the present invention applies which shows schematically a physical representation of modules of the data collection terminal.

Functional interconnections and power saving features of the present invention may be better understood by knowing how various building blocks or modules of a portable data collection terminal unit relate to each other. FIG. I shows a schematic arrangement of various physical modules or components that become integrated into the portable data terminal unit which is designated generally by the numeral 10. Hand-held terminals are of generally rectangular, elongate shape for accepted practical user friendliness. Thus the modular terminal unit 10 desirably has an elongate, rectangular shape. An upper module 12 provides a sensory or physical interface to an operator of the terminal unit 10. The module 12 is referred to as a keyboard and display module 12 and features a keyboard 14 which may be a typical alphanumerical keyboard, including also function keys and cursor manipulation keys as part of an integrated keyboard arrangement. The keyboard 14 may be, and desirably is, a submodule in itself, inserted and mounted into a mounting frame 15 of the keyboard and display module 12. In a typical manner, the depression of molded keytops 16 generally closes electrical contacts in a lower contact plane (not visible) of the keyboard 14. The type of keyboard 14 is, however, not critical and not considered limiting to the invention. The keyboard 14 being a selected one of a number of available keyboards is, however pertinent to the invention. For example, in one application the keyboard 14 may be preferred to be a twenty or a twenty-four key keyboard. Such a keyboard 14 comprises comparatively few keytops 16, the locations and functions of which are more readily learned and accepted by an operator. Such keyboards typically do not have alphabetical key functions. Thus for many record keeping and merchandising operations, the keyboard 14 having an array of twenty or twenty-four keytops may be most desirable. In another operation, a greater number of keytops 16 may be required to display the letters of the alphabet, numbers, and to provide for the execution of various functions. Thus, a keyboard 14 having an array of fifty-six keytops 16 may be preferred. Numerous variations in the arrangement of the keytops 16 within the array of the keyboard 14 are additionally possible. Mechanical or touch sensitive keytops 16 may be employed. In fact, touch sensitive keyboards which are known in the art, and typically involve programming and hi-directional feedback, may be improved by interconnection features of the present invention which will become apparent from the detailed description as a whole.

The keyboard and display module 12 further includes an upper cavity 17 wherein a display screen 18 is disposed. The display screen 18 is preferably a state-of-the-art liquid crystal display, the liquid crystal display ("LCD") technology being well established in the art. A dot-addressable liquid crystal array screen 18 is ideal for "User friendliness" and versatility and permits the display of various alphanumeric characters and graphic symbols, as well as Chinese or Japanese character symbols. Of course, dot-addressable graphic representations are known to require a substantial level of data processing and memory storage to permit the symbols to be displayed or moved about on the display screen 18 with reasonable speed. Long delays between the time that an operator pushes a keytop 16 to obtain data and the time that the requested data are displayed is considered "user unfriendly" and is commercially undesirable. A display technology which has become a standard is referred to as VGA technology. VGA screens are capable of fine gray scale or color resolutions. The display screen 18 would be part of a selected display screen module 19 of a number of available display screen modules.

Figure 1A:
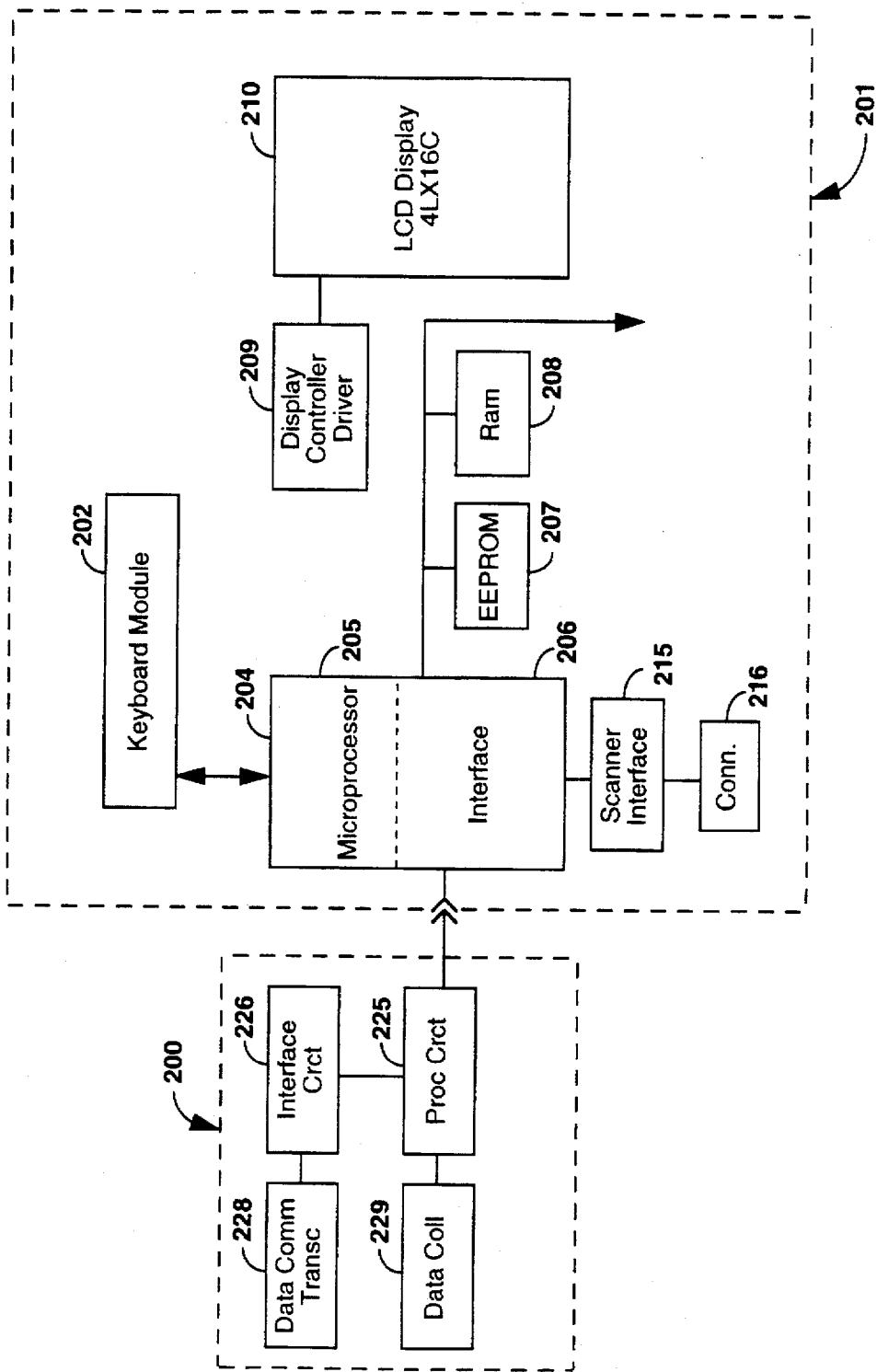
FIG. 1A is a schematic diagram of functional blocks for illustrating major functional elements of a base module and a respective data and communications module of a data terminal in accordance with the present invention.

FIG. 1A illustrates one embodiment of the data processing terminal of the present invention illustrating advantages in the modular design approach. The terminal utilizes a microprocessor controlled data transfer between the base module 201 and any of a number of data and communication modules which may include various radio transceivers such as frequency-hopping or direct-sequence spread spectrum radios, UHF (Ultra-High Frequency) radios, etc. The terminal 10 and all of its circuits, including those of attached modules, are powered by a power pack module 23 as described herein.

Specifically, FIG. 1A shows a block diagram of functions of the base module 201 and a typical data and communications module designated generally by the numeral 200. The base module 201 is operative in conjunction with a typical radio frequency transceiver provided by the data and communication module 200, for example. The base module 201 includes a typical keyboard module 202 interactively coupled to a microprocessor 204. A preferred microprocessor is a 80C196KC device which is a 16-bit microcontroller 205 with on-chip masked ROM, RAM and built-in timers, ports, analog to digital converters and a serial interface 206. Thus, the microprocessor functions as a microcontroller and as an interface for communicating data and control signals to and from the base module 201. In addition to the on-chip memory capacity, an external ROM 207 and an external RAM 208 may be provided for additional data processing and communication capacity. Display controller and driver circuits 209 may be multi-chip circuits or may be integrated into a single device to drive the described LCD screen 210.

A typical scanner interface 215 is coupled to a 9-pin connector 216, such as the referred to D-subminiature connector which may couple a laser scanner or CCD scanner to the base module 201 for data collection.

The data and communication module 200 is of particular interest in that an improved interfacing may be obtained by coupling communication between the data and communication module 200 and the base module 201 through a microprocessor 225, such as, for example an 80C51 microprocessor circuit. Typical on board ROM allows the microprocessor to be programmed to interact with a number of devices in accordance with the stored program. The microprocessor interacts with an interface circuit 226 which may be an analog or mixed analog and digital interface circuit. The program for interacting with the interface circuit 226 may also be stored within an on board ROM. The interface circuit 226 is coupled to a transceiver module 228. The microprocessor 225 may also be coupled directly to a data collection interface 229 to receive data from a scanner for reading any number of different bar codes or for providing input data from other external sources. The operation of the microprocessor 225 for coupling data to the base module 201 allows various input patterns to be processed by any of specific operational protocols controlled by the microprocessor 225, such that the data input from the data collection circuit can be made the same from any of a number of devices. Also, with respect to the operation of the transceiver, the program for operating the microprocessor 225 may include particular address codes for data retrieval and data communication via the transceiver. The data sent via a data and control bus between the microprocessors 225 and 204 can emulate a uniform data transfer protocol to the base module 201. The addition of the microprocessor 225 in a data and communication module 200 thus increases the number of communications devices that may be represented by the data communication transceiver circuit or module.

The data and communication module 200 may be removed and replaced with a number of other modules. In those modules, the transceiver 228 may be, for example, any RF radio, such as a spread spectrum, UHF, or cellular transceiver. The commonality between all communication modules is the microprocessor 225 and the associated communication protocol back to the microprocessor 205 of the base module 201. In other words, the program function represented by the interface circuit 226 and interacting with the microprocessor 225 permits the interactive control and data stream between the base module 201 and the data and communication module 200 to appear the same to the base module 201 no matter how the module 200 communicates.

The reference to the particular microprocessor circuits should not be considered limiting to the scope of the invention. The combination of two microprocessors interacting with each other, each controlling the environment of a respective one of two submodules such as the base module and the data and communication module permits an increased number of different components and functions to be used within the data system. The data collection terminal unit of the present invention is particularly designed for use in a mobile computer network. Such a network connects mobile interactive radio-equipped computers (such as the terminal unit 10) to an infrastructure of stationary computer devices.

Communication within the network is generally governed by software control through a grouping of software routines. Together, the software routines define an overall communication protocol for the network. The software groupings also define a stack of protocol layers; i.e., a protocol stack. The protocol stack divides the overall communication protocol into hierarchical layers of functionality.

Figure 1B:
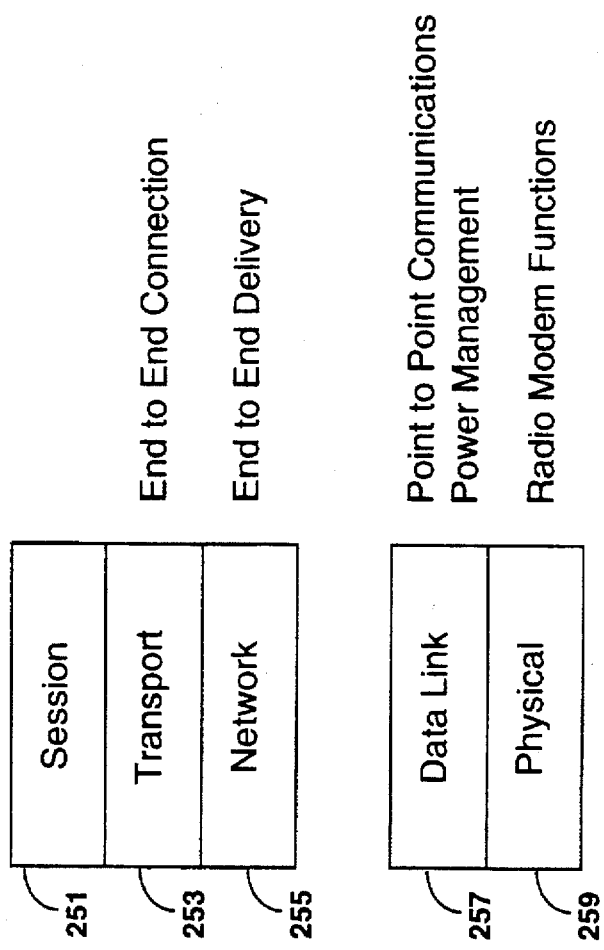
FIGS. 1B and 1C are diagrams illustrating the modularity of the software protocol stack used by the data terminal in accordance with the present invention.

FIG. 1B illustrates one embodiment of the software protocol stack used by the modular data collection terminal unit of the present invention. The protocol stack is split to illustrate that the functionality of the software is divided between the base module 201 and the data and communication module 200. Specifically, the functionality of the upper layers of the protocol stack (i.e., session layer 251, transport layer 253, and network layer 255) is performed by the microprocessor 205 of the base module 201 while the functionality of the lower layers (i.e., data link layer 257 and physical layer 259 is performed by the microprocessor 225 of the data and communication module 200.

The session layer 251 performs general logic functions, such as authentication of passwords, etc.

The transport layer 253 provides end-to-end connectivity within a mobile computer network. It recovers from the loss of data packets, discards duplicate data packets, and fragments and reassembles logical user messages. Essentially, the transport layer 253 provides a data pipeline between access points in terminal modes.

The network layer 255 provides end-to-end delivery of data packets within a mobile computer network. For example, if a spanning tree network offers the desired good network solution, the network layer 255 would (1) organize nodes in the network into a spanning tree; (2) route data packets along branches of the spanning tree; (3) provide a service for storing data packets for sleeping terminals (i.e. power management); (4) propagate lost terminal node information throughout the spanning tree; (5) maintain spanning tree links; (6) allocate and distribute network addresses; and (7) maintain and provide diagnostic network statistics.

The data link layer 257 controls access to the communication channel and is responsible for providing reliable transmission between any two devices in the network on both wired and radio links.

The physical layer 259 performs radio modem functions and is therefore very radio transceiver dependent.

As can be appreciated, the lower the level in the protocol stack, the more radio transceiver dependent the protocol becomes. Similarly, the lower the level, the more business environment specific the protocol becomes. Thus, a good dividing line for the protocol layers that exist in the communication module 200 is at the data link layer 257. This way, any communication module 200 supporting any type of radio transceiver can communicate with the common higher levels of protocol stack existing in the base module 201.

Alternatively, the dividing line might also be drawn at a higher level, for example, at the network layer 255, or at somewhere in between. For example, referring to FIG. 1C, a portion of the network layer which addresses the specific concerns of roaming portable terminals and power management might be migrated into the communication module 200. Such migration permits the communication module 200 protocol substack to be able to communicate with other higher level protocol stacks which do not directly support such network layer functionality.

Further detail regarding mobile computer networks and the above protocol is found in attached Appendix A, a Masters Thesis entitled "Mobile Computer Network Architecture" authored by Robert C. Meier, a co-inventor herein.

Figure 1C:
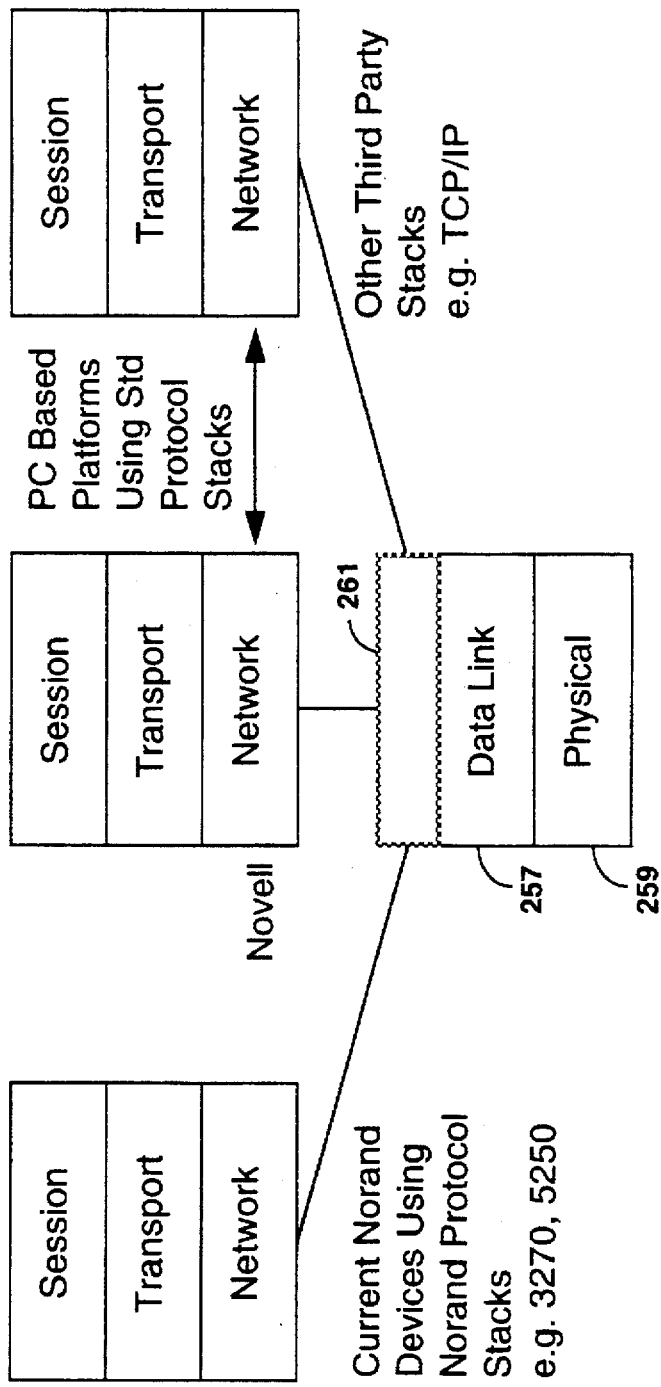

FIG. 1C illustrates the compatibility of the lower layers of the protocol stack (i.e., that of the data and communication module 200 used by the data collection terminal unit of the present invention with a variety of standard protocol stacks. Particularly, the protocol of the data and communication module 200 is capable of interfacing with any personal computer (PC) based platforms that use a standard protocol stack. Such PC based platforms may include, for example, a Novell Ethernet Network or TCP/IP. The network layer protocol associated with the mobility of a terminal unit (i.e., specific spanning tree and power management functionality), data link layer, and the physical link layer is managed by the microprocessor 225 of the data and communication module 200. This protocol substack is stored in the interface circuit 226. Similarly, the substack containing the sessions layer transport layer and a majority of the network layer is stored in memory in the base module 201.

Figure 2:
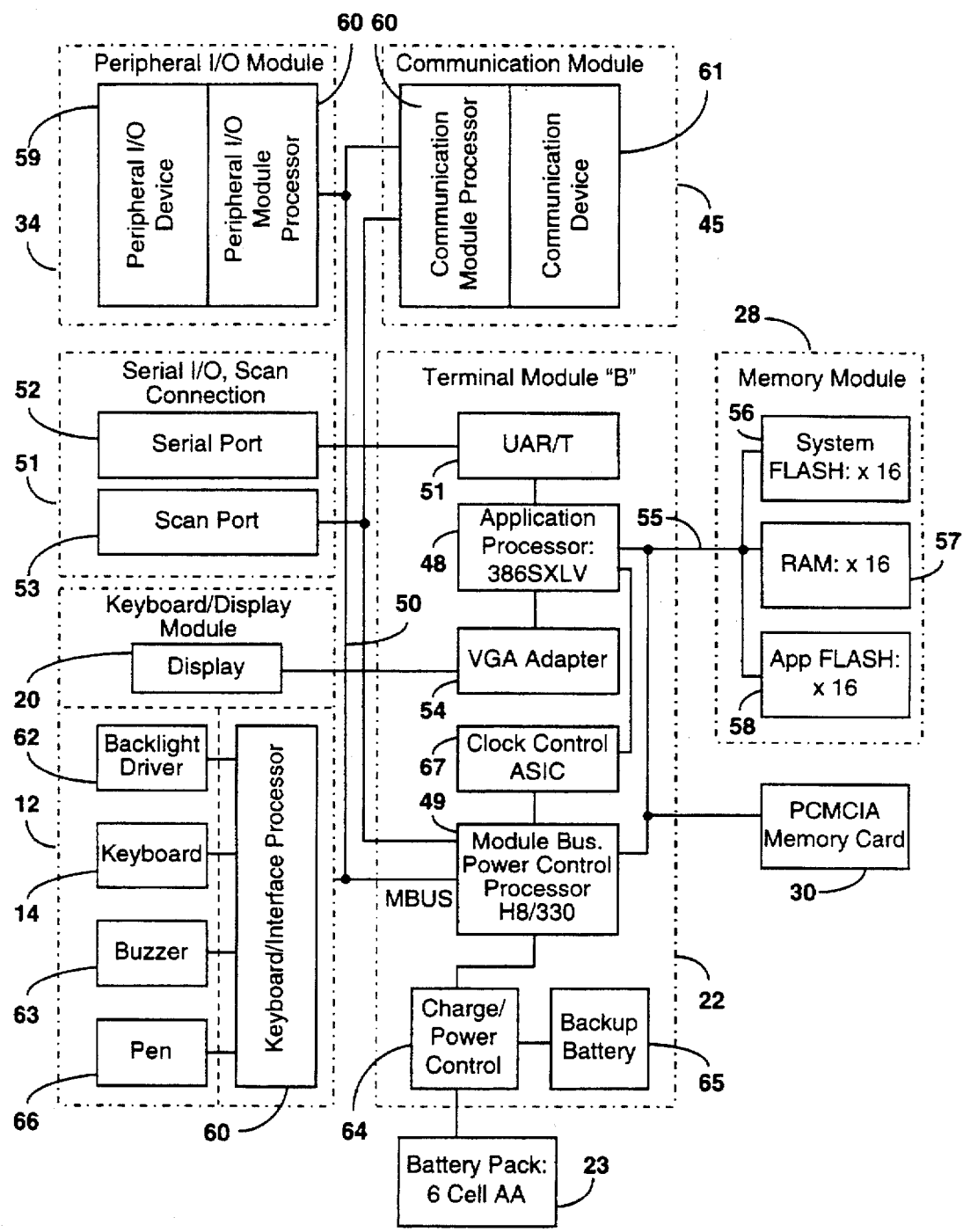
FIG. 2 is a schematic diagram of functional interfaces among various modules of the data collection terminal shown in FIG. 1.

In an alternate embodiment, FIG. 2 illustrates a schematic diagram of functional interfaces among various modules of the data collection terminal unit of FIG. 1. As will become more apparent below, the embodiment in FIG. 2 expands on the concept explained in reference to FIG. 1A of splitting up the hardware functionality and software protocol layers of the terminal unit 10 to enable ease of radio transceiver substitution. FIG. 2 refers to a display screen module 20 which is similar in function to display screen module 19 discussed above, yet which may include selected differences to illustrate the advantages of the modular concept in combination with other features of the present invention. Display screens may vary in size or resolution or both, such that options among a number of display screen modules 19 may be made available to a potential user of the terminal unit 10. A display of an array of (128by240) pixels of, for example, (0.25×0.25) millimeter is an example of what is considered to be a desirable display screen resolution. Another screen array size may be (64×192) pixels, for example, of (0.35×0.50) millimeter per pixel.

The keyboard and display module 12 occupies most of the area of the terminal unit 10 which faces an operator when the terminal unit 10 is held and operationally used by the operator. Assembled to an underside 21 of the keyboard and display module 12 are preferably two major modules of the terminal unit 10. A first module is what is referred to as the terminal module 22. Whereas the keyboard and display module 12 is the major interface component between the operator and the terminal unit 10, the terminal module 22 is a major functional component of the terminal unit 10 itself, as will become apparent from the description herein. The terminal module 22 functionally controls the interaction of the various units or modules as described herein, and functionally is the control unit of the terminal unit 10. The terminal module 22 houses functional submodules and microprocessor circuits. A significant component is, of course, a power pack module 23. The power pack module may contain, for example, six AA type rechargeable cells which may be arranged in a convenient flat arrangement and fitted into a battery end 24 of a housing 25 of the terminal module 22. The power pack module 23 supplies the power to various modules of the terminal unit 10, thus providing the capability for portable use of the terminal unit 10.

From the above description of potential choices of the type of display on the display screen 18, and further choices among keyboard arrangements of the keyboard 14, different requirements for electronic support circuits are indicated. One of the requirements to support the economical changing of functions is a means to provide a ready change in programmability of microprocessor circuits. Some module selections of the terminal unit 10 require less memory usage and different operational protocols than others. In accordance with a preferred embodiment, a memory module 27 may be selected as one of a number of differently programmed memory modules 27. However, in addition to being differently programmed, an alternate memory module 28 may include a different memory size (in cell numbers and in configuration). The terminal module 22 may further include an exchangeable memory card 30. The memory card 30 may be used to provide additional memory capacity as well as control programs for various desired functions of the various modules as described herein. The memory card 30 is schematically shown as being insertible laterally into a slot 32 of the housing 25 of the terminal module 22. However, the shown physical arrangement is but one of a number of equally desirable arrangements. An enclosed and sealed arrangement for the memory card 30 is desirable to protect modules of the terminal unit 10 from the environment.

A peripheral I/O module 34 is shown at a lower or inner end 35 (see FIG. 1) of the terminal unit 10. The inner end 35 is typically pointed toward an operator of the terminal unit 10, as the unit is held in the operator's hand with the keyboard and display module 12 directed upward toward the operator. The I/O (Input-Output) module 34 may typically include externally of a housing 36 a standard RS-232 and RS-485 connector 37. FIG. 1 also depicts a round communication connector 38. The peripheral I/O module 34 provides an interface between the terminal unit 10 and such diverse peripheral devices as "docks". Docks may be batch transfer devices for transferring accumulated data, battery charging devices, or cables which may connect to a code scanner, for example. An RS-232 interface is typically connected to a printer, for example.

A serial I/O and scan connection module 41 may be attached at a longitudinally opposite outer end 40 (see FIG. 1) of the terminal unit 10. The scan connection module 41 is a high speed serial data communication module 41 which provides for serial data to be received in high volume from a scanner for example. Scanner data are typically received in a high density data string and require significant processing. As will become apparent below, a direct communication link to the data processing capability of the terminal unit 10 is provided through the scan connection module 41.

A further functional module is a communication module 44. Again in reference to FIG. 1, the communication module 44 may be disposed adjacent the terminal module 22 toward the outer end 40 of the terminal unit 10. The communication module 44 is selected from a group of available communication modules of distinct functions. The selection of one of the communication modules such as the communication module 44 in FIG. 1, may characterize or classify the operation of the terminal unit 10. For example, a communication module 44 may have been selected from a group of modules which include standard FM data radio transceiver modules, spread spectrum radio transceiver modules, modem communication modules, scanner device modules, or other data input devices. FIG. 2 shows a communication module 45 as an alternate to the physical representation of the communication module 44 shown in FIG. 1 to indicate a diversity of modules available for substitution. In further reference to FIG. 1, the communication module 44 is shown as having an antenna 46, indicating the selection being a transceiver unit for radio frequency real time communication with a data system. Such a data system typically includes a further transceiver station, not shown, with which the transceiver module 44 communicates. The operator of the terminal unit 10 also constitutes a second end of a communication link that is established by the operator's manipulation of the keyboard 14 and by the operator's visual perception and recognition of the data displayed on the display screen 18.

Referring now to FIG. 2, a functional schematic diagram of a combination of the physical modules discussed with respect to FIG. 1, or of alternate equivalents of the modules in FIG. 1, is shown. The modules with respect to which preferred physical positioning was discussed in reference to FIG. 1 are now shown functionally related in FIG. 2. It is to be noted that the schematic representation refers to functional or communication rather than electrical connections. The power pack 23 is typically coupled to power all electrically driven circuits of the terminal unit 10. The power pack 23 is functionally and physically coupled to the terminal module 22. While electrical power is distributed from the power pack 23 to all electrically powered or controlled modules of the terminal unit, the remaining power of the power pack is actually monitored by a function of the terminal module 22. The power pack 23 as the sole portable power source for the terminal unit 10 would, but for power saving provisions, experience a significant power drain during the operation of the terminal unit 10.

Power savings are implemented by selectively using circuit functions as they are needed. Accordingly, the terminal module includes preferably first and second microprocessors 48 and 49, respectively. The first microprocessor 48 is a data processing device and is also referred to herein as an application processor 48. The application processor may be any of a number of available microprocessors available. Desirably the application microprocessor 48 has the capability of processing data with greater word length or word width than the second processor 49. The term word width refers to the number of data bits that are capable of simultaneously being processed, retrieved or stored. The application processor 48 is therefore one capable, for example, of processing a 16-bit or a 32-bit data word. The processing speed and clocking rate of the application processor 48 would desirably exceed that of the second microprocessor 49. At present, the more powerful microprocessors, such as the microprocessor 48, have higher power requirements than the second microprocessor 49. However, even with the higher power requirement during operation, power savings may be achieved by providing a rest state at which the microprocessor 48 is not clocked and thus deactivated.

The second microprocessor 49 is also referred to as a control processor 49. The second microprocessor controls the operation of the terminal module 22 and controls communication within the terminal module as well as among the various other modules of the terminal unit 10. The control processor 49 requires less power for operation than the application processor 48 for reasons that will become apparent. Control is an ongoing function. Because the operational speed of the control processor 49 is comparatively slower than that of the application processor 48, the operational power consumption of the control processor 49 is also lower than that of the application processor 48. The control processor 49 may be a Hitachi H8/330 type microprocessor device. The Hitachi H8/330 processor features on-board memory which is convenient for its intended operation as will be seen in reference to its operational modes as set forth herein. The H8 type processor is an 8-bit processor, capable of processing data in an 8-bit word length. However, the control processor 49 need not be an 8-bit processor. In general, the word width processing capacity of the control processor 49 should be chosen to be relatively less than that of the application processor 48. The control processor 49 does not require the processing speed that is desirable for the application processor 48, and, processors with relatively low word width processing capacity (considering processors in general) require less processing power. It should be understood, however, that the specification of any particular device, such as the Hitachi H8-type microprocessor for the control processor 49, is for illustrative purposes only. The features and desired functions of the invention will be helpful to one skilled in the art to select any of a number of acceptable devices to function in the desired manner as described herein.

Figure 3:
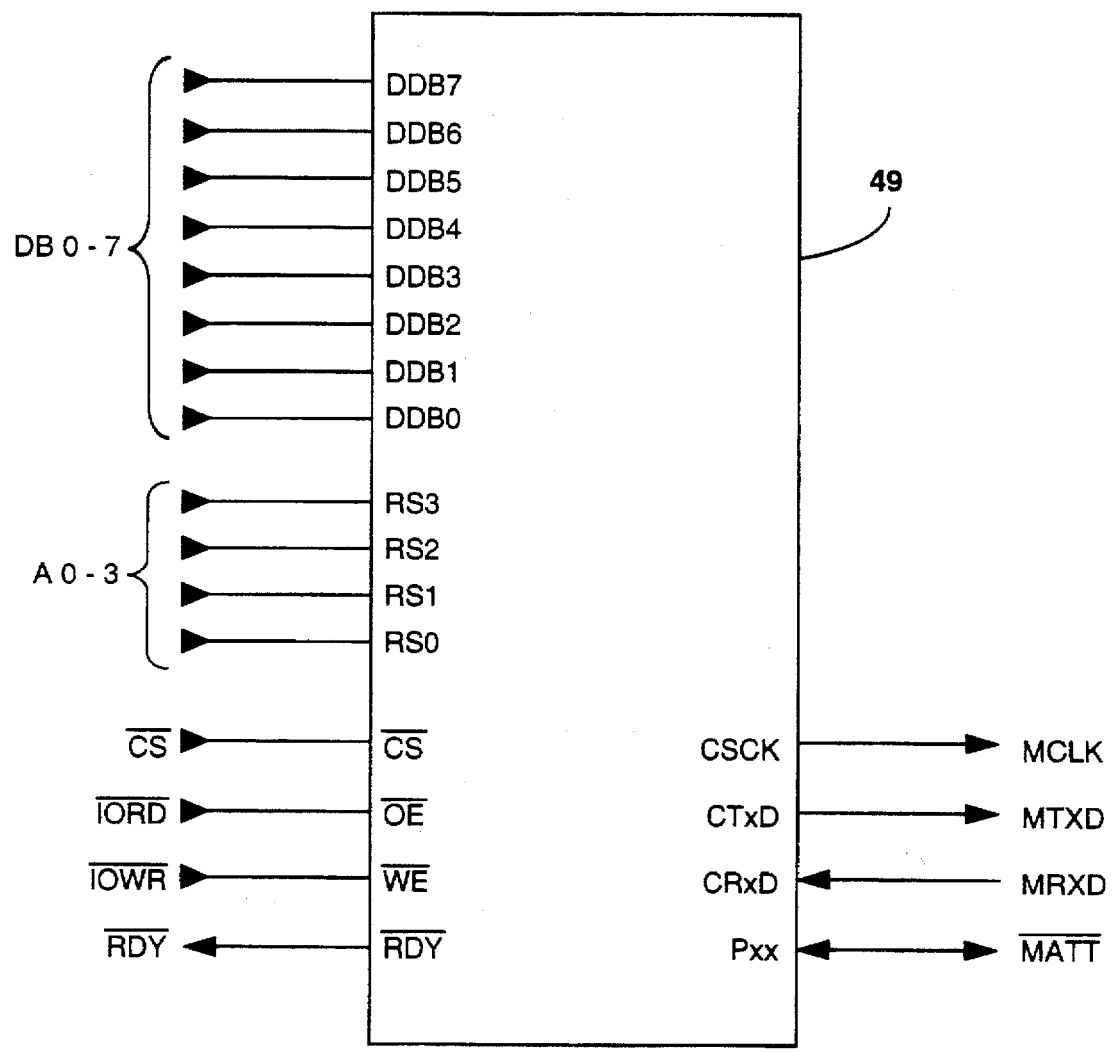
FIG. 3 is a schematic diagram of a control microprocessor, illustrating data bus terminals for synchronous communications.

FIG. 3 shows a schematic block representative of signal terminals of the control microprocessor 49 which are pertinent to the preferred mode of implementing the present invention. In describing the significant signal and data terminals, a bar above a designation indicates that a low signal is active. Herein, the inverse or signal low active state is described with an "N" preceding the letter name at the respective signal term. To communicate among the various described modules, four signal leads of the control processor 49 define the leads of a communication bus 50 referred to herein as "MBUS". The MBUS 50 is a high speed synchronous serial data signal bus which may, and preferably does, operate at a signal rate of 500 kilo bits per second. The high speed data bus provides reliability advantages explained below. A modular structure in which the modules are readily disconnected and reconnected to permit convenient changes during the manufacture of the final product, may reduce the reliability of the terminal unit 10. When reliability is decreased with each additionally coupled module, the advantages of modular structure are quickly dissipated. Compared to typical parallel data buses used to link components of electronic products or systems, the present system architecture of the modular terminal unit 10 requires significantly fewer contacts to interconnect the various modules. With fewer signal lines to manage, it becomes more feasible to protect each line from noise and interference effects by using well known shielding, impedance reduction and termination techniques thereby increasing the reliability of the terminal unit 10. As a result, the present invention is typically more reliable than modular systems with conventional parallel data transfer, due to the reduction in the interconnections among the various modules. FIG. 3 shows four signal terminals which constitute the MBUS concept. "MCLK" is the clocking signal which synchronizes the modular counterparts of the control processor 49. The clocking signal provides for a bit rate of 500 kilo bits per -second. The terminal labeled "MTXD" transfers data from the control processor onto the MBUS 50. The terminal labeled MRXD receives data from other modules over the MBUS 50. The low signal active "NMATT" is a control signal line which indicates that data will be communicated over the MBUS 50. These four lines effectively permit the various modules to communicate among each other. A number of signal contention protocols are available to resolve potential collisions in data communication. It should be understood that any standard signal contention protocol may be modified if so desired to assign specific priorities for communication among the modules. For example, data received from a scanning operation may be accepted and processed on a priority basis. Keystroke inputs from the keyboard and display module 12 may be given priority over data flow from the communication module 45. Similarly, data messages received via radio transmission from an external master unit (not shown) may be given priority. Program altering instructions may be embedded within the message which affect future operations of the terminal unit 10.

Further with respect to FIG. 3, corresponding data lines interfacing with the application processor 48 are indicated as parallel signal lines DB0–7 and data lines A0–3. Data communication and control procedures between the control microprocessor 49 and the application processor 48 are further described with respect to alternate embodiments.

Referring again to FIG. 2, the application processor 48 is coupled to an asynchronous device or "UAR/T" function 51 with an output coupled to a serial port 52 of the serial I/O scan connection module 41. The serial I/O scan connection module 41 further includes a scan port 53 which links to the control processor 49 to communicate control signals, such as scan trigger signals, for example. The application processor 48 is further coupled to a VGA adapter circuit or driver 54 for driving the display screen 20. The display screen function is processor intensive. Data processing operations are, therefore, managed directly through the application processor 48. The data processing operations performed by the application processor 48 are in most instances memory-usage intensive. Consequently, the application processor 48 is linked by a conventional data bus 55 directly to the memory module 28. The memory module 28 is shown as including representative data storage functions or circuits including a 16-bit word width system FLASH-programmable memory 56, a typical 16-bit word width random access memory 57 ("RAM"), and additional application FLASH-programmable memory 58, also preferably 16-bit word width. The 16-bit word width storage devices 56, 57 and 58 are preferred in conjunction with a 16-bit microprocessor device. Presently preferred 16-bit microprocessors are a Chips and Technologies F8680 device or an Advanced Micro Devices 386SXLV processor. The selection of other processors for the microprocessor 48 may require different types of memory devices or different word width or storage capacities than those described above.

The peripheral I/O module 34 may, as discussed with respect to FIG. 1, include standard connectors for coupling the module 34 to an external device. A particular device 59 may be a portable printer device, as shown in the function block 59 of FIG. 2, which may be mounted or coupled directly to the terminal unit 10. The peripheral I/O device, whether it is a printer or a reader or other data input or output device, would functionally include a microprocessor 60. The microprocessor 60 is chosen to interact with the MBUS system. The microprocessor 60 is coupled in each described element to function as a terminal element, which is an interface communicatively coupling the respective logic circuits of the module to the MBUS. The microprocessor 60 receives control codes via theMBUS 50 and responds by activating or de-activating the power circuits of the respective module, or conditioning the module to receive or transmit data.

The communication module 45, which may be a modem or any of a number of available radio frequency transceiver modules, also includes a compatible microprocessor 60 which interfaces with a respective communication device 61 of the module 45. The communication device 61 may be a modem or transceiver device, for example. The keyboard and display module 12 also preferably includes its own interfacing microprocessor device 60. The keyboard and display microprocessor 60 is coupled to control various functions which are directly associated with the keyboard and display module 12. A particular function which may be conveniently controlled via the MBUS 50 and the respective control processors 49 and 60 is a backlight drive 62 for the display screen 20. Another function is a buzzer 63. The buzzer 63 may be activated to signal an incorrect key depression by an operator. The buzzer 63 may further be used to alert an operator when a charge and power control circuit 64 detects that the power pack 23 has become discharged and a backup battery 65 is being engaged, giving a user time to recharge or replace battery pack 23. The power control 64 may function to shut down the terminal unit 10 from further operation until the power pack has been recharged. In a preferred embodiment, power from the backup battery 65 would be maintained on the control processor to permit it to determine when power from the power pack 23 has been restored. The processor 60 of the keyboard and display module 12 may also control other input or output devices that may be coupled to the keyboard and display module 12. For example, a pen 66 may be coupled to the keyboard and display module 12 for use in connection with a pen stylus sensitive keyboard module 14 or in connection with a pen stylus sensitive display screen 20. In this latter instance, the display screen module 20 becomes an input device in addition to being an output device.

The application processor 48 and the control processor 49 are preferably controlled through a timing Application Specific Integrated Circuit 67 ("clock control ASIC"). The clock control circuit 67 may be driven from a single clock signal which is then divided to provide respectively different clocking rates to each of the processors 48 and 49. The implementation of the timing circuit 67 in a single circuit function is more efficient and provides synchronization among the components and modules. A second clock signal for implementing a real time clock may also be provided.

In addition to providing better reliability as discussed above, the MBUS 50 also provides more compact physical routing of cables among the modules. Furthermore, control of the functions of the various described modules via the MBUS 50 provides power savings, as will be described more fully below in reference to FIGS. 4 and 5. To conserve power and prolong the operational time of the terminal unit 10 between changes or recharges of the power pack 23, the control processor 49 and the related MBUS module processors 60 place any module which is not in active use into dormant state.

The MBUS 50 communicatively interconnects the modules of the terminal unit 10, such as the peripheral I/O module 34, the communication module 45, the keyboard and display module 12 and the terminal module 22. Other modules that may be included in the active communication network of the MBUS 50 may simply be added as described herein. For each module, one of the microprocessors 60, having the data terminals of the microprocessor 49 shown in FIG. 3, namely MCLK, MTXD, MRXD and NMATT are coupled to the respective lines of the MBUS 50 to become part of the internal communication network of the terminal unit 10. The microprocessors 49 and 60 constitute the terminal elements of the communication network represented by the MBUS 50. For each module, the respective microprocessor 60, though it may be physically identical to the control microprocessor 49, functions as a subservient processor to the control processor 49. The microprocessors 60 become a communication interface between the MBUS 50 and the functional circuits of the respective module, whether the module is the communication module 45, the keyboard and display module 12 or the peripheral I/O module 34. Inputs from the respective module are accepted by the processor 60. An H8/330 microprocessor includes internal memory for receiving and temporarily storing data communications. Programmable ROM on the H8/330 permit instructions to be stored which particularly configure the microprocessor as a module processor 60. The interface operation of the microprocessor 60 differs from the controlling operation of the control processor 49 as shown below in reference to FIGS. 4 and 5.

Figure 4:
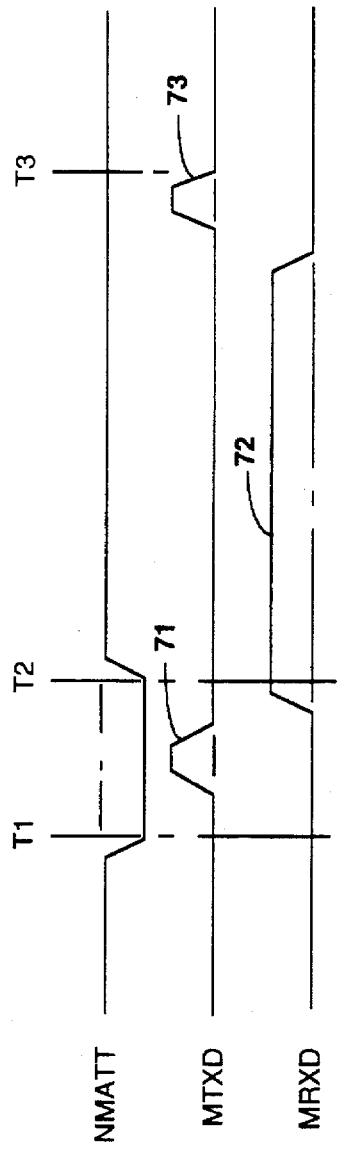
FIG. 4 is a sequencing diagram showing schematically occurrences of a module-initiated communication sequence in accordance with features of the invention.

A normal state of the microprocessors 49 and 60 is a sub-active or dormant state. In this state, the module processors 60 and the control processor 49 are clocked at a power saving "slow" clocking speed. The sub-active or dormant operational state permits the module processors 60 and the control processor 49 to execute certain long-interval control functions. For example, the keyboard and display screen processor 60 monitors the keyboard in order to sense a keytop depression while the control processor 49 maintains the charge and power control circuit 64 in order to sense a low battery signal. Upon occurrence of an event which that affects the operation of any typical communication function that is driven over the MBUS 50, all modules and the control processor are placed into a fully activated mode. The control processor 49 queries, directs and controls communication over the MBUS 50. For example, FIG. 4 shows an activation cycle of the MBUS 50 which is initiated by one of described modules other than the terminal module 22, i.e., from one of the processors 60. The respective processor 60 drives the NMATT line of the MBUS 50 into a low signal state. The low state of the NMATT line activates all processors 60 to receive an inquiry or instructions. At T1 in FIG. 4 all modules have been placed into the active state. During the time interval T1 to T2 the control processor sends a query or polls the activated modules over the MTXD line which is reserved for transmissions originating from the terminal module 22, i.e., from the control processor 49. The query would typically contain at least one byte of data, the quantitative translation of the byte of data indicating to the processors 60 that it is a query in response to one of the module processors 60 having driven the NMATT line to a low state. The query shown at 70 signals the processor 60 to transmit its data message over the MRXD line of the MBUS 50. At the onset of the data transmission 72 from the respective communicating module processor 60, the NMATT line is restored to a high state, placing all other modules back into the dormant condition. As shown in FIG. 4, the data communication may proceed for a variable length of time past the time state T2 at which the NMATT line has returned to a high state. Upon termination of data communication from the respective module processor 60 to the control processor 49, the control processor 49 sends a message 73 confirming correct receipt of the data message (at T3). Again the confirming data message contains at least one byte of information, the decoding of which would either indicate an error code or signal the correct receipt of the data message. At that time (at T3), the communicating module processor 60 and the control processor 49 also assume the power saving dormant state.

Figure 5:
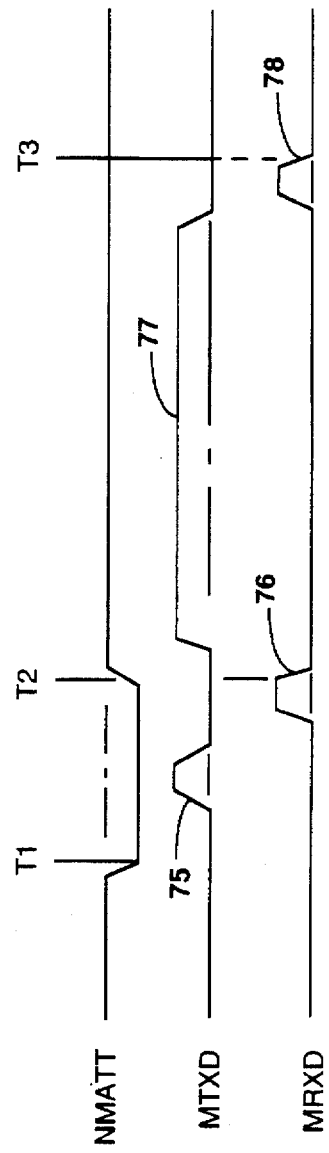
FIG. 5 is a further sequencing diagram illustrating schematically occurrences of a controller-initiated communication in accordance with features of the invention.

FIG. 5 describes a very similar event in which the control processor 49 drives the NMATT line to a low state. Again, all processors 60 assume an active state and all processors 60 receive a communication 75 of typically at least one byte of information from the control processor 49 during the time interval between T1 and T2. The information 75 contains an address of the module to which a data message from the control processor 49 will be directed. The respective module processor acknowledges its understanding of the address by a responding message 76 which may be translated by the control processor 49. In response to the receipt of the message the control processor releases the NMATT line, which assumes its normal high state and places all non-affected module processors 60 again into a dormant state. The control processor 49 then transmits its data message as indicated at 77 to the respective, previously addressed module processor 60. At the conclusion of the communication 77 from the control processor 49, the respective module processor acknowledges receipt of the communication 77 by its response 78. Once it is interpreted from the response 78 that the communication 77 has been received correctly, both the control processor 49 and the respective module processor 60 assume their dormant states. It is to be noted that the respective data messages shown in FIGS. 4 and 5 indicate durations of data messages. It is to be understood that the high and low states of other than the NMATT line indicate a time interval during which a great number of high or low states in synchronous time slots are transmitted essentially at the bit rate of 500 kilo bits per second. This bit rate may include start and stop intervals.

In the described communication events, power consumption by the terminal unit 10 is minimized by providing for a quasi dormant state for substantially all functions of the various modules, such that electrical power is used in pulses during the described query states and only in spurts by certain modules during real time performances. The power saving features in communication from and to the various modules is further present in implementing highly power intensive data processing operations in the terminal module 22.

Figure 6:
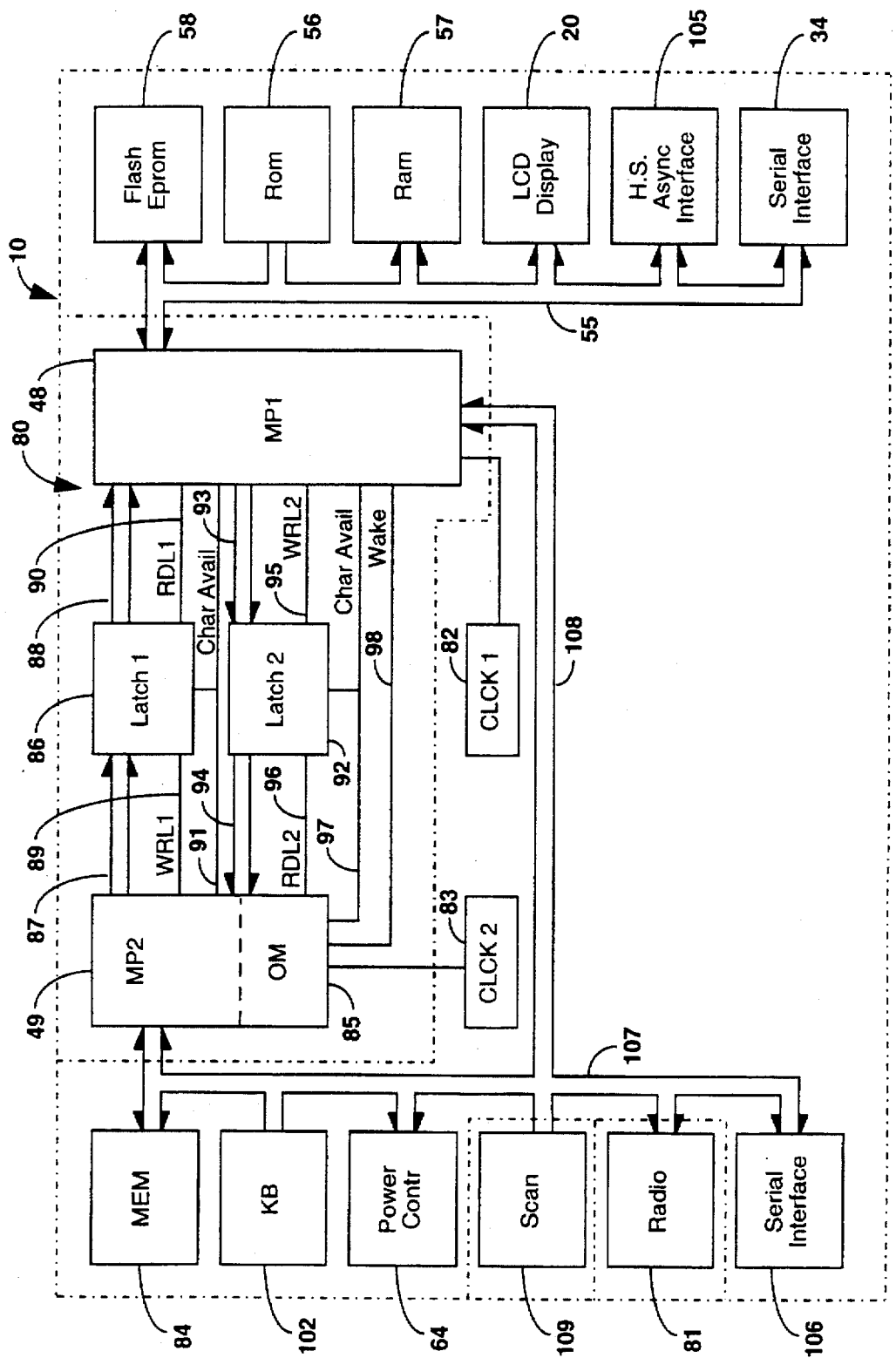
FIG. 6 is a schematic diagram of an alternate embodiment of the invention showing major functional elements and their interaction with a power saving microprocessor control circuit in accordance with the invention.

Referring to FIG. 6, the schematic diagram illustrates an alternate embodiment of the present invention where major functional logic and communications elements are coupled to and interact with the application processor 48 and the control processor 49 in a power-conserving microprocessor circuit 80. The circuit 80 may control the operations of, or be functional in the operation of, the terminal unit 10. The terminal unit 10 may interact as described with one or more distinct functional modules including communication modules, such as a transceiver communication module ("RADIO") shown at 81. Because the terminal unit 10 is portable, the physical circuits of the functional units or modules shown in FIG. 6 would typically be powered by the power pack or battery 23 (shown schematically in FIG. 2), which is illustratively included in the power management function ("POWER CONTR") 64. The microprocessor operated control circuit 80 comprises a combination of the application microprocessor 48 and the control microprocessor 49. The circuit 80 can also be two circuit portions that include specifically two microprocessor type subcircuits 48 and 49. Each of these subcircuits 48 or 49 are separately functioning microprocessor blocks, modules or separate microprocessor devices. In the preferred embodiment as described herein the devices are respectively an application processor 48 ("MP1") and a control processor 49 ("MP2"). It is advantageous to perform data processing operations at a comparatively higher speed and with a more powerful processor than is be desirable for relatively less complex control functions.

The term "data processing operation" may used herein in the sense of manipulating a series of binary codes according to programmed instructions to arrive at a desired result. Because of the great number of discrete binary operations required to perform many of the most common data processing functions, higher processor speeds and more complex or powerful microprocessor circuits of those typically available are more desirable for data processing operations.

In the now described embodiment, the application processor or data processing device 48 may be an "Intel 80C188EB" device which is "16-Bit" microprocessor device, operated at a preferred speed of 9.2 megahertz (MHz). At such preferred clocking speed of 9.2 MHz, the power consumption or operating current consumed by the data processing microprocessor device 48 is approximately 55 milliamps ("mA"). The control processor 49 may be a "Hitachi H8/325" device which is an "8-Bit" microprocessor, operated at a speed of one-half of the speed of the data processing microprocessor 48, that is, 4.6 MHz. Because of the smaller physical size of the control processor 49 and the slower, preferred clocking speed, the power consumption or current required by the control processor 49 in its operational mode is only about 9 mA, that is less than one-fifth of the power consumed by the processor 48. In general, the control microprocessor circuit or the control microprocessor 49 desirably operates at a slower and less power consuming speed than the application microprocessor circuit or the application microprocessor 48. A one-to-two speed ratio for driving the respective microprocessors 49 and 48 is preferably chosen because of the power savings that are realized with respect to the portable terminal unit 10. Respective clocking circuits 82 and 83 ("CLCK 1 and CLCK 2") are shown as providing respective timing signal ports coupled to the respective processors 48 and 49 to drive the processors at the desired speeds as described.

Also, a functional arrangement of the separate clocking circuits 82 and 83 preferably may be replaced by the clock control circuit 67, as shown in FIG. 2. The clock control circuit 67 may be expanded in its function to include an interface circuit function between the processors 48 and 49 which includes data transfer as well as clocking functions. The clock control circuit 67 would include in such coupling arrangement a typical divide-by-two timing circuit function. An original 9.2 MHz clocking signal port and a signal port with the divided by two signal, comparable to the timing signal ports 82 and 83, would be coupled to the respective timing signal input ports of the processors 48 and 49, respectively, to drive the processors 48 and 49 at their respective speeds of 9.2 and 4.6 MHz. As mentioned above, a second clock may be coupled to the clock control circuit 67 to provide a real time clock.

As will become apparent from the further description, it is within the scope of the invention to integrate the distinct functions and operational characteristics of the separately identified microprocessor devices 48 and 49 into a single integrated device. The resulting integrated device 80 desirably includes respective interface functions, as further described herein, to implement the power-saving characteristics realized by the control circuit 80. Within such integrated device 80, the function of the application processor 48 is then performed by a first microprocessor circuit block or circuit portion, and the function of the control processor 49 is performed by a second microprocessor circuit block or circuit portion. These circuit blocks, portions or modules interact essentially in the same manner within the circuit 80 as the currently used microprocessor devices 48 and 49.

The control processor 49 may include in its commercial implementation, in addition to typical microprocessor registers and an arithmetic logic unit, such functional circuit blocks as ROM, RAM and communications ports. These circuit blocks may also be included in any integrated device 80, or their functions may be supplied by peripheral devices. As shown in FIG. 6, additional external memory 84 ("MEM") may optionally be provided to supplement such on-board memory 85 ("OM"), though for typical operations as further described herein, the external memory device 84 is not required. According to one embodiment, data communication between the processors 48 and 49 occurs via an interface circuit that includes, for example, two 8-bit data registers or latches described in greater detail below in relation to FIG. 6. It should be understood, however, that the control processor 49 may have a direct bus interface to enable direct coupling of the control processor 49 to the application processor 48. The coupled processors 48 and 49 are capable of bidirectionally passing data and control signals without the described two 8-bit data registers or latches. Also, data latches are generally considered temporary data storage devices. Data from one device are latched into a respective data latch to be retrieved by a second device. Although not preferred, it is contemplated that dual port memory may be used as an alternative to the latches described below.

The clock control ASIC function 67 shown in FIG. 2 should be understood to not only include the clocking signal coupling circuits to drive the respective application processor 48 and the control processor 49, but to further include the data interface or bus to permit the desired bidirectional data and control code communication between the processors 48 and 49 as further described herein. In further reference to FIG. 2, an integration of the processor devices 48 and 49 into a single device desirably may include the described function of the interface and clock control circuit 67.

Referring again to FIG. 6, a first latch 86 ("LATCH 1") of the two latches is coupled through an 8-line parallel bus 87 to the microprocessor 49, and through a similar bus 88 to the microprocessor 48. Respective write and read lines 89 and 90 ("WRL1 and RDL2") provide control or trigger signals for the processor 49 to write data into the first latch 86 and for the processor 48 to read data from the latch 86. A handshake or control signal line 91 ("CHARAVAIL 1") toggles between a high or "logic 1" to indicate to the processor 48 that data have been read into the first latch 86 by the processor 49 and a "logic 0" to signal that the processor has read or taken the data from the first latch 86. A second latch 92 ("LATCH 2") similarly stores an 8-bit data element written into the second latch 92 by the processor 48 over a second 8-bit write bus 93. A second read bus 94 transfers the data element stored in the second latch 92 from the latch to the second processor 49. The control or trigger signals for writing into or reading from the second data latch 92 are provided over trigger lines 95 and 96 ("WRL2 and RDL2"), respectively. A second handshake or control signal line 97 ("CHAR AVAIL 2") coupled to the second latch 92 and to the processors 48 and 49 also toggles between high and low signal states to indicate in the high state the availability of data in the second latch 92 and in the low state the completion of a read operation of the most recent data element by the control processor 49.

A control signal line 98 carries a control signal generated by the control processor 49 which controls the duty cycle of the application processor 48. In reference to FIGS. 7 and 8, the current usage of the control processor 49 ranges between a high of 9 mA in a typical operating mode and a low of about 7 mA in a typical "idle mode" at the preferred frequency of 4.6 MHz, (See FIG. 7, graphs 100 and 101, respectively). It should be realized that even while "idle", the control processor maintains power to internal memory and performs typical periodic monitoring functions, such as, for example, sampling a keyboard circuit 102 ("KB") for a "Depressed Key" signal or routinely monitoring the power management function 64 for a "Low Battery" indication. However, even when in the typical operational mode as indicated on the current vs. frequency graph 100, the control processor uses only about one-sixth of the current used by the application processor 48 in its preferred operational mode. On the other hand, when the application processor 48 is placed into an idle state (i.e., when it is not driven by a clocking signal), the required maximum current rating is 0.1 mA, as shown by the high-low indicated values at the 9.2 MHz frequency mark at and below graph 103 in FIG. 8.

Graph 103 indicates the typical operating current consumption of the application processor 48. It should be noted that the application processor 48 could be deactivated by a complete electrical shut down of the device. However, because of the low non-clocked power or current draw of the application processor 48, the application processor function is preferably deactivated by eliminating its clocking signal but maintaining the application processor 48 under DC bias. Removing the clocking signal from the application processor function achieves a desired power-down idle state while permitting the device 48 to be reactivated immediately by an appropriate "wake up" control signal from the control microprocessor 49.

Typical data processing operations performed by the application processor 48 require approximately 10 milliseconds of time and not more than 20 milliseconds on the average of all operations which are typically performed by the application processor 48. A more user friendly and practical response time may be obtained from the terminal unit 10 (and less power is required) when the application processor 48 performs substantially all data processing operations and is subsequently immediately deactivated than if a single alternative microprocessor circuit were used operating at a higher rate and including sufficient computing capacity to perform all required functions in an appropriately short time. The combination of the application processor 48 and the control processor 49 amounts to an approximate increase in current usage of typically only about ten percent, and in the extreme of no more than 20 percent, over the normal operating current level of the control processor by itself. The power required by the application processor 48 as controlled by the control processor 49 is about one fifth that required by the control processor 49 itself when it is operated continuously. However, the display speed and data manipulation speed of the terminal unit 10 essentially is the same as if the unit 10 were controlled by the more powerful application processor 48.

The operating current requirement for the application processor 48 is directly related to the number of actively switching elements in each computational operation. Though having an interrupt function, the referred to 80C188EB processor 48 does not include, in contrast to the control processor 49, any internal memory devices. FIG. 6 consequently shows a data bus 55 of the processor 48 coupled to external memory devices, such as the flash electrically erasable and programmable read-only memory 58 ("FLASH EPROM"), a read-only memory 104 ("ROM") and atypical random access memory 57 ("37 RAM"). The ROM 104 is also the functional equivalent to the system FLASH memory 56. The data bus 55 further couples the application processor directly to the display module 20 ("LCD DISPLAY") of the terminal unit 10. The display module 20 may be a dot addressable LCD graphic screen module, for example. A direct data transfer by the high speed application processor 48 to the LCD screen is preferred because of the substantial amounts of data handling or processing that is required in updating a particular screen. For example, even a small graphic screen display, such as a screen of 48×100 pixels, requires that each of the pixels be updated on a continuous basis. Typically control circuits, which are part of the data display function of the module 20 and are not separately shown, and which may be specific to a particular screen display, may routinely re-apply currently displayed information dots in a cyclic refresh operation to the already identified pixels of the screen. However, any screen update, such as a simple display line scrolling operation, requires that each pixel of the screen be updated.

To perform such updating of information in a power efficient and prompt, user-friendly manner, a data processing operation and the high speed passing of the updated data between the RAM memory 57 and the data display 20 is accomplished during a short operational activation of the application processor 48. More data processing with respect to the data display screen 20 may be required for routine menu operations. Menu operations are particularly desirable for such portable terminal units 10, in that the typical user may not be well acquainted with computer terminals. Well defined menu operations with a number of available menu levels may therefore significantly increase the usefulness of a terminal unit. In addition to requiring the normal display screen update, menu operators also require data base searching and data retrieval. The described microprocessor circuit (i.e., with the selectively activated data processing device 48 and the relatively smaller and slower control processor 49) may be used to perform the above described menu operations.

Selective activation and deactivation of the microprocessor circuit portion implemented by the data processing device or application processor 48 also provides power savings when the operating speeds of the two processors 48 and 49 are the same. However, such power savings do not appear to be as great as those realized by the embodiment described above.

The application processor 48 may also communicate with a high speed asynchronous communication interface 105 ("H.S. ASYNC INTRFCE") to support facsimile or external display screen operations. In addition, the application processor 48 may communicate data to an RS-232/RS-485 serial interface module 34 ("SERIAL INTERFACE"). However, it should be realized that certain communications operations, such as outgoing communications to a printer (not shown) for example, may occur under the control of the control processor 49. Even when the application processor 48 selects data for communication to a line printer, a typical printer speed, except in a graphics mode, would be sufficiently slow to allow the application processor 48 to operate in an intermittent, power saving mode. FIG. 6 consequently shows a second RS-232/RS485 interface 106 ("SERIAL INTRFCE") coupled to a second data bus 107, which is further communicatively coupled to the control processor 49 to support the above described data communication operation via the control processor 49.

The data bus 107 is further shown as being coupled via a bus extension 108 directly to the application processor 48. The data bus extension 108 is particularly provided for direct data communication between the application processor and a data scanner 109 ("SCAN"), which may, for example, be a bar code reader. Because of the high rate at which data are generated by the operation of a data scanner, the data are most reliably received, processed and stored by the application processor 48. A scanning operation may consequently involve the operation of both the application processor 48 and the control processor 49. According to one embodiment of the control circuit 80, the control processor 49 monitors the circuit function of the data scanner 109 to detect a control signal that indicates the event of a scanner trigger depression. The scanning operation results in a string of data appearing at the data bus 107 and the associated data bus 108. Since the application processor 48 is likely to be idle at the time of the occurrence of a trigger signal, the control processor places a "wake-up" signal on the control signal line 98 to activate the application processor 48. The control processor 49 further writes an 8-bit control character into the first latch 86. Upon completion of loading the control character into the data latch 86, the control processor 49 places a "one" signal on the character available line 91 to allow the application processor to read the control character from the latch 86. The application processor reads and decodes the control character in accordance with protocol instructions read from the ROM memory 56, for example. In the example of a scanner trigger indication, the decoded control character signals the forthcoming string of information to be received by the application processor 48 directly from the scanner 109 over the data bus 108. Hence, in contrast to being conditioned for the event of receiving data from the keyboard 49 or from the radio 81 (which data might preferably be received over the data latch 86), the application processor would in the event of scanned incoming data be conditioned to read the "event data" as a string of data directly from the data bus 108. The term "event data" is used to describe data relating to an event. Any time event data requires processing, such event data would be routed to the application processor 48 either directly, as described with respect to the scanner data, or between the two processors 48 and 49, such as by the circuit 67 or a similar interface circuit. It should be understood that conditioning the application processor to receive a string of data directly via the bus 108 need not be limited to the receipt of the scanner data. Such conditioning is contemplated for any use of the terminal 10 which requires a high volume of data to be received and processed within a short period of time. Upon completion of the scanning operation, a trigger release signal is loaded into the first latch and communicated from the control processor 49 to the application processor 48. Upon receipt of the signal and completion of any data processing operations remaining as a result of the receipt of data via the data bus 108, the application processor instructs the control processor to apply a "wake-up" signal to the control signal line 98 upon occurrence of any specified event requiring processing of data. Thus, in one embodiment, the control processor 49 continues to control the application processor 48 by transmitting control codes to selectively enable or disable the application processor 48 to directly receive data via the data bus 108. The receipt of data by the application processor 48 is referred to as "direct" data input, since the contemplated transfer of data via the data latches 86 and 92 is bypassed.

FIG. 2 shows schematically one embodiment of electrical components of an exemplary terminal unit 10, and the interactive relationship of such components to the application processor 48 or the control processor 49. FIG. 2 shows schematically a plurality of electrical components which are generally directly related to the functional elements discussed with respect to FIG. 6. In the embodiment shown in FIG. 2, the application processor 48 directly controls the previously referred to high speed asynchronous communications interface 105 and the RS-232/485 standards serial interface 34. The flash EPROM programmable read-only memory 58 is preferred to have no less than 256K byte storage capacity. The flash EPROM may supplement or even replace standard ROM, such as memory 56, which is preferred to have at least a 512K byte storage capacity. The ROM, if used, provides typical and normally non-variable data processing protocol instructions. Such ROM may include control instructions for standard display updating routines as well as for other routines which are typically implemented by standard keyboard instructions and which pertain to typical data input and output commands.

The random access memory 56 may be a semi-permanent static RAM type circuit. The memory may have a capacity of 512K bytes. The preferred data storage capacity provides sufficient storage for an on-board data base related to typical inventory or delivery route type information. In view of the portability of the terminal unit 10, an unexpected loss of battery power may bring about a significant loss of information unless the stored data are protected from destruction until full battery power is restored. For example, the terminal unit 10 may be returned at an initial signal of "low battery" to a battery charger unit (not shown) for a recharging operation and any stored data may be transferred, even while the battery 23 is being recharged, from the terminal unit 10 to a host computer (not shown).

Display 20 may be a graphic display having an array of 48×100 pixels. Typical menu or special graphic screen data may be pre-established for a particular terminal unit 10 or for an application group of such units and may be stored initially in the specific ROM 56 provided for the particular unit or units 10. As previously discussed, the updating of displayed data on the screen device 20 requires a significant amount of data processing. Typically, such data processing operations involve accessing permanently stored screen display information, such as from the ROM 56 or from the flash EPROM 58, the manipulation of such information, and temporary storage of such manipulated information in the random access memory 57. As shown in FIG. 2, the application processor 48 has direct functional control over the respective devices responsible for such data updating manipulations.

Contrast control is another function which is desirable in LCD display screen 20. In regards to FIG. 2, such a control may be integrally coupled to the VGA adapter circuit 54. The contrast of the LCD display screen 20 is typically set and adjusted by an operator and is a matter of choice. The contrast may be adjusted, for example, by a typical key depression or by a keyboard sequence given by an operator. Such control input executions are within the scope of operations of the control processor 49. Thus, in response to an appropriate command from the keyboard 102, the display contrast may be changed without activating the application processor 48. The contrast display may be controlled as indicated in FIG. 2 by the functional coupling of the keyboard circuit 102 to the control processor 49, and the further coupling of the processor 48 to the contrast control circuit and then directly to the LCD display screen circuit 20.

In one embodiment, the LCD display screen 20 is equipped with a backlighting drive 62. Many warehouse operations, route delivery operations and even merchandising inventory operations are often performed under poor lighting conditions, thereby requiring a backlighting source to be supplied as a standard feature of the LCD display screen 20. A backlight drive circuit 62 may be coupled through the MBUS 50 to the control processor 49. A backlight drive circuit for use in conjunction with the exemplary terminal unit 10 is described in copending patent application by S. E. Koenck et al., Ser. No. 07/776,059, filed on Oct. 11, 1991, which application is assigned to the assignee of the present application. Both the application processor 48 and the control processor 49 may interact with the backlight drive circuit 62 to provide for an operator controlled brightness control sequence to be communicated to the backlight drive 62.

Figure 9:
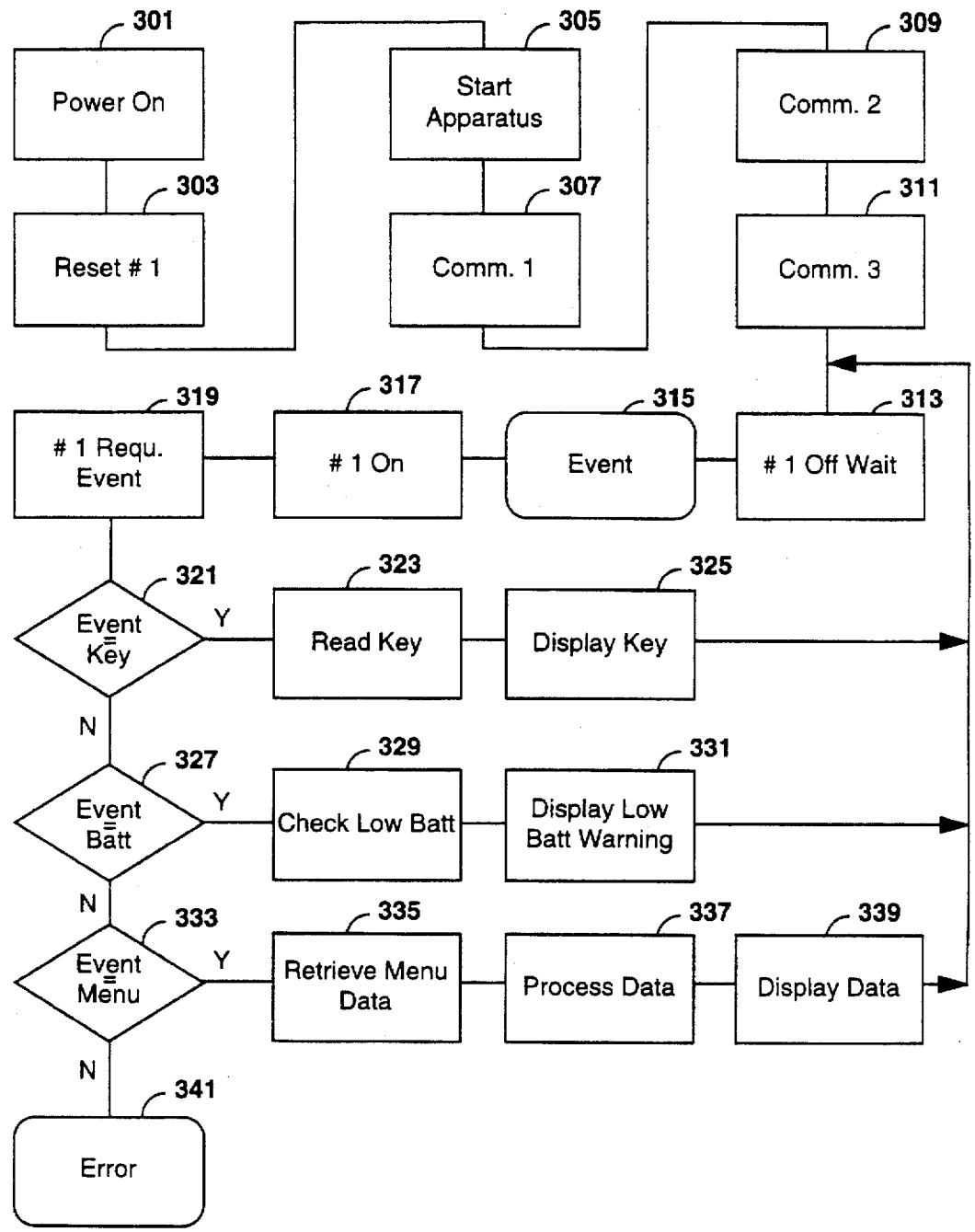
FIG. 9 is a flow diagram showing a desired interaction of the two microprocessor devices in FIG. 6 in accordance with the invention.

It should be realized that the control circuit 67 as an ASIC may also include, besides the timing function circuits for the real time clock and its functions, the clocking signals to each of the two processors 48 and 49. The control circuit 67 may also provide the already described data communication functions between the application processor 48 and the control processor 49, as represented in FIG. 6 by the two latching circuits 86 and 92. The function by the control processor 49 to activate or "wake up" the application processor for data processing operations is accentuated in the representation of the "wake-up" feature by the separate function line 98 in FIG. 2. In one contemplated embodiment, the control circuit 67 may include integrally a switching circuit function for separately switching the application processor 48 off or on, as indicated in FIG. 9 by the function blocks "#1 OFF WAIT" and "#1 ON". A switch in the integrated control circuit 67 may perform the switching operation by selectively interrupting and reestablishing the clocking signal to the application processor 48. In another embodiment, the application processor 48 may provide a shutdown status signal to the control processor 49 and shut itself down. The control processor 49 subsequently returns the application processor 48 to an active state upon occurrence of any event which requires the operation of the application processor 48. The process flow diagram of FIG. 9 generally depicts operational procedures between the application processor 48 and the control processor 49.

Further in reference to FIG. 2, a trigger control signal of the scanner module 41 may be received by the control processor 49. However the data flow from the scanner module 41 would be received directly by the application processor 48 for further processing and storage. Input signals which are received at speeds within the operational capability of the control processor 49 are receivedby and transferred through the control processor 49. For example, key depression signals from the keyboard 49 are generally received directly by the control processor 49. The keyboard for the terminal unit 10 referenced herein, as indicated in FIG. 2, may be a 6×8 key matrix. Because the real time selection of a key by an operator is slow in comparison to the processing speed of even the slower control processor, the interpretation of which key has been selected may be made by the control processor 49. An "event" indication character communicated to the application processor 48 may already reflect which of the available functions of a particular key has been selected. The preprocessing of slow occurring events limits the operational periods of the application processor 48.

The control processor further controls an input to an audible alarm circuit 63 ("BUZZER"). An audible alarm, a slow occurring event, generates a signal to alert an operator of an alarm condition or to indicate that a processing operation has been completed. For example, when the application processor 48 has received a string of data from the scanner module 41, and has further processed the received information to verify its correctness, the application processor 48 may communicate an acceptance code to the control processor 49 and be shut down from further operation. The control processor will then routinely generate an audible signal to alert the operator that the information has been accepted. Prior to communicating the acceptance code to the control processor, the application processor may retrieve from its memory 57, for example, information relating to the bar code which has just been read and accepted, and may compile an information screen displaying such retrieved information to the operator prior to the deactivation of the application processor 48. Thus, by the time the operator is alerted by the audible signal that the respective bar code has been read and accepted, the pertinent information regarding the item represented by the bar code is already displayed on the LCD display screen 20.

Other devices which may be under direct control of the control processor 49 are the radio 81 with its included radio interface ("RADIO INTERFACE"), and the power control circuit 64 ("CHARGE/POWER CONTROL") of the terminal unit 10. A serial interface 34 ("RS-232/RS-485 SERIAL INTERFACE") may optionally be controlled by the control processor 49. Because of the power savings achieved by the described interaction between the application processor 48 and the control processor 49, various other devices or functions may be added to the general operation of the terminal unit 10 without unduly limiting its operational cycle.

The interaction between the control processor 49 and the application processor 48 is described in greater detail in reference to both FIG. 2 and 9. In general, as discussed above, the application processor performs data processing operations, while the control processor 49 performs input-output control operations, which include periodic monitoring functions. The control processor 49 controls the activation or reactivation of the application processor 48. However, the application processor 48 processes the parameters and feeds to the control processor 49 the respective instructions that control the control processor 49. The application processor 48 is therefore, according to one embodiment, the one device which accesses the operations protocol of the terminal unit 10 from either the ROM or the flash EPROM devices 56 or 58.

Referring now to FIG. 9, the depression of the power switch by an operator, physically starts the terminal unit with a cold start at a block 301. The turn-on starts the clocking signal and the reset of both the control and application processors 48 and 49. The control processor 49 may reset the application processor 48 at a block 303. The reset operation starts the apparatus at a block 305 with an initialization sequence of communications between the application processor 48 and the control processor 49. During the initialization, the application processor 48 retrieves from its program storage default values, such as for a battery threshold value, and transfers the respective default value to the control processor 49 at a block 307. The control processor retains the default value and uses it in its further operations to operate the power control circuit 64. Other initialization functions may be performed, such as, for example, setting an initial contrast value on the LCD screen display 20 at a block 309, and determining whether or not the backlighting function is to be activated at a block 311. The application processor 48 further may retrieve data from memory 56, 57 or 58, and manipulate such data in a manner to indicate on the screen that the unit 10 is operational. Once the terminal unit 10 is initialized, the application processor 48 communicates to the control processor 49 that it is assuming its rest state at a block 313, and is shut off pending the occurrence of an event.

Upon occurrence of an event at a block 315, such as a "battery low indication" or the depression of a key by an operator, the control processor 49 causes the application processor 48 to turn on at a block 317. Typically the clock signal to the application processor 48 may be provided by a control signal applied to the control device 67, or the application processor may be otherwise enabled, such as byan enable signal applied to the control signal line 98. Upon being activated, the application processor 48 communicates with the control processor 49, such as via the interface circuit 24 as described above with respect to FIG. 6, to request at a block 319 data relevant to the type of event that has occurred. After receiving the respective communication from the control processor 49, the application processor 48 tests the received information as to the type of event and proceeds to process data as required according to the program. FIG. 9 shows three typical events of a large number of possible programmed events for which the application processor 48 may be activated. A typical key depression detected at a block 321 may result in reading the value of the depressed key, at a block 323, from the second data latch 92 as described with respect to FIG. 6, or from an equivalent register of the control device 67 in FIG. 2. The information then results in the retrieval of data regarding the addresses of pixels which will be changed to a logical "high" to depict the information on the LCD display screen 20, at a block 325 the respective data being transferred to the respective circuit elements of the display screen 20. Thereafter, the application processor communicates to the control processor 49 that the instructions have been executed and is shut down to await a further activation by an event at block 315 and an instruction at block 317. The shutdown of the application processor 48 may be initiated either by the application processor 48 itself or by the control processor 49. Because the start-up or activation of the application processor 48 is initiated by the control processor 49, it may be desirable to disable the application processor 48 through the control processor 49.

Another typical event for activating the application processor 48 may be the detection of a low battery indication at a block 327 in response to a threshold value transferred by the application processor 48 to the control processor 49 during the described start-up procedure. The protocol may require that the application processor 48 verify the low battery indication by providing its own comparison check at a block 329. Because of an impending shutdown due to a low battery indication, the application processor may complete any operation if the low battery indication is still within tolerable limits or may suspend further data processing because of risk of errors. The application processor may further display a low battery indication on the LCD display screen 20 at a block 331 and then be shut off pending further event instruction as described above.

Another type event may be a special function key instruction such as the indication that a menu operation has been selected at a block 333. The application processor 48 proceeds to access a designated program routine corresponding to the requested menu choice ("RETRIEVE MENU DATA"). The respective program instructions are executed at a block 337, and the result or completion of the routine is displayed on the LCD display screen 20 at a block 339. The displayed result may be preceded by a repetitive interactive data transfer between the application processor 48 and the control processor 49, for example, when the menu choice requires the transmission of displayed information to a host computer. In such an event the application processor 48 may transfer the displayed information character by character to the control processor 49. The control processor 49 in turn activates the radio interface and transfers the information string to the radio interface to be transmitted in accordance with the program instructions interpreted by the application processor 48. FIG. 9 shows an error trap at a block 341 to which the program instructions proceed if an event code is not recognized by the programmed event descriptions and resulting processing routines of the application processor 48 for the particular application of the terminal unit 10. The data processing operations performed by the application processor 48 generally require less than 10 milliseconds. Thus, on the average, operations including the processing of keystrokes and the associated display manipulations require less than one fiftieth of the average operational period of the terminal unit 10. Substantial power savings are consequently achieved by selectively de-activating and re-activating the application processor 48 for preprogrammed events which require the execution of the respective data manipulations at a speed not obtainable by the control processor 49.

Further in reference to FIG. 9, if none of the event tests recognize the particular code supplied to the application processor 48, an event error trap routine at block 341 is used to inform the operator of the error condition. Such a routine may, for example, instruct the operator to again enter the most recently requested operation, and may include an audible warning from the buzzer. Various changes in the described control sequence may be implemented. Certain routines may be implemented at the described slower speed by the control processor 49 directly, while the application processor 48 remains deactivated. Further, other microprocessor devices may be chosen for the application and control processors, respectively. The described microprocessor devices are particularly suitable for various operations that are performed by the terminal unit 10 in the above-referred to operations.

Figure 10:
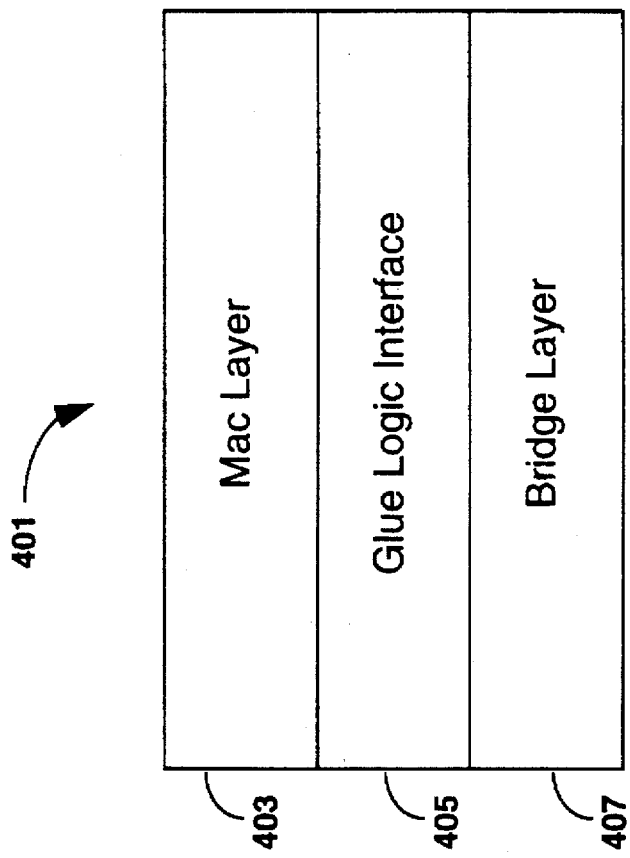
FIG. 10 is a diagram illustrating a protocol stack used in the data processing terminal of the present invention.

FIG. 10 illustrates a portion of the software protocol stack 401 that runs on one of Norand Corporation's Portable Data Collection Terminal Units, Model No. TM 1100 (See attached APPENDICES B and C). Specifically, the MAC (Medium Access Control) layer 403 is responsible for providing reliable data transmission between the terminal unit and any other node or device in a mobile computer network. When a radio module (e.g., Norand RM40 RF Module) is attached to the terminal unit and powered up, the MAC layer 403 and a Glue Logic Layer 405 are transferred to flash memory in the radio module. The Glue Logic Layer 405 controls the microprocessor in the radio module so that it is able to communicate with the high speed main microprocessor of the terminal unit. Generally, the Bridge Layer 407 organizes the nodes or terminals of the mobile computer network into an optimal spanning, routes data between any two nodes or terminals in the network, and provides data package storage to facilitate sleeping terminals. Appendix D provides an exemplary computer program listing of the software protocol stack 401 of FIG. 10 (Bridge Layer at pp. 1–33; MAC Layer at pp. 34–51; Glue Logic Layer at pp. 52–59). These protocol layers are actually subgroupings of the protocol stacks illustrated in FIGS 1B and 1C.

Figure 11:
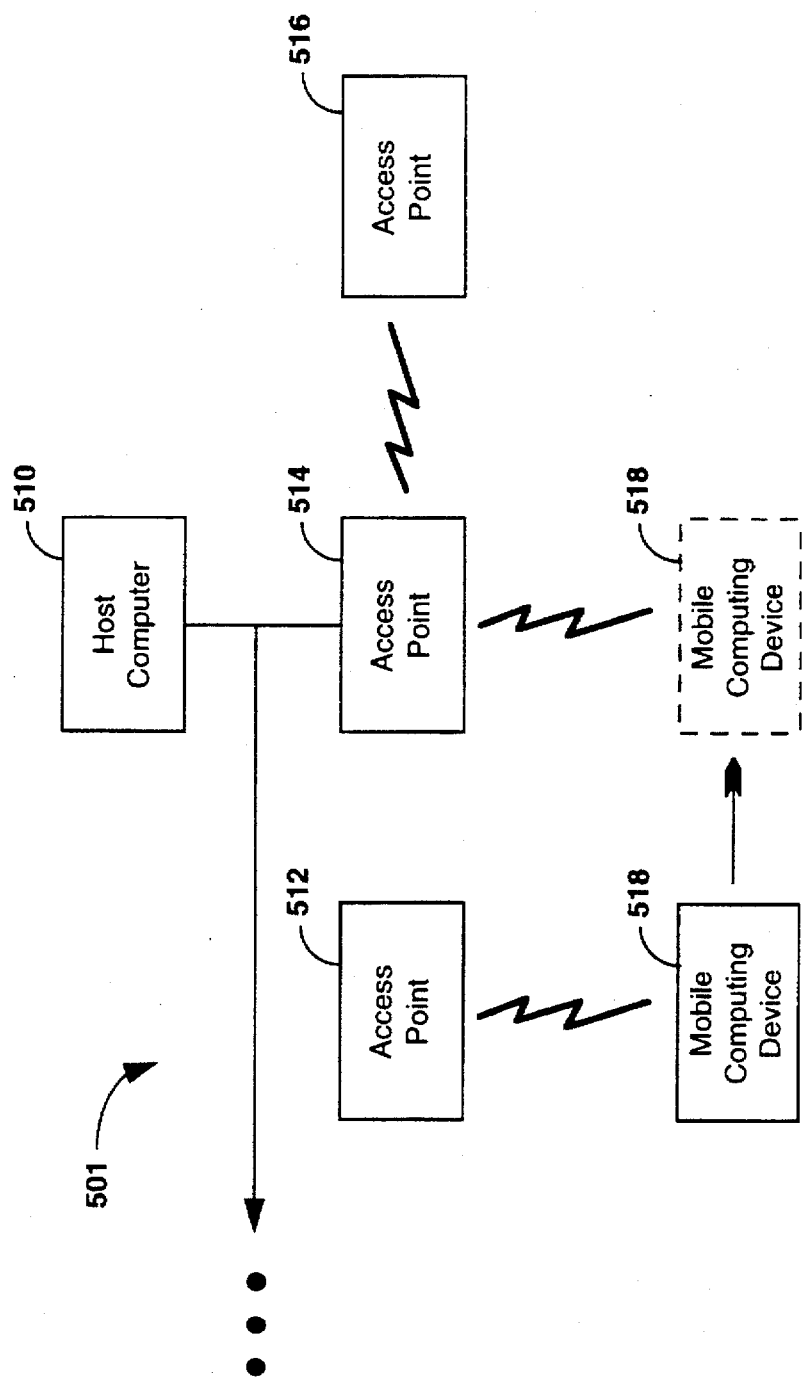
FIG. 11 is a diagram illustrating a local area communications network of the present invention.

FIG. 11 shows an exemplary local area network (LAN) illustrating the roaming characteristics of the portable data collection terminals. Specifically, the illustrated LAN consists of a host computer 510, multiple access points 512, 514, 516 and a mobile computing device (MCD) 518. The MCD 518, a portable data collection terminal, is communicatively coupled to the host computer 510 through an access point 512. Although only one MCD, MCD 518, is shown typically a plurality of MCDs would exist on the LAN. The MCD 518 communicates with the host computer 510 through the access point 512 to which it is connected.

There are two situations in which the MCD 518 becomes disconnected from the network 501. First, where the MCD roams out of the range of one access point, such as access point 512, into the range of another point, such as access point 514 as is shown by the dashed MCD 518 position. Alternatively, MCD 518 may enter a sleep mode where the radio transceiver is powered down. The sleep mode provides power savings.

The MCD 518 and the access point 512 communicate in a structured manner, where the MCD 518 transmits a request-for-poll (RFP), the access point 512 responds with a poll, the MCD 518 then transmits its data, and the access point 512 responds with an acknowledge (ACK) signal if the data message is finished or with another poll if there is still more data to be transmitted. One data message from the MCD 18 to the access point 512 may consist of several POLL-DATA sequences, where each DATA transmission is a fragment of the entire data message. To initiate such communication exchange, channel access protocols must be established.

Figure 12:
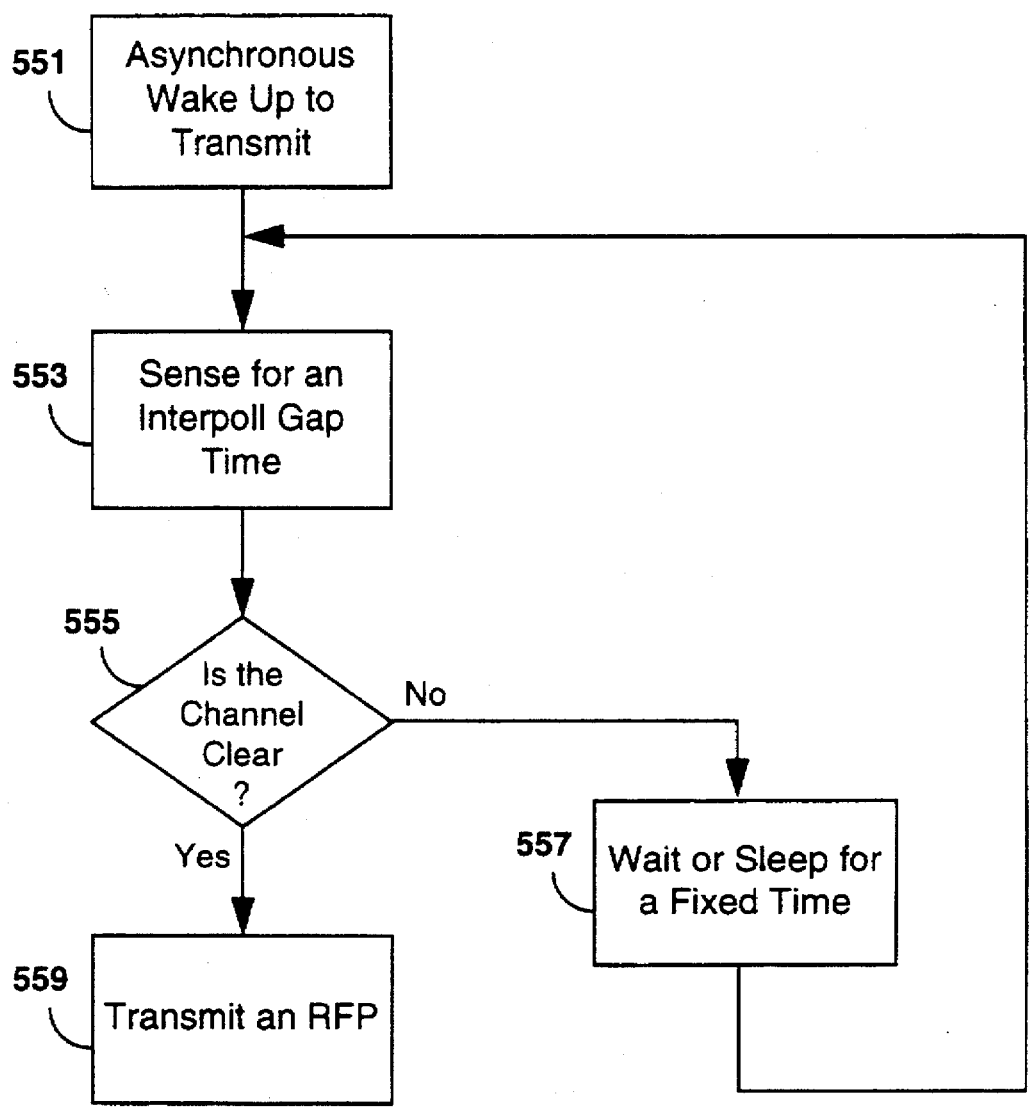
FIG. 12 is a flow diagram illustrating another protocol embodiment used by the data processing terminal of the present invention for gaining access to the channel.

FIG. 12 shows the process implemented by a mobile computing device when it has a message to transmit to the host computer. A MCD wakes up at a block 551 when it has a data message to transmit to the host computer. This wake-up can occur at any possible moment in time, i.e., a random time. After waking up, the MCD senses, at a block 553, the communications channel for a predetermined time, which is greater than or equal to the maximum interpoll gap time. In this context, a maximum interpoll gap time is defined as the maximum time between poll messages transmitted from the access point to the MCD. This assures the MCD that a transmission from the access point to another MCD will occur within the sensing time if the channel is currently being used. If, at a block 555, the channel is clear for the interpoll gap time, the MCD transmits a RFP at a block 559, and the communications sequence begins. If, at block 555, the channel is busy during the interpoll gap time, the MCD waits a fixed time period at a block 557 and senses the channel at block 553 as before.

Because the MCD wakes up at some random time to send data to the host, the probability of collision with the transmission of another MCD is extremely small. By sensing the channel for a fixed period of time and waiting for a fixed period of time to retry transmission, the random nature of transmission attempts is retained even after a busy channel is sensed. For a collision to occur in this scenario, two MCDs would have to wake up at the exact same moment in time, the probability of which is extremely small.

Figure 13:
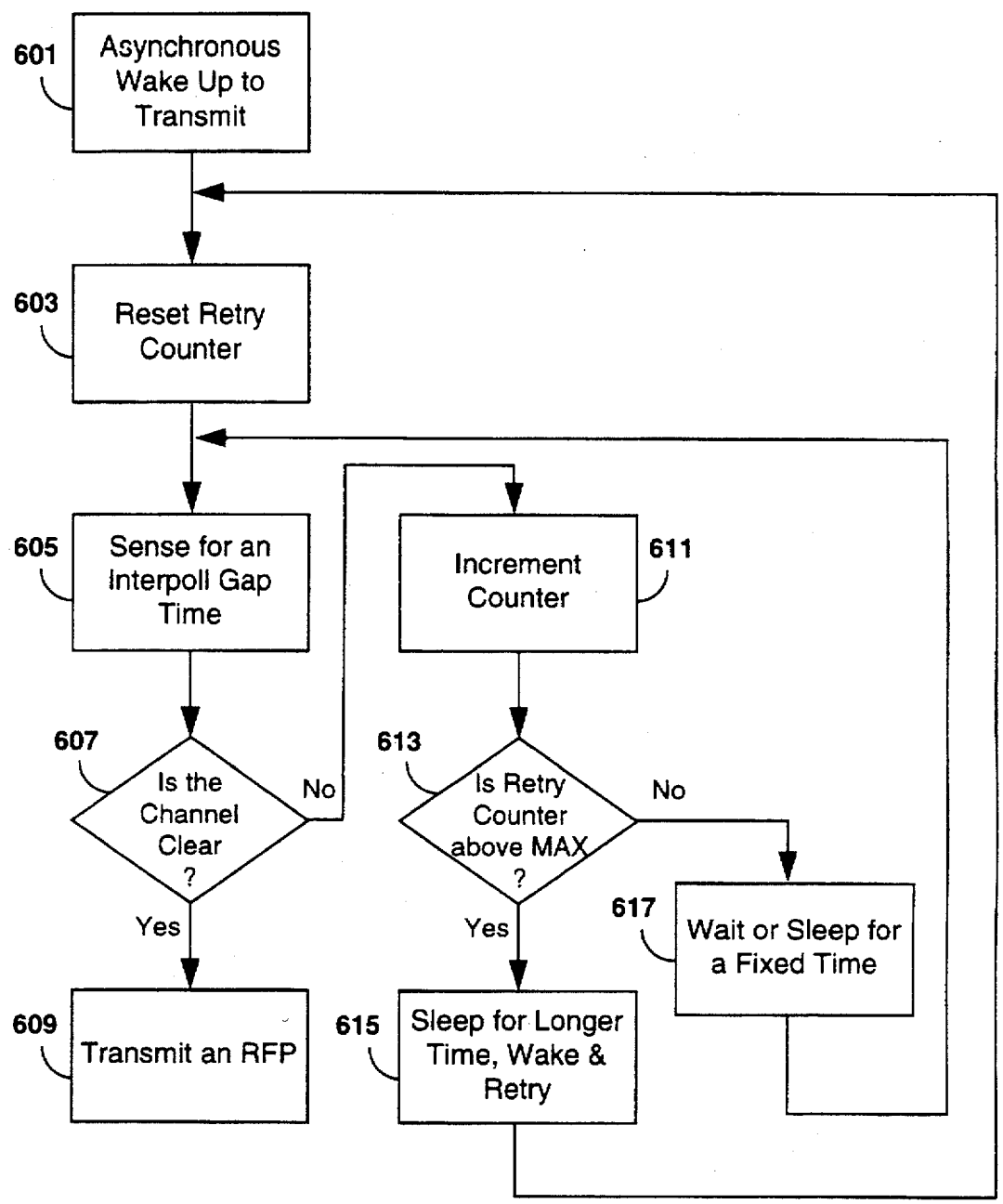
FIG. 13 is a flow diagram illustrating an alternate protocol embodiment used by the data processing terminal of the present invention for channel access which includes a retry counter.

FIG. 13 shows a process similar to that of FIG. 12, except that a retry counter implementation is used. Upon waking up to transmit at a block 601, a MCD resets a retry counter to zero at a block 603, indicating that it is the first attempt to communicate on the channel. If, at block 607, the channel is determined to be clear for the interpoll gap time, the MCD transmits an RFP at a block 609, and the communications sequence begins. Each time the channel is sensed at a block 605 and is determined to be busy at block 607, the retry counter is incremented at a block 611. Once the retry counter reaches a threshold or predetermined MAX value at a block 613, the MCD stops trying to transmit and goes back to sleep for some relatively long period of time at a block 615 before trying to transmit again. If instead, the predetermined MAX value has not been reached at the block 613, the MCD may either wait or sleep for a predetermined or fixed time before trying to access the channel again. This channel access protocol allows a terminal, an MCD, to save power if the channel is heavily loaded by sleeping until the channel may be less heavily loaded.

Figure 14:
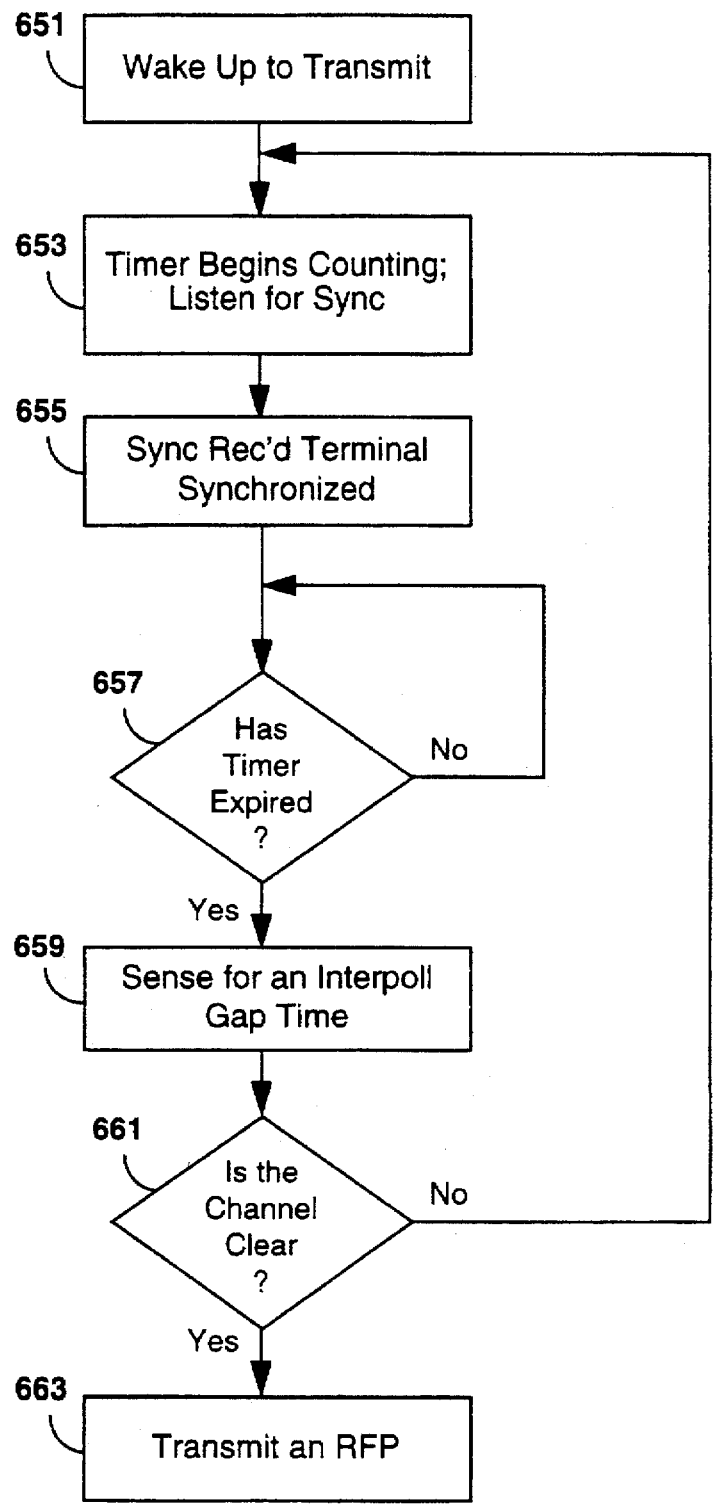
FIG. 14 is a flow diagram illustrating an alternate protocol embodiment used by the data processing terminal of the present invention for channel access which uses periodic SYNC messages in roaming implementations.

FIG. 14 shows the process implemented by a mobile computing device in a configuration where the MCD may be roaming between coverage areas and disconnecting and reconnecting with different access points (as is illustrated in FIG. 11). In this situation, access points periodically transmit SYNC messages, so that a MCD which is roaming, or has been sleeping for an extended period of time, can connect to the proper base station and synchronize its clock so that it knows when further SYNC messages will occur. In this embodiment, therefore, after waking at a block 651, the MCD listens to receive a SYNC message 653, 655 and 657 before attempting to transmit on the communications channel, since it may have awakened in the coverage area of a different access point. Thus, the amount of time, at a block 657, between wake-up and channel sensing or between a busy channel sense and a further channel sense should be greater than or equal to the time between SYNC messages minus the maximum interpoll gap time. This assures that a SYNC message will be received each time before the MCD attempts to sense the channel and transmit. In addition, after receiving a sync signal, the MCD listens for an interpoll gap time 659 to determine if the channel is clear, at blocks 659 and 661. If clear, the MCD transmits an RFP at a block 663.

Figure 15:
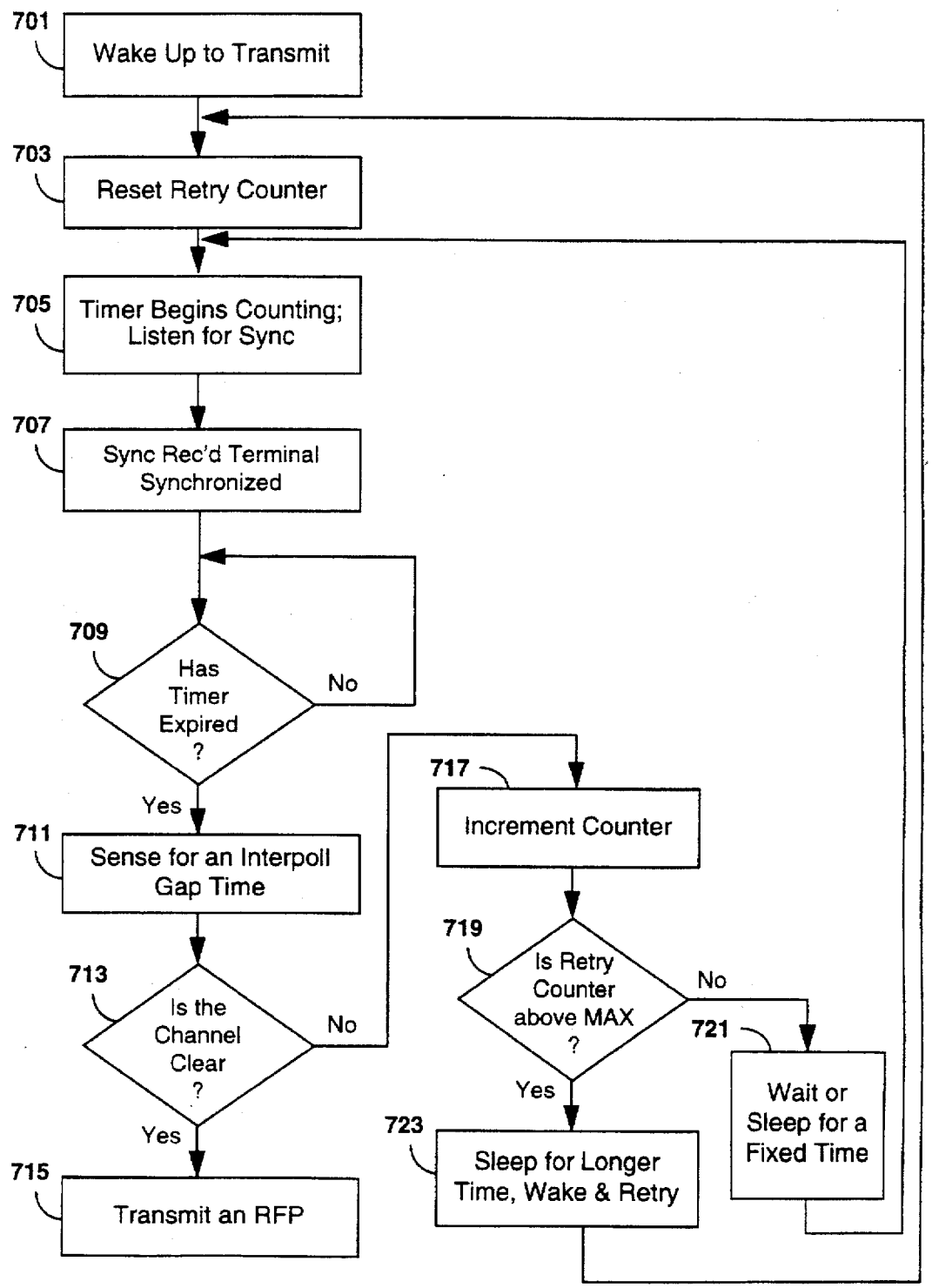
FIG. 15 is a flow diagram illustrating another protocol embodiment used by the data processing terminal of the present invention for channel access which includes both periodic SYNC messages and a retry counter.

FIG. 15 shows a process similar to that of FIG. 14, except that a retry counter implementation is used to control the number of retry attempts. Upon waking up to transmit at a block 701, a MCD resets a retry counter to zero at a block 703, indicating that it is the first attempt to communicate on the channel. Each time the channel is sensed and is determined to be busy, the retry counter is incremented at a block 717. Once the retry counter reaches a predetermined MAX value at a block 719, the MCD stops trying to transmit and goes back to sleep at a block 723, for some relatively long period of time before trying to transmit again. This procedure allows a terminal to save power if the channel is heavily loaded by sleeping until the channel may be less heavily loaded. In addition, if the channel is busy but the retry counter has not reached the MAX vaue, the MCD may either sleep or wait for a fixed period of time at a block 721. Although a fixed period of time is desirable, a random or pseudo-random back-off might also be used.

Figure 16:
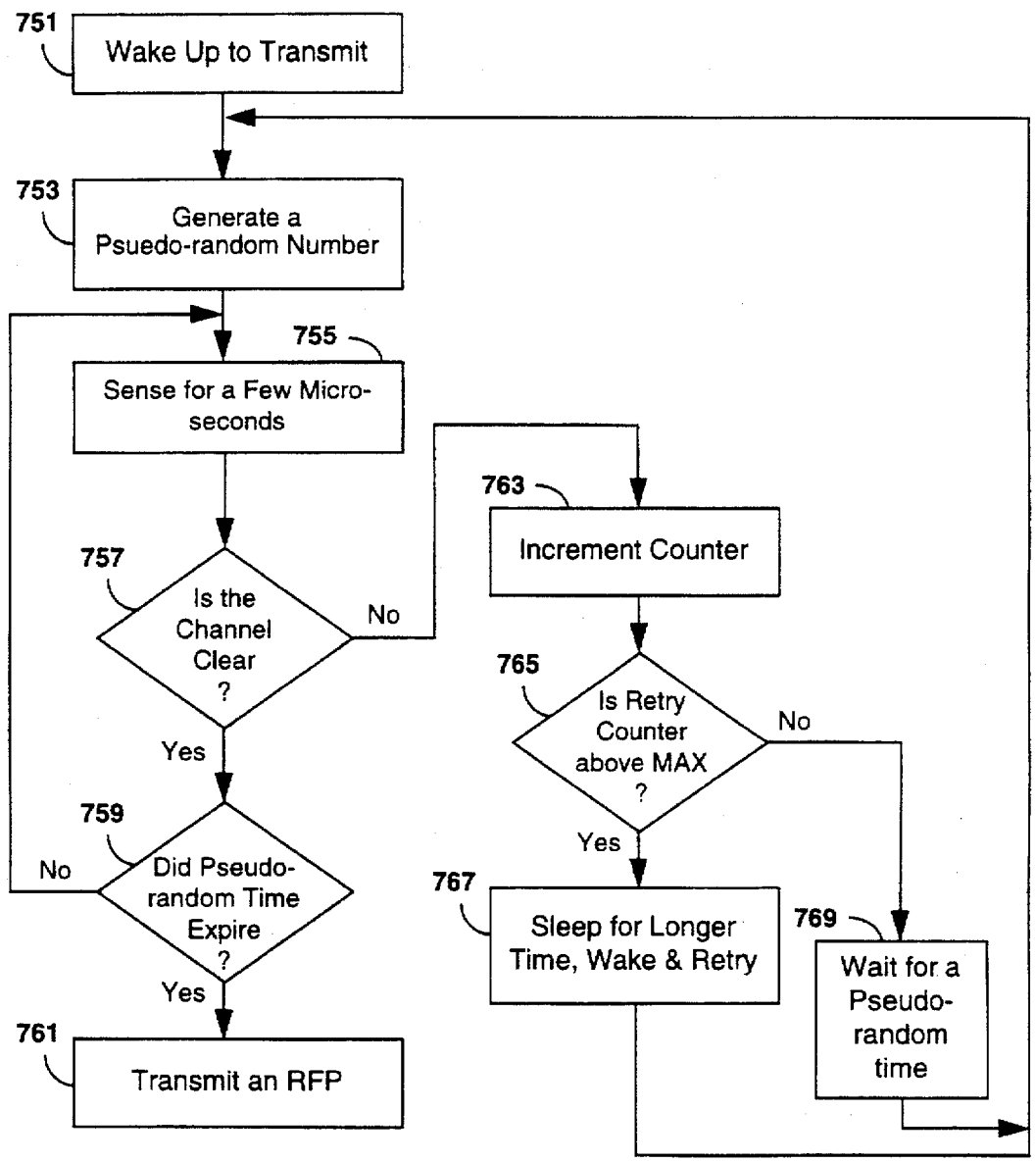
FIG. 16 is a flow diagram illustrating a channel access protocol using a pseudo-random number generator according to another embodiment of the present invention.

FIG. 16 is a flow diagram illustrating a channel access protocol using a pseudo-random number generator according to another embodiment of the present invention. Upon waking up to transmit at a block 751, a MCD generates a pseudo-random number (e.g., 5–8 milliseconds) at a block 753. The MCD then senses the communication channel for a few microseconds at a block 755. If the channel is determined to be clear at a block 757, the MCD determines whether the pseudo-random time period has expired at a block 757. If it has expired, the MCD transmits an RFP at a block 761, and the communications sequence begins. If the pseudo-random time period has not expired, the MCD again senses the communication channel for a few microseconds determined at a block 755 to determine if the channel is clear at block 757, i.e., repeating the above.

If the channel is determined to be busy at block 757, the MCD increments a retry counter at a block 763. If the retry counter has not reached a predetermined maximum value at a block 765, the MCD waits for a pseudo-random time (e.g., 10 milliseconds) at a block 769 and then generates another pseudo-random number at block 753 and repeats the above procedure. Once the retry counter reaches the predetermined maximum value, at block 765, the MCD quits trying to transmit and goes to sleep for a longer period of time at a block 767, before reawakening at block 751 to retry the transmission.

Figure 17:
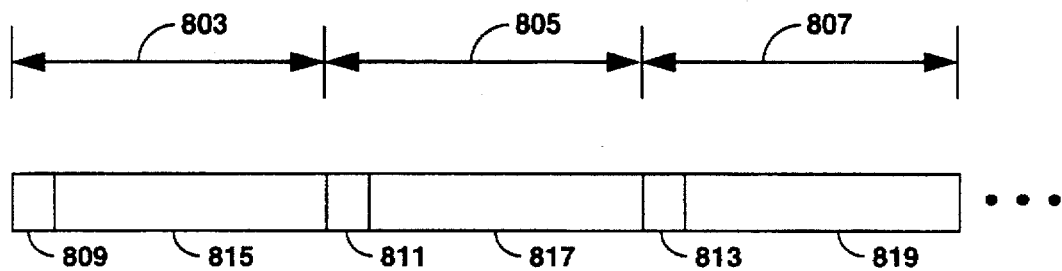
FIG. 17 is a diagram of the basic communication structure used in the channel access protocol of the present invention.

FIG. 17 shows the basic communication structure in one embodiment of the present invention. Access points periodically transmit a series of SYNC messages such as 809–813, while allowing time for communication exchanges during the periods 815–819 between SYNC messages. In general, the SYNC message itself takes much less time than the amount of time allocated for communication between SYNC messages. The time allocated for a SYNC message and for subsequent terminal communication (i.e., until another SYNC message is transmitted) is depicted by periods 803–807.

Figure 18:
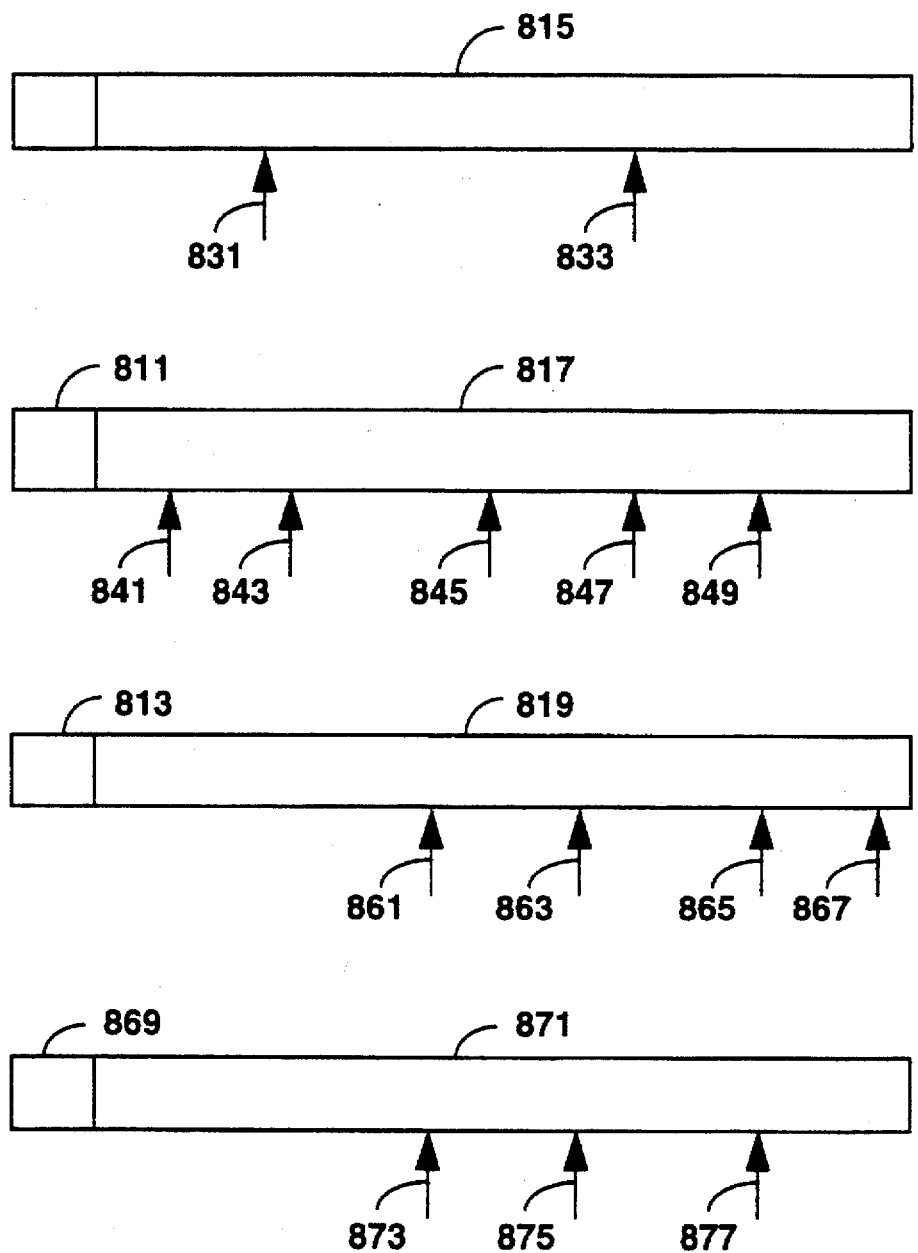
FIG. 18 is a diagram illustrating an exemplary communication sequence according to the channel access protocol of the present invention.

FIG. 18 shows a series of exemplary communication exchanges and channel access attempts where three MCDs are attempting to communicate in the same general time frame. The three units attempting to communicate are referred to as unit 1, unit 2, and unit 3. Unit 1 wakes up first at 831, in the first time interval 815. It must wait until it receives a SYNC message at 811, so it cannot attempt to transmit in time interval 815. Unit 2 is the next to wake up at 833, also in time interval 815. As with unit 1, unit 2 cannot transmit until a SYNC 811 is received, and therefore cannot transmit in time interval 815.

After the timer set by unit 1 when it initially woke up expires, SYNC message 811 has been received by unit 1. Thus, unit 1 can listen to the communications channel at 841 for the maximum interpoll gap time, determine a clear channel, and begin its communications sequence at 843, all in this time interval 817. The timer initially set by unit 2 also expires during time interval 817, and unit 2 has therefore received the SYNC message 811 and senses the communications channel at 847. However, unit 1 has not yet finished its transmission when unit 2 senses the channel for the maximum interpoll gap time. Thus, unit 2 must defer transmission, and waits until time interval 819 to retry communication.

Meanwhile, also in time interval 817, unit 3 initially wakes up to transmit at 845. Unit 3 must wait for a SYNC before attempting to transmit, so it does not transmit in the time interval 817.

In time interval 819, after the SYNC message 813, unit 2 and unit 3 have both received a SYNC message and can sense the channel to attempt transmission. In this case, unit 3 listens to the channel at 861 slightly before unit 2 senses the channel at 863, such that the channel is not busy when unit 2 begins to sense the channel. However, after unit 3 has sensed the channel for the maximum interpoll gap time, it begins communication on the channel at 865. Unit 2 finishes listening to the channel, also for the maximum interpoll gap time, after unit 3 has begun its communication, so unit 2 must defer communication. Unit 3 ends its transmission at 867. Finally, after SYNC message 869 in time interval 871, unit 2 senses an idle channel at 873 and transmits its communication to the access point at 875. Unit 2 ends its transmission at 877. This sequence illustrates the interpoll gap time channel sense and the wait to transmit until after a SYNC message has been received.

The operation of the protocol of the present invention takes advantage of the inherently random wake-up time of a mobile computing device in a local area communications network. Rather, than performing a random back-off routine, the time of wake-up is used to ensure random communications attempts, thereby preventing collisions due to many terminals attempting to transmit immediately after a certain common event. This is done by preserving the random wake-up time and adding a fixed amount of time to the time of wake-up in back-off procedures. The protocol of the present invention eliminates the need for random number generation and the implementation of random back-off algorithms.

Figure 19:
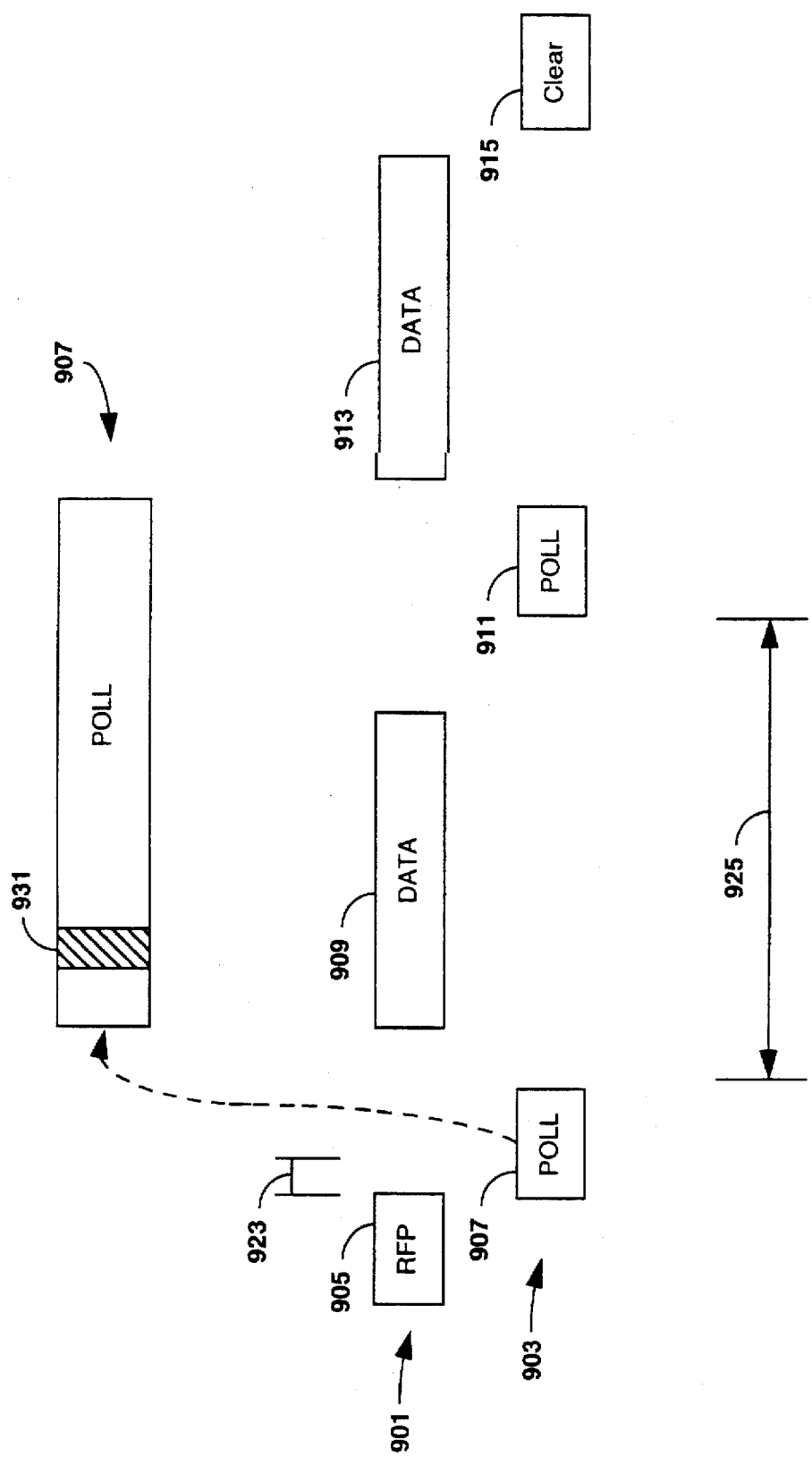
FIG. 19 is a diagram showing an exemplary communication exchange and illustrating channel access using a channel reservation scheme.

FIG. 19 is a timing graph illustrating an exemplary communication exchange between a portable data terminal 901 and an access point 903. Upon determining that the channel is clear, the portable data terminal 901 begins by transmitting an RFP (request for poll) frame 905. After an interframe gap time 923, the access point 903 responds with a POLL frame 907 to indicate to the portable data terminal 901 that it is available to receive data. The portable data terminal 901 then sends a DATA frame 909. The access point 903 acknowledges receipt of DATA frame 909 with a POLL frame 911. The portable data terminal 901 then transmits DATA frame 913 which indicates that data transmission is complete. The access point 915 then transmits a CLEAR frame 915 to acknowledge receipt.

A channel reservation scheme is used to generally restrict channel access contention to RFP frames. Each frame transmitted during the communication exchange contains a channel reservation field (e.g., field 931 in POLL 907) which may indicate either the number of outstanding frames or the amount of time required to transmit the outstanding frames.

This scheme enables other terminals attempting to access the busy channel to determine the actual amount of time during which they may sleep. Sleeping, i.e., powering-down the radio for the duration of the channel reservation period (i.e., until the channel becomes clear) conserves battery power and aids in collision avoidance. Further, channel reservation may be implemented with the other channel access embodiments discussed above during heavy communication traffic. In other words, channel reservation may supplement other channel access protocols when terminals using those protocols are continuously failing to gain access to the channel.

Figure 20:
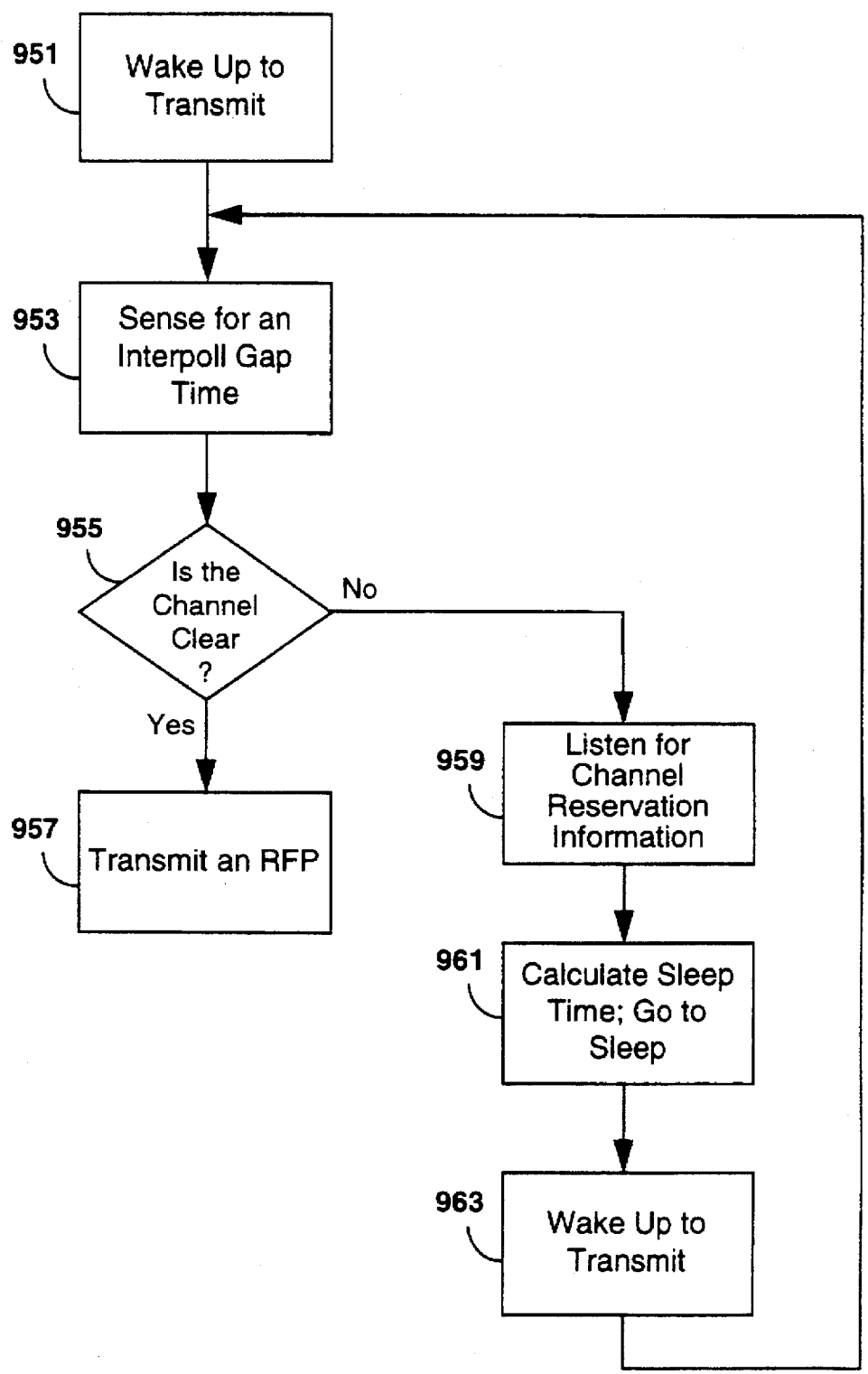
FIG. 20 is a flow diagram illustrating channel access using the channel reservation scheme of FIG. 19.

FIG. 20 is a flow diagram illustrating an embodiment of the channel access reservation scheme described above. A portable data terminal (or mobile computer device ("MCD") wakes up to transmit data at a block 951. It then senses the channel for an interpoll gap time at a block 953 before determining if the channel is clear at a block 955. If the channel is clear, the portable data terminal transmits an RFP and the communication sequence begins (e.g., that shown in FIG. 19). If the channel is busy, the portable data terminal listens for the channel reservation information on the channel at a block 959, and calculates the time that it should "sleep" and powers down at a block 961. At the end of the calculated sleep period, the portable data terminal wakes up to transmit at a block 963 and repeats the process by sensing the channel for an interpoll gap time at block 953.

Figure 21:
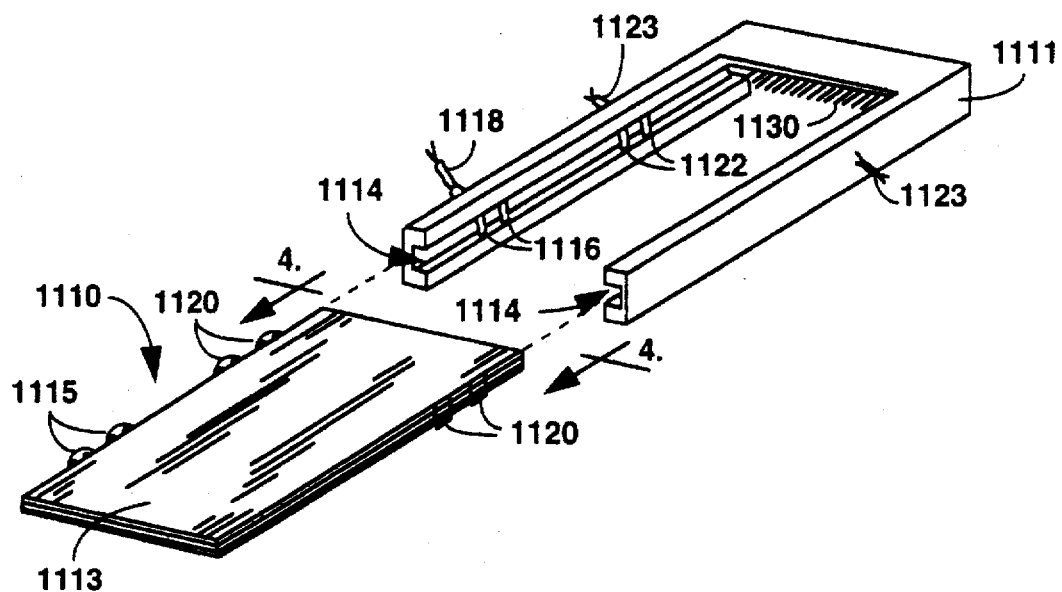
FIG. 21 is a perspective view of a radio card and a corresponding port for receiving the radio card built in accordance with the present invention.

FIG. 21 shows a radio card 1110 and a receiving device 1111 built in accordance with the present invention. The radio card 1110 has a housing 1113 inside of which is a completely operational radio transceiver (not shown). The receiving device 1111 in this embodiment of the present invention uses a pair of opposed slots 1114 to receive and guide the incoming radio card 1110.

Figure 22:
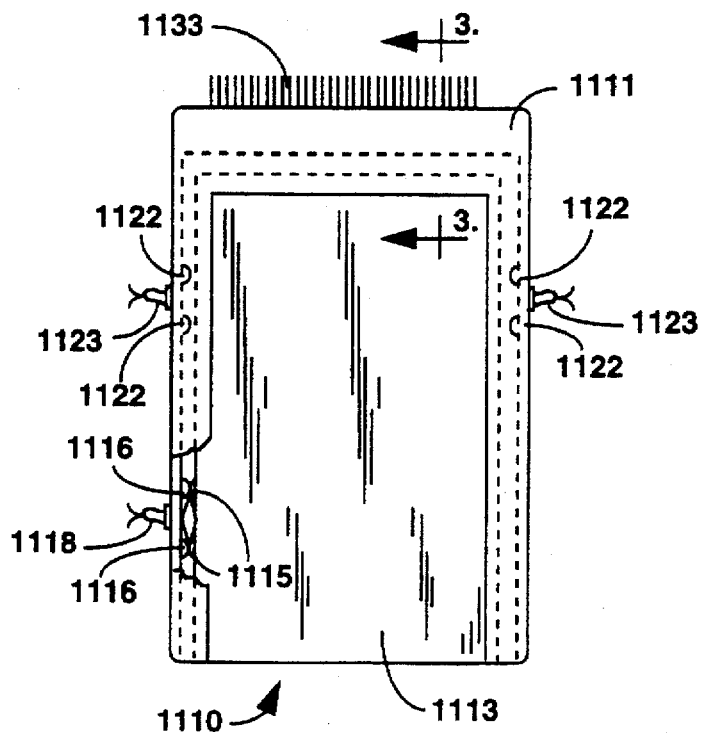
FIG. 22 is a partial top plan view of a radio card and port for receiving the radio card with the radio card completely inserted in the port.

The radio card 1110 has a pair of antenna contacts 1115 positioned along the edge of the housing 1113. The receiving device 1111 has a corresponding pair of antenna contacts 1116. As can be seen in FIG. 22, when the radio card 1110 is inserted into the receiving device 1111 the antenna contacts 1115 on the radio card housing 1113 electrically encounter the corresponding set of antenna contacts 1116 positioned on the receiving device 1111. The antenna contacts 1116 on the receiving device 1111 are connected to an antenna cable 1118. The antenna cable 1118 is in turn connected to an antenna not shown. Thus, when the radio card 1110 is completely inserted into the receiving device 1111 the radio card 1110 automatically is connected to an antenna.

Referring again to FIG. 21, a radio card 1110 may have antenna contacts 1120 shown in dashed lines, located at different positions on the housing 1113. Similarly, the receiving device 1111 may have several additional pairs of antenna contacts 1122. The additional pairs of antenna contacts 1122 on the receiving device 1113 can be used to allow access to several different antennas depending on the type and frequency of radio communication to be utilized by the radio card 1110. This access is accomplished through additional antenna cables 1123 attached to the additional contacts 1122. Thus, if the receiving device 1113 is part of a hand held computer terminal which has more than one antenna attached or built in, different pairs of contacts 1116 & 1122 can be used to allow access by the radio card to the different antennas depending upon the frequency and range characteristics of each antenna. While a radio card 1110 may only operate at one frequency and thereby only need one antenna and therefore only have one pair of antenna contacts, the receiving device 1111 still may have several pairs of antenna contacts 1116 & 1122 all but one of which do not correspond to any pair of radio card 1110 antenna contacts 1115.

Figure 23:
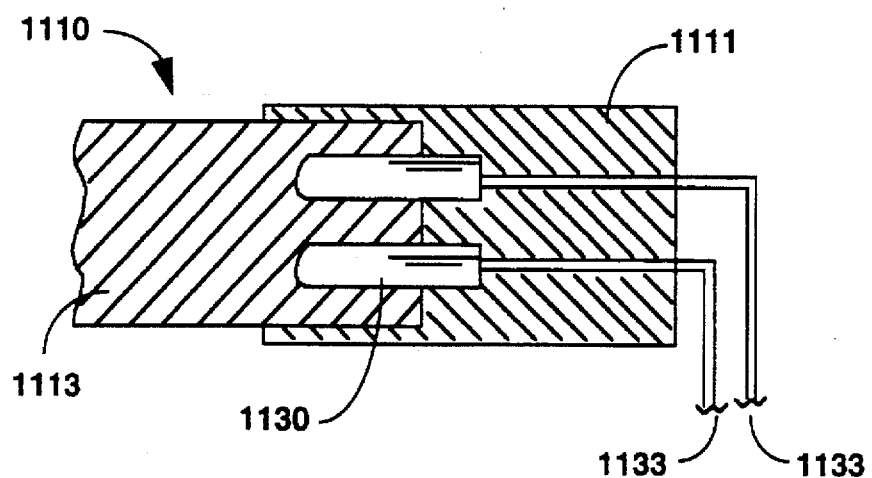
FIG. 23 is a partial side elevational view taken along line 3—3 showing the male/female pin connection of the radio card and the port of FIG. 22.
Figure 24:
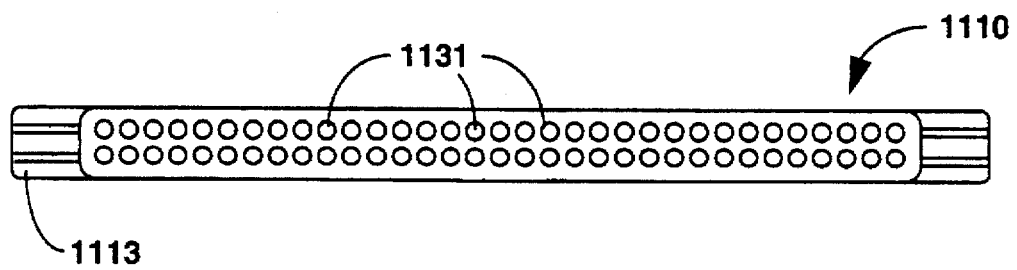
FIG. 24 is a front view taken along line 4—4 showing the female pin connections of the radio card of FIG. 21.

Referring to FIGS. 23 and 24, when the radio card 1110 is inserted into the receiving device 1111 an interface between the radio card 1110 and the receiving device 1111 is produced. The receiving device 1111 has a plurality of pins 1130 which form the male portion of a connector. The radio card 1110 has a corresponding plurality of holes 1131 which form the female portion of the connector and which engage the pins 1130. The pins 1130 are connected to the computer terminal not shown by a series of electrical connections 1133 such as wires or electrical ribbon. The holes 1131 in the radio card 1110 are electrically connected to the radio. When the pins 1130 are engaged in the holes 1131, electrical signals can be exchanged between the radio card 1110 and the computer terminal. The electrical signals can be in the form of information exchange, power supply or both.

The radio card 1110 of FIGS. 21–24 might also be a modem card not shown. In this embodiment, the connections would be the same as previously described with the only difference being that instead of the contacts connecting the modem card to a radio antenna, the modem card would be connected to a traditional telephone line, a cellular phone or an antenna for a cellular phone if the cellular phone was built within the modem card.

Figure 25:
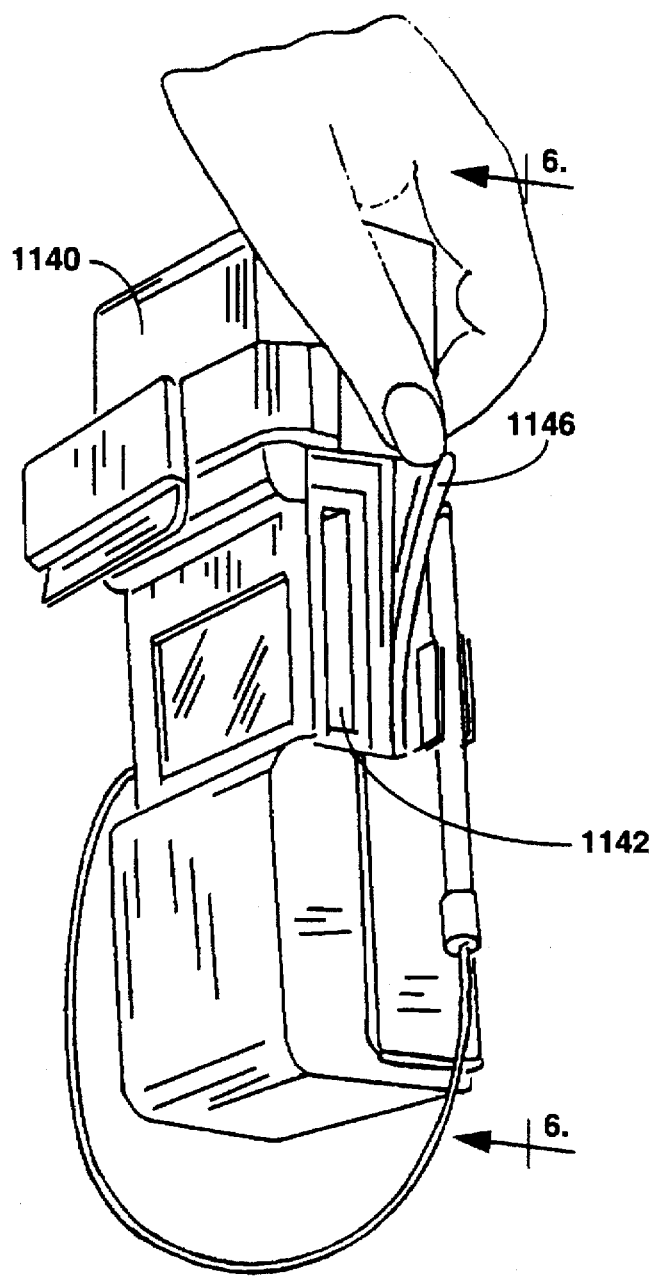
FIG. 25 is a perspective view of a computer terminal showing the slot for receiving the radio card.
Figure 26:
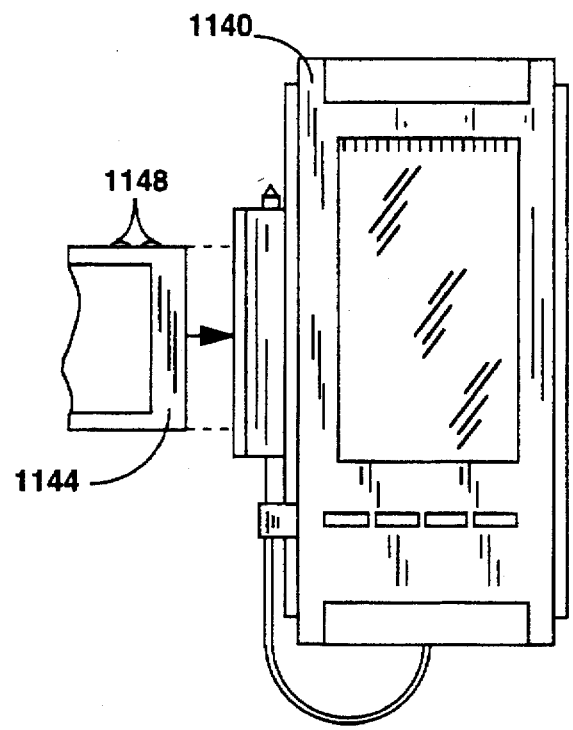
FIG. 26 is front view taken along line 6—6 showing how a radio card to be inserted into the slot of the computer terminal of FIG. 25.

Referring to FIGS. 25 and 26, a computer terminal 1140 is shown built in accordance with the present invention. The computer terminal 1140 has a slot 1142 for receiving a radio card 1144. The user of the computer terminal 1140 lifts up a flexible cover 1146 and inserts the radio card 1144 into the slot 1142. The radio card 1144 engages with the computer terminal 1140 in a similar manner as described in FIGS. 21–24. The radio card 1144 has a pair of antenna contacts 1148 which will engage with a corresponding pair of contacts inside the computer terminal 1140. The pair of antenna contacts inside the computer terminal are connected to a radio antenna not shown.

Figure 27:
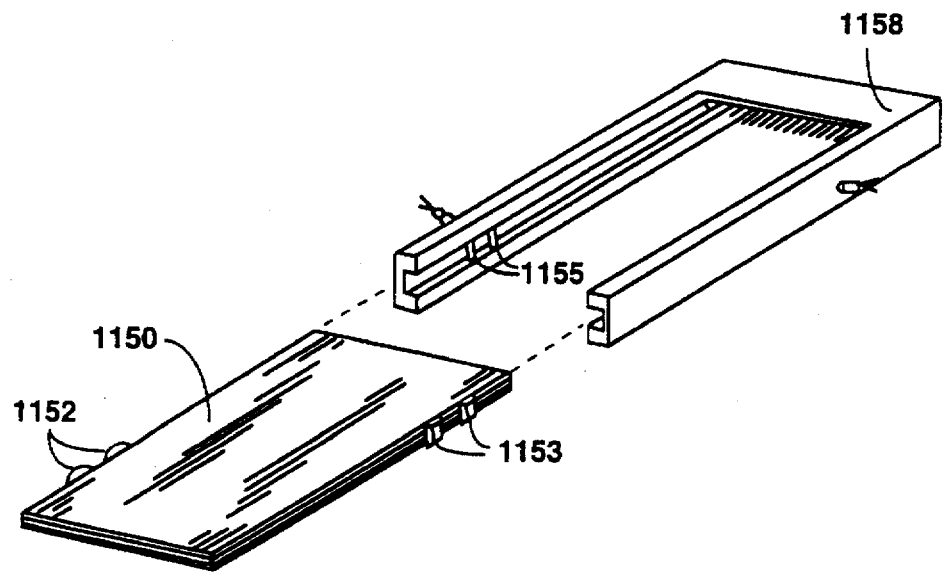
FIG. 27 is a perspective view of another radio card and a corresponding port for receiving the radio card built in accordance with the present invention.
Figure 28:
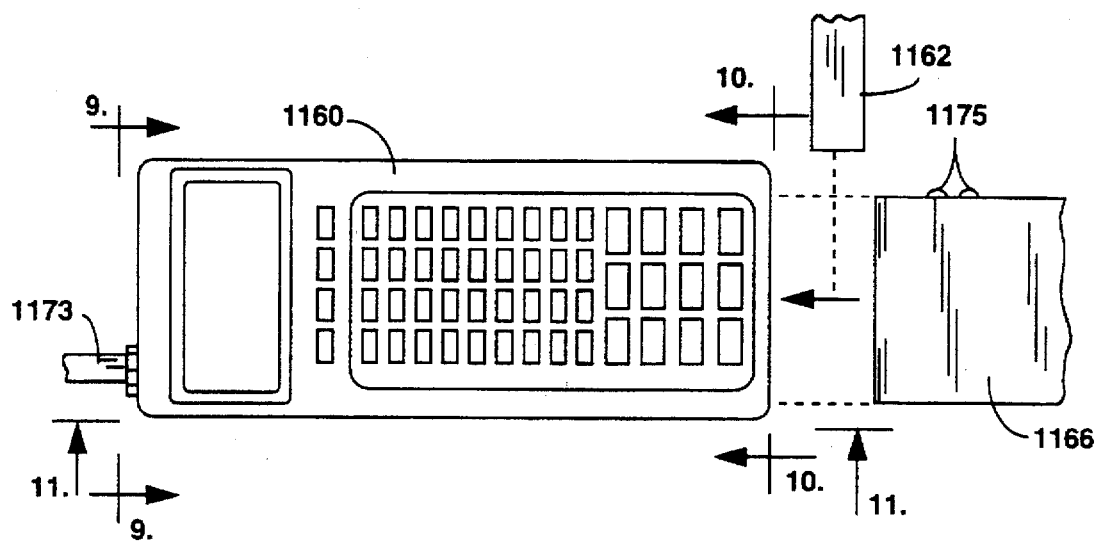
FIG. 28 is a front view of another computer terminal and end cap capable of receiving a radio card.
Figure 29:
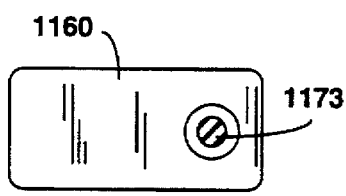
FIG. 29 is a top view taken along line 9—9 of the computer terminal of FIG. 28.
Figure 30:
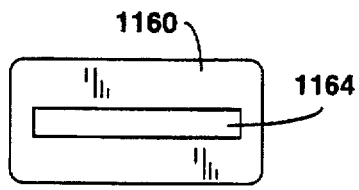
FIG. 30 is a bottom view taken along line 10—10 of the computer terminal of FIG. 28 with the end cap removed.
Figure 31:
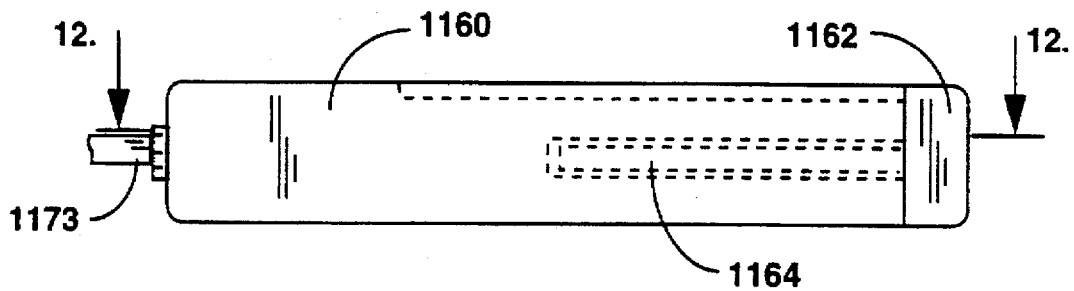
FIG. 31 is a side elevation view taken along line 11—11 of the computer terminal of FIG. 28 with the slot for the radio card shown in dashed lines.
Figure 32:
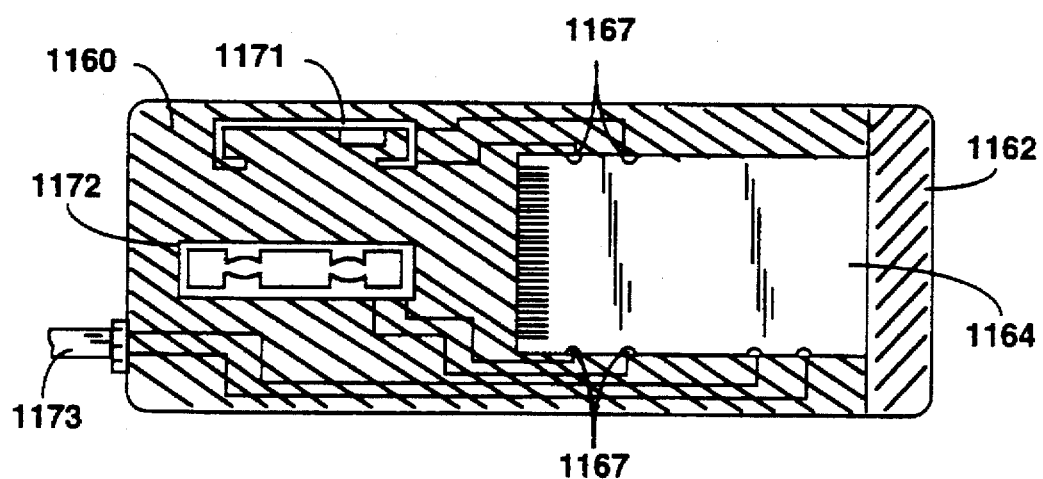
FIG. 32 is a partial top view taken along line 12—12 of the computer terminal of FIG. 31 showing the slot for receiving the radio card and the antennas.

Referring to FIG. 27, another embodiment of the present invention is shown. The radio card 1150 has two pairs of antenna contacts 1152 & 1153 which will encounter respectively two pair of antenna contacts 1155 & not shown on the receiving device 1158. This embodiment accommodates a radio card 1150 which can operate at two different frequencies which require two different antennas. Standardization of antenna contact position with antenna type is anticipated and covered by the present invention.

Referring to FIGS. 28–32, another embodiment of a computer terminal 1160 built in accordance with the present invention is shown. The computer terminal 1160 has a removable end cap 1162. When the end cap 1162 is removed, a slot 1160 is revealed which is used to receive a radio card 1166. The slot 1164 in the computer terminal 1160 has three pairs of antenna contacts 1167, 1168 and 1169 which are respectively connected to three different radio antennas 1171, 1172 and 1173. The radio card 1166 in this embodiment only has one pair of antenna contacts 1175. Thus, when the radio card 1166 is inserted into the slot 1164, the antenna contacts 1175 will match up to the antenna contacts 1167 and the radio will utilize the internal antenna 1171. The external antenna 1173 and the other internal antenna 1172 will not be used by this particular radio card 1166.

Figure 33:
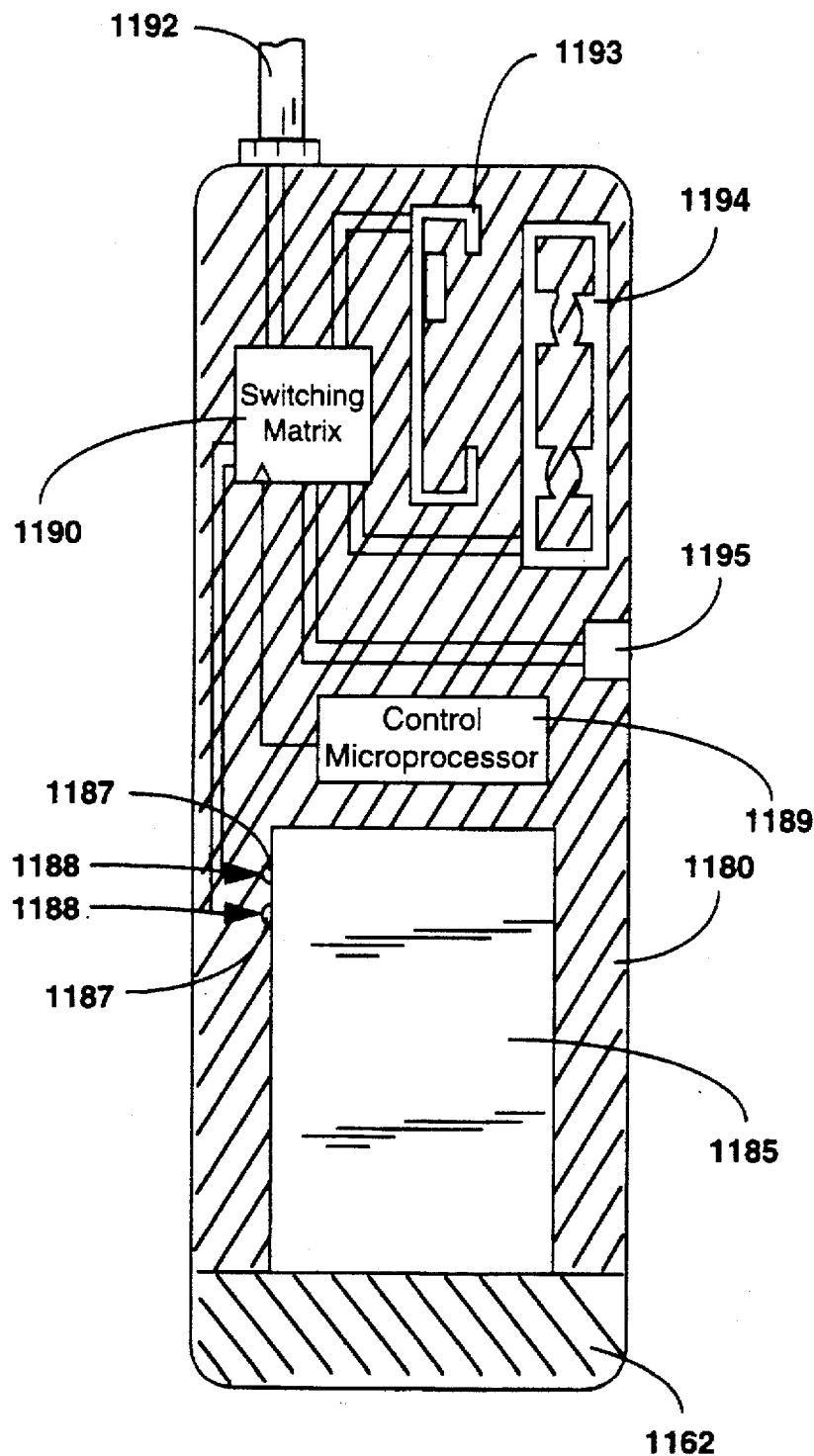
FIG. 33 is a partial top view of yet another embodiment of a computer terminal built in accordance with the present invention showing the use of a switching matrix.

Referring now to FIG. 33, still another embodiment of a computer terminal 1180 built in accordance with the present invention is shown. A communication card 1185 is inserted into the computer terminal 1180. The card 1185 can either be a radio card or a modem card. The card 1185 has a set or pair of contacts 1187 which encounter a set or pair of contacts 1188 disposed on the receiving portion of the computer terminal 1180. The contacts 1188 are electrically connected to a switching matrix 1190, thus the radio card or modem card 1185 is electrically connected to the switching matrix 1190.

The switching matrix 1190 is connected to a plurality of antennas 1192, 1193 and 1194 and to a telephone jack 1195. The switching matrix 1190 is used to electrically and selectively connect the radio or modem card 1185 to the appropriate antenna or to a telephone line. The switching matrix 1190 is controlled by the control microprocessor 1198 of the computer terminal 1180. The control microprocessor interrogates the card 1185 to determine what kind of card it is and to determine what antenna or telephone connection it needs. The control microprocessor then signals the switching matrix 1190 which connects the card 1185 to the appropriate antenna 1192, 1193 or 1194 or to the phone jack 1195.

Figure 34:
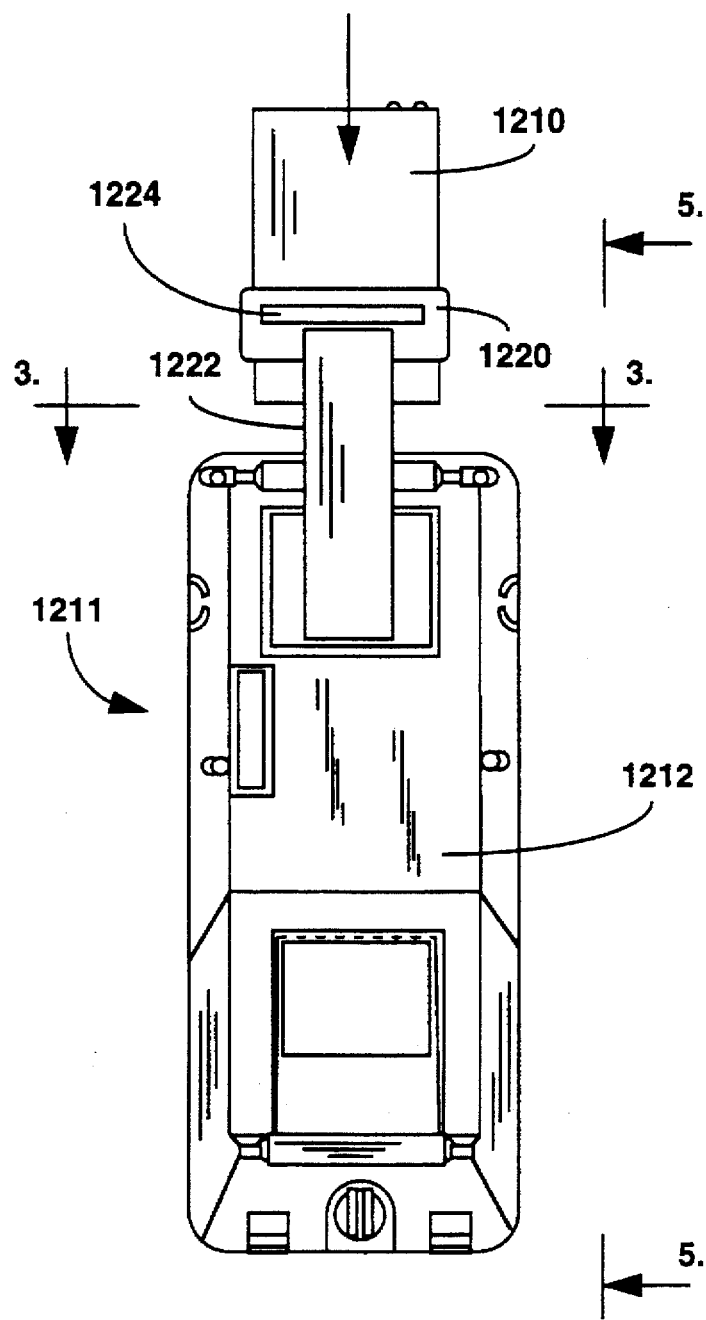
FIG. 34 is a back view of a computer device and radio card built in accordance with the present invention.
Figure 35:
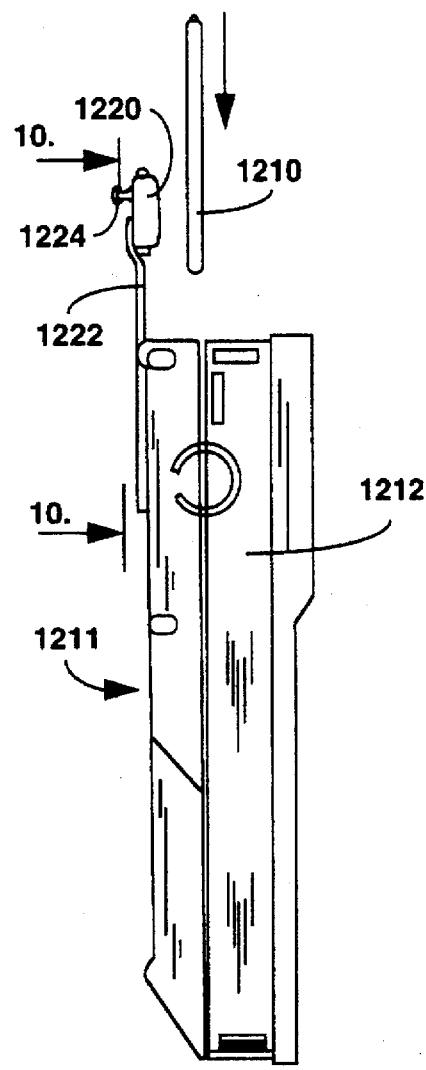
FIG. 35 is a side elevational view taken along line 2—2 of FIG. 34 of the computer device and radio card.
Figure 36:
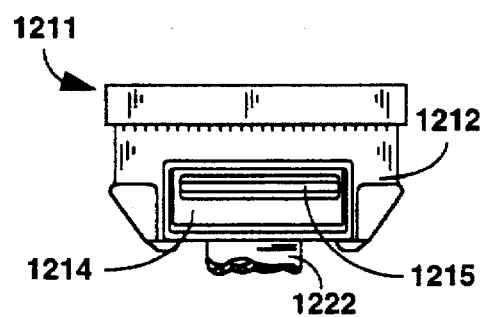
FIG. 36 is a partial top view taken along line 3—3 of FIG. 34 of the computer device.

FIGS. 34, 35 and 36 illustrate another embodiment wherein a computer device 1211 utilizes a radio card 1210 built in accordance with the present invention. The computer device 1211 has a housing 1212. Inside the radio card 1210 is a completely operational radio transceiver (not shown). The computer device 1211 has an opening 1214 in the housing 1212 through which the radio card 1210 can be inserted into the computer device 1212. In the present embodiment of the invention, the receiving means for the computer device is a slot 1215.

When the radio card 1210 is inserted into the slot 1215 in the computer device 1211 an interface between the radio card 1210 and the computer device 1211 is produced. The computer device 1211 has a plurality of pins not shown which form the male portion of a connector. The radio card 1210 has a corresponding plurality of holes not shown which form the female portion of the connector and which engage the pins. The pins are connected internally and electrically to the, computer device 1211 by a series of electrical connections such as wires or electrical ribbon. The holes in the radio card 1210 are electrically connected to the radio transceiver. When the pins engage the holes, electrical signals can be exchanged between the radio transceiver inside the radio card 10 and the computer device 1211. The electrical signals can be in the form of information exchange, power supply or both. The radio card 1210 includes antenna contacts 1217 to engage corresponding radio antenna contacts that are connected to an appropriate antenna.

The computer device 1211 includes a cap 1220 which is designed to matingly engage the opening 1215 in the housing 1212 of the computer device 1211 and thereby cover the slot 1215 used to receive the radio card 1210. A flexible band 1222 attaches the cap 1220 to the housing 1212 of the computer device 1211. One end of the band 1222 is connected to the cap 1220 while the other end is attached to the housing 1212. A handle 1224 helps assist the removal of the cap 1220 from the housing 1212 of the computer device 1211.

The cap 1220 is constructed of a closed cell foam material with high air content for low dielectric losses. Alternatively, a quality dielectric material may be used to reduce the size of the antenna structure. The cap 1220 when made of a foam material helps to protect the radio card from the physical trauma typically associated with computer devices of these types. Additionally, as will be discussed in further detail below, the cap 1220 helps to environmentally seal the opening 1214 preventing harmful material from the outside such as dust or moisture from reaching the radio card 1210 and helps to reduce the escape of electronic noise from the housing 1212 created by the radio card 1210 and computer device 1211. As will be discussed below, a grounded metal shield covering a portion of the cap 1220 is used to reduce the escape of electronic noise.

While the cap 1220 helps to seal the opening, protect the radio card 1210 and hold the radio card in place, the primary function of the cap is to provide the radio card 1210 access to an appropriate antenna or antennas. The connection of the radio card 1210 to the antenna is made through the cap 1220. The antenna or antennas can be embedded in the cap 1220, embedded in the band 1222 or even attached to, mounted on, or embedded in the housing 1212 of the computer device 1211.

Figure 37:
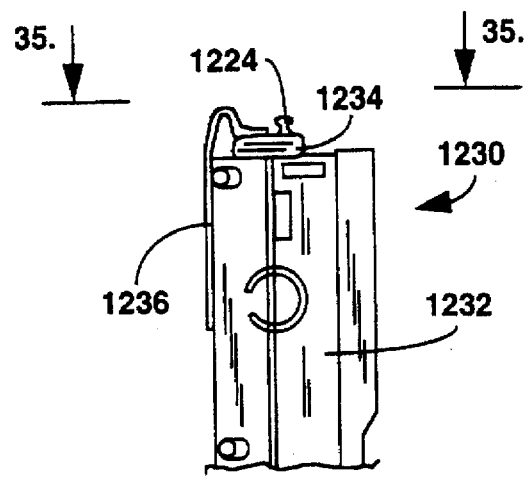
FIG. 37 is a partial side elevational view of another computer device built in accordance with the present invention.
Figure 38:
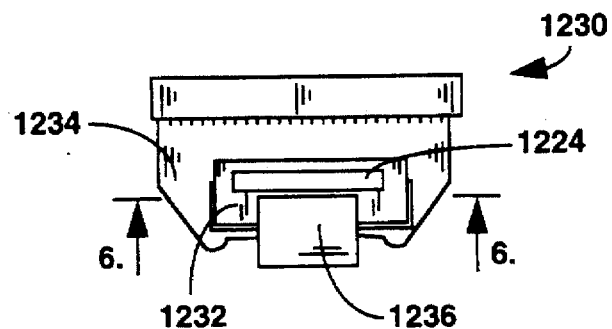
FIG. 38 is a top view taken along line 5—5 of FIG. 37 of the computer device showing the rubber cap inserted therein.

Referring now to FIGS. 37 and 38, a computer device 1230 built in accordance with the present invention is shown with a cap 1234 engaged in the opening of the housing 1232 wherein a radio card can be inserted. A band 1236 is attached to both the cap 1234 and the housing 1232. The band 1236 helps prevent the loss of the cap 1234 when the cap 1234 is not engaged in the housing 1232 of the computer device 1230.

Figure 39:
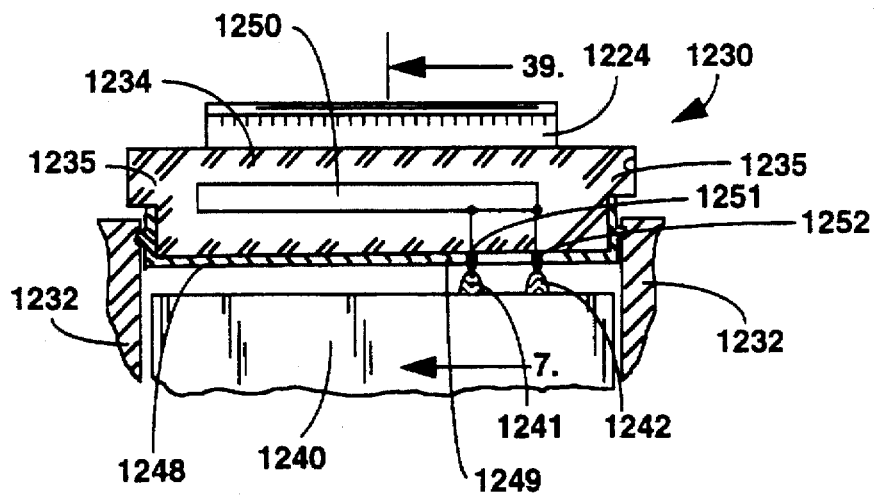
FIG. 39 is a partial vertical sectional view taken along line 6—6 of FIG. 38 showing a radio antenna embedded within the rubber cap.
Figure 40:
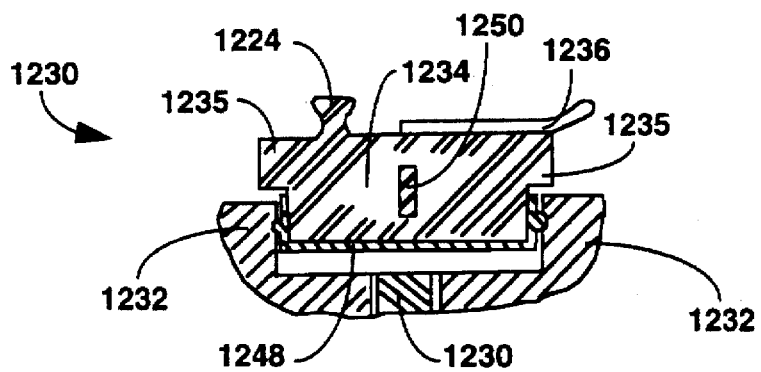
FIG. 40 is a partial vertical section view taken along line 7—7 of FIG. 39 of the rubber cap.

Referring now to FIGS. 39 and 40, the cap 1232 is shown engaged with the housing 1232 of the computer device 1230. The cap 1234 includes an outwardly extending lip 1236 which helps to environmentally seal the opening in the housing 1232 preventing harmful material from the outside such as dust or moisture from reaching the radio card 1240 which has been inserted into the computer device 1230. When the cap 1234 is completely inserted or fully engaged in the housing 1232, the lip 1235 sealingly engages the housing 1232.

Embedded in the cap 1234 is an antenna 1250. The antenna 1250 is connected to the radio card 1240 through contacts 1251 and 1252 disposed on the cap 1234 and contacts 1241 and 1242 disposed on the radio card 1240. Contact 1252 is the ground contact for the antenna 1250 and is connected to the end of the antenna 1250. Contact 1242 is the ground contact for the radio card 1240. Contact 1251 is the signal contact and is connected to the antenna 1250 a short distance from the end of the antenna 1250. Contact 1241 is the signal contact for the radio card 1240.

Contact 1251 and contact 1241 are disposed on the cap 1234 and the radio card 1240, respectively, such that the contacts engage each other when the cap 1234 is inserted into or engaged with the housing 1232 of the computer device 1230. Similarly, contact 1252 and contact 1242 are disposed on the cap 1234 and the radio card 1240, respectively, such that the contacts engage each other when the cap 1234 is inserted into or engaged with the housing 1232 of the computer device 1230. The contacts shown in the present embodiment are of the metal button type wherein the connection is made when the two metal surfaces meet. Many variations of the contacts are possible including the use of male/female connections and spring type contacts.

A shield 1248 is disposed around the bottom portion of the cap 1234 and is used to reduce the escape of electronic noise. Typically in computer devices of this type, the inside of the housing of the computer device is shielded. Additionally, the area immediately surrounding the radio device such as a radio card may also be shielded. By shielding the cap 1234, the integrity of the housing and radio shields are not breached by the opening used to insert and remove the radio card. The shield 1248 is connected to the antenna ground contact 1252 on the cap 1234. A hole 1259 in the shield 1248 allows the signal contacts 1251 and 1241 to engage without being grounded.

Figure 41:
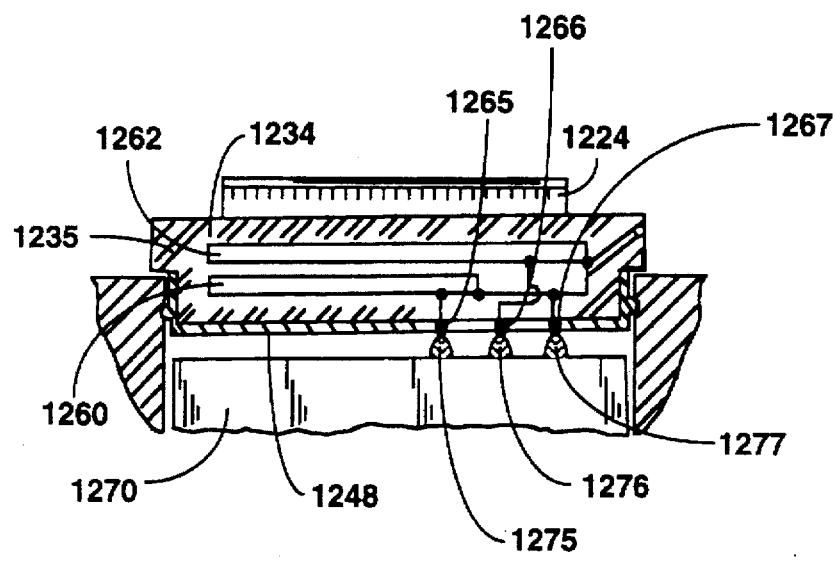
FIG. 41 is a partial vertical sectional view of another embodiment of the present invention.

Referring now to FIG. 41, the cap 1234 is shown embedded within which are two antennas 1260 and 1262 designed to receive and transmit different radio frequency signals. The first antenna 1260 and the second antenna 1262 are both connected to a common ground contact 1267 which is connected to the shield and which engages the ground contact 1277 on the radio card 1270. The first antenna 1260 is connected to a first signal contact 1265 and is disposed on the cap 1234 to engage a first signal contact 1275 disposed on the radio card 1270. Similarly, the second antenna 1262 is connected to a second signal contact 1266 and is disposed on the cap 1234 to engage a second signal contact 1276 disposed on the radio card 1270. Thus the radio card 1270 will use a signal via contact 1275 or via contact 1276 depending upon which antenna it would like to use. Which antenna it would like to use is dependent upon the desired frequency upon which it want to transmit and receive.

The radio card 1270 as shown has three contacts 1275, 1276 and 1277. However, if the radio transceiver in the radio card 1270 is designed such that it would only be able to transmit and receive signals which correspond to the first antenna 1260, then it would not need to have contact 1276 and it could be left off. Similarly, if the radio card 1270 were only going to use second antenna 1262 then contact 1275 could be omitted. Thus, standardizing contact position with respect to antenna type allows for flexibility in cap usage with various radio cards such that only appropriate antennas will be connected to the radio card.

Figure 42:
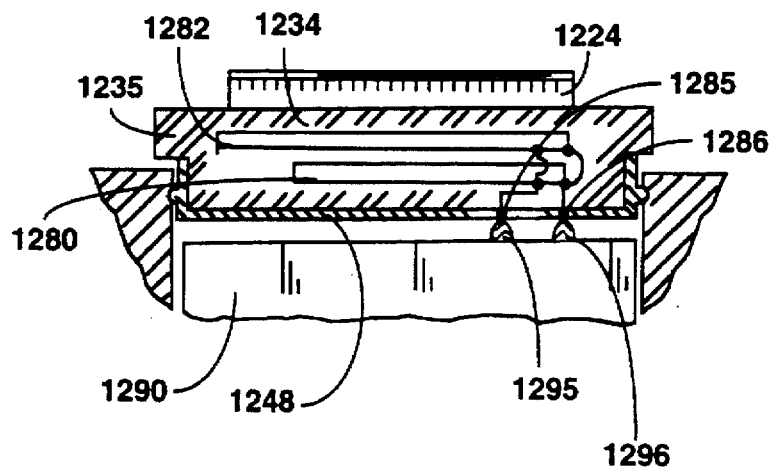
FIG. 42 is a partial vertical sectional view of still another embodiment of the present invention.

Referring to FIG. 42, two antennas 1280 and 1282 are embedded in the cap 1234. In this embodiment built in accordance with the present invention, the two antennas 1280 and 1282 not only share a common ground contact 1286 which engages the ground contact 1296 of the radio card 1290, but they also share a common signal contact 1285 which engages the signal contact 1295 on the radio card 1290. Thus, both antennas receive and transmit signals using the same two contacts. This embodiment requires a radio card 1290 which can filter the different signals and thus use the signal from the desired antenna while ignoring the signals which arrive via the other antenna.

Figure 43:
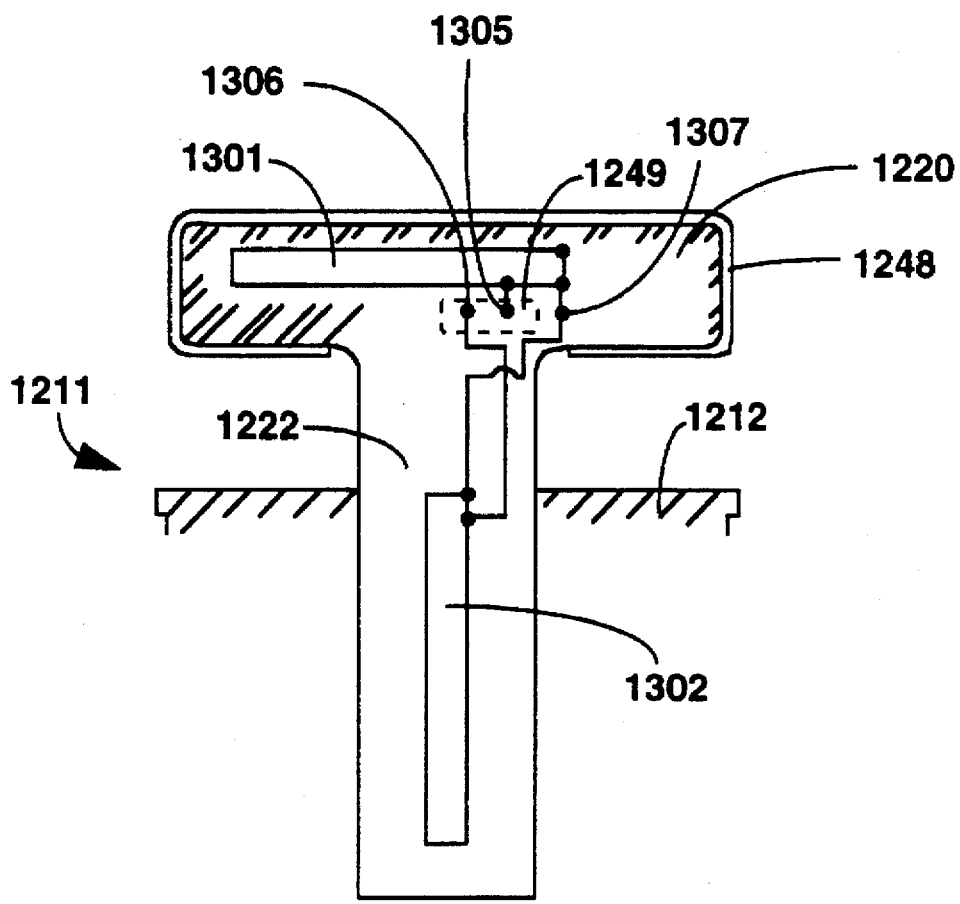
FIG. 43 is a partial back view taken along line 10—10 of FIG. 35 of the computer device.

Referring to FIG. 43, a computer device 1211 built in accordance with the present invention is shown which is designed to implement an antenna diversity scheme. A first antenna 1301 is embedded in the cap 1220. A second antenna 1302 is shown embedded in the band 1222. As discussed in the embodiment as shown in FIG. 41, the two antennas 1301 and 1302 share a common ground contact 1307. The first antenna 1301 is connected to a signal contact 1305. Likewise, the second antenna 1302 is connected to a signal contact 1306. The hole 1249 in the shield 1248 which prevent the signal contacts 1305 and 1306 from grounding is shown in dashed lines.

The first antenna 1301 is similar to the second antenna 1302 and both are designed to transmit and receive similar radio frequency signals. When the cap 1220 is engaged in the opening of the housing 1212, the first antenna 1301 and the second antenna 1302 will be perpendicular with respect to each other. The quality of the signal received by the first antenna 1301 and the quality of the signal received by the second antenna 1302 may be greatly different since the antennas are placed at right angles with respect to each other. In the present embodiment, the radio card can check the quality of each signal and use the antenna which is currently receiving the stronger signal. Additionally, it can switch to the other antenna when the conditions change such that the signal is no longer acceptable. Utilizing two similar antennas in this matter, antenna diversification, can be very important in computer terminals of this type since they are often mobile and are often subjected to a rapidly changing environment. An antenna diversification scheme of this type can be used to help eliminate the reception problems associated with signal multipath.

Figure 44:
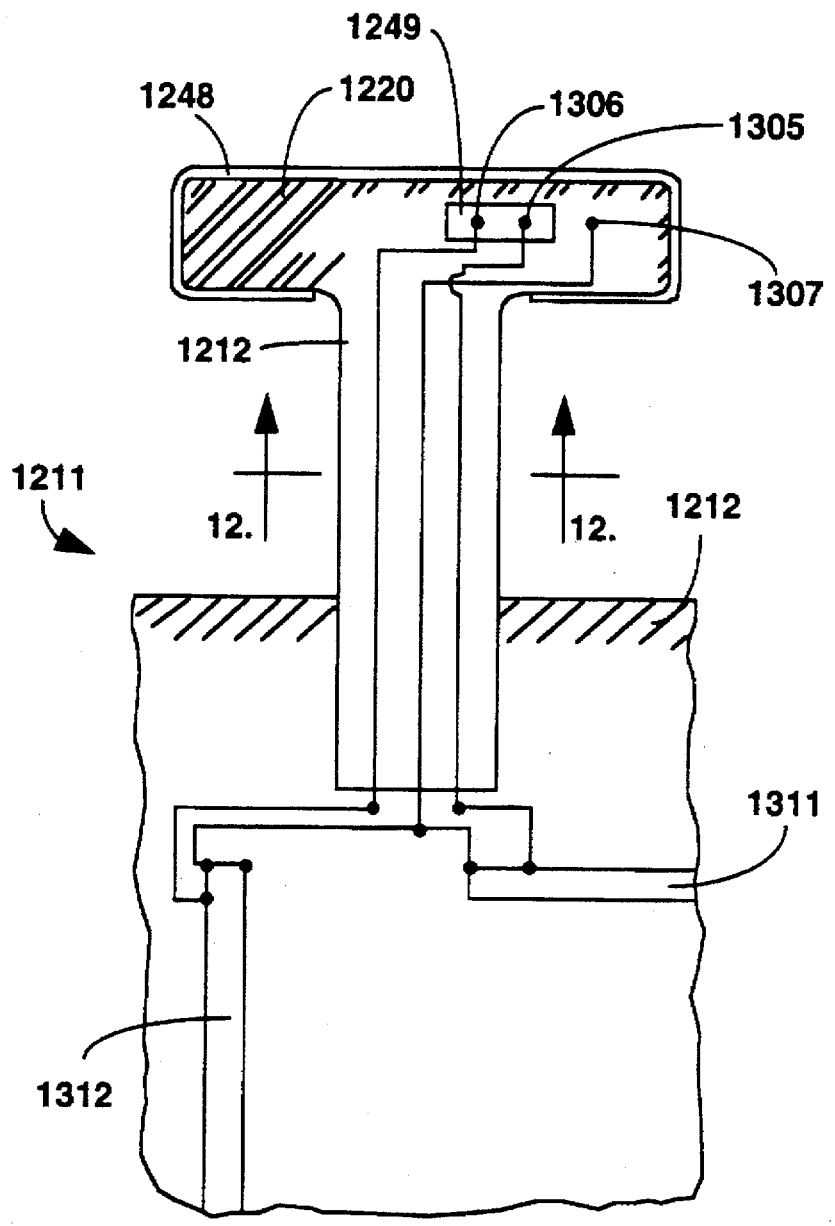
FIG. 44 is a partial back view of still another embodiment built in accordance with the present invention.

Referring now to FIG. 44, another embodiment of the present invention is shown with the first antenna 1311 and the second antenna 1312 attached to the housing 1212 of the computer terminal 1211. As in the embodiment shown in FIG. 43, the first antenna 1311 is similar to the second antenna 1312 and both are designed to transmit and receive similar radio frequency signals and are perpendicular with respect to each other such that an antenna diversity scheme can be implemented. The antennas 1311 and 1312 are connected to the contacts 1305, 1306 and 1307 through the cap 1220 and though the band 1212.

Figure 46:
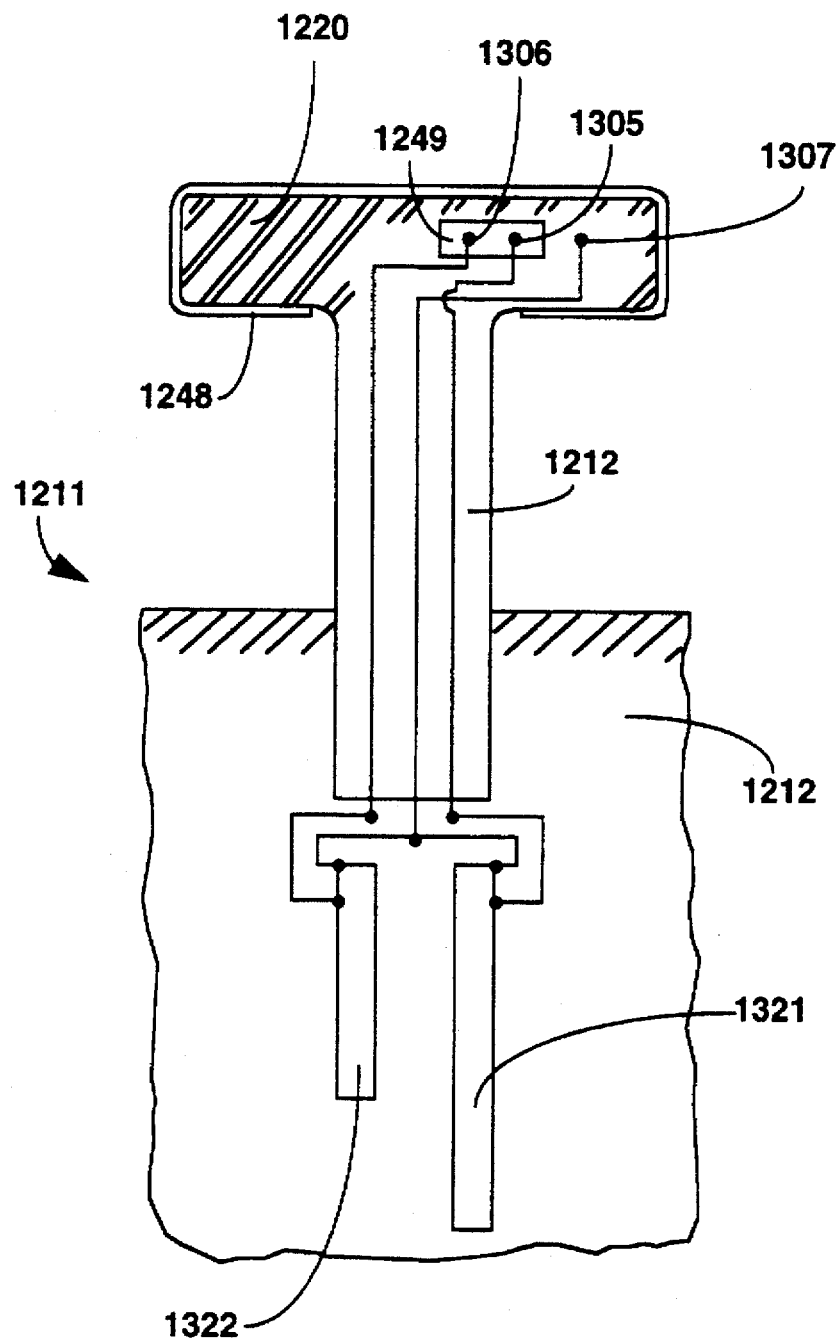
FIG. 46 is partial back view of a computer device of yet another embodiment of the present invention.

Referring to FIG. 46, the embodiment of FIG. 44 is shown with the only differences being that the first antenna 1321 and the second antenna 1322 are positioned slightly differently and the antennas are designed to transmit and receive different radio frequency signals. Thus, the radio card uses the signal on contact 1305 when it wants to receive signals via the first antenna 1321 and uses the signal on contact 1306 when it wants to receive signal via the second antenna 1322.

Figure 45:
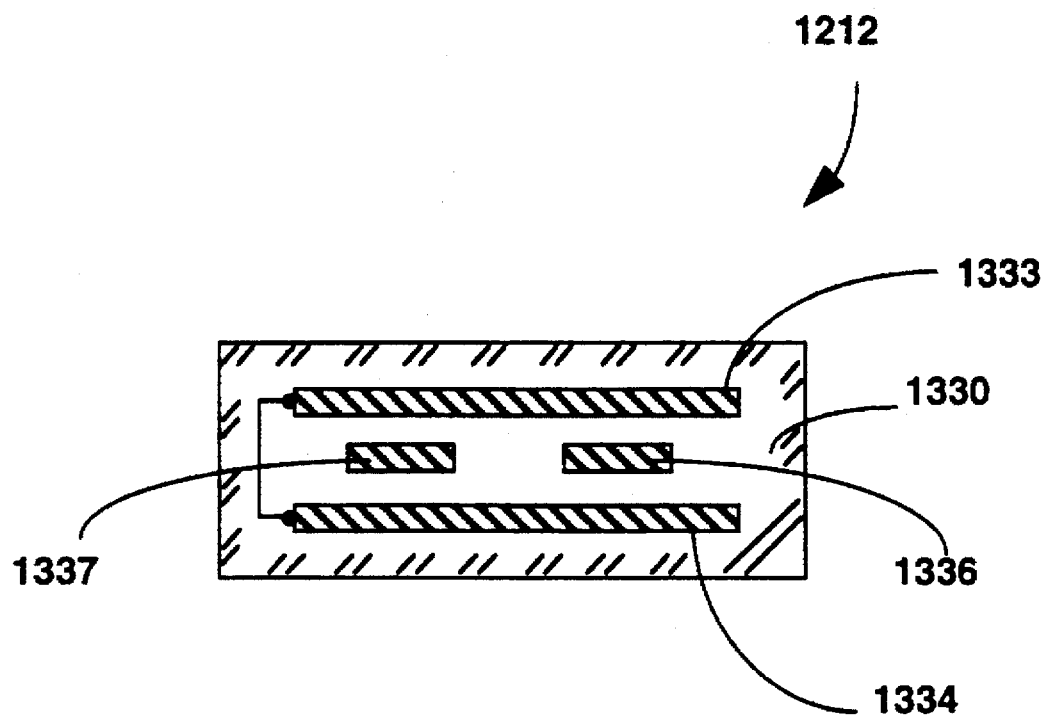
FIG. 45 is a partial horizontal sectional view taken along line 12—12 of FIG. 44 of the band showing the shielded ribbon used to carry the antenna signals.

In FIGS. 43, 44 and 46, the portion of the connection between the contacts 1305, 1306 and 1307 and the antennas which pass through the band 1212 are shown schematically as wires. In the best mode of the present invention, the transmission of the signal through the band 1212 would be accomplished through the use of a micro shield strip 1330 as shown in FIG. 45. The micro shield strip consists of several conductive ribbons running the length of the band 1212 and separated by the non-conductive material of the band 1212. A wide top ribbon 1333 and a wide bottom ribbon 1334 are used to sandwich two smaller ribbons 1336 and 1337. The smaller ribbons 1336 and 1337 are used to transmit the antenna signals and are connected to contacts 1305 and 1306 respectively. The wide bands 1333 and 1334 are common to each other and are used to ground each of the antennas and are connected to the ground contact 1307 on the cap 1220. The wide ground ribbons 1333 and 1334 shield the smaller antenna signal ribbons 1336 and 1337 and help to maintain the signal integrity.

Figure 47:
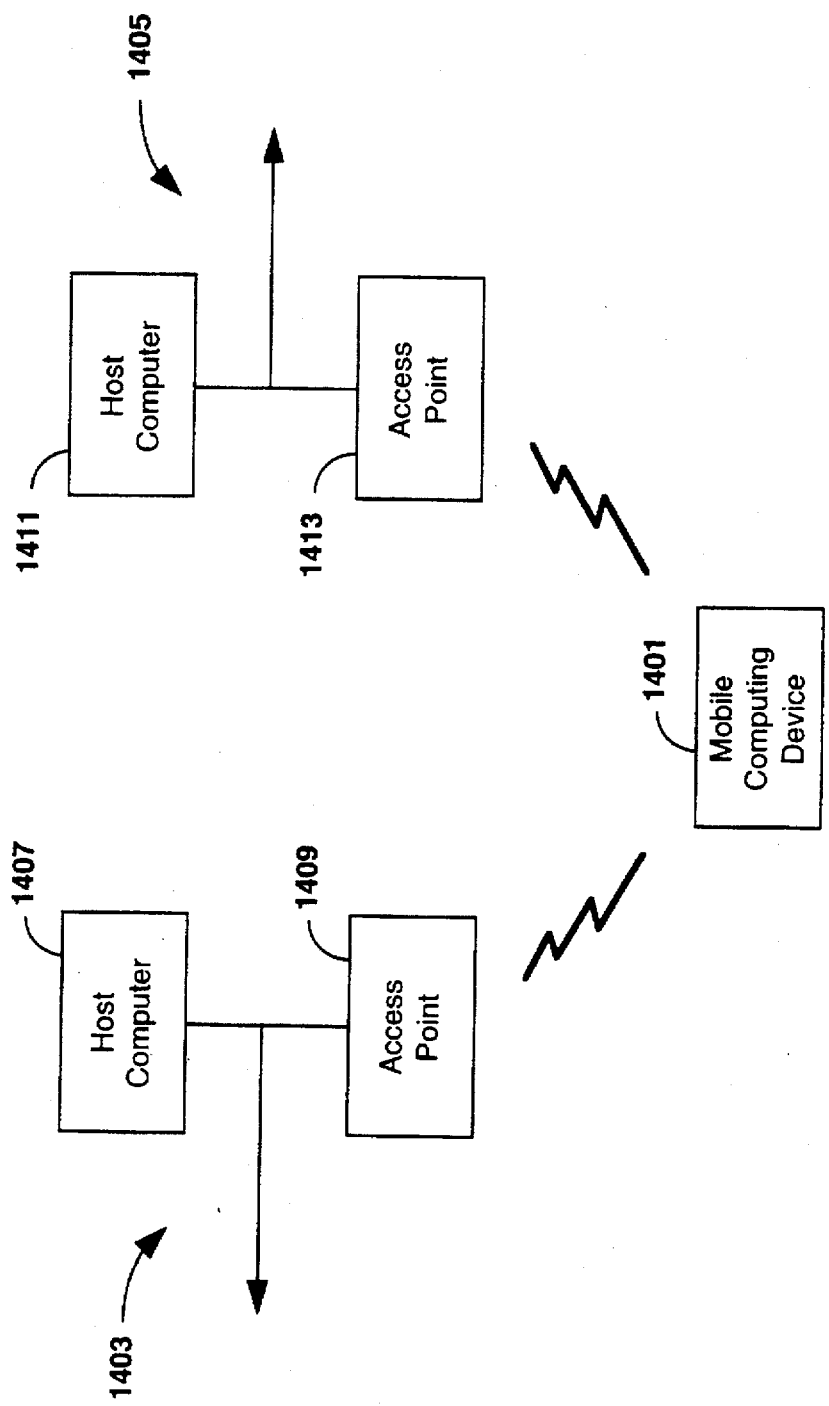
FIG. 47 is a diagram which illustrates the use of the portable data terminal according to the present invention which utilizes a plurality of radios to access different sub-networks of an overall communication network.
Figures 1, 2:
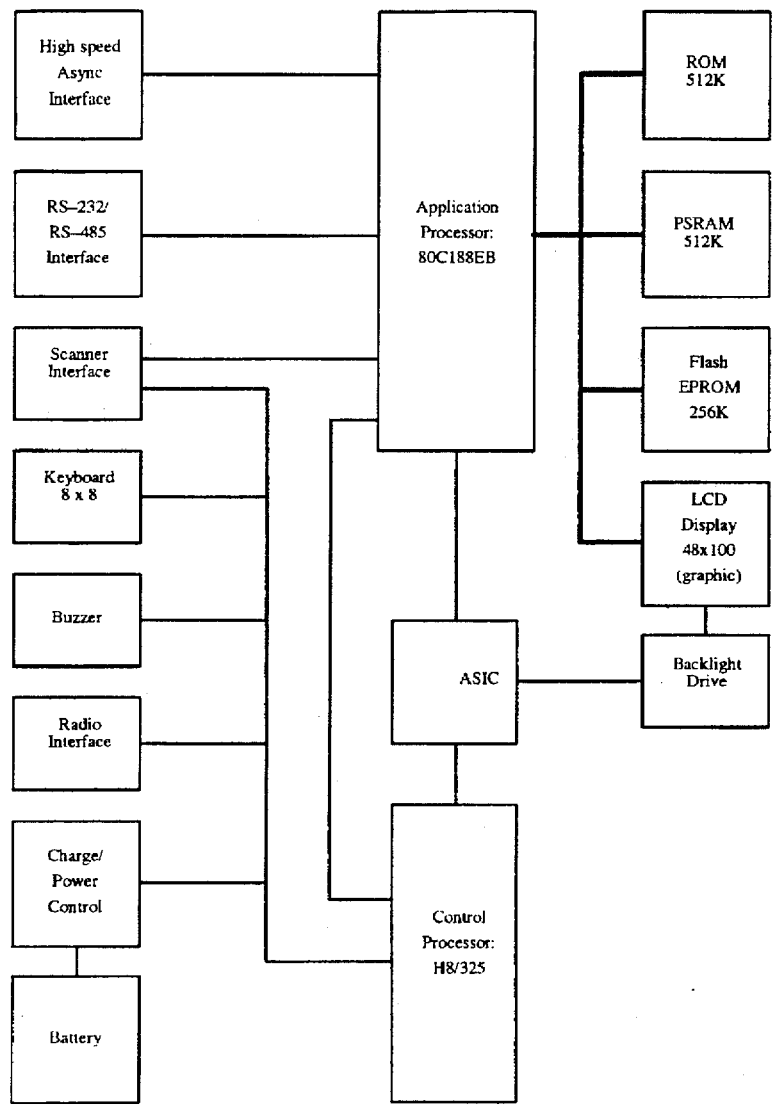

FIG. 47 is a diagram illustrating the use of portable data terminals according to the present invention which utilizes a plurality of radios to access different subnetworks of an overall communication network. Specifically, subnetworks 1403 and 1405 are illustrated which provide for an overall network environment for MCD 1401. Each subnetwork 1403 and 1405 may have a host computer, such as 1407 and 1411, and an access point, such as 1409 and 1413. The access point 1409 provides for communication via one type of radio communication while access point 1403 provides for another. For example, access point 1409 may provide a long-distance digital cellular link while access point 1413 provides for local spread spectrum link.

In addition, access points 1409 and 1413 might also exist on a single network for providing multiple communication paths in case one access point fails or becomes overloaded.

To accommodate multiple radios, the communication module of MCD 1401 contains multiple transceivers, and associated protocol substacks and antennas. Specifically, the communication module might include a single processing unit which handles multiple sets of software protocol substacks, i.e., one for each of the included transmitters. Similarly, if the protocol substacks and the processing unit functionality of each radio is too different, additional separate processing units may be included. Finally, the MCD (the portable data collection terminal) might also be designed to receive multiple communication modules.

In addition, the base module may interrogate the selected ("inserted") communication module(s) to determine which antennas to interconnect. Alternatively, the communication modules may interrogate the base module and request from the available antennas. Where a suitable antenna is not available, an external antenna connector is selected. Available antennas may be installed inside or on the outside of the base unit. Of course the antennas might also be selected via the physical communication module connectors as described below.

It should be realized that various other changes and modifications in the structure of the described embodiment would be possible without departing from the spirit and scope of the invention as set forth in the claims.

APPENDIX A:

A COPY OF A MASTERS THESIS ENTITLED
"MOBILE COMPUTER NETWORK ARCHITECTURE"

©Copyright 1993 by ROBERT C. MEIER

MOBILE COMPUTER NETWORK ARCHITECTURE by

Robert C. Meier

A thesis submitted in partial fulfillment
of the requirements for the Master of
Science degree in Computer Science
in the Graduate College of
The University of Iowa August 1993

Thesis supervisor: Professor Donald Epley

TABLE OF CONTENTS

LIST OF TABLES .............................................iv

LIST OF FIGURES ............................................ v

CHAPTER

I. INTRODUCTION ....................................... 1

Summary of Contributions ..................... 2
        Organization of Thesis ....................... 3

II. NETWORK OVERVIEW. ................................ 4

Logical nodes ................................ 4
        Physical devices ............................. 5
        Communications links ......................... 6
        Network addresses ............................ 9
        Network design issues. ......................10

III. DATA LINK LAYER ................................17

Functional requirements .....................17
        Data Link Control ...........................18
            Data Link Control services .............18
            Data Link Control frame definitions .....19
            Bracket transmission ...................21
            Ffame/packet filtering .................25
            Transmit and Receive State Machines .....25
                Bracket Transmit State Machine. ......26
                    Transmit state descriptions .....26
                    Transmit state timers ...........27
                Bracket Receive State Machine .......30
                    Receive state descriptions ......32
                    Receive state timers ............32
        Medium Access Control .......................33

IV. NETWORK LAYER ....................................38

```
            Functional requirements .....................38
            Network layer services ......................38
            Network layer packet definitions. ...........39
            Spanning tree organization. .................39
                 Attaching to the spanning tree ..........45
                 Network layer routing. ..................48
                 Dynamic changes in the spanning
                      tree. ..............................52
                 Detach packet logic. ....................55
                 Hello synchronization. ..................56
                 Sleeping terminal support ...............57
            Address Resolution. .........................58
                 Reverse Address Resolution Protocol
                      (RARP). ............................59
                 RARP routing. ...........................60
                 Address Resolution Protocol (ARP). ......62
                 Address maintenance. ....................62
            Root resolution .............................63
                 Root resolution states ..................63
                 Hello packet priority. ..................65

V. TRANSPORT LAYER ....................................68

VI. SUMMARY ...........................................73

Conclusions ....................................73
       Future MCNA Extensions .........................74

REFERENCES ............................................76
```

LIST OF TABLES

| Table | | Page |
|---|---|---|
| 1. | DLC Frame Types | 20 |
| 2. | DLC Control Fields | 21 |
| 3. | DLC Transmit State Transition Table | 29 |
| 4. | DLC Receive State Transition Table | 31 |
| 5. | Network Header Control Word | 40 |
| 6. | Network Layer Packet Types | 41 |
| 7. | Root Resolution State Transition Table | 67 |

LIST OF FIGURES

Figure                                                          Page

1.  Terminal and Router Protocol Stacks............. 4
2.  An example MCNA Network......................... 8
3.  Coverage Areas with Hidden Nodes ...............16
4.  Example DLC Bracket Transmission................22
5.  DLC Bracket Transmission Timing Graph...........23
6.  A Block Diagram of Physical Devices and Links...42
7.  A Spanning Tree.................................43
8.  A Spanning Tree with Network Addresses..........49
9.  An Example Network Routing Table................50
10. An Example RARP Routing Table...................61

CHAPTER I

INTRODUCTION

Mobile Computer Network Architecture (MCNA) is a computer network architecture designed to connect mobile interactive radio-equipped computers to an infrastructure of stationary computer devices. The network architecture is based on protocol layering principles developed by the International Standards Organization (ISO) for Open Systems Interconnection (OSI). The ISO/OSI model specifies seven distinct communications layers. Each layer provides a distinct service and isolates other layers from changes in the computer network. MCNA implements the first four protocol layers - 1) the physical layer, 2) the data link layer, 3) the network layer and 4) the transport layer. The physical layer includes short-range spread spectrum radio links to facilitate terminal mobility. Multiple overlapping radio coverage areas are used to provide a multi-hop data path from intelligent mobile radio-equipped computers to a fixed network of computers and to other radio-equipped computers. Multi-hop radio links, overlapping radio coverage areas, and mobile network nodes present unique network design issues which are primarily addressed by the data link layer and the network layer. This thesis defines
network requirements and design issues which influenced the
development of MCNA, and then presents data link and network
layer solutions and transport layer requirements in the
context of a specific hardware solution and a working
functional model.

Summary of Contributions

The radio networking concepts presented in this thesis
include extensions and adaptations of earlier work, and
include original work by the author which is listed in
patent applications filed by Norand Corporation of Cedar
Rapids, Iowa. The problems and design issues related to
packet radio networking are well documented in several of
the listed references. Nielson and Tobagi provide the best
summary of packet radio design issues in [1]. The data link
layer presented in this thesis includes a channel
reservation technique which has been used in earlier
collision avoidance protocols designed for wired links. The
network layer organizes nodes into a spanning tree.
Spanning trees are commonly used for network layer routing;
however, the approach used in MCNA was actually inspired by
the IEEE 802.1 standard for transparent bridging. Backes
provides an excellent overview of the 802.1 bridging
standard in [9]. It should be noted that MCNA and
transparent bridging are considerably different. MCNA defines a layered protocol stack for a packet switched network. Transparent bridging defines a method for forwarding data link frames across local area subnets and is not a part of any protocol layer. The transport layer used in MCNA is an extension of the IEEE 802.2 logical link control standard described in [10].

Organization of Thesis

Chapter II contains an overview of MCNA and presents design issues which affected the development of the MCNA protocol stack.

Chapter III contains a detailed description of the MCNA data link layer which encompasses channel access and logical link control.

Chapter IV contains a detailed description of the MCNA network layer.

Chapter V contains a brief description of the functions and services provided by the MCNA transport layer. A detailed specification of the transport layer can be found in [10].

Chapter VI summarizes advantages of the MCNA approach and discusses possible extensions to MCNA.

CHAPTER II
NETWORK OVERVIEW
Logical nodes
A logical node in the MCNA network is an addressable protocol entity. The network contains two logical node types: 1) terminal nodes and 2) router nodes. Figure 1 shows the protocol stacks for both node types. The arrows represent the flow of data between layers in the stacks.
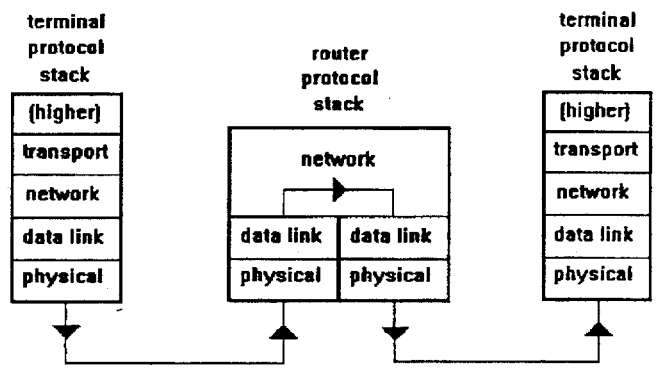
Figure 1.  Terminal and Router Protocol Stacks Terminal nodes are end points in the network; router nodes are used to forward data packets at the network layer. Any logical terminal can communicate with any other logical terminal at the network layer. The network is designed to support up to 1000 logical terminals which correspond to hardware devices such as radio-equipped computers, host computers, printers, etc.

Physical devices

A typical MCNA network might consist of the following hardware device types:

Base station - A stationary radio-equipped computer which is used to extend the range of a controller node. Base-station-to-controller links or base-station-to-base-station links can be wired or radio. Base stations contain a single router node.

Mobile Radio-equipped Computer (MRC) - A radio-equipped mobile computer which contains one or more terminal nodes. MRCs are often battery powered and go into a sleeping state whenever possible to conserve power. An MRC does not receive network data while it is sleeping. The MCNA network provides several features to accommodate sleeping terminal nodes. MRCs communicate with base stations at the data link layer.

Controller - A gateway device which connects peripheral devices to the network. A controller contains one router node and one or more terminal nodes. Each controller-based terminal node corresponds to an attached peripheral device. A typical MCNA network has one or more controller devices.

Peripheral Device - Any device which does not directly support the MCNA protocol stack, such as a printer or host computer. A peripheral device must be connected to a controller device and is represented by a terminal protocol stack in the controller.

Host Computer (or host) - A computer which communicates with associated MRCs in an MCNA network. A host computer can be viewed as a peripheral device.

Communications links

A communication link is used to make a physical layer connection between devices. In an MCNA network, physical layer connections can be made with either wired or radio links. Each link is restricted to a single communications channel, where a channel can accommodate only one data transmission at any given time. (In some networks, frequency or time division multiplexing can be used to multiplex multiple communications channels on a single physical link.) The network architecture assumes that <u>both radio and wired links provide a broadcast medium at the data link layer</u>. All unicast and multicast data link frames transmitted on a medium are received by all nodes physically connected to the medium.

Low-power direct-sequenced spread-spectrum radio is used to facilitate mobility for MRCs. The bit rate of the spread-spectrum radio channel is approximately 200 Kbps. Although the coverage area of a single radio transmitter is restricted, the total radio coverage area of an MCNA network must be virtually unlimited by the network design. Multiple base stations are used to extend the radio coverage area. It is a requirement that MRCs can move freely throughout the total coverage area without significant response time and throughput penalties. Roaming is the process of moving out of the coverage area of one base station and into the coverage area of a second base station. Link level error rates are relatively high on radio links due to roaming (and the nature of the medium).

Base stations and controllers can be connected on a multi-drop relatively high-speed wired backbone LAN. (Note that if an IEEE 802 medium access LAN standard is used for the backbone LAN, multicast IEEE 802.1 addresses are required to broadcast unicast data link frames at the medium access control sublayer.) Base stations can also be connected on radio links, at the physical layer. A peripheral device can be connected to an MCNA controller by any physical standard which both devices support. As noted above, a peripheral device is represented by a terminal protocol stack in an attached controller; therefore, the physical connection to a peripheral device is not considered to be an MCNA network link. Differences in MCNA physical layer links are hidden from higher layers by the MCNA data link layer.
Figure 2 shows an example MCNA network. Note that base stations can be wired (i.e. to the backbone LAN) or wireless.
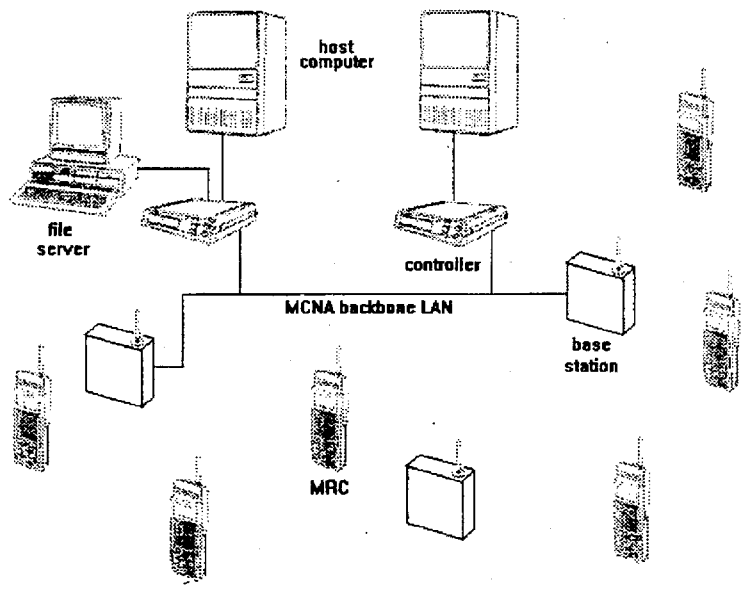
Figure 2. An example MCNA Network

Network addresses

Data link frames contain a hop destination and hop source address in the data link header. Network layer packets contain an end-to-end destination and source address in the network header. Transport headers contain source and destination service access point (SAP) identifiers. Data link and network addresses are consistent and have the same format.

All devices must have either a unique long identifier which is programmed into the device at the factory and/or an alias which is typically entered by the user and is well-known. The long address and/or alias binds to a short 16-bit network address, obtained from an address server. A network address uniquely identifies a logical terminal or router node.

Network addresses consist of 2 parts: a 1) node type and a 2) 11-bit node identifier. MCNA has terminal and router node types. A node type of all 1's is used to specify all node types. The node identifier is used to uniquely identify a node of the specified type. A node identifier of all 1's is used to specify any node of the associated type. Note that a node type of all 1's and a node identifier of 1's can be used to specify all nodes.

A unicast address is used to identify a single MCNA node. A multicast or broadcast address is used to identify a group of nodes. The high-order bit is always set ON in a multicast or broadcast address. The high-order bit can be set ON in a unicast address to turn off data link handshaking.

The default network address used when a data link entity is first enabled consists of the multicast node type concatenated with a node identifier of all 1's. For example, the default address for a router node is hexadecimal A7FF. The network layer is responsible for obtaining a network address and assigning it to the data link entity assigned to a physical port.

In addition, to source and destination addresses, each transmitted network packet contains an MCNA network identifier (LAN ID) in the data link header. The network identifier is used to filter radio traffic from adjacent MCNA networks.

Network design issues

Although MCNA is designed to be a general purpose network architecture, terminal emulation is the predominant application which MCNA is required to support. In an example emulation system, an MRC might look like a data entry terminal to a host computer. In this case, a controller attached to the host computer (directly or indirectly) would contain a logical terminal node which provided a gateway to the host. The application on top of the logical terminal protocol stack might emulate a terminal controller device. In addition to terminal emulation, the network must facilitate mail messaging, file transfers, and client-server applications.

Due to the nature of the supported applications, data traffic in an MCNA network is normally bursty and light, but can be heavy at times. Fast on-line response times for terminal emulation are essential, but the network can not go into an overloaded state when traffic occasionally gets heavy.

MCNA is a fully-interconnected network at the transport layer. For example, in figure 2, any of the MRCs in the network can log onto either host, can send mail messages to each other, or request records from the file server.

Most network architectures fall into one of two categories: 1) packet-switching, or 2) circuit-switching. In a packet-switched network, each data packet associated with a transport layer connection can be routed along a different path. Packets can be lost and arrive out of order. In a circuit-switched network, a fixed path, called a virtual circuit, is defined when a transport layer connection is established. Packets always arrive in order and are rarely lost. In an MCNA network, radio links (and data packets) can be lost frequently if an MRC roams during a transport layer connection. The frequent loss of physical links prohibits the use of pure circuit-switching at the network layer.

In a packet-switched (or circuit-switched) network, nodes periodically exchange or distribute routing tables so that each node can learn the path to other nodes in the network. Routing table entries typically contain the cost to other nodes in the network and allow a node to select the best first hop to use to send data to another node. Unscheduled routing table exchanges can be triggered when the cost to a node suddenly changes significantly, possibly due to a node or link failure. The overhead associated with routing table exchanges can be significant, even when physical links are relatively stable. Several factors preclude the use of routing table exchanges in an MCNA network: 1) radio links are transient, 2) the primary application requires consistent fast response times, and 3) the bandwidth on the radio channel is limited. Frequent table exchanges, triggered by the loss of radio links, would be required to support fast response times for roaming MRCs. It is easy to envision a network saturated by routing table exchanges.

In an MCNA network, logical nodes are organized into a spanning tree with a router node at the root of the tree. Other router nodes serve as interior nodes in the tree and terminal nodes are leaves in the tree. With the exception of the root node, each (child) node is connected by a single logical link to a parent node. Parent router nodes may have multiple children. Like a sink tree, nodes closer to the root node of the spanning tree are said to be downstream from nodes which are further away. Conversely, all nodes are upstream from the root. Network layer packets are routed along branches of the spanning tree. Router nodes use a technique called backward learning, to "learn" the path to upstream nodes (i.e. nodes in the subtree rooted at the router). The explicit exchange of routing tables is not required.

Responsiveness and guaranteed throughput, especially under heavy loads, are often conflicting goals in network design. Maximum throughput under heavy loads can be guaranteed by token-passing or polling schemes. Nodes gain access to a communications channel only after receiving a token or poll (i.e. from a master node). Responsiveness is degraded since a node must wait for a token or poll in order to communicate. On lightly loaded networks, the best response times (i.e. for on-line applications) can be obtained by using a technique called multiple access. In a multiple access system, nodes are allowed to access the channel asynchronously, without waiting for a poll or token. However, throughput under heavy loads can be degraded due to contention - multiple concurrent access to a communications channel resulting in collisions. In a carrier-sense/multiple access (CSMA) or listen-before-talk (LBT) multiple access system, collisions are reduced because nodes "listen" to the channel, to determine if it is busy, before accessing the channel. Hybrid channel access techniques exist, which allow multiple access to the channel under light loads, but which migrate to a polling scheme as traffic increases. Such techniques usually require coordination from a master node.

As mentioned earlier, MCNA must provide fast response times for bursty traffic from up to 1000 nodes. The time required for polling or passing a token to idle nodes prohibits the use of a polling or token-passing scheme. The coordination required for any sort of hybrid scheme is complex, since a network can contain multiple overlapping coverage areas. No single "master" node can be heard throughout the radio network. Polling, token-passing, or hybrid schemes are even more difficult to implement if the network contains sleeping nodes. MCNA uses a multiple access technique on both wired and radio communications channels. The technique is called Listen-Before-Talk Channel Reservation with Busy Pulse (LBTCR/BP), and is described in detail below.

Packet radio networks present unique channel access design issues, which are not present in wired networks. The existence of multiple overlapping radio coverage areas can be both an advantage and disadvantage. The total data rate on the radio network can actually exceed the bandwidth of the radio channel due to a phenomenon called spatial reuse. Two pairs of MRCs can communicate concurrently, if the radio coverage area of the first pair is disjoint from the coverage area of the second pair. Concurrent communications sessions are possible even when coverage areas are not disjoint due to the capture effect. The capture effect allows a radio receiver to correctly interpret the signal from a strong transmitter in the presence of signals from weaker transmitters.

A CSMA or LBT scheme is more complicated in a multi-hop radio network due to the presence of hidden nodes. A node is said to be "hidden" from a transmitter if it is not in the coverage area of the transmitter, but is within the coverage area of the intended receiver. Figure 3 shows one example of hidden nodes. The circles represent the radio coverage areas of each of the nodes - A, B, C, and D. Consider the following scenario. Assume A is transmitting to B. C now wants to begin a conversation with D. Since C can not hear A, C assumes the channel is idle and begins transmitting to D. Since B is in the coverage area of both A and C, it will lose the transmission from A.

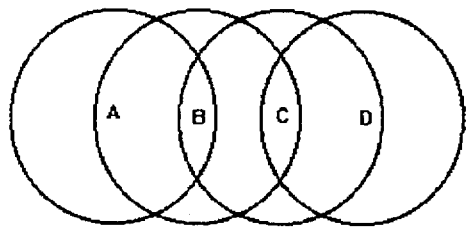
Figure 3. Coverage Areas with Hidden Nodes
The design of a packet radio network is also complicated by the existence of transient and unidirectional radio links. Links can be transient because the range and quality of a radio link can vary over time. A link can be unidirectional because transmitter strength and receiver sensitivity can vary from node to node.

CHAPTER III

DATA LINK LAYER

The MCNA Data Link layer controls access to the channel and is responsible for providing reliable transmission between any two devices in the network (i.e. MRC-to-base-station), on both wired and radio links. MCNA's data link layer has a Medium Access Control (MAC) component and a Data Link Control (DLC) component. The MAC and DLC components of the MCNA data link layer are not strictly layered and can not be presented independently. This paper focuses on the data link layer used on radio links, however the radio DLC component is also appropriate for wired links with significant error rates (i.e. due to access collisions). The radio MAC can be used on wired LAN links if an underlying MAC service is not provided by the LAN standard (i.e. IEEE 802.3).

Functional requirements

The data link layer: 1) accepts frames from the network layer and passes frames to the physical layer for transmission; 2) appends data link layer framing bytes and CCITT-16 frame check sequence (FCS) bytes to transmitted multicast and unicast frames; 3) removes data link layer framing bytes and FCS bytes from received frames; 4) verifies the FCS bytes in received frames; 5) filters out frames which do not belong to the MCNA network of the local device; 6) filters out packets which are not directed to the local device; 7) forwards packets to the network layer which are addressed to the local device, or are broadcast or multicast to the local device; 8) regulates access to the communications channel on wired LAN links and spread spectrum radio links; 9) recovers lost unicast frames; 10) maintains and provides diagnostic statistics; and 11) transparently fragments and reassembles network layer packets, which exceed the maximum data link frame size. A group of frames which is associated with a single network layer packet is called a bracket.

Data Link Control

Data Link Control services

The DLC component provides "acknowledged connectionless" services to the MCNA network layer. A data link connection is not required to transmit a network layer packet; however, each packet is acknowledged at the data link layer and errors are reported to the network layer. The network layer uses a DL_UNITDATA.request primitive to transmit a unicast packet to a child or parent node or to transmit a multicast packet to a group of nodes. The
network layer receives a DL_UNITDATA.indication when a
packet is received. The network layer can enable and
disable the data link layer with DL_START and DL_STOP,
respectively.

Data Link Control frame definitions

All DLC frames contain a destination address, a source
address, a data link control byte, and a channel reservation
field in the DLC header. Bits in the DLC control byte are
used to specify the frame type. DLC frames are one of two
types: 1) request, or 2) response, depending on the state of
the REQ/RSP control bit.

Table 1 briefly describes each of the request and
response frame types. Table 2 briefly describes several
control byte fields.

The source address, in the DLC header, is the network
address of the local node. The destination address is
passed to the DLC by the network layer. The destination (or
source) can be a broadcast, multicast, or unicast address.
If the destination (or source) is a multicast address, then
the DLC transmits the network layer packet as a single
multicast EOD frame.

Table 1. DLC Frame Types a. Request Frame Types

| | |
|---|---|
| DATA | request frame used to send data in a bracket of frames containing network layer data |
| EOD | end-of-data request frame used to send the last data frame in a bracket of frames containing network layer data. Note that a bracket of frames may contain a single multicast EOD frame. |
| RFP | request-for-poll request frame used to request polling from the destination node. An RFP is used to initiate the transmission of a unicast bracket of frames. |
| ENQ | inquiry frame used to determine the frame sequence state of the destination and used to abort an active transmission. | b. Response Frame Types

| | |
|---|---|
| POLL | response frame used to solicit the next DATA or EOD frame, in a bracket, from the destination. |
| WAIT | response frame which is used to notify the destination that the local node is busy. |
| CLEAR | response frame used to signal the end of the transmission of a unicast bracket of frames. |
| REJECT | response frame used to indicate that a request frame is invalid or that the frame sequence state is undefined. |

Table 2. DLC Control Fields

| | |
|---|---|
| REQ/RSP | The REQ/RSP bit is set OFF in request frames and is set ON in response frames. |
| SEQ | The SEQ bit is used to sequence DLC frames in a unicast bracket, modulo 2. The SEQ bit is used to detect duplicate frames. |
| MORE | In data request frames, the MORE bit is used to distinguish between DATA frames and EOD frames. The last frame sent in a bracket of data frames is always an EOD frame. |
| PRIORITY | The priority bit is set ON in request frames for high priority data transmissions. MCNA provides normal and high priority data pipelines. |
| LAN ID | The LAN ID bits contain a network identifier. Frames which do not belong to the local network are discarded. |

Bracket transmission

In the discussion which follows, "source" is used to denote a node sending request frames and "sink" is used to denote a node sending response frames. On radio links (and, optionally, on wired links), the DLC fragments a network layer unicast packet into short fixed length frames before the packet is sent. The fragments are reassembled by the sink and are posted to the sink's network layer if, and only if, all frames in the packet are received. As noted above, a group of frames which is associated with a single network layer packet is called a bracket. Fragmentation at the data link layer allows the DLC entity to use a frame size which is suitable for the link error rate without impacting packet sizes at the network layer.

Figure 4 illustrates an example data link unicast conversation between two nodes - A and B. A conversation is initiated when the network layer in node A posts a DL_UNITDATA.request to the DLC layer in A. After the channel is accessed by the data link MAC component, DLC A sends an RFP frame to DLC B. DLC B responds with a POLL frame to solicit DATA frames from DLC A. The last data fragment in the bracket is sent, by DLC A, in an EOD frame. DLC B responds with a CLEAR frame which ends the conversation.

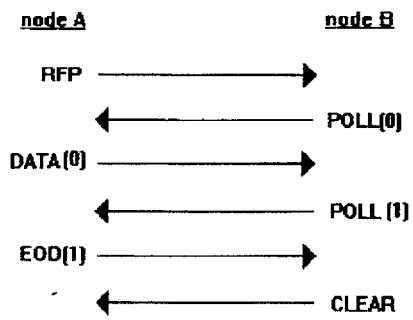

Figure 4. Example DLC Bracket Transmission

Figure 5 shows a timing graph for the example bracket transmission in figure 4.

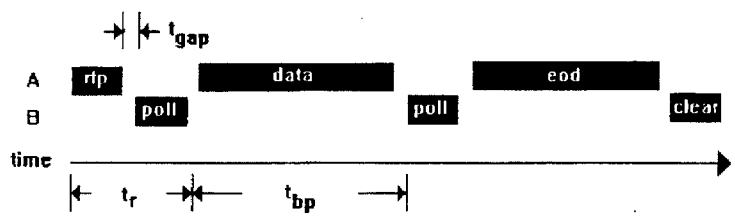

Figure 5. DLC Bracket Transmission Timing Graph

The example transmission illustrated in figures 4 and 5 assumes that no errors occurred. A data link error can occur if a frame is lost or corrupted. A frame check sequence field is appended to the end of all data link frames. The FCS field is used to perform a complimentary transmitter/receiver cyclic redundancy check on each frame to determine if the frame was corrupted. Corrupted frames are ignored by the data link layer and are viewed as lost. The DLC component of the data link layer is responsible for retransmitting lost unicast fragments. The sink is primarily responsible for error recovery during a unicast conversation. If a DATA or EOD frame fragment is lost, the sink times out and resends a POLL frame to solicit retransmission of the fragment. A 1-bit sequence number is used to determine whether a POLL is for the previous (i.e. lost) fragment or the next fragment. The sequence number is reset to 0 at the start of a conversation. The source is responsible for recovery from lost RFP frames. (It should be noted that an ambiguous situation can occur when a source sends an RFP frame and misses the first POLL frame from the sink. The source can not distinguish the missed POLL from a lost RFP and, as a result, both the source and sink actively attempt to recover.) If a CLEAR frame is missed in a unicast sequence, the source can send an ENQ frame to determine the status of the conversation. If the CLEAR was lost, the sink responds to an ENQ by resending the CLEAR. A REJECT is sent to indicate that the sink exceeded a MAX_POLL_RETRY count and did not receive the EOD fragment. If a sink does not respond, a radio source can assume that the sink is no longer in range. A sink must cache the appropriate receive state information to determine whether a CLEAR or REJECT should be returned in response to an ENQ.

A source can reset an active conversation, at any time before the EOD frame is sent, by resending the RFP frame. A source can abort an active conversation by sending an ENQ frame.

Frame/packet filtering

When the DLC entity is in an ENABLED/ON state it is continuously listening on its assigned port. The DLC entity receives all data link layer frames. Frames which do not pass an FCS check are invalid and are discarded. Valid data frames are reassembled into a complete packet which is posted to the network layer if: 1) The LAN ID in the DLC header matches the LAN ID of the local node, and 2) The destination address in the DLC header a) is equal to the network address of the local node, or b) is an acceptable multicast or broadcast address.

The high-order multicast bit is set ON in all multicast or broadcast frames. A multicast or broadcast frame is accepted if the node type specifies a group to which the local node belongs and either a) the node identifier is all 1's, or b) the node identifier is equal to the identifier of the local node. A response is never required when the multicast bit is set ON.

Transmit and Receive State Machines

State logic is not required to transmit multicast and broadcast frames. Multicast and broadcast frames can be transmitted in a single segment whenever the channel is available. Received multicast or broadcast frames are simply posted to the network layer if the destination node belongs to the specified multicast or broadcast group.

Unicast bracket transmission is best described in the context of a transmit and receive state machine. A source node uses a transmit state machine to send a bracket of unicast frames to a sink node. A sink node use a receive state machine to receive a bracket of unicast frames. A node can not be in the transmit state machine and receive state machine at the same time. An active node is in one of three high level states: 1) LISTEN, 2) TRANSMIT, or 3) RECEIVE. A node in the LISTEN state is not in either the transmit or receive state machine. A node in the TRANSMIT state is in the transmit state machine. A node in the RECEIVE state is in the receive state machine. Only one bracket transmission can be in progress per node at any time.

Bracket Transmit State Machine

The transmit state machine specifies source actions which are dependent on the current state and the input to the state machine. Transmit state input is limited to: 1) unicast response frames addressed to the local node, and 2) transmit state timers.

Transmit state descriptions

States in the DLC transmit state machine are described below:

IDLE - The state machine is idle and is waiting for a bracket of frames to transmit.

READY - The state machine has a bracket of frames to transmit and is waiting to acquire the channel.

S_RFP - The state machine has sent an RFP frame and is waiting for a POLL frame.

S_DATA - The state machine has sent a DATA frame and is waiting for a POLL frame.

S_EOD - The state machine has sent an EOD frame and is waiting for a CLEAR frame.

RDY_ENQ - The state machine has lost a CLEAR frame and is waiting to acquire the channel before sending an ENQ frame.

Transmit state timers

The transmit state machine requires three timers: A RSP_TIMEOUT receive timer is started when an RFP or ENQ frame is transmitted. The time-out value is larger than the interframe gap time plus the time required to transmit a POLL or CLEAR frame. If the RSP_TIMEOUT timer expires before an expected response is received, a retry counter is incremented and the RFP or ENQ request frame is retransmitted, if the retry count has not been exceeded.

A POLL_TIMEOUT timer is started whenever a DATA or EOD frame is transmitted following the reception of a POLL frame. The time-out value is larger than the time required for the maximum number of poll retry attempts. The DLC layer returns an error to the network layer if the timer expires before an expected POLL frame is received. Note that the sink is responsible for recovery when the POLL_TIMEOUT timer is running.

A TX_WAIT timer is started whenever a node is in the transmit state machine and is waiting to access the channel.

The transmit state machine maintains an internal sequence state variable which is equal to the 1-bit sequence value of the next frame to transmit. The sequence variable is reset to 0 at the beginning of a conversation and follows the state of the SEQ bit in received POLL frames. The SEQ bit in POLL frames is the sequence number of the next frame expected. Successive POLL frames with the same sequence number cause a DATA or EOD frame to be retransmitted. A DATA or EOD frame is "accepted" when a POLL or CLEAR frame is received with the next sequence number.

The state machine must maintain a "current pointer" variable which points to the current frame, in a bracket of frames, to be transmitted. The current pointer is advanced if, and only if, a POLL for the next frame in the bracket is received. The transition taken when a POLL frame is received depends on whether the current pointer is pointing to a DATA or EOD frame.

Table 3. DLC Transmit State Transition Table

| state | event | action | next state |
|---|---|---|---|
| IDLE | A bracket of frames is passed to the state machine | Reset retry count; execute channel access algorithm | READY |
| READY | Channel acquired | Increment retry count; send RFP frame; start RSP_TIMEOUT timer | S_RFP |
| S_RFP | RSP_TIMEOUT timer expires and max. retry count exceeded | Return error | IDLE |
| | RSP_TIMEOUT timer expires | Execute channel access algorithm | READY |
| | POLL received | Send current DATA frame; start POLL_TIMEOUT timer | S_DATA |
| | POLL received | Send current EOD frame; start POLL_TIMEOUT receive timer | S_EOD |
| | WAIT received | Start TX_WAIT timer | IDLE |
| | REJECT received | Return error (invalid transition) | IDLE |
| S_DATA | POLL_TIMEOUT timer expires | Return error | IDLE |
| | POLL received | Advance current pointer if frame was accepted; send current DATA frame; start POLL_TIMEOUT timer | S_DATA |
| | POLL received | Advance current pointer if frame was accepted; reset retry count; send current EOD frame; start POLL_TIMEOUT timer | S_EOD |
| | REJECT received | Return error (invalid transition) | IDLE |

Table 3--continued

| S_EOD | POLL_TIMEOUT timer expires | Reset retry count; execute channel access algorithm | RDY_ENQ |
|---|---|---|---|
| | POLL received | Retransmit EOD frame; start POLL_TIMEOUT timer | S_EOD |
| | CLEAR received; EOD frame not accepted | Return error (invalid transition) | IDLE |
| | REJECT received | Return error (invalid transition) | IDLE |
| | CLEAR received; EOD frame accepted | Return good | IDLE |
| RDY_ENQ | Channel acquired | Increment retry count; send ENQ; start RSP_TIMEOUT timer | S_ENQ |
| S_ENQ | RSP_TIMEOUT timer expires and max. retry count exceeded | Return error | IDLE |
| | RSP_TIMEOUT timer expires | Execute channel access algorithm | RDY_ENQ |
| | CLEAR received; EOD frame not accepted | Return error (invalid transition) | IDLE |
| | REJECT received | Return error (invalid transition) | IDLE |
| | CLEAR received; EOD frame accepted | Return good | IDLE |

Table 3 specifies state transitions for unicast bracket transmissions.

Bracket Receive State Machine

The receive state machine specifies sink actions which are dependent on the current state and the input to the state machine.

Table 4. DLC Receive State Transition Table

| state | event | action | next state |
|---|---|---|---|
| IDLE_LISTEN | RFP received | Send POLL; reset retry count; start RSP_TIMEOUT timer | BUSY |
| | ENQ received; entry for source node is in the SEQ state table | Send CLEAR | IDLE_LISTEN |
| | ENQ received; no entry for source node in the SEQ state table | Send REJECT | IDLE_LISTEN |
| | DATA or EOD received | Send REJECT | IDLE_LISTEN |
| BUSY | RSP_TIMEOUT timer expires; max. retries exceeded | Flush; delete SEQ state table entry | IDLE_LISTEN |
| | RSP_TIMEOUT timer expires | Increment retry count; execute channel access algorithm; acquire channel; resend POLL; start RSP_TIMEOUT timer | BUSY |
| | DATA received from active node | Reset retry count; send next POLL; start RSP_TIMEOUT timer | BUSY |
| | DATA or EOD received from inactive node | Send REJECT | BUSY |
| | EOD received from active node | Send CLEAR; reassemble and post complete packet; flush | IDLE_LISTEN |
| | ENQ received from inactive node; entry for source node in SEQ state table | Send CLEAR; flush | BUSY |
| | ENQ received from inactive node; no entry for source node in SEQ state table | Send REJECT; flush | BUSY |

Table 4--continued

| | ENQ received from active node | Send REJECT; flush; delete SEQ state table entry | IDLE_LISTEN |
|---|---|---|---|
| | RFP received from inactive node | Send WAIT | BUSY |
| | RFP received from active node | Send POLL; reset retry count; start RSP_TIMEOUT timer | BUSY |

Receive state input is limited to: 1) unicast request frames addressed to the local node, and 2) receive state timers.

Receive state descriptions

States in the receive state machine are described below:

IDLE_LISTEN - The receiver is not receiving a bracket of frames.

BUSY - The receiver has sent a POLL frame and is waiting for the next frame in a bracket.

Receive state timers

A RSP_TIMEOUT timer is started when a POLL frame is transmitted. The time-out value is larger than the interframe gap time plus the time required to transmit a DATA or EOD frame. If the RSP_TIMEOUT timer expires before an expected response is received, a retry counter is incremented and a POLL frame with the same SEQ value is retransmitted, if the retry count has not been exceeded.

Each node maintains a receive SEQ state table which has an entry for all nodes which have recently transmitted valid data frames. A receive SEQ state value is reset to 0 when an RFP frame is received, and is incremented when a DATA or EOD frame is accepted. The SEQ state variable is cached in the table so that a source node, which missed a CLEAR response, can inquire as to the status of its last transmission. A CLEAR is (re)sent if a node receives an ENQ and has an entry in its SEQ state table for the source node. A REJECT is sent if an ENQ is received and an entry is not in the table.

The receive state machine uses a routine called "flush" to free any buffers, allocated to a bracket of frames, if an error occurs before the complete bracket is received.

Receive state transitions are specified in table 4.

Medium Access Control

As Tobagi points out in [1], the hidden node problem can severely limit bandwidth utilization in a simple CSMA radio network. Tobagi discusses a channel access technique referred to as listen-before-talk with busy tone (LBT/BT). LBT/BT requires a second transceiver in each radio-equipped device and a second control channel (i.e. on another frequency) used to broadcast a "busy tone" whenever a node

34 is actively receiving a radio transmission. For example, in figure 3, if A is transmitting data to B, then B must broadcast a busy tone on the control channel for the duration of the transmission. C is able to sense the busy tone, and refrains from broadcasting to D until the both the data and control channels are idle. The busy tone solution is expensive for obvious reasons. MCNA uses an analogous, but less expensive technique referred to as busy pulse. As noted earlier, the DLC component fragments and reassembles network layer packets. A fragment can occupy a channel for a known fixed time period. In figure 5, assume node A is engaged in a bracket transmission with node B. If a third node, C, listens to a radio channel for a worst-case time, $t_{bp}$, it is guaranteed that it will detect the active conversation if either node A or B (but not necessarily both) is within range of C. The busy pulse technique prevents interrupted conversations by requiring sleeping nodes to listen to the channel for a busy pulse period after awakening, before initiating a transmission. The busy pulse period is equal to the time required to transmit a DATA frame plus two interframe gap times. In figure 5, $t_{gap}$ defines the interframe gap time and $t_{bp}$ defines the busy pulse time.

MCNA uses a channel reservation technique to generally restrict channel access contention to RFP frames. Each DLC request frame contains a channel reservation field which indicates the amount of time required to send any outstanding frames in a bracket, without error. The reservation is echoed by the sink in POLL response frames. (Note that the reservation field is always zero in EOD and CLEAR frames.) An LBT algorithm is generally executed only once per conversation. After an RFP frame is sent, the source owns the channel for the entire conversation and subsequent request and response frames can be sent without additional channel access logic. As a result, interframe gap times and, hence, busy pulse times can be well-defined.

Channel reservation can be implemented with a continuous millisecond clock, a RESERVE_TIME variable, and a RESERVE_NODE variable. If RESERVE_TIME is greater than the current millisecond time, the channel is considered reserved and can not be used. The RESERVE_TIME variable is updated when a unicast request or response frame is received as follows: 1) If the destination address in the DLC header is not the local node address and the calculated reserve time of the frame is greater than RESERVE_TIME, then RESERVE_TIME is set to the calculated reserve time and RESERVE_NODE is set to the source address, 2) If the calculated time is less than RESERVE_TIME and the source address is equal to RESERVE_NODE then RESERVE_TIME is set to the calculated time, 3) If the local node address is equal to the destination address and the source address equals RESERVE_NODE then RESERVE_TIME is set to the current millisecond time (i.e. the reservation is canceled).

Before a unicast conversation or a multicast transmission is initiated, an LBT algorithm is executed to determine if the channel is available. The transmission can begin immediately, if the channel is not active and is not reserved. If the channel is not free, a random backoff algorithm specifies backoff delays as a function of the LBT slot time and the number of retries. An LBT slot is defined as a function of the best case and worst case busy-sense time. The best case busy-sense time is equal to the amount of time from the point at which a node detected the channel idle, before transmitting, until another node can detect the transmission in progress. The worst cast busy-sense time is best defined by an example. In figure 3, suppose nodes A and C attempt to initiate a conversion with B at approximately the same time. If node A determines that the channel is idle and begins transmitting an RFP frame at time 0, then the worst case busy-sense time is equal to the time $t_b$, in figure 5, at which node B begins sending a response POLL frame. Node C can not determine that the channel is busy between time 0 and time $t_b$.

If a channel is detected busy, the access delay time is simply the calculated random backoff time. If a channel is reserved, a random delay is calculated by adding the reserved time to the calculated random backoff time. Note that the data link layer must continue to monitor link activity during a backoff period.

The backoff algorithm is repeated, whenever a collision is suspected, to randomly distribute retries over an increasing number of LBT slots. The channel access algorithm must assume that a collision may have occurred whenever an expected reply is missed, since collision detection (CD) is not available. A sink must back off whenever a POLL frame is lost, before it retransmits the POLL frame. A source must back off before retrying whenever an RFP or ENQ frame is lost.

The network layer can indicate to the data link layer that a packet is being sent as a response to a multicast or broadcast message. If a network layer packet is being sent in response to a multicast message, then the data link layer waits for a random delay period before transmitting the response.

The total retry time, including backoff time, at the data link layer must be relatively short so that lost branches in the network layer spanning tree can be quickly detected and new branches quickly re-established.

38

CHAPTER IV

NETWORK LAYER

Functional requirements

The network layer provides the following functions: 1) The network layer organizes nodes in the network into an spanning tree rooted at a root router node, hereafter simply referred to as the root. The spanning tree is used to prevent loops in the topology. 2) The network layer routes packets along branches of the spanning tree. 3) The network layer provides a service for storing packets for sleeping terminals. Packets which can not be delivered immediately can be saved by the network entity in a parent node for one or more HELLO times. 4) The network layer propagates lost terminal node information throughout the spanning tree. 5) The network layer maintains the spanning tree links. 6) The network layer allocates and distributes network addresses. 7) The network layer maintains and provides diagnostic statistics.

Network layer services

The transport layer uses an NL_UNITDATA.request primitive to send a transport layer message. The alias or network address of the destination node must be passed along
with the message. If an alias is passed, the network layer
will automatically resolve it into a network address. The
alias and associated address are cached in the local network
entity. The network header contains several protocol bits
which are used to identify data which belongs to a transport
layer protocol. When data arrives for a transport protocol,
the specified transport protocol entity is notified with an
NL_UNITDATA.indication.

Network layer packet definitions

The network header in network layer packets contains a
destination address, a source address, and a control word.

Table 5 describes fields in the network header control
word. Table 6 describes each of the network layer packet
types.

Spanning tree organization

The network layer organizes nodes into a spanning tree
with a single router node at the root of the tree. (Note
that the LAN ID in the data link header allows more than one
logical tree to exist in the same coverage area.) Interior
branches of the spanning tree are relatively stable (i.e.
controllers and base stations do not move often).
Terminals, which are leaves on the spanning tree, may become
unattached and must be reattached frequently. All messages are routed along branches of the spanning tree. Restricting each node in the tree to a single parent guarantees that there will be no loops in the logical topology.

Table 5. Network Header Control Word

| | |
|---|---|
| PACKET TYPE | This field is used to specify the network layer packet type. |
| NETWORK PARMS | If this bit field is set ON then optional network layer parameters immediately follow the network header. |
| RSPRQ | This field can be used to request an end-to-end network layer response packet. Normally this field should be set ON for ATTACH, RARP and ARP request packets, and should be set OFF for all other network layer packets. |
| PROTOCOL | This field is used to indicate the presence and type of higher layer data. |
| REQ/RSP | This bit is set OFF in network request packets and is set ON in network response packets. |
| ATTI | A router node will set this bit ON in an ATTACH.request packet whenever the source node is not in its routing table. The bit value in an ATTACH.response packet follows the state of the bit in the associated ATTACH.request. If a terminal receives an ATTACH.response packet with the ATTI bit set ON, it is a positive indication that the terminal was detached and has reattached to the network. |

Table 6. Network Layer Packet Types

| | |
|---|---|
| DATA | DATA.request packets are general purpose network layer packets used to send higher layer data and/or network layer parameters. |
| HELLO | HELLO.response packets are used to build the spanning tree and are used to advertise pending message information and lost node information. Scheduled HELLO.response packets are broadcast periodically at calculated time intervals by each router node in the spanning tree. In addition, router nodes will broadcast an unscheduled HELLO.response packet whenever a HELLO.request packet is received. |
| ATTACH | A node transmits an ATTACH.request packet to attach to the network and to maintain its path in the network. If the RSPRQ bit is set ON the root node will return an ATTACH.response packet. Higher layer data can be piggybacked on ATTACH.request packets. |
| DETACH | DETACH.request packets are used to notify the network that a node has detached. |
| ARP | An address resolution packet (ARP) is used to acquire the 16-bit network address of a destination node, when only the alias (or 48-bit identifier) of the node is known. An ARP packet is generated automatically by the network layer whenever address resolution is required. |
| RARP | A reverse address resolution packet (RARP) is used to set or change the alias and/or 48-bit long identifier of a device and to acquire a 16-bit network address. |

Figure 7:
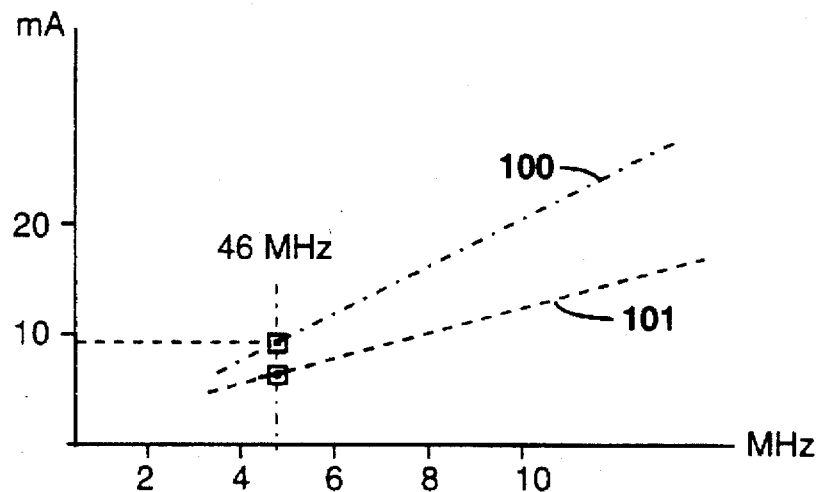
FIG. 7 is a schematic diagram showing typical, frequency related current characteristics of a control microprocessor device of the circuit shown in FIG. 6.

Figures 6 and 7 illustrate how physical devices are organized into logical nodes in a spanning tree. Figure 6 depicts devices and the physical communication links. Figure 7 depicts the same devices organized as nodes on

42 branches of a spanning tree. The root node in figure 7 is labeled with an R.

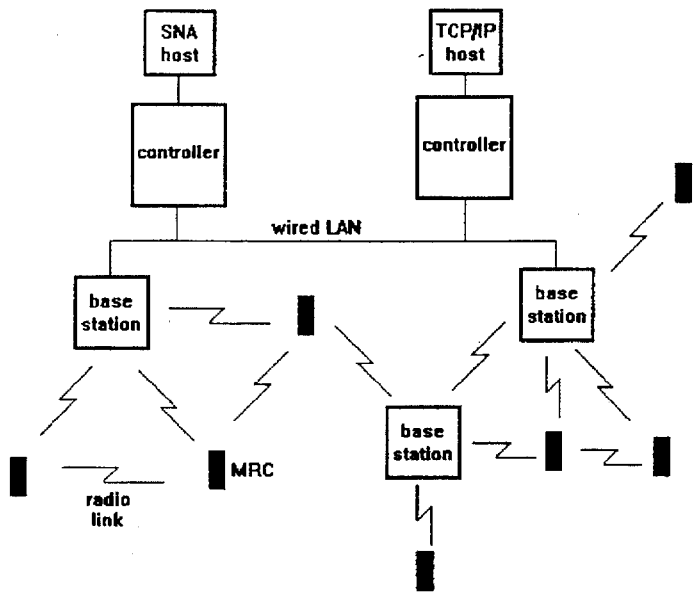

Figure 6. A Block Diagram of Physical Devices and Links

Nodes in the network are generally categorized as attached or unattached (i.e. to the spanning tree). Initially, only the root is attached. A single controller can be designated to contain the root node, or multiple root candidates can negotiate to determine which node assumes the root status. The root and other attached router nodes
broadcast HELLO.response packets at calculated intervals.
The HELLO packets enable unattached nodes to learn the
optimum path to the root node before attaching to the
network.
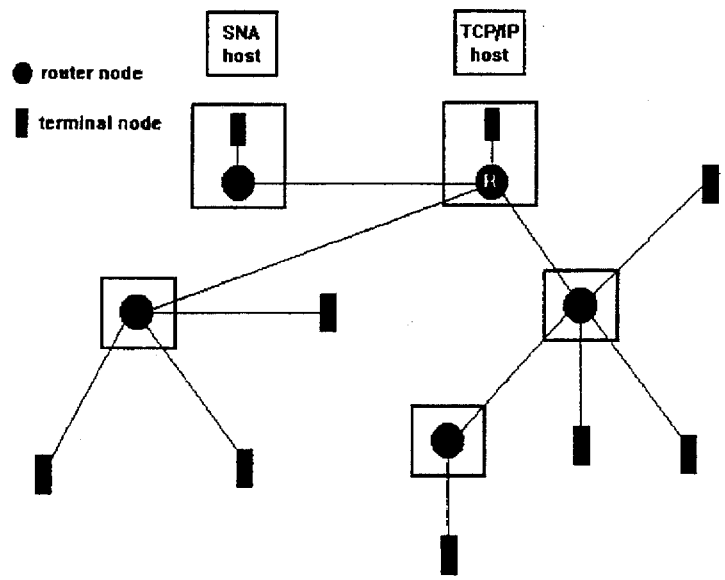
Figure 7. A Spanning Tree
The HELLO.response packets include: 1) the source
address; 2) a broadcast destination address; 3) the "cost"

44 to the root; 4) a "seed" value used to calculate the time of the next HELLO.response packet; 5) a hello displacement time; 6) the priority of the root node (or root candidate); 7) the unique device identifier of the root node (or root candidate); and 8) a root node sequence number, used to distinguish between multiple occurrences of the spanning tree with the same root node.

The HELLO "cost" field indicates the total "distance" to the root, and is equal to the sum of the costs of each hop on the path to the root. (Note that the root node broadcasts HELLO packets with the cost field set to zero.) The incremental cost of the hop between a node and its parent is primarily a function of the physical link type (i.e. ethernet, RS485, or radio). The cost component is intended to bias path selection toward high-speed (i.e. wired) connections. On radio links, spanning tree attachment is biased toward the link with the best signal strength. Signal strength is not a factor in the cumulative path cost.

The HELLO "displacement" field specifies the displacement of the actual hello time from the calculated hello time or to indicate that the hello time was unscheduled. A well-known randomization algorithm is used to calculate the next hello time. The HELLO "seed" field is used as a seed for the calculation.

The "root identifier" and "root sequence" fields are used to define a single instance of the network. Attached nodes must forget their network address and return to the unattached state whenever a HELLO.response packet is received with a new root node identifier or root sequence number.

HELLO.response packets can contain optional parameters such as: 1) a descendent count; 2) a pending message list, and 3) a detached-node list.

A pending message list consists of 0 or more network addresses of sleeping terminals and is used to indicate that a message is pending in the network for each terminal in the list. Pending messages are stored in the parent node of the terminal.

Detached-node lists contain the addresses of terminal nodes which have lost packets or detached from the spanning tree. A router node learns which entries should be in its list from DETACH packets which are distributed throughout the network when a terminal is lost. Detached nodes are included in detached-node lists in HELLO.response packets for DETACH_MSG_LIFE hello times.

Attaching to the spanning tree

Nodes without a parent in the spanning tree are in an UNATTACHED state. In the unattached state, a node learns which attached router node is closest to the root node by

46 listening to HELLO.response packets. (If no HELLO.response packets are received, the node can wait (i.e. sleep) and retry later.) After the learning period expires an unattached node sends an ATTACH.request packet, with the RSPRQ bit set ON, to the attached router node with the lowest cost to the root. (Nodes without a network address must first send a RARP.request packet to the root to obtain a network address.) The attached router node forwards the ATTACH.request packet onto the root node. <u>The end-to-end ATTACH.request functions as a discovery packet and enables router nodes along the path to the root node to quickly learn the path to the source node</u>. The root node returns the request as an end-to-end ATTACH.response packet. When the unattached node receives the ATTACH.response packet it goes to an ATTACHED state and sets internal root port and parent variables. (Note that the ATTACH.request must be repeated if an ATTACH.response is not received.) The root port is the physical port on which the response packet arrived and the parent (address) is equal to the data link source address. If the newly attached node is a router node, it calculates its cost to the root, by adding its root port link cost to the HELLO cost of its new parent, and begins to broadcast HELLO.response packets.

Unattached terminal nodes can optionally broadcast a global HELLO.request packet with a multicast router destination address to solicit unscheduled HELLO.response packets from attached router nodes. The net effect is that the UNATTACHED state can (optionally) be shortened. (Note that only attached routers or the root may respond to request packets.) The HELLO.request facility is intended for unattached terminals with transactions in progress.

An attached node can change (i.e. shorten) its path in the spanning tree at any time simply by selecting a new parent and repeating the attach process.

Each attached node must transmit an ATTACH.request or DATA.request packet at least once per ATTACH_TIMEOUT time period to maintain its path in the network. Higher layer data can be piggybacked onto ATTACH.request packets by setting the network layer destination address to the 16-bit address of the node for which the data is intended. If data is piggybacked onto an ATTACH.request packet, the network layer will split the ATTACH packet into separate ATTACH and DATA request packets as soon as the next hop to the destination address is not on the path to the root node (i.e. the first upstream hop). The destination address of the generated ATTACH.request packet is the well-known address of the root node.

Active nodes do not need to explicitly generate ATTACH.request packets. An ATTACH.request is automatically generated (or a DATA.request is converted to an ATTACH.request), by a router node, whenever a request packet arrives from an upstream node and an entry for the source node does not exist in the router node's routing table. An attach indication (ATTI) bit is set ON in the ATTACH.response packet to notify the source node it has just attached to the network.

Network layer routing

All packets are routed along branches of the spanning tree. Routers "learn" the path to nodes by monitoring traffic from upstream nodes (i.e. traffic directed toward the root). Whenever a router receives a packet from an upstream node, the router creates or updates an entry in its routing table for the source node. The entry includes the node address, and the address of the router which sent the packet (i.e. the hop source address). When a router receives a packet from a downstream node the packet is forwarded to the upstream hop which is specified in the routing entry for the destination. The packet is discarded if a routing entry does not exist.

Packets from upstream nodes are simply forwarded to the next downstream node (i.e. the parent) in the branch of the spanning tree. <u>No explicit routing is required for downstream traffic because the route is defined by the structure of the spanning tree</u>. A packet travels downstream until a node is reached which has an entry in its routing table for the destination address. The packet is then explicitly routed upstream until it reaches its destination. Thus, terminal-to-terminal communications is accomplished by routing all traffic through the nearest common ancestor of both terminals. In the worst case, the root is the nearest common ancestor.

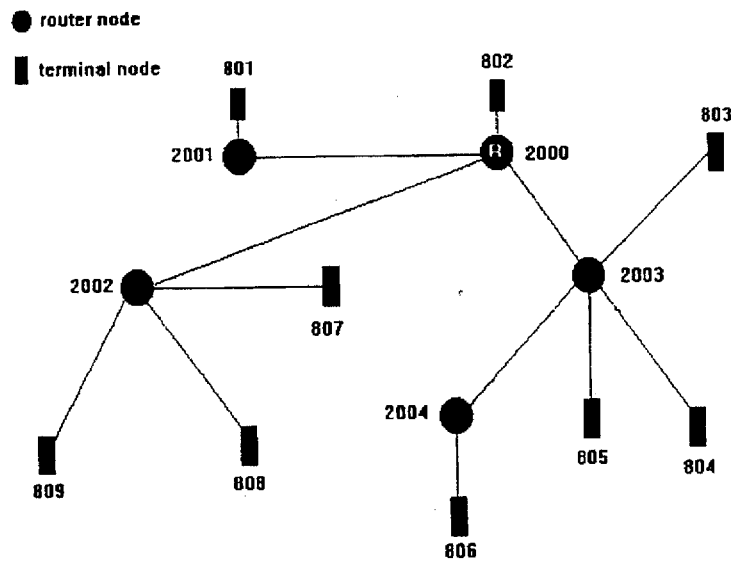

Figure 8:
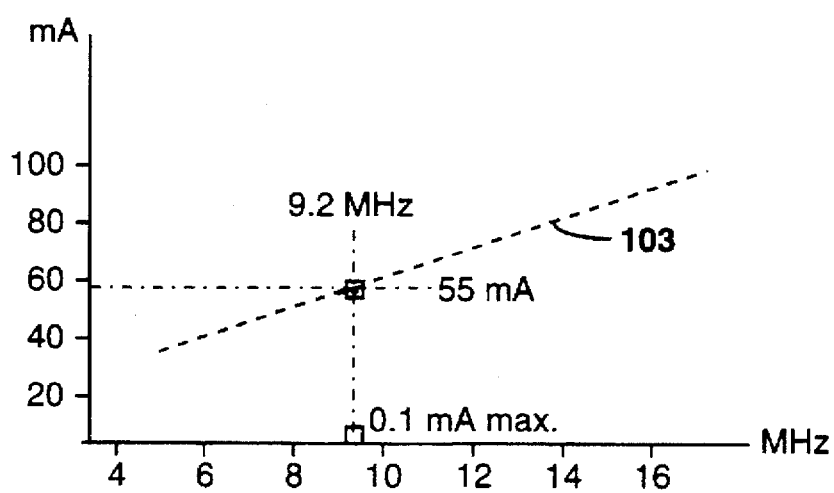
FIG. 8 is a schematic diagram showing frequency related current characteristics of an application microprocessor device of the circuit shown in FIG. 6.

Figure 8. A Spanning Tree with Network Addresses

Figure 8 reproduces the spanning tree from figure 7 along with the hexadecimal address of each node. As an example, assume terminal 804 sends a packet destined for terminal 806. The packet will follow one downstream hop from 804 to 2003. The routing function at 2003 has an entry for 806 in its routing table which specifies 2004 as the first upstream hop to 806. The packet is routed upstream to 2004. An entry in the routing table at 2004 specifies 806 as the first upstream hop to 806, and the packet is routed from 2004 to 806.

The routing table in each router node defines the subtree rooted at the router node. The routing table for router node 2003 in figure 8 is shown in figure 9 below.

| destination | port | first hop | age | child flag |
|---|---|---|---|---|
| 2004 | 2 | 2004 | 1 | true |
| 803 | 2 | 803 | 1 | true |
| 804 | 2 | 804 | 2 | true |
| 805 | 2 | 805 | 0 | true |
| 806 | 2 | 2004 | 1 | false |

Figure 9. An Example Network Routing Table

Routing table entries are created or updated whenever a downstream unicast DATA, ATTACH, or ARP packet is received. If an entry does not exist for the source address in the network header, an entry is created with the destination field set to the network layer source address. The other fields in the (old or new) entry for the destination are modified as follows: 1) the first hop field set to the source address in the data link header, 2) the port field is set to identify the data link entity which delivered the packet, 3) the age field is set to 0, and 4) if the destination and first hop fields are identical, the child flag field is set to true.

The age field for each entry is incremented at regular intervals. An entry's age field is reset to 0 whenever a packet is received from the destination associated with the entry. If no packets are received from the destination of an entry for ROUTE_TIMEOUT minutes, the entry is deleted from the route table. Nodes can maintain their path in the network by sending an ATTACH.request packet to the root node once every ATTACH_TIMEOUT minutes, where ATTACH_TIMEOUT must be shorter than ROUTE_TIMEOUT.

If a router receives a DETACH.request packet from an upstream router node, then each entry in its route table, with a destination field which matches an entry in the packet's detached list, is deleted.

All nodes, except the root node, keep a parent and root port variable. A packet traveling downstream is forwarded by setting the data link destination address to the parent address and then passing the packet to the data link entity associated with the root port.

Dynamic changes in the spanning tree

Paths in the spanning tree can change for a number of reasons:

1) Any node may select a new path to the root whenever a better path is found. For example, a better path might be one where the cost of a node's parent from the root is CHANGE_THRESHOLD greater than the cost in a HELLO.response packet from another node. Rapidly moving terminals can cache a short list of alternate parents. Periodically, sleeping terminals, must stay awake for 1 or more HELLO times to discover changes (i.e. shorter paths) in the network topology.

2) A parent node detaches the subtree rooted at a child node, whenever a message cannot be delivered to the child. This occurs when the data link layer in a parent node fails to deliver a unicast network layer packet to a child node.

3) A child node goes into the UNATTACHED state whenever its data link layer fails to deliver a message to its parent. If the child node is a router, it must continue to broadcast scheduled HELLO.response packets with an infinite distance for MAX_HELLO_LOST+1 times. If the child node is a terminal, it may solicit unscheduled HELLO.response packets to shorten the UNATTACHED state. After the UNATTACHED learning state has expired the node reattaches by transmitting an ATTACH.request to the router node closest to the root.

4) If a node in an ATTACHED state receives a DETACH packet or a HELLO.response packet with its network address in the detached list, it must enter the UNATTACHED state and reattach to the spanning tree. (Note that it may not actually be unattached.) After reattaching, the node must remain in a HOLD_DOWN state for MAX_HELLO_LOST+1 hello times. During the HOLD_DOWN state, the node ignores its address in DETACH packet and HELLO.response packet detached lists. After the HOLD_DOWN period expires the node must send a second ATTACH.request to the root, to insure that it is still attached.

5) Entries in routing tables are aged periodically and old entries are discarded. When routing table space for a new entry is required, either an unused entry or the oldest (i.e. least recently used) entry is selected. If a used entry is selected, then the old information is simply discarded.

6) A sleeping node must wake up and enter an ATTACHED listen state whenever a threshold number of HELLO.response packets (i.e. 1 or 2), from its parent, are missed. The state ends when the node receives a data or HELLO.response packet from its parent. The node enters the UNATTACHED state when a) its address appears in the detached list of a DETACH or HELLO.response packet, or b) a total of MAX_HELLO_LOST consecutive HELLO.response packets are missed.

The time that a node spends in the ATTACHED listen state must be less than the lifetime of detached node information in the network. This insures that a detached node will always enter the UNATTACHED state (i.e. either the node will find its address in a detached node list or the node will miss MAX_HELLO_LOST HELLO.response packets and go into the UNATTACHED state before it sees a "good" HELLO.response packet from its (former) parent).

7) Any node which receives a HELLO.response packet from its parent with an infinite distance immediately enters the UNATTACHED state. If the node is a router, it must continue to broadcast HELLO.response packets with an infinite distance for MAX_HELLO_LOST+1 times.

Note that old invalid paths may exist in the spanning tree for a period of time. For example, if a terminal detaches and reattaches to a different branch in the spanning tree, all downstream nodes in the new branch "learn" the new path to the terminal. Nodes which were also in the old path change their routing tables and no longer forward packets along the old path. At least one node, the root, must be in both the old and new path. A new path is established as soon as an end-to-end attach request packet from the terminal reaches a node which was also in the old path. Any remaining old path fragment will be disjoint from the new path and will be aged away.

Detach packet logic

Since terminals can be mobile they can lose messages often and must be notified quickly. A router handles lost messages differently for each of the following three cases: 1) the data link hop destination of a lost message is a downstream router (i.e. the parent), 2) the hop destination is an upstream router, or 3) the hop destination is a terminal. In the first case, the upstream router will detach from the network and will begin broadcasting HELLO.response packets with an infinite cost, causing the subtree below the router to detach and reattach to the network. In the last two cases, the router node will generate a DETACH.request packet which includes a detached node list. The detached node list contains the network layer destination address of the terminal which lost the message. Initially, the detach packet is forwarded to the parent node (if it exists) and router nodes which are children. Router nodes which receive a DETACH.request must forward it along all branches of the spanning tree except the branch it was received on. A router node does not forward a DETACH.request if the DETACH.request came from an upstream node, and the upstream node is not the first hop in

56 the routing table entry associated with the terminal in the detached list. Each router node must broadcast the DETACH.request to all terminal nodes one time so that the terminal can quickly discover that it is detached or has lost a message. In either case, the terminal responds by reattaching to the network. Each router node, which receives the DETACH.request, purges the detached terminal from its routing table and adds the terminal to its detached node set. Detached node information is broadcast in HELLO.response packets for MAX_HELLO_LOST+1 times or until the router determines the terminal has reattached.

Hello synchronization

All attached non-terminal nodes broadcast periodic HELLO.response packets at calculated intervals. On the average, the intervals are separated by HELLO_PERIOD seconds. The HELLO.response packet contains a "seed" field used in a well-known randomization algorithm to determine the next hello time node and the next seed. The address of the transmitting node is used as a factor in the algorithm to guarantee randomization. Nodes can execute the algorithm i times to determine the time (and seed) of the i-th hello packet from the transmitter.

After attaching, a router chooses a random initial seed and hello time and broadcasts a hello packet. The router chooses succeeding hello times by executing the randomization algorithm. If the transmission of a HELLO.response packet is delayed, then the delay is entered into a "hello displacement" field in the packet, so that the calculated time can be accurately derived by a receiver. Cumulative delays are not allowed (i.e. contention delays during the i-th hello transmission do not effect the time of the i+1 hello transmission).

Sleeping terminal support

A sleeping node initially "synchronizes" on a HELLO.response packet from its parent. The node can calculate the time of the next expected HELLO.response packet from its parent and can power-down with an active timer interrupt set to wake it just before the HELLO.response packet is transmitted. The network layer entity in a parent node can store a message for a sleeping node until the node "requests" the message by notifying its parent that it is awake. A terminal learns that it must request unsolicited saved message by examining the pending message list in the HELLO.response packet. This implementation enables sleeping terminals to receive unsolicited messages and relaxes the timing constraints for transaction oriented messages.

ATTACH, DATA, and ARP request packets can contain several network parameters which are used for storing pending messages for sleeping terminals in the parent router node. A "delivery service type" parameter, indicates that a terminal (i.e. which sent the request) is sleeping. An "awake time window" parameter is used to specify an awake time period. An "awake time offset" parameter is used to specify the start of the awake time window. (The awake time window is effective immediately if an awake time offset is not specified.) An "auto awake" delivery service type can be used to implicitly set an awake time window each time the parent node receives a message from the sleeping terminal. A "maximum stored message count" field specifies the maximum number of HELLO times that a message should be stored in the parent router node. The network layer entity in a parent node will store pending messages until 1) the message is delivered, or 2) "maximum stored message count" hello times have expired.

Address Resolution

An address server in the root node maintains network addressing information in an address table, distributes network addresses to requesting nodes, and resolves network addressing problems. Each entry in the address table contains a device type field, a network address field, a long ID field, an alias field, an in-use field, and an age field. Entries in the table are aged so that they can be reused after MAX_ADDRESS_LIFE minutes. Aged entries are kept in the table indefinitely. The age field in an entry is reset to 0 whenever a RARP.request or ATTACH.request packet is received from the node associated with the entry.

A separate sequential set of unique node identifiers is maintained for router nodes and terminal nodes. Each set begins with an identifier of 1 and ends with the maximum range for the device type.

Reverse Address Resolution Protocol (RARP)

A RARP.request packet can be used to: 1) acquire a network address from the address server, 2) change an existing 48-bit long identifier in the address table, or 3) change an existing alias in the address table.

A node which does not yet have a unique 16-bit network address must request a 11-bit node identifier from the address server. The node uses a multicast address until a unique node identifier is assigned. A RARP.request packet, containing the requesting node's unique 48-bit long identifier and/or an alias, is sent to the address server by the requesting node. When a node requests a new address, the server first checks its address table to determine if the node already has a (valid or aged) address. If the node doesn't already have an address, the server allocates the next available node identifier, for the device type, to the node. In either case, if an address is available, the server will set a network address field in the RARP packet to the allocated address and will set a RARP return code to 0. If an address is not available, or an entry already exists in the address table with ambiguous identifiers, the address server will set the network address field to all 1's and will indicate the error in the return code field.

The address servers returns the RARP.request packet to the requesting node as a RARP.response packet. If the node, which generated the RARP.request packet, does not receive a RARP.response packet within PATH_TIMEOUT seconds, it must resend the RARP.request.

RARP routing

RARP packets can not be routed with regular routing tables because a node does not have a unique network address until it receives a RARP response packet. Each router node maintains a separate RARP routing table which contains entries for upstream nodes which have recently sent a RARP.request packet to the root node. An example RARP route table is shown in figure 10.

Whenever a RARP.request packet is received, an entry is created (or updated) in the RARP route table and the long ID and/or alias fields in the entry are set to the values specified in the request packet. The node which initiated the request is defined by the long ID and/or alias. The return code is initialized to "invalid" to indicate that an associated RARP.response packet, destined for the node which originated the RARP.request, has not been received. The port field points to the port on which the RARP.request was received. The network address is set to the network layer source address of the RARP.request packet. The default global node identifier (i.e. all 1's) is used before a unique network node identifier is obtained. (If a node is attempting to change its long ID or alias, then the network address may be unique.) The first hop field will be set to the MAC source address. The age field will be set to 0.

| long ID | alias | port | first hop | network address | return code | age |
|---|---|---|---|---|---|---|
| hex 1003508A990C | null | 1 | hex 020A | hex FFFF | invalid | 0 |
| hex 1003508A920B | term2 | 1 | hex 87FF | hex 080C | 0 | 3 |

Figure 10. An Example RARP Routing Table

Normally, a router node will forward RARP.request packets to the root node. However, if a router node receives a RARP.request packet, and a valid entry for the node which initiated the request is already in the RARP route table, the router can simply return a RARP.response packet to the source node.

When a router node receives a RARP.response packet from the root node, it will update the return code and network address fields in the RARP route table entry for the node which initiated the request. RARP.response packets are
forwarded on the port specified in the route table entry.
The MAC destination address is set to the first hop address.
Note that the last hop is often made with a broadcast
transmission.

RARP route table entries are aged (quickly) so that
older entries are discarded in RARP_TIMEOUT seconds.

Address Resolution Protocol (ARP)

A node can request the 16-bit network address of
another node by sending an ARP.request packet to an address
server in the root node. The ARP.request packet must
contain either the 48-bit identifier or the alias of the
target node, but not both. The address server returns the
16-bit network address of the target node in an ARP.response
packet, if the target node exists in the server's address
table. An address of all 1's and an error is returned if
the target node is not in the address table or if the entry
for the target node is aged.

Address maintenance

A node will lose its address if: 1) the root node
changes (i.e. either a different ROOT ID or root sequence
number is detected in a HELLO.response packet); 2) it has
not received an ATTACH.response packet, from the root node, within an ADDRESS_TIMEOUT time period; or 3) no network activity is detected within a NETWORK_TIMEOUT time period.

A node can maintain its address by sending an ATTACH.request packet to the root node at least once per ADDRESS_TIMEOUT time period. Note that a node must send an ATTACH.request to the root at least once per ROUTE_TIMEOUT time period, to maintain its path to the root in the spanning tree; therefore no special logic is required for address maintenance. If the node is active it can simply piggyback the ATTACH.request on a higher-layer downstream data packet. The root node will return an ATTACH.response packet, and the node can reset its ADDRESS_TIMEOUT timer when the response packet is received.

Root resolution

Root resolution states

The network layer entity in each router node is in one of the following high-level node states:

R - Root node. The node owns the root node address.

RC - Root candidate node.

NR - Router node which has a non-zero root priority.

An 'a' subscript is used to denote nodes without a network address.

All node states are further qualified by one of three attach states:

D - The node is Disabled and unattached.
U - The node is enabled and Unattached.
A - The node is enabled and Attached to the network.
I - The node is in an Intermediate hold-down state.

For example, RC.U, is used to denote the node and attach state of a root candidate which is not attached to the network.

The following substates are used to qualify an unattached node:

idle - No network activity has been detected.
wait - Wait for the first HELLO.response packet.
hello - A HELLO.response packet has been received.

Each MCNA network must have one or more root candidates. Each root candidate node enters the RC.U state when the network layer entity in the node is enabled. This state ends when 1) the root candidate determines that a higher priority root node already exists and enters the NR.U state, or 2) the root candidate assumes ownership of the root node status and enters the R.A state. A node in any NR state assumes the root node status if 1) the network becomes idle, or 2) a lower priority root node is detected.

A root candidate which does not detect any activity assumes the root node status. If activity is detected, the root candidate remains in the RC.U.wait state until a HELLO.response packet is received or until network activity ceases.

In the R.A state the root node broadcasts a HELLO.response packet once per HELLO_PERIOD time period, according to a random distribution algorithm. The root HELLO.response packets contain a path cost of 0, the priority of the root node, a root sequence number, and a ROOT ID which is either the unique long identifier or the unique alias of the root device. <u>The priority, root sequence, and ROOT ID fields are copied into the HELLO.response packets transmitted by all non-root routers in the network</u>. The root sequence number is stored in non-volatile storage by all root candidates. The sequence number is copied into RAM by the root node when it determines that it is the root and the copy in non-volatile storage is incremented.

Hello packet priority

A "higher priority HELLO.response packet" is defined as any HELLO.response packet which contains a matching LAN ID and either 1) a higher ROOT PRIORITY field, or 2) an equal priority field and a higher priority ROOT ID. A ROOT ID can consist of a unique 48-bit device ID and/or a device alias. A "higher priority ROOT ID" is defined as 1) the ID with the higher 48-bit ID, or, 2) if neither candidate has a 48-bit ID, the ID with the alias with highest string value. Note that if the ROOT ID does not contain a unique 48-bit device ID, then the 48-bit device ID is assumed to be all 0's.

It may be possible for a root candidate to receive a HELLO.response packet with an equal priority if the ROOT ID field in the HELLO.response packet matches the candidate's device identifier. Received HELLO.response packets with a ROOT ID field that matches the identifier of the local device and a non-zero path cost are assumed to be associated with an out-of-date spanning tree and are discarded by the network layer. Received HELLO.response packets with a matching ROOT ID and a zero path cost cause a fatal error.

The state transition table below defines transitions in the root resolution process.

Table 7. Root Resolution State Transition Table

| state | event | action | next state |
|---|---|---|---|
| RC.D | Network layer entity enabled. | Enable data link layer on all network ports; set HELLO_TIMEOUT inactivity-timer. | RC.U.idle |
| RC.U.idle | Inactivity-timer expires. | - | R.A |
|  | Non-HELLO packet received. | Set R_IDLE_TIME inactivity-timer. | RC.U.wait |
|  | Higher priority HELLO packet received. | Set R_IDLE_TIME inactivity-timer; set HELLO_TIMEOUT hello- timer. | NRa.U.hello |
|  | Lower priority HELLO packet received. |  | R.A |
| RC.U.wait | Inactivity-timer expires. |  | R.A |
|  | Non-HELLO packet received. | Set R_IDLE_TIME inactivity-timer. | RC.U.wait |
|  | Higher priority HELLO packet received. | Set R_IDLE_TIME inactivity-timer; set HELLO_TIMEOUT hello- timer. | NRa.U.hello |
|  | Lower priority HELLO packet received. |  | R.A |
| NR.U | Lower priority HELLO packet received. | Set R_IDLE_TIME inactivity-timer. | NR.I then RC.U.wait |
| R.A | Higher priority HELLO packet received. | Transmit HELLO packets with an infinite path cost for MAX_HELLO_LOST+1 HELLO periods; set R_IDLE_TIME inactivity-timer; set HELLO_TIMEOUT hello-timer. | R.I then NRa.U.hello |

CHAPTER V

TRANSPORT LAYER

The MCNA transport layer provides a reliable connection oriented service and an unreliable connectionless service. The MCNA network layer does not provide a reliable end-to-end service because it can lose packets over transient radio links. Go-back-n transport error recovery is sufficient since the network layer does not fragment packets and packets are normally delivered in sequence. The transport layer recovers from lost packets, discards duplicate packets, and fragments and reassembles logical user messages. Essentially, it provides a data pipeline between access points in terminal nodes.

Connection oriented services are provided with the following primitives:

```
TL_CONNECT.request(alias,DSAP, . . .)
TL_CONNECT.indication(destination,DSAP,SSAP, . . .)
TL_LISTEN.request(SSAP, . . .)
TL_SEND.request(connection, buffer, length)
TL_RECEIVE.indication(connection, buffer, length)
TL_DISCONNECT.request(connection)
```

69

Connectionless services are provided with the following primitives:

TL_UNITDATA.request(alias,DSAP,SSAP, buffer, length);
TL_UNITDATA_LISTEN.request(SSAP,...);

A transport connection is defined by a destination and source network address and a destination and source service access point (SAP). The TL_CONNECT and TL_LISTEN functions are used to establish a transport connection between two service access points. A transport application in a first node can use TL_LISTEN to "listen" on a well-known source service access point (SSAP). A transport application in a second node can "connect" to the well-known access point with the TL_CONNECT function. The TL_CONNECT.request DSAP parameter is the same as the SSAP parameter used in the TL_LISTEN.request. A connect SSAP is generated by the system in the second node. The "alias" passed to the TL_CONNECT.request function is the network name of the first node. The network layer converts the alias into a network address. Once a connection is established, data is sent and received with the TL_SEND.request and TL_RECEIVE.indication functions. A node which initiates a connection must insure that at least a MAX_PACKET_LIFE time period has expired since an old connection existed before issuing a new
TL_CONNECT.request with the same alias, DSAP, and SSAP.

Since all packets sent during a connection may not
follow the same path, no more than MAX_SEQ frames may be
sent in a MAX_PACKET_LIFE time period, where MAX_SEQ is the
maximum message sequence number and MAX_PACKET_LIFE is the
longest time that a packet can be delayed in the network.
Note that the spanning tree topology insures that packets
will not loop.

The transport entity in a terminal node stores messages
for possible retransmission. Retransmissions may not always
follow the same path, as the original transmission, due
(primarily) to moving terminals and the resulting changes in
the spanning tree. For example, the network layer entity in
a parent node may disconnect a child after the data link
entity reports a message delivery failure. The child will
soon discover that it is detached and will reattach to the
spanning tree with a different parent. Now when a transport
layer message is (re)sent, it will follow the new path.

Network packets can be lost due to terminal roaming or
network congestion. In a congested network a packet can be
discarded by a router node when the router does not have a
free buffer. A timer is started for each transmitted
transport message which requires a response. If the
expected response is not received within a reasonable time period, the message is retransmitted. Retransmitting discarded messages too quickly can aggravate the congestion problem. The MCNA transport layer uses an adaptive timer algorithm to adjust the expected propagation delay for transport messages to the end-to-end distance and traffic load, without causing sporadic changes or dramatic swings in time-out values. The algorithm prevents the transport layer from saturating the network by increasing message time-out values (i.e. increasing the time between retransmissions) whenever a message is lost. The algorithm prevents saturation when the network is congested but reduces response times when messages are lost due to roaming terminals. To alleviate this problem, the MCNA network layer notifies the transport layer when a network layer path change is detected. The notification can trigger an immediate retransmission if unacknowledged messages exist on a connection, or an expected response has not been received.

Since network addresses are a component of a transport connection identifier, the transport entity in each node must be notified when the root node changes. Old network addresses are invalid if the root node changes and the associated transport connections are lost.

A separate trivial transaction-oriented transport protocol (TTTP) is required to reliably gather network statistics and to send mail messages between terminals.

72

TTTP allows information to be reliably exchanged between nodes without the overhead of creating and deleting connections. TTTP requires a response at the application layer and retries transaction requests until a response is received. All transactions are assumed to be idempotent.

CHAPTER VI

SUMMARY

Conclusions

The MCNA backward learning technique eliminates the need to broadcast or exchange routing information. Roaming terminal nodes can switch paths immediately with little added overhead. A disadvantage of the backward learning technique is that a terminal node can not directly communicate with another terminal node. All data traffic must be routed through the nearest common ancestor, thus increasing the total data traffic in the network. MCNA assumes that most of the extra traffic can be localized to high-speed wired links. This is certainly a valid assumption if the predominant application is terminal emulation, since most traffic is directed to a host computer.

An MCNA network is inherently redundant. If a router node fails, the subtree underneath it can quickly re-attach to the network, with minimum overhead, provided a coverage area is not lost. If the root node is lost, the root resolution protocol enables another node to assume the root status and the spanning tree can be re-built.

MCNA provides an efficient and robust solution for connecting a periphery of mobile terminals to a stable network infrastructure.

Future MCNA extensions

MCNA requires a hierarchical network for communications between any two nodes. A desirable extension, would be to allow two MCNA nodes to communicate directly in the absence of the hierarchical network. Such point-to-point sessions are often referred to as ad hoc conversations in current papers on wireless networks. A problem arises because data link and network addresses are dispensed by the MCNA network. This problem could be overcome by defining a global LAN identifier, reserved for ad hoc conversations, and by allowing nodes to independently choose data link addresses as part of an initial handshaking phase prior to an ad hoc session. Predefined unique network addresses (i.e. IEEE 802 addresses) could be assigned to each MCNA node to avoid problems arising from ambiguous data link addresses. Note that the use of predefined (i.e. large) data link addresses would add substantial overhead for unicast transmissions.

As a second possible extension, the MCNA architecture could be modified to enable transparent bridging to wired 802 local area networks. Such an extension requires each node in the MCNA network to be identified by an IEEE 802 address. The device which contained the MCNA root node would have to function as the designated bridge for the "MCNA subnet". The details of this extension are beyond the scope of this thesis and are the subject of a patent application submitted by Norand Corporation.

REFERENCES

[1] B. M. Leiner, D. L. Nielson, and F. A. Tobagi, *Issues in Packet Radio Design*, Proceedings of the IEEE, Vol. 75, No. 1, January 1987.

[2] L. Kleinrock and F. A. Tobagi, *Packet Switching in Radio Channels: Part I - Carrier Sense Multiple Access Modes and the Throughput Delay Characteristics*, IEEE Transactions on Communications, Vol. COM-23, No. 12, December 1975.

[3] L. Kleinrock and F. A. Tobagi, *Packet Switching in Radio Channels: Part II - The Hidden Terminal Problem in Carrier Sense Multiple Access and the Busy Tone Solution*, IEEE Transactions on Communications, Vol. COM-23, No. 12, December 1975.

[4] L. Kleinrock and F. A. Tobagi, *Packet Switching in Radio Channels: Part IV - Stability Considerations and Dynamic Control in Carrier Sense Multiple Access*, IEEE Transactions on Communications, Vol. COM-25, No. 10, October 1977.

[5] L. Kleinrock and J. Silvester, *On the Behavior of Multi-hop Packet Radio Networks*, Proceedings of the IEEE, Vol. 75, No. 1, January 1987.

[6] M. B. Pursley, *The Role of Spread Spectrum in Packet Radio Networks*, Proceedings of the IEEE, Vol. 75, No. 1, January 1987.

[7] J. O. Onunga and R. W. Donaldson, *Performance Analysis of CSMA with Priority Acknowledgments (CSMA/PA) on Noisy Data Networks with Finite User Population*, IEEE Transactions on Communications, Vol. 39, No. 7, July 1991.

[8] L. Kleinrock and J. Silvester, *Spatial Reuse in Multi-hop Packet Radio Networks*, Proceedings of the IEEE, Vol. 75, No.1, January 1987.

[9] F. Backes, *Transparent Bridges for Interconnection of IEEE 802 LANs*, IEEE Network, Vol. 2, No. 1, January 1988.

[10] International Standard ISO/DIS 8802-2.2.

[11] A. S. Tanenbaum, *Computer Networks*, Prentice Hall, Second Edition

[12] D. E. Comer, *Internetworking with TCP/IP*, Prentice Hall

APPENDIX B:

TM 1100 DATA TERMINAL SPECIFICATIONS

©Copyright 1992 by NORAND CORPORATION

*980–000–096*
*April 1993*

NORAND® service
instruction book

TM1100
Data Terminal

This instruction book is in four sections:

*General Information*

*Theory of Operation*

*Maintenance*

*Diagrams and Parts Lists*

© 1992 Norand Corporation. All rights reserved

We welcome your comments concerning this service instruction book. Although every effort has been made to keep it free of errors, some may occur. When reporting a specific problem, please describe it briefly, include the book title and part number, and include the page number on which it occurs.

Send your comments to:

NORAND CORPORATION
        PUBLICATIONS DEPARTMENT—BL11
        550 SECOND STREET S.E.
        CEDAR RAPIDS, IOWA 52401

Norand Corporation
550 Second Street SE
Cedar Rapids, Iowa 52401
Phone: (319) 369-3100

® Registered Trademark; Marca Registrada by Norand Corporation, Cedar Rapids, Iowa, U.S.A.

© 1992 Norand Corporation. All rights reserved

NOTICE

This equipment has been tested and found to comply with the limits for a Class A digital device, pursuant to Part 15 of the FCC Rules. These limits are designed to provide reasonable protection against harmful interference when the equipment is operated in a commercial environment. This equipment generates, uses, and can radiate radio frequency energy and if not installed and used in accordance with the instruction manual, may cause harmful interference to radio communications. Operation of this equipment in a residential area is likely to cause interference in which case the user will be required to correct the interference at the user's own expense.

NOTICE

This document contains confidential information and is proprietary to Norand Corporation. It is being supplied to you with the express understanding that the information contained herein be held in confidence. This document is not to be copied, distributed, or displayed to third parties with out the express written consent of Norand Corporation, and shall be returned to Norand Corporation upon written request. If a purchase, license, or non-disclosure agreement has been executed, the terms of that agreement shall govern this document.

NOTICE

This publication is furnished for information only, and the information in it is subject to change without notice. Although every effort has been made to provide complete and accurate information, NORAND Corporation assumes no responsibility or liability for any errors or inaccuracies that may appear in this document.

general information

1.1 INTRODUCTION

This service instruction book (SIB) contains the theory of operation, maintenance procedures, and diagrams and parts lists for the NORAND® 1100 Series Data Terminal (NPN 225-001-XXX). The 1100 Series Data Terminal is shown in Figure 1-1. Refer to table 1-1 for the terminal specifications.

1.2 PURPOSE OF EQUIPMENT

The 1100 series terminal is a portable, hand-held computer terminal. It is used in various NORAND data networks as a data gathering device. The operator enters data into the terminal using the terminal keyboard, an attached bar code scanner, an integrated barcode scanner, or a combination of the three. The terminal transfers the entered data to a host computer over a radio frequency link or through a local area network (LAN), via the remaining components of the network.

The 1100 Series Data Terminal contains 512K of non-volitale RAM, 128K of FLASH and 512K of masked ROM memory.

The terminal uses a variety of attached (as opposed to integrated) five volt bar code scanning devices. Attached bar code scanners are connected to the terminal at the 9-pin D-sub connector located on the bottom of the terminal. The terminal controls the operation of the scanner.

Terminals with integrated bar code scanners have a built-in scanning device. Integrated scanning terminals feature four "triggers" to operate the scanner – two on the integrated bar code scanning device, and two on the terminal keypad.

The terminal display is a 4-line by 16-character, reflective super-twist LCD. The reflective super-twist LCD enhances the display's readability, even in low lighting.

The terminal keypad has 47 alphanumeric keys, includng the ON/OFF key. Four keys are programmable in both the normal and shift modes, for a total of eight special characters or function .

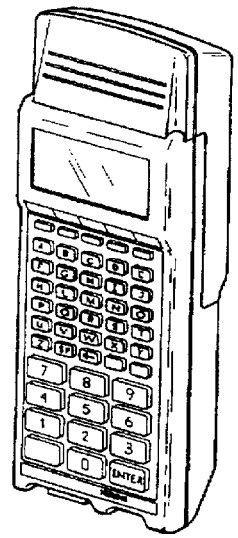

Figure 1-1
*1100 Series Data Terminal
(RT1140 model shown)*

1.3 COMMONLY USED ABBREVIATIONS

Table 1-2 lists the abbreviations used throughout this service instruction book.

general information

Table 1–1. *RT1100 Data Terminal Specifications*

| CHARACTERISTIC | SPECIFICATION |
|---|---|
| PHYSICAL | |
| Size: | |
|    Length | 6.875 inches (17.46 cm) |
|    Width | 2.625 inches (6.68 cm) |
|    Depth | 1.25 inches (3.18 cm) |
| Weight: | 15.2 ounces (431 grams) without scanning module<br>18.2 ounces (516 grams) with scanning module |
| ELECTRICAL | |
| Battery Pack Characteristics: | |
|    Normal recharge time | Complete in 8 hours using Norand NC100 Charger. |
|    Pack life | At least 500 discharge/charge cycles. |
| Radio Transceiver Characteristics: | |
|    Radio Power | 1 watt (maximum) |
|    Frequency Range | 450 to 470 MHz |
|    RF Data Rate | 4800 baud (9600 with RTC protocol) |
| Display | 6 or 8 Line with 12 or 16 character LCD. |
| Memory: | |
|    RAM | 512K bytes |
|    FLASH ROM | 256K bytes |
|    MASKED ROM | 512 bytes |
| Bar Code Scanning Support | Any 5 volt scanning device; CCD, Visible Laser Diode, and Pen Wand. |
| EMI and RFI | Complies with FCC part 15, subpart J, for Class A computing devices. |
| ESD | Will not undergo irreversible damage when subjected to 20KV electrostatic discharge on all surfaces. |
| Line Transients | Capable of withstanding unfiltered power line transcients up to 32V dc for 1 msec. | general information

Table 1-1. *RT1100 Data Terminal Specifications (continued)*

| CHARACTERISTIC | SPECIFICATION |
|---|---|
| External Connectors | |
| Scanner Iinterface: | 9-pin D subminiature |
| J2-1 | SOS |
| J2-2 | DATA |
| J2-3 | LED |
| J2-4 | MOTORFAIL |
| J2-5 | TRIGGER |
| J2-6 | ENABLE |
| J2-7 | GND |
| J2-8 | GND |
| J2-9 | +V |
| | |
| RS232/485 | 6-pin mini-DIN |
| J1 | ERXD/DATA |
| J2 | ETXD/DATAL |
| J3 | RTS |
| J4 | CTS |
| J5 | CHG |
| J6 | GND |
| | |
| Charger: | 6-pin DIN |
| J3-1 | NOT USED |
| J3-2 | NOT USED |
| J3-3 | NOT USED |
| J3-4 | GND |
| J3-5 | CHARGE |
| J3-6 | NOT USED | general informatic

Table 1–1. *RT1100 Data Terminal Specifications (continued)*

| CHARACTERISTIC | SPECIFICATION |
|---|---|
| Internal Connectors | |
| RT1100 Host Board | |
| J1–1 | NOT USED |
| J1–2 | ON/OFF |
| J1–3 | RADGP0 |
| J1–4 | RADGP1 |
| J1–5 | RADGP2 |
| J1–6 | RADGP3 |
| | |
| Radio/Scanner Interface Signal | |
| P2–1 | BATTV+ |
| P2–2 | RADION |
| P2–3 | PTT |
| P2–4 | RXDATA |
| P2–5 | TXDATA |
| P2–6 | SP48_96 |
| P2–7 | +5V |
| P2–8 | RX_AUDIO |
| P2–9 | TXDC188 |
| P2–10 | RXDC 188 |
| P2–11 | TXF0 |
| P2–12 | GND |
| | |
| P3–1 | DATA |
| P3–2 | SOS |
| P3–3 | RSTRIG |
| P3–4 | RENABLE |
| P3–5 | VSCAN+ |
| P3–6 | BUZZER | general information

Table 1–1. *RT1100 Data Terminal Specifications (continued)*

| CHARACTERISTIC | SPECIFICATION |
| --- | --- |
| Flextail Callouts | |
| P3–1 | ENABLE |
| P3–2 | SSOS |
| P3–3 | GND |
| P3–4 | SDATA |
| P3–5 | GND |
| P3–6 | SCNLED |
| P3–7 | VSCAN+ |
| P3–8 | GND |
| P3–9 | TRIGGER |
| P3–10 | ERTSA |
| P3–11 | CHARGE |
| P3–12 | ERXDA |
| P3–13 | ETXDA |
| P3–14 | ECTSA |
| P3–15 | GND |
| | |
| Radio Transceiver | |
| J1–1 | GND |
| J1–2 | SW B+ |
| J1–3 | XMIT B+ |
| J1–4 | RX +5 |
| J1–5 | TX +5 |
| J1–6 | TX MOD |
| J1–7 | SQ DET |
| J1–8 | SQ ADJ OUT |
| J1–9 | SQ ADJ IN |
| J1–10 | DISCR OUT |
| J1–11 | CH SEL B |
| J1–12 | CH SEL A | general information

Table 1-1. *RT1100 Data Terminal Specifications (continued)*

| CHARACTERISTIC | SPECIFICATION |
|---|---|
| J1-13 | AUX TX MOD |
| J1-14 | UNSW BATT |
| Input signal levels | |
| Minimum mark (logic 1) | −3V dc (OV or open appears as logic 1) |
| Maximum space (logic 0) | +3V dc |
| Input impedance | 3kΩ minimum; 7kΩ maximum |
| | |
| Output Signal Levels: | |
| Minimum mark (logic 1) | −3V dc (OV or open appears as logic 1) |
| Maximum space (logic 0) | +3V dc |
| Minimum drivable load | 3kΩ |
| | |
| ENVIROMENTAL | |
| Temperature: | |
| Storage | −40 to 158° F (−40 to 70° C) |
| Operating | 32 to 104° F (0 to 40° C) |
| Relative Humidity | 10% to 90%, noncondensing |
| Dust | Environmentally sealed to withstand penetration of dust. |
| Shock/Vibration | Will suffer cosmetic damage only and shall operate after drop tested as per the Electronic Industries Association Standard RS-316-B method 5.6. | general information

Table 1-2 *Commonly Used Abbreviations*

| ABBREVIATION | MEANING | COMMENTS |
|---|---|---|
| A | Ampere | Unit of measurement for electrical current. |
| ac | Alternating Current | Current that periodically changes magnitude and direction of flow. |
| aux | Auxiliary (backup) | |
| cm | Centimeters | |
| CMOS | Complementary Metal–Oxide Semiconductor | |
| CPU | Central Processing Unit | Circuit which contains a microprocessor. Can also designate the microprocessor itself. |
| dc | Direct Current | Current which always flows in the same direction. |
| EEPROM | Electrically Erasable Programmable Read–Only Memory | Medium for permanent storage of operating program. |
| EPROM | Erasable Programmable Read–Only Memory | Medium for permanent storage of operating program. |
| ESD(S) | Electro Static Discharge (Sensitive) | Voltage induced into equipment by static charges present in most work/lab environments. (Units or subassemblies that may fail when subjected to electrostatic charges.) |
| FM | Frequency Modulated | Method of integrating data onto an RF carrier signal. |
| Hz | Hertz | Unit of frequency measurement. 1 Hz = 1 cycle per second. |
| I/O | Input/Output | Data going to (input) or coming from (output) a device or component. |
| in | Inches | |
| k | kilo | One thousand (e.g., kV = 1 thousand volts). |
| LCD | Liquid Crystal Display | |
| m | milli | A thousandth (e.g., mV = 1 thousandth of a volt). |
| max | Maximum | |
| min | Minimum | |
| mux | Multiplexer | |
| NPN | Norand Part Number | |

1–7 general informatic

Table 1–2 *Commonly Used Abbreviations (continued)*

| ABBREVIATION | MEANING | COMMENTS |
|---|---|---|
| qty | quantity | The number of items required. |
| RAM | Random–Access Read–Write Memory | Medium for temporary storage of instructions or data. |
| RF | Radio Frequency | |
| ROM | Read–Only Memory | Medium for permanent storage of instructions or data. |
| RTV | return to vendor | Indicates that a component or assembly is repaired by the manufacturer and not by Norand Customer Support Centers. |
| TTL | Transistor–Transistor Logic | |
| UUT | Unit Under Test | Designator used to indicate the radio data terminal in the testing/troubleshooting procedures. |
| V | Volt | Unit of measurement for electrical pressure. | theory of operation

2.0 General

This section contains the theory of operation for the TM1100 Data Terminal. The TM1100 terminal is positioned toward the high end of the Cricket family of portable data terminals with a 16-bit 8086 compatible microprocessor, program and data memory, radio/scanner expansion modules that are compatible with the RT1000 and new expansion modules with increased functionality.

2.1 TM1100 Functionality

The TM1100 terminal shares a number of characteristics with the RT1000 terminal including its battery pack, 47 key keyboard, moving beam scanner interface, compatibility with the RT1000 radio/scanner expansion modules and a slightly modified version of the plastic case. The primary differences between the TM1100 and the RT1000 terminals are in the areas of processor intelligence, memory capacity and peripheral connection capability.

The TM1100 has an 80C188EB microprocessor as its main data processing unit with 512K bytes of masked ROM, 512K bytes of RAM and up to 256K bytes of Flash EPROM. This processor and memory combination allow significant application program functionality to be resident within the terminal including "IBM PC-like" DOS, "C", and other personal computer derived programming methods.

The TM1100 LCD display is also substantially different from the RT1000 type. A single integrated circuit graphic display controller is assembled with the LCD glass and electroluminescent backlight panel into a module form. The display format is a graphic type with 48 rows x 100 columns which form 6 lines of 16 5x7 dot matrix characters with the remaining 4 pixel columns used for icon style annunciators. The display is backlighted by an integral electroluminescent panel which is powered by high voltage AC drive circuits on the main circuit board.

Other areas of expanded functionality in the TM1100 include its RS-232 and RS-485 interface capability, battery backed RAM and real time clock, and its unique combination of two microprocessors which partition the terminal operation requirements into the two parts of I/O and power management which is controlled by an H8/325 microprocessor and application processing which is the function of the 80C188EB microprocessor. This combination provides improved power conservation while maintaining the necessary processing performance for popular programming and application development environments. Much of the terminal functionality is included in a custom LSI circuit (ASIC) which implements the memory interface, processor and real time clocks, interprocessor communications and backlight drive control.

2.2 System Block Diagram Overview

The TM1100 Data Terminal is a microprocessor based terminal with features that allow it to be used and programmed similarly to popular personal computers. The block diagram of the terminal is shown in Figure 2-1, on page 2-2.

The main CPU is an Intel 80C188EB microprocessor which is a 16-bit microprocessor with on-chip interrupt interface, I/O ports, timers and serial interface.

The I/O and power management processor is a Hitachi H8/325 single chip microcontroller with 32K bytes of on-board masked ROM, 1024 bytes of RAM, serial interface, timer/counters and external I/O ports.

The ASIC provides a parallel communication path between the two processors using back-to-back memory mapped ports that allow data theory of operatio.

*TM1100, Functional Block Diagram* theory of operation to be written by one processor and read by the other. The ASIC also includes the bus demultiplexing circuits for the 80C188EB as well as memory decoding and processor clock generation.

The memory organization of the terminal is a combination of masked ROM, Flash EPROM and pseudostatic RAM. The pseudostatic RAM and real time clock in the ASIC are powered by a backed up power supply.

The liquid crystal display is a module featuring a 48 line by 100 pixel graphic format with an integral LSI driver/controller integrated circuit and electroluminescent backlight panel. The display is interfaced to the 80C188EB processor through memory mapped I/O. The keyboard is directly interfaced to the H8/325 processor by processor ports. A radio module is interfaced to the H8/325 with processor ports and the H8/325 serial interface. Expansion modules of types other than a radio module are interfaced to the H8/325, however, a high speed serial interface facility to the 80C188EB is available for direct coupling. This may be useful for interface to devices that require high data rates such as solid state disk modules or certain high speed radio modules.

Externally attached or integrated scanners are interfaced through ESD protection circuits to processor ports. The power control block consists of the terminal battery and power control and voltage regulator circuits.

2.3 Application Microprocessor

The main processor in the TM1100 is an 80C188EB which is a highly integrated fully static low power 16-bit microprocessor featuring an 8086 compatible instruction set with an 8-bit external data bus, chip select generation logic, 3 counter/timer units, two serial communication ports, I/O ports, a power management unit and an interrupt controller unit. Since the 80C188EB is a fully static device, the clock may be turned off completely without losing its state resulting in significant power savings.

2.4 Memory

2.4.1 Masked ROM

The masked ROM is a 512K byte device which contains two basic blocks of information. The bootstrap loader which controls loading and programming of the Flash EPROM is contained in the masked ROM so that there is a guaranteed ability to initialize or restore the condition of the terminal under conditions ranging from manufacture to fault recovery. The other information stored in the masked ROM is the character generator used by the 80C188EB to form characters in the graphic display. This character generator contains the so-called "shift-JIS" character set which includes a complete set of international text characters as well as a 6500 character Japanese Kanji symbol set. Initial TM1100 units will use an OTP (One Time Programmable) EPROM device until the masked units are available.

2.4.2 Flash EPROM

The Flash EPROM is a 256K byte device which contains stored system and application programs. Flash EPROM is a technology similar to the ultraviolet erasable EPROM except the erase function is performed electrically. Consequently, there is no need to remove the device from the circuit for reprogramming so the device can be directly soldered to the circuit board. The Flash EPROM is the primary application program storage location. The masked ROM contains a bootstrap load and Flash programming utility that is used to re- theory of operatio ceive the program from an external computer and program it into the Flash device.

2.4.3 Pseudostatic RAM

The TM1100 RAM is a 512K byte pseudostatic device which employs a combination of dynamic and static RAM technology. The storage mechanism is a dynamic cell which requires refresh for data retention. The pseudostatic memory includes on–board circuits to perform this refresh function in such a way that the device looks to the system like a static RAM. In standby, the refresh function is performed internally in a very low power mode, so the pseudostatic device performs similarly to a full static RAM while providing memory density comparable to a dynamic RAM. The other important benefit of the pseudostatic RAM is its bytewide organization which allows the use of a single memory device in the system.

2.5 Power Control, I/O Microprocessor

While the 80C188EB is a low power device, it still consumes too much current to be left operating constantly. The H8/325 microcontroller is a much lower power microprocessor and it has efficient timer/counter facilities on board for further power reduction by allowing the processor to remain in its idle mode most of the time.

In general, terminal operation is partitioned into I/O and application related parts. The I/O portions of the terminal operation are primarily controlled by the H8/325, while the application portion is handled by the 80C188EB. The I/O operations controlled by the H8/325 include keyboard interface, scanner interface (up to the count collection operation), UHF radio interface including the entire communication protocol, buzzer and power management including battery terminal voltage monitoring, LCD bias voltage control, LCD backlight control, RS–232/485 driver control, and pseudostatic RAM refresh enable in standby. The H8/325 also provides a rich set of I/O ports which generally helps reduce parts count and complexity.

2.6 Display

The TM1100 terminal features a unique display with extremely compact packaging technology to provide increased functionality in the Cricket form factor. In essence, the TM1100 display module consists of a sandwich of the display glass, EL backlight panel and circuit board connected together with heat–seal tape. This very thin structure allows the module to be located in the space originally designed for the RT1000 LCD glass alone.

The TM1100 display is controlled by a Hitachi 66108 graphic controller/driver which is contained in a 208 pin Tape Automated Bonding (TAB) package. The 66108 is a complete single chip driver with on–board RAM, multiplexing and driving circuits for the 100 pixel column by 48 pixel row display format used in the TM1100. The interface to the 66108 is a memory mapped bus connected to the 80C188EB so that the display is directly controllable by the high speed application processor. The display character format is generated by the 80C188EB by retrieving the character generator information from the masked ROM as described in section 2.3.1. Display formats of 6 lines x 16 characters, 6 lines x 12 characters and 8 lines x 16 characters are available under processor control. While the entire display contents are controllable by the application program, in general the character display mode will be used, and the right 4 pixel positions will be used for icon–type annunciators indicating the shift, battery, charge and communication status without preempting displayable character positions.

theory of operation

The display is backlighted by an integral EL panel which is driven by high voltage AC drive circuits located on the CPU circuit board.

2.7 Keyboard

The TM1100 terminal has 47 keys including the power-on key. The keyboard is organized as a crosspoint matrix in 8 row x 6 column format and is interfaced to the H8/325 microcontroller. The row lines are connected to processor outputs and the column lines are connected to inputs with pullups. Keyboard scanning is accomplished by sequentially driving a single row line low and reading the column lines to determine when one of those lines is low. The indicated line corresponds to the column in which the activated key is located, so the key is located by the junction of the selected row line and the indicated column line. Since the key is a switch, there is switch bounce associated with the electromechanical contact, so a firmware routine is included to deal with the switch bounce effects.

2.8 Expansion Interface

As a member of the Cricket product family, the TM1100 terminal has been developed initially to be a radio data terminal. However, with the significant application program and data storage capability of the terminal, it is clear that the TM1100 has excellent capacity to be used as a site-based batch terminal as well. Consequently, the RT1000-style modular radio interface has become a much broader concept in the TM1100.

2.8.1 Radio Interface

Radio communication in the TM1100 includes the RT1000 style radio module for UHF applications as well as an expanded radio module for Spread Spectrum (SST) communications. As in the RT1000, the UHF communication capability is built around the Motorola Radius P10™ and P60™ radio transceivers. The H8/325 processor handles UHF radio communications completely including power control to the radio module, receiving and transmitting characters, and complete implementation of the radio protocol. When a complete, error free block of information is received and contained in the H8/325 memory, "wakes up" the 80C188EB processor and transfers the block at high speed, thereby significantly reducing the amount of time that the 80C188EB has to be powered and operating. Transmission of a block of information is handled in a similar manner, with the 80C188EB transferring a block to be transmitted to the H8/325 memory and powering off while the H8325 performs the radio communication function.

SST communication is handled somewhat differently in the TM1100 due to the high data rate and HDLC format of the SST radio. Because of this somewhat unique communication requirement, the SST radio module has its own self-contained microcontroller, Serial Communication Controller (SCC) and counter/timer circuit imbedded in a digital ASIC which also includes the digital circuits required by the SST radio itself. The SST radio module with its processor and ASIC handle the SST communications and protocol completely and transfer received and transmitted data directly to and from the 80C188EB processor. As in the case of the UHF module, power is conserved by using a low power processor to perform the communication and protocol handling function.

2.8.2 Scanner Interface

The TM1100 has the capability to support a variety of attached or integrated scanners. Interface to scanning devices is shared between theory of operation the H8/325 and 80C188EB processors. The H8/325 is interfaced to the TRIGGER input so it can sense when the operator initiates a scan operation and the scanner must be enabled by turning on ENABLE to the scanner. Once this operation begins, the count collection portion of the scanner interface is handled by the 80C188EB with its high speed 16 bit counter/timer circuits and resident scan decode algorithms. The basic scanner interface is the industry standard 9 pin scanner definition shown in Table 2-1.

Table 2-1 *Scanner Interface Pin Definition*

| PIN | SIGNAL LEVEL | I/O | DESCRIPTION |
|---|---|---|---|
| 1 | 5 volt logic (pullup) | I | SOS |
| 2 | 5 volt logic (pullup) | I | DATA |
| 3 | 5 volt buffered | O | LED |
| 4 | nc, ESD protection only | I | MOTORFAIL |
| 5 | 5 volt logic (pullup) | I | TRIG |
| 6 | Switched +5 volts | O | ENABLE |
| 7 | Ground | | GND |
| 8 | Ground | | GND |
| 9 | 5 volt power | O | +V |

This scanner interface may be used to support a wide variety of industry compatible scanners, and may also be used to support digital wand scanners.

In addition to the externally connected scanner, the TM1100 terminal has the capability to support an integrated scanner module which is associated with the expansion module. The integrated scanner module is physically larger than the "radio only" unit, though its interface connector and physical mounting structure are identical. The integrated modules may employ moving beam laser, charge coupled device (CCD) or other types of scanner technology.

2.8.3 RS-232, RS-485 Interface

The TM1100 terminal has two separate serial interface facilities for wired communications to computers and peripherals. Both the RS-232 and the RS-485 interfaces are accessed through the 6-pin mini-DIN connector by sharing two of the pins. The mini-DIN pin configuration is as follows:

Table 2-2 *Charger/Data Interface Pin Definition*

| PIN | SIGNAL LEVEL | I/O | DESCRIPTION |
|---|---|---|---|
| 1 | RS-232/RS-485 (pullup) | I/O | EXRD/DATA |
| 2 | RS-232/RS-485 (pulldown) | I/O | ETXD/DATAL |
| 3 | RS-232 | O | RTS |
| 4 | RS-232 | I | CTS |
| 5 | Charge Input | I | CHG |
| 6 | Ground | | GND |

The RS-232 RXD and TXD lines are shared with the RS-485 DATA and DATAL lines by separately enabling the line drivers under software control. The RS-232 interface is generally intended to be used for point-to-point interface to devices such as computers for Flash program download and to printers or other attached peripherals. The RS-485 interface is theory of operation generally used for networked interface connections where the multidrop capability is needed.

2.8.4 ASIC

A digital Application Specific Integrated Circuit (ASIC) is used to implement a significant portion of the logic functionality of the TM1100. The ASIC includes the back-to-back 8-bit ports that are used by the 80C188EB and H8/325 microprocessor to communicate with each other, bus demultiplexing, memory decoding and control for the 80C188 ROM, Flash EPROM and pseudostatic RAM, drive and control for the electroluminescent backlight high voltage generation circuit, clock oscillators for both microprocessors and the battery backed real time clock.

2.8.5 Power Control

The TM1100 is powered by a standard Motorola P10™ 7.2 volt NiCad battery pack or equivalent. The terminal is powered on and off by a momentary contact SPST power-on key which toggles a latch to control power. The terminal 5 volt operating power is generated by a voltage regulator with an external pass transistor. The negative voltage required by the LCD is generated by a charge pump driven by the digital ASIC. Backup power for the real time clock and pseudostatic RAM is provided by a 0.3 Farad supercap and a low power voltage regulator. Battery charging is accomplished by a constant current regulator. The battery and charge voltage are monitored by the H8/325 using its pulse width modulator outputs to create an analog voltage that may be used in a successive approximation analog to digital conversion.

2.9 Detailed Description

The following paragraphs describe the operation of the 1100 terminal in detail. Component names and reference designators used in the following paragraphs match those used in the schematic diagrams of the 11000 terminal, contained in the Diagrams and Parts List section of this book.

2.10 Processor

The heart of the TM1100 is the 80C188EB microprocessor U9 with its high speed, high integration and 8086 compatible instruction set. With the 80C188EB as its core, it is possible for application programs to be developed for the TM1100 in a manner similar to that used by popular personal computers such as the IBM-PC.

Power-on reset of the TM1100 is controlled by the H8/325. Specifically, the reset signal RESC188 is generated by the H8/325 U10 pin 31 and is applied to pin 68 RESIN of 80C188EB U9.

The 80C188EB U9 pin 71 is clocked with a digital clock signal OSC_16MHZ that is derived from an 18.432 Mhz crystal oscillator and is gated and driven by U3 74HC02 pin 1 through resistor R22 392Ω. When the 80C188EB is placed in its shutdown condition, the OSC_16MHZ signal is gated off to reduce power consumption. The 80C188EB divides this clock input by 2 for a net processor execution cycle speed of 9.216 Mhz.

Since the 80C188EB employs a multiplexed address/data bus, it is necessary to demultiplex the bus by latching the address information on the bus with the falling edge of the ALE signal pin 38 of U9. This function is performed by the ASIC U6 which receives the multiplexed address/data bus on the lines DB0-DB7 and outputs the address information on the lines theory of operation

A0–A7. While address lines A8–A15 do not require latching, it is necessary to latch address lines A16–A18 since the 80C188EB does not guarantee that these signals will not change during a memory access function. This is accomplished by the ASIC U6 by receiving lines PA15–P18 and latching them to create the lines A15–A18. The 19-bit address bus is then used by the various memory devices for memory addressing.

Selection of a specific memory device is controlled by the 80C188EB chip select logic block, which generates the signals ROM, FLASH, C188_CSL, DISCE and RAMCSINL. The signals ROM and FLASH are selection signals for the masked ROM and FLASH EPROM devices.

ROM is connected to the UCS or Upper Chip Select line of the 80C188EB. Upon power-up, this is the memory block that is accessed following reset of the processor, so valid program storage is required to be addressed by the UCS line. In the case of the TM1100, the masked ROM contains the system setup and bootstrap loader programs such that if valid programs are in place in memory, execution may proceed, and if no programs are resident, loading and storing of those programs is supported.

The FLASH signal is the chip select for the Flash EPROM which may be used to store system or application programs. FLASH is connected to the 80C188EB GCS6 line which is one of the general purpose chip select signals generated by the 80C188EB memory decoder.

The RAMCSINL select signal for the pseudostatic RAM is connected to the LCS chip select line since RAM must be the lowest memory for storage of interrupt vectors. Further discussion of the generation of the chip enable signal for the pseudostatic RAM is included in section 3.4.

C188_CSL is the select signal for the interface to the ASIC that provides the data exchange mechanism between the 80C188EB and the H8/325. C188_CSL is connected to the 80C188EB GCS4 line.

DISCE is the select signal for the 66108 display controller and is connected to the 80C188EB GCS7 select line.

The memory blocks decoded by the GCSx lines are not defined until the decoder is setup following execution of code in the masked ROM. It should be noted that the memory map of the 80C188EB is addressed by 20 address bits for 1M bytes total. Because of the programmable chip select block, however, more than 1M byte may be addressed by modifying the extents of the selects so effective overlaying may be accomplished. For example, if the character generator section of the masked ROM is used only by the display driver routine, that routine may be the only code that extends the address range for the masked ROM to its full 512K byte extent. All other operational contexts may map the masked ROM to a minimum amount, which may be zero if the masked ROM is not accessed at all. Since the largest physical memory device is 512k bytes, only 19 address lines from the processor are used externally, with the total memory map managed through the chip select generator block from the internally accessible address lines.

Interface to all memory mapped devices for read and write operations requires the coincidence of the appropriate device chip select along with either RD or WR respectively.

The 80C188EB includes a number of on-board functions that are used to interface to various peripheral devices in the TM1100. The 80C188EB has two serial interface ports that are used for external asynchronous data communication to the TM1100. Serial port 0 is used to communicate to the RS–232/RS–485 theory of operation port which will be described in more detail in section 3.13, while serial port 1 is used for high speed communication to the peripheral expansion unit, which is often a radio module but may be some non-radio unit such as a modem, solid-state disk, automatic identification interface or some other type of peripheral interface. This high speed interface uses the 80C188EB RXD1 and TXD1 signals to drive the RXDC188 and TXDC188 signals respectively to the expansion module. These high speed signals will normally be connected to and interpreted by a separate microprocessor in the expansion module.

Two of the 80C188EB on-board high speed 16-bit timer/counter units are be used to capture the relative widths of bars and spaces as detected by bar code scanners of either attached or integrated type. The scan data signal DATA representative of bar and space widths is connected to T0IN U9 pin 76. The complement DATALOW is generated by an inverter in the ASIC U6. DATA is connected to the ASIC U6 pin 30 and DATALOW is generated at U6 pin 29. DATALOW is then connected to the 80C188EB T1IN timer/counter input U9 pin 78. By tying the scan DATA signal and its complement to two separate timer/counter inputs, it is possible to operate the timer/counters in gated count mode which generates count values proportional to bar and space widths that may be interpreted by the scan decode algorithms. DATALOW is also connected to processor port P2.5 U9 pin 4 so its level may be monitored to identify the presence of a wand scanner. For a more detailed description of the scanner interface and control operation, see section 3.9.

A number of the control and interface signals necessary for the operation of the TM1100 terminal are generated by 80C188EB ports. These signals include SCANLEDL, SCANPWR, RSENABLE, ENABLEL, and SOS which support the scanner interface and SRTS, SCTS, and TXDEN485 which control the RS–232 and RS–485 interfaces.

2.11 ROM Memory

As described in section 2.3.1, the RT1100 terminal has 512K bytes of masked ROM which contains the bootstrap loader and character generator tables. (For initial test and production units, the masked ROM may be replaced by a programmed EPROM device.) The ROM U5 is addressed by 19 bits of the 80C188EB address bus A0–A18 and selected by the UCS chip select line ROM connected to the ROM CE input U5 pin 22. Data is gated to the processor data bus by RD which is connected to the ROM OE input U5 pin 24.

2.12 FLASH EPROM Memory

The TM1100 terminal has up to 256K bytes of FLASH EPROM memory which is a memory technology that is similar to the well known ultraviolet erasable EPROM except that erasure is accomplished electrically. Consequently, no unit disassembly, sockets, service handling or the like are necessary for program modification or updates. The FLASH EPROM is addressed by 18 bits of the 80C188EB address bus A0–A17 and is selected by the GCS6 chip select line FLASH connected to the FLASH CE input U8 pin 30. Data is gated to the processor data bus by RD which is connected to the FLASH OE input U8 pin 32. Programming the FLASH U8 requires application of a 12 volt power supply VPP to the VPP input at pin 9 of U8. The TM1100 charge input is the source of the 12 volt supply which is switched by the H8/325 processor to control the VPP programming supply. The switch uses both sections of Q1 FMC3 consisting of a PNP and an NPN transistor with bias resistors controlled by the H8/325. When FLASH programming is en- theory of operatio abled, the H8/325 drives its port pin P7.4 high, which sources current into the base of the NPN switch of Q1. The collector of the NPN switch is connected to the collector of the PNP switch of Q1 which switches the PNP switch on sourcing 12 volts from CHARGE to VPP.

When the 12 volt progamming voltage is applied to VPP of the FLASH EPROM, its erase and program functions are enabled and may proceed under the control of the 80C188EB. Data to be programmed into the FLASH is received by the 80C188EB through the RS-232 port under control of the bootstrap load program residing in masked ROM. In the program mode, the FLASH looks like a writable device, so the WR line from the 80C188EB is connected to the WE input of the FLASH at pin 7 of U8.

2.13 Pseudostatic RAM

The TM1100 pseudostatic RAM U4 is organized as a 512K byte device which is addressed by the LCS chip select line RAMCSINL from the 80C188EB processor. Since the pseudostatic RAM device utilizes dynamic RAM storage and retrieval mechanisms, certain dynamic RAM characteristics are evident, particularly the latched address bus characteristic. Consequently, it is possible to connect the multiplexed Address/Data bus signals DB0–DB7 and the multiplexed address signals PA15–PA17 directly to the pseudostatic RAM U4. The selection of the pseudostatic RAM is a bit more complex than a fully static device since the OE and CE lines are used to place the device into its self refresh data retention modes. For this reason, the LCS chip select RAMCSINL and RD signals from the 80C188EB are gated through the ASIC to properly generate these signals. For a normal read and write operation the LCS signal from the 80C188EB is passed through the ASIC to create the signal RAMCSOUTL which is applied to the CE input pin 22 of U4. A read operation involves the 80C188EB RD signal passed through the ASIC to create the signal RAM_RDL which is connected to the OE input pin 24 of U4. The 80C188EB WR is connected directly to the WE input pin 29 of U4.

The self refresh mode of the pseudostatic RAM is invoked by driving the OE input low for more than 8 μsec. with the CE input high. Since this won't occur in the normal addressing operation of the 80C188EB, the ASIC must force this condition when self refresh is to be initiated. This is controlled by the H8/325 when it has determined that the 80C188EB is to be powered off by driving REFRESH_EN U10 pin 24 high to the ASIC U6 pin 55. Since this signal is only driven high when the 80C188EB is to be in its low power non-operating state (Note pullup resistor R95 100kΩ which insures that self refresh will be enabled in the standby condition), REFRESH_EN is also used to gate the 18.432 Mhz. clock to the 80C188EB which further reduces its power consumption. This is accomplished by gating an input to the 74HC02 NOR gate U3–C at pin 8. The other input to that gate is derived from the VCC_VH power valid signal which also must be high for proper operation of the terminal. When VCC_VH is high, the gate at U3–B inverts the signal from its input pin 6 to its output pin 4 which is connected to U3–C pin 9. U3–D serves as an additional inverter to gate the proper polarity to the gating section at U3–A which ultimately drives the external clock signal to the 80C188EB processor U9 at pin 71. It should be noted that the need for the 74HC02 NOR gate as a clock gate and driver is due to the fact that the ASIC clock driver does not gate the clock off when the REFRESH_EN signal is received. This deficiency will be corrected in a further iteration of the ASIC circuit.

theory of operation

While not as power efficient as full static CMOS RAM, the pseudostatic RAM is a CMOS device with favorable data retention power consumption. The worst case standby retention current in the self-refresh mode is 200 µa. Power for memory data and real time clock retention in the ASIC is provided through a power backup system consisting of the main terminal battery and a "supercap" for retention when the main battery is removed. When the main battery is in place, the backup power supply RAMV+ is generated by a low power MAX667 voltage regulator REG2 whose output is directed through a diode CR5 to the RAMV+ bus. Resistors R69 309KΩ and R73 100KΩ set the output voltage of the regulator to +5 volts. It should be noted that the blocking diode CR5 does not contribute to error in the setting of RAMV+ since the output voltage is sensed after the diode. The MAX667 regulator REG2 has a voltage sense capability that detects that the output voltage has dropped out of regulation using its LBI (pin 3) and LBO (pin 7) pins connected through resistors R56 475KΩ, R66 3.9MΩ, R83 267KΩ and R57 100KΩ. R83 and R57 form a voltage reference, R66 provides switching hysteresis, and R56 is a pullup of the open drain output for logic interface to the ASIC for its VCC valid VCC_VH input. Backup power is provided by the supercap C29 0.3F when the main terminal battery is removed. Charging current to the supercap C29 is limited by the 100Ω resistor R58 so the regulator REG2 is able to generate the +5 volt RAMV+ voltage immediately. During standby operation, the delivered current is so low that virtually no voltage drop is seen through the 100Ω impedance to the backup load of the RAM and ASIC. Capacitors C25 10µF and C35 0.1µF provide supply bypassing for the RAMV+ supply. Resistor R67 17.4Ω and capacitor C36 1µF provide bypass filtering and isolation for the RAMV+ backup supply circuit.

It should be noted that since the power supply for the ASIC is the RAMV+ supply, pullup derived voltages must be pulled up to this supply. Consequently, the pullups R16 100KΩ, R18 100KΩ and R23 100KΩ and reset circuit R41 100KΩ and capacitor C23 0.1µF are all connected to the RAMV+ supply.

2.14 Display

The TM1100 display is a module using liquid crystal technology which includes a Hitachi 66108 controller/driver, an electroluminescent backlight panel, a circuit board and interconnection to the glass. The 66108 controller is a graphic mode device with internal pixel mapped memory, so character generation must be done externally. In the case of the TM1100, the character generation function is performed by the 80C188EB with character generation storage contained in the masked ROM as described in sections 2.3.1 and 3.2. The display drive configuration is as shown in Figure 2-2.

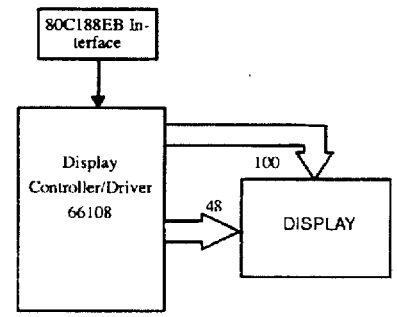

Figure 2-2
*Display Driver Configuration*

The display is physically arranged as 48 pixel rows x 100 pixel columns, which allows character or graphic information to be displayed. The most typical display mode will be the 5 x 7 theory of operatic.

character generator mode, which allows 6 lines x 16 characters to be displayed. For compatability to the IBM PC display modes, the 8 x 8 character generator mode may be used which allows 6 lines x 12 characters to be displayed. A "squashed" character generator mode of 5 x 5 is also available which allows 8 lines x 16 characters to be displayed. Graphic display capability is inherent in the 66108 driver/controller and is a function of the application program resident in the 80C188EB.

It should be noted that all of the display formats described use only 96 of the 100 pixel columns. The remaining 4 pixel columns are accessible by the 80C188EB application program, but will generally used for icon style annunciators to indicate battery status, charge connection, radio communication loss, keyboard shift and the like.

1/48 duty cycle multiplexing is used by the 66108 to drive the display. To achieve this level of multiplexing, stepped multiplex drive voltages derived from a negative power supply voltage are necessary. The step voltages and negative power supply along with a processor controlled display bias control are all generated on the TM1100 circuit board and connected to the display module.

The negative power supply is created by using a capacitor/diode ladder structure with the switches implemented in the ASIC and driven at 32768 hz. as derived from the real time clock crystal. A complementary drive method is used to minimize the number of diodes and capacitors at the expense of doubling the bias voltage of the capacitors, which is trivial in this case. The configuration is a negative voltage tripler operating from the 5 volt power supply that powers the ASIC. The signals PHZ1_32KHZ and PHZ2_32KHZ are driven by high current buffers in the ASIC. Capacitors C11, C12 and C13 pump charge which is stored on capacitor C1. The voltage V-12 is nominally -15 volts +4 diode drops (through CR1 and CR2) or approximately -12 volts. V-12 powers 5 MC33174D op-amps U2-A, U2-B, U1-A, U1-B and U1-C which are connected to a voltage divider string consisting of resistors R4, R8, R13, R9, R5, R6 and R10. The top of the string generates the most positive voltage V1, and the bottom of the string generates the most negative voltage V6. The bottom voltage V6 is created by an inverting amplifier U1-D which converts a positive voltage VLCD to a negative voltage scaled by -4.75 times. The voltage VLCD is created by a pulse width derived D-A converter which is developed by the H8 processor using the pulse width modulated output at U10 pin 10 P4.1_TMCO0 integrated by resistor R46 100 K$\Omega$ and capacitor C21 1$\mu$F. Contrast control to the LCD display is accomplished by changing the pulse width value of this output to change the value of the step voltage V6 and all of the other step voltages proportionately.

The 66108 display controller/driver controls the graphic display by multiplexing the common and segment lines indicated in Figure 2-2. The multiplexing technique is unique to liquid crystal displays in that the drive voltage between the common and segment lines must contain no DC component, but there is a voltage threshold that causes an individual pixel element to be activated. The multiplexing method involves applying differential stepped AC drive voltages to the common and segment lines such that pixels that are to be activated receive a differential AC voltage above the switching threshold. The multiplexing waveforms are as shown in Figure 2-3.

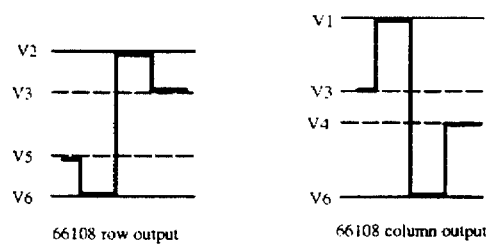

Figure 2-3
LCD Multiplexing Waveforms

The row and column multiplexing and driving circuits are completely contained in the display module. A further description of the LCD multiplexing technique may be found in the RT1000 Theory of Operation, Norand document 561-014-029.

2.15 Display Backlight

The TM1100 display module contains an integral electroluminescent backlight panel for operation in low light environments. Generation of the high voltage AC power supply required to energize the electroluminescent panel is accomplished on the TM1100 circuit board. The electroluminescent drive circuit consists of logic in the ASIC, external switching transistors Q7-A and Q7-B, a toroidal transformer T1, diode CR6 and optically isolated SCRs U12 and U13 with drive waveforms as shown in Figure 2-4. The drive method involves driving the transformer T1 via the ASIC signal QPH1 Q7-A at a 115 Khz rate for 8 cycles with SCR U13 turned on which causes the voltage at the panel EL (waveform 5) to ramp up to approximately 50 volts. SCR U12 is then turned on which causes the stored charge in the capacitive electroluminescent panel and capacitor C49 4700 pf. to flow through the transformer secondary. As the current builds up, reaches its peak and begins to decay, charge is delivered back to the electroluminescent panel in the reverse direction which causes the panel voltage EL to become negative. After this polarity reversal has been concluded, the ASIC signal QPH2 causes 8 pulses at the 115 khz rate to be driven in the reverse direction through the transformer T1 via Q7-B which further drives the voltage EL to -50 volts. Waveforms 1 and 2 illustrate the pulsed drive voltages to transistors Q7-A and Q7-B. Waveforms 3 and 4 indicate the drive signals to SCR switches U13 and U12. Waveform 6 indicates the current required from the power supply BATT+ and the filter capacitor C43 33 µF. to the center tap of the transformer T1, and waveform 7 indicates the current flow through the electroluminescent panel itself. The frequency of a complete cycle as illustrated from the time T1 to time T7 is 920 hz.

Control and timing of the signals shown is generated by the digital ASIC U4. Timing is provided by the 18.432 Mhz processor crystal which is divided down to develop the necessary frequencies. The frequency of the 8 pulses is 115 khz, with duty cycle modulation of the pulse width to allow modification of the output voltage and resulting panel brightness. The duty cycle of the drive pulses is adjustable by the processor in 16 - 2.5% steps from 20% to 57.5%. The initial duty cycle after reset is 20%.

The optically isolated SCR switches are somewhat unique devices in that they switch on with a coincidence of the optical drive and gate current. To insure that the switch stays on during the entire pulsing time, the optical drive is maintained for the whole time. The gate current for U13 is provided through resistor R65 22.1 kΩ and capacitor C34 1000 pf and for U12 through R63 22.1 kΩ and C28 1000 pf. The theory of operation

LED drive current for U13 and U12 is limited by resistors R70 and R81 392Ω.

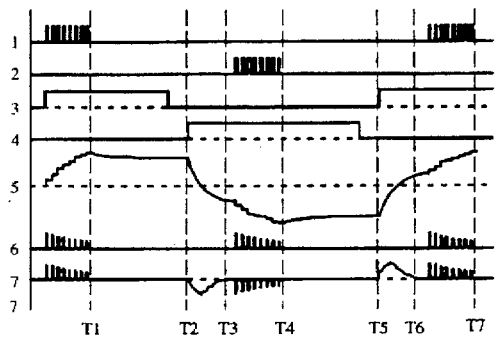

Figure 2–4 *LCD Backlight Drive Waveforms*

2.16 Keyboard

The TM1100 keyboard is an elastomer rubber type with carbon plunger switches that short printed circuit traces to make contact closure. There are a total of 47 keys organized as shown in Figure 5. The keys are identified by the H8/325 processor using a scanning crosspoint matrix technique with the exception of the ON/OFF key, which has both of its contacts brought out separately. The keyswitch row and column locations are as indicated in Table 2-3.

Table 2–3 *Keyswitch matrix locations*

|       | COL 0 | COL 1 | COL 2 | COL 3 | COL 4 | COL 5 |
|-------|-------|-------|-------|-------|-------|-------|
| ROW 0 |       | A     | F     | K     | P     | U     |
| ROW 1 | SK1   | B     | G     | L     | Q     | V     |

Table 2–4 *Keyswitch matrix locations (cont.)*

|       | COL 0 | COL 1 | COL 2 | COL 3 | COL 4 | COL 5 |
|-------|-------|-------|-------|-------|-------|-------|
| ROW 2 | SK2   | C     | H     | M     | R     | W     |
| ROW 3 | SK3   | D     | I     | N     | S     | X     |
| ROW 4 | SK4   | E     | J     | O     | T     | Y     |
| ROW 5 | Z     | 7     | 4     | 1     | CLR   | SHF   |
| ROW 6 | A–a   | 8     | 5     | 2     | 0     | ▼     |
| ROW 7 | NO    | 9     | 6     | 3     | ENTER |       |

The keys labelled SK1–4 are the special function keys located in the row above the alpha keys beside the ON/OFF key. Key definitions are custom programmable under control of the 80C188EB. The physical key is detected and identified by the key scanning program in the H8/325, while the key logical value may be modified by the 80C188EB. Identification of closure of an individual key is done by first detecting that there is closure of at least one key. The row lines of the key matrix are all connected to port 1 outputs of the H8/325 which are driven low when key input is to be received. The column lines COL0 – COL5 are H8/325 processor port 2 inputs that have internal pullups to +5 volts. When no keys are pressed, the column inputs to the processor will all be high. When any key is pressed, the processor will read the column input port in its 10 msec. cyclic input sampling program, and will detect that the column port input is not all high. The individual key is identified by selectively driving each row line low and reading the column input port. The activated key is identified as the key that resides in the selected row whose column input is low. Identification of an activated key may require as few as one theory of operation to as many as 8 steps depending on which key is activated. Because the keyswitch is an electromechanical contact, there is associated switch bounce which causes the input signal to oscillate between its closed and open states for a period of a few milliseconds. This switch bounce is handled by repeatedly reading the column line inputs until the states have not changed for 30 msec., at which time the key input is received and processed. Note that the power-on key is brought out separately as a single pole/single throw switch for control of the power control latch. This key is identified to the scanning matrix by use of an isolation diode CR3 such that when the switch is pressed, the COL0 line is pulled low with no ROW line driven by the H8/325, which can occur under no other condition.

The keyboard interfacing method described here is intended to be used with only a single key pressed at a time. If more than one key is pressed, it is possible that one of the keys will be received correctly, although some ambiguity may exist depending on which keys are pressed. In general, it is assumed that pressing multiple keys simultaneously is an improper operation, and an error may result.

As key input is detected by the H8/325 processor, the 80C188EB is alerted and the key codes are transferred to the 80C188EB application program in a manner similar to a typical personal computer.

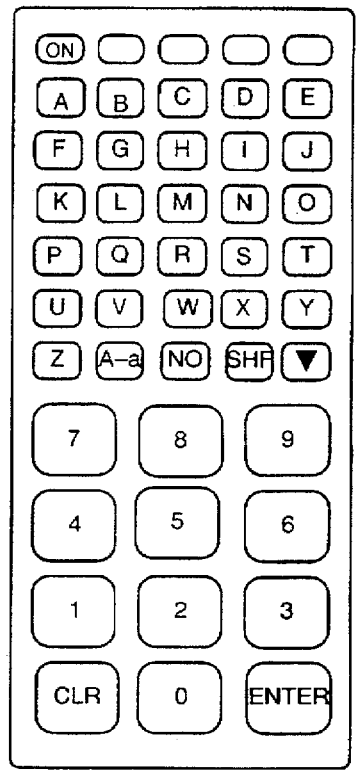

Figure 2-5 *Keyboard Layout*

2.17 Expansion Module Interface

The TM1100 terminal has the facility for a separately removeable module which may contain a variety of peripherals including radio transceivers, scanners, modems, automatic identification units or memory of several types. At the initial introduction of the TM1100, the expansion module will contain either a radio module or will be a blank unit utilizing only the basic terminal memory and peripherals.

theory of operatio.

The expansion module connectors are divided into three sections defined as follows:

Table 2-5 *Expansion Module Connector J1, Pin Definition*

| PIN | SIGNAL LEVEL | I/O | DESCRIPTION |
|---|---|---|---|
| 1 | 0–20 volts | I | CHARGE |
| 2 | 0–+BATT | I/O | ON/OFF |
| 3 | (future) | I/O | RADGP0 |
| 4 | (future) | I/O | RADGP1 |
| 5 | (future) | I/O | RADGP2 |
| 6 | (future) | I/O | RSDGP3 |

Table 2-6 *Expansion Module Connector J2, Pin Definition*

| PIN | SIGNAL LEVEL | I/O | DESCRIPTION |
|---|---|---|---|
| 1 | +BATT | O | BATTERY VOLTAGE |
| 2 | 5 volt logic (pullup in radio module) | O | RADIO ON |
| 3 | 5 volt logic (pullup in radio module) | O | PTT |
| 4 | 5 volt logic (pullup in radio module) | I | RXDATA |
| 5 | 5 volt logic (pullup in radio module) | O | TXDATA |
| 6 | 5 volt logic (pullup in radio module) | O | SP48_96 |

Table 2-6 *Expansion Module Connector J2, Pin Definition (continued)*

| PIN | SIGNAL LEVEL | I/O | DESCRIPTION |
|---|---|---|---|
| 7 | 5 volt power | O | +5V |
| 8 | Test signal | I | RX_AUDIO |
| 9 | 5 volt logic | O | TXDC188 |
| 10 | 5 volt logic | I | RXDC188 |
| 11 | Test signal | O | TXFO |
| 12 | Ground | I/O | GROUND |

Table 2-7 *Expansion Module Connector J3, Pin Definition*

| PIN | SIGNAL LEVEL | I/O | DESCRIPTION |
|---|---|---|---|
| 1 | 5 volt logic (pullup on CPU board) | I | DATA |
| 2 | 5 volt logic (pullup on CPU board) | I | SOS |
| 3 | 5 volt logic (pullup on CPU board) | I | RSTRIG |
| 4 | Buffered +5 volts | O | RENABLE |
| 5 | Switched +5 volts | O | VSCAN+ |
| 6 | Buffered 5 volt logic | O | BUZZER | theory of operation

2.17.1 Radio/Scanner Interface Signal Descriptions

2.17.1.1 BATT+ (P2-1)

BATT+V is the +7.2 volt positive battery terminal. This signal is unswitched, so the expansion module must be switched so that the off state current consumption is virtually zero. The power is switched by RADION and +5V.

2.17.1.2 RADION (P2-2)

RADION is the basic power control for the expansion module. When this signal is high, the expansion module is powered off.

2.17.1.3 PTT (P2-3)

PTT enables the expansion module transmitter when driven low.

2.17.1.4 RXDATA (P2-4)

RXDATA is the received data from the expansion module.

2.17.1.5 TXDATA (P2-5)

TXDATA is the transmitted data to the expansion module.

2.17.1.6 SP48_96 (P2-6)

SP48_96 is the data rate select to the expansion module. When low, the data rate is 4800 bps, and when high the data rate is 9600 bps.

2.17.1.7 +5V (P2-7)

+5V is the regulated +5 volt power from the terminal.

2.17.1.8 RX_AUDIO (P2-7)

RXAUDIO is a signal generated by the expansion module that is used only for test purposes and is not connected on the processor board. RXAUDIO is the raw received analog signal from the radio transceiver.

2.17.1.9 TXDC188 (P2-9)

TXDC188 is the serial async transmitted data line from the 80C188EB processor and may be used for high speed communication without delay through the H8/325 processor.

2.17.1.10 RXDC188 (P2-10)

RXDC188 is the serial async received data line from the 80C188EB processor and may be used for high speed communication without delay through the H8/325 processor.

2.17.1.11 TXF0 (P2-11)

TXF0 is a test signal from the H8/325 processor. When the expansion module is an RF transceiver, TXF0 is driven into the radio module to force the transmitter to output the unmodulated center frequency.

2.17.1.12 GND (P2-12)

Ground.

2.17.1.13 DATA (P3-1)

DATA is the signal from the integrated scanner corresponding to the widths of bars and spaces of the bar code being read.

theory of operatio

2.17.1.14 SOS (P3-2)

SOS is the Start Of Scan signal from the integrated scanner which indicates the position of the scan field.

2.17.1.15 RSTRIG (P3-3)

RSTRIG is the trigger switch for the integrated scanner. When the trigger is actuated, RSTRIG is shorted to ground.

2.17.1.16 RENABLE (P3-4)

RENABLE is the enable control for the integrated scanner. The scanner is enabled when RENABLE is high.

2.17.1.17 VSCAN+ (P3-5)

VSCAN+ is the power for the integrated scanner. The VSCAN+ voltage is regulated to +5 volts and is switched by the processor.

2.17.1.18 BUZZER (P3-6)

BUZZER is the drive signal from the processor that drives the buzzer located in the radio/scanner module. This signal is a square wave driven at the buzzer frequency.

2.17.2 Radio Communications

The TM1100 terminal has capability to be used either as a self-contained batch memory terminal or as an on-line radio terminal depending on the type of expansion module that is used. In addition, several types of radio transceivers may be used for on-line communications. In each case, the radio module consists of analog signal processing circuits and a radio transceiver to perform an equivalent "modem" function such that the terminal is able to receive and transmit data to the remote base transceiver which is typically connected to a host computer. The communication protocol is dependent on the type of radio transceiver used. The two basic radio modules that will be used initially in the TM1100 terminal are the narrowband UHF module operating in the 450-470 Mhz range, and a wideband direct sequence Spread Spectrum transceiver operating in the 902-928 Mhz range. The UHF module is used for compatible communications with the RT1000, RT2210 and RT3210 products with the Enhanced Adaptive Poll protocol, while the SST module is used in advanced high speed applications.

Operation of the radio module in UHF applications is controlled by the H8/325 processor with the Enhanced Adaptive Poll protocol implemented in the H8/325 masked ROM so that the 80C188EB processor may be be powered off during the time that data is transmitted and received. When a block is received and buffered in the on-board RAM of the H8/325, the 80C188EB processor is alerted and the data is rapidly transferred from the H8/325 to the 80C188EB. Power to the UHF radio module is switched under the control of the RADION signal, which places the radio in the receive mode. Data transmission occurs when the PTT signal is driven low which keys the radio transmitter. Data is received on the RXDATA line and is transmitted on the TXDATA line at 4800 bps according to the Advanced Adaptive Poll protocol definition.

Operation of the Spread Spectrum (SST) radio module is somewhat different from the UHF module. The program residing in the Flash EPROM of the 80C188EB is modified for the special interface requirements of the SST module. A key difference in the SST module over the UHF module is that the SST module has its own self-contained microprocessor to control the communication protocol and data handling. This is made necessary by the 192,000 bps data rate and HDLC protocol used by the

*theory of operation*

SST system which is more complex than the resident H8/325 processor in the TM1100 is able to support. Consequently, the SST module has built-in facilities for the protocol requirements and a direct interface to the 80C188EB processor through the RXDC188 and TXDC188 signals. Power control is still handled by the H8/325 so that the 80C188EB is in its lowest power operating state until data must be handled for transmission or reception.

2.17.3 Integrated Scanner

Signals are included on the expansion module interface to support an integrated scanner of several types similar to the cable attached moving beam scanners. Several of the integrated scanner interface signals are identical to the cable attached scanner signals including SOS, DATA and VSCAN+. The RSTRIG and RENABLE signals are specifically received from the integrated scanner to determine when the operater has depressed its trigger switch and desires for that scanner to operate. A more detailed description of the scanner interface is included in section 3.9.

2.18 Scanner Interface

The external scanner interface consists of a "de facto" industry standard locking 9-pin "D" subminiature connector with interface circuits to the processor. Operation of a typical moving beam scanner is initiated by the operator depressing the trigger switch, which shorts the TRIGGER line (pulled up to +5V through 2.21kΩ resistor R50) to ground. This signal, like all of the lines connecting to the external connector, is passed through an ESD protection network consisting of a resistor and tranzorb. In the case of the TRIG line, the resistor is R51 2.21kΩ and the tranzorb is TZ2-B. The clamped signal is connected directly to an input port to the H8/325 processor. When TRIG is activated, the H8/325 processor responds by asserting ENABLE high to enable the scanner to operate. This is accomplished by driving the signal ENABLEL low which turns on transistor Q10 FMA8. The transistor emitter is tied to +5V, so the transistor collector voltage is switched to nearly +5V. The ENABLE output is routed through ESD protection consisting of TZ1-D and 392Ω R78 to the 9 pin connector.

As soon as ENABLE is received by the scanner, it will shortly begin outputting SSOS which is an approximately square wave indicating the area of the scanning field. The SSOS signal is pulled up through 2.21KΩ R47 and coupled through ESD protection network 2.2KΩ R48 and TZ1-C to the H8/325 processor. As soon as a bar coded label is placed in the scanning field, information is encoded on the SDATA output which is representative of the bar and space widths of the code. The SDATA signal is pulled up through 2.21KΩ R49 and is coupled through ESD protection network 2.21KΩ R45 and tranzorb TZ1-B to the H8/325 processor.

As soon as the H8/325 processor determines that the TRIGGER switch has been activated, it immediately alerts the 80C188EB processor which has high speed counters on board for high resolution signal capturing. Scan decoding is performed by the 80C188EB by converting the signal received on the SDATA line to digital counts that are proportional to the widths of the signal pulses, which of course are representative of the widths of the bars and spaces. Once all of the counts are captured, decoding of the encoded information proceeds. The TM1100 may contain decoding algorithms for any number of bar code types. Any or all of these algorithms may be enabled depending on configuration settings in the terminal. The decoding procedure attempts to decode the stored counts using all of the enabled algorithms until all possibilities have been exhausted. If none of the algorithms results in theory of operatio.

a successful decode, the count acquisition process is repeated until the operator releases the TRIGGER switch.

Scanning is only allowed when the TM1100 terminal firmware enables the VSCAN+ power line to the scanner. This signal may be enabled either by command from the host computer or under control of the 80C188EB application program which indicates that scan data entry is allowed for the next input. VSCAN+ is switched under the control of the SCANPWR signal which is generated by an H8/325 processor output port. The port output is connected to the gate of P-channel FET Q9-A SI9953 which is configured as a high-side switch. When the gate signal SCANPWR is driven low, the VSCAN+ output sources current from the VCC power bus. Q9 turn-on is slowed by 1KΩ resistor R90 and .1µF capacitor C50 to limit the step load transient current. ESD protection and filtering are provided by tranzorb TZ2-D and .1 µf capacitor C44.

Many typical external cable connected scanners have a built-in LED that provides an indication to the user when a successful scan has been completed. Source drive current for this LED must be provided by the controlling equipment, in this case the TM1100 terminal. The circuit that drives this LED consists of the signal SCNLEDL generated by an H8/325 processor output port which is connected to transistor Q10 FMA8 whose emitter is tied to +5V. The collector of Q10 is connected through ESD protection network TZ1-A and 392Ω R84 to the output connector. The LED is consequently turned on by driving the processor output port signal SCNLEDL low which turns on Q10 and drives SCNLED high to the scanner. Note that the SCNLED pin is also used as a test facility for the UHF radio RX_AUDIO signal. This signal is connected to the pin through a 0.1µf. capacitor C46 so that there is no interference with the normal operation of an LED driving circuit, but the low level audio signal can be observed on this signal line if the scanner is removed.

The integrated scanner is operated similarly to the cable attached scanner. The integrated scanner actuation indication is the RSTRIG signal which is connected to an input port of the H8/325 processor. The integrated scanner is enabled to read when the RSENABLE output of the processor is activated. This output is connected to the gate of FET Q9-B SI9953 configured as a high side switch to +5V. When the H8/325 processor drives the RSENABLE line low, the RENABLE line is driven high to the integrated scanner. Since there are separate trigger and enable controls for the cable attached and integrated scanner functions, it is possible for the TM1100 to actually operate with two scanners connected.

2.19 Power Control

Power for operation of the TM1100 terminal is provided by a 6 cell NiCad battery pack. The pack configuration is the industry standard Motorola P10™ type consisting of 6-2/3A$_f$ cells with built-in short-circuit protection. The nominal capacity of the P10™ pack is 600 ma-hrs.

The power-on control of the TM1100 is controlled electronically rather than by a mechanical switch. The ON/OFF key is a momentary contact elastomeric switch which grounds the ON_OFF signal. A cross-coupled latch consisting of NAND gates U11-B and U11-C CD4093 powered directly by the battery is the latching device that turns power on and off. Set/reset operation of the latch with only a single-throw single-pole switch is accomplished by using a 10kΩ pullup resistor R54 and two R-C time delay circuits. The short time constant is implemented by 10KΩ resistor R53 and .1 µf capacitor C27, and the long time theory of operation constant is implemented by 1.2MΩ resistor R52 and .1μf capacitor C24. Power is turned on by momentarily depressing the power–on switch which causes the set input of the latch at pin 8 of CD4093 U11–C to go low quickly. The long time constant at the reset input of the latch at pin 6 of CD4093 U11–B causes the reset input to be held high for several seconds after the switch is depressed. Consequently, if the ON/OFF key is depressed for a time shorter than this time constant, the set input will prevail and set the latch output. If the ON/OFF key is depressed for a time longer than this time constant, both the set and reset input will be held low for the time that the key is depressed, but the set input will go high much sooner than the reset input, so the latch will be reset. The result of this configuration is that the unit will be powered off by pressing and holding the ON/OFF key for a time longer than the time constant of the reset input. This time is nominally around 3 seconds. The NAND gates used to implement the power control latch are Schmitt trigger input types to properly handle the very slowly changing inputs and prevent oscillation or mistriggering as the R–C voltages charge and discharge. The supply voltage for the CD4093 is created by the 15 volt MMBZ5245 zener diode Z2, limiting resistor 2.21KΩ R55 and 10μF capacitor C26 which prevents overvoltage from being applied to the CD4093 if the battery pack is removed while the unit is connected to a charger.

The output of the latch controls the TM1100 voltage regulator by driving the gate of a P–channel MOSFET Q5 ZVP3306 which switches the base current path for the regulator pass transistor Q6 XT2907A. The voltage regulator uses an LP2951 REG1 as the regulator controller with the external pass transistor. Since the quiescent current consumption of the LP2951 is quite low, it is possible to configure the external pass regulator such that the regulator is powered by the bias current for the pass transistor. Regulation is performed by controlling the base current of the external pass transistor through the output of the LP2951 to ground. The maximum base current is limited by tying the LP2951 output to ground through a 392Ω limiting resistor R59. The LP2951 has a built–in voltage reference and feedback ratio for +5V regulation which is implemented by connecting the SENSE input to the regulated output and connecting the +5VTAP to the FEEDBACK input. The +5VTAP is a tap in a voltage divider resistor circuit internal to the LP2951 that accurately sets the output voltage to +5V.

Power is turned off by resetting the power control latch which turns Q5 off. The bias current to the XT2907A pass transistor Q6 is switched off, and the 4.75KΩ back bias resistor R64 insures that Q6 doesn't leak any current. Power is switched off by the operator depressing the ON/OFF key momentarily which alerts the H8/325 processor that a shutdown sequence has been initiated. The H8/325 then signals the 80C188EB to prepare to shut down and then drives transistor switch Q3 FMG2 with the signal PWRDN to reset the power control latch. The H8/325 may also initiate a shutdown sequence when it senses that the battery voltage has discharged to its lower limit to prevent excessive discharge of the battery.

Filtering of the regulated output voltage for noise and stability considerations is provided by capacitors C37 100 pf and C32 33μf. Capacitor C30 100pf is required for stability of the regulator. Capacitor C31 1000 pf is a noise by-pass capacitor.

2.20 Battery Charger

The NiCad batteries used in the TM1100 terminal are rechargeable batteries that require constant current charging. The basic charge circuit consists of transistor Q8 XT2907A, par- theory of operation allel 100Ω resistors R82, R79 and R89, zener diode Z3 MMBZ5229B 4.3 volts, and resistor R74 1.00KΩ. Current regulation is performed by regulating the voltage across the 33Ω equivalent resistance of the parallel resistors R82, R79 and R89. When voltage is applied to the CHARGE input, current flows through the 33Ω resistance, through the emitter to base path of Q8 and through R74 to ground. As this current flows through the 33Ω resistance, the voltage across the 33Ω resistance increases while the Vbe between the emitter and base of Q8 remains relatively constant. When the sum of the voltage across the 33Ω resistance and the Vbe of Q8 reaches 4.3 volts, the zener Z3 begins to divert current away from the the 33Ω resistance path through R74. This 4.3 volt constraint causes 4.3 volts -.7 volts or 3.6 volts to appear across the equivalent 33Ω with a resultant current of 110 ma. The temperature coefficient of Q8 and Z3 are nearly identical, so the current will change little as temperature changes. Diode CR7 prevents the charge circuit from discharging the battery if the charger is not connected. Zener diode Z2 limits the voltage that will be present if the battery is removed while the unit is connected to a charger so that no components will be damaged by excessive voltage under these conditions. TZ4 prevents damage to the charge circuits by ESD. The base of transistor Q3 FMG2 is driven by the application of voltage to the CHARGE line which causes the CHGSENSE signal to be driven low indicating that the terminal has been connected to a charger. Gates U11-A and U11-D prevent application of the battery sense voltage when the processor is turned off.

A duplicate of the basic charge circuit consisting of Q2 XT2907A, 100Ω resistors R60, R68, and R61, zener diode Z1 MMBZ5229B, transistor switch FMC3 and resistor R52 1.00KΩ is used to provide additional charge current to the battery when high current consumption devices such as the Spread Spectrum radio transceiver are operating. This additional charge current is enabled under the control of the XTRA_CHARGEH signal which determines that the terminal is not in the standby low current consumption state.

2.21 Battery Voltage Sense

While the H8/325 processor has no built-in A-D or D-A converters, these functions can be created using its pulse width modulated outputs along with a simple lowpass filter consisting of R38 47.5KΩ and C19 1µF to smooth the pulsing frequency. As mentioned in section 3.5, an H8/325 processor PWM output port is used to control the LCD negative bias voltage. The battery voltage sense is controlled in a similar fashion except that the PWM generated analog voltage is used as a test voltage for a successive approximation analog to digital converter with the use of an external comparator U7-A and sense resistors R32 47.5KΩ, R33 47.5KΩ, hysteresis resistor R44 1MΩ and noise filter capacitor C18 100 pf. A test voltage consisting of 50% of the full scale voltage is applied to the – input of the comparator and the output is sampled to see if it is low or high. If the output is high, it is indicated that the sensed battery voltage is higher than the test voltage, so the MSB of the binary value is a "0" and the next bit is tested. If the output is low, the sensed battery voltage is lower than the test voltage, so the MSB is a "1", and so on. Using this method, it is possible to measure the battery voltage to approximately 6 bits of resolution with good repeatability.

2.22 External Serial Interface

The TM1100 terminal includes both RS-232 and RS-485 interface facilities either of which may be enabled or both may be disabled to conserve power. Both interfaces use the mini- theory of operation

DIN connector with the ERXDA and ETXDA signals shared by both.

The RS–232 signals are generated and received by a MAX242 U14 which contains a ±12 volt power supply circuit and high voltage drivers and receivers. The ±12 volt supply uses 0.1 µf capacitors C39, C401, C41 and C42 to generate those voltages from +5 volts using the charge pump technique. The MAX242 is placed in its shutdown mode by the SHUTDN signal from the H8/325 processor to conserve power when it is not being used. ESD protection of the RS–232 signals is provided by resistors R71, R88, R76 and R72 1KΩ, and tranzorbs TZ3–A,B,C and D. ECTSA is tied through resistor R75 100KΩ for a default "off" condition.

The RS–485 interface consists of an LTC485 CMOS RS–485 transceiver integrated circuit which may be enabled when the MAX242 RS–232 driver is disabled. The driver enabling is done under the control of the H8/325 processor as part of the terminal configuration function. When the LTC485 is enabled, its receiver is turned on by the H8/325 driving the REN485 signal low, and its transmitter is turned on similarly by driving the TXDEN485 high. The outputs of the MAX–242 are turned off by driving its EN input through inverter connected comparator U7–B when the REN485 signal is driven low. The outputs of the LTC485 are connected to the connector pins through pullup resistor 100KΩ R85 and series resistor 17.4Ω R86 and pulldown resistor 100KΩ R87 and series resistor 17.4Ω R77 to hold the proper default levels on the RS–485 lines while providing ESD protection. When the LTC485 drivers and receivers are off, the LTC485 device presents a high impedance to the multidrop bus. In addition to meeting the RS–485 multidrop requirements, this also allows sharing of the pins in the mini-DIN connector with the RS–232 RXD and TXD lines.

In the cases of both the RS–232 and RS–485 interfaces, the received and transmitted data is routed to the 80C188EB processor serial port 0 which allows direct interaction with the application program and communication structures typically required. In general, operation of the serial port will be a high current consumption mode, since it is necessary for the 80C188EB to be operating to support the communication function.

2.23 ASIC

As has been mentioned at several points, a significant portion of the functionality of the TM1100 is implemented in a digital ASIC. Figure 2–6 is an outline of the ASIC, showing pin locations and signal names. Table XX defines each signal name and describes the functin of each. The ASIC provides the processor clocks, real time clock, memory decoding, processor intercommunication, backlight drive and miscellaneous functions that otherwise would require a significant number of integrated circuit devices to implement.

The ASIC is primarily a bidirectional interface chip linking the 80C188 processor with the H8 processor. Logic within the ASIC controls data flow through the 8 bit bus. Also part of the ASIC are a 32 bit real time clock, backlight controller/driver circuit, an 11 bit address latch for the 80C188 processor, and two oscillators—one 32,768 Hz oscillator and one 18.432 MHz oscillator. The two oscillators provide timing signals for the ASIC, H8 processor, and backlight circuitry.

Refer to figure XX. The ASIC must always have power applied to maintain the real time clock (RTC). To reduce power consumption, power management logic is provided by the VCC_VH signal. When VCC_VH is at logic 0, the ASIC is in the low power consumption state. During this state, only the 32,768 Hz os- theory of operatio.
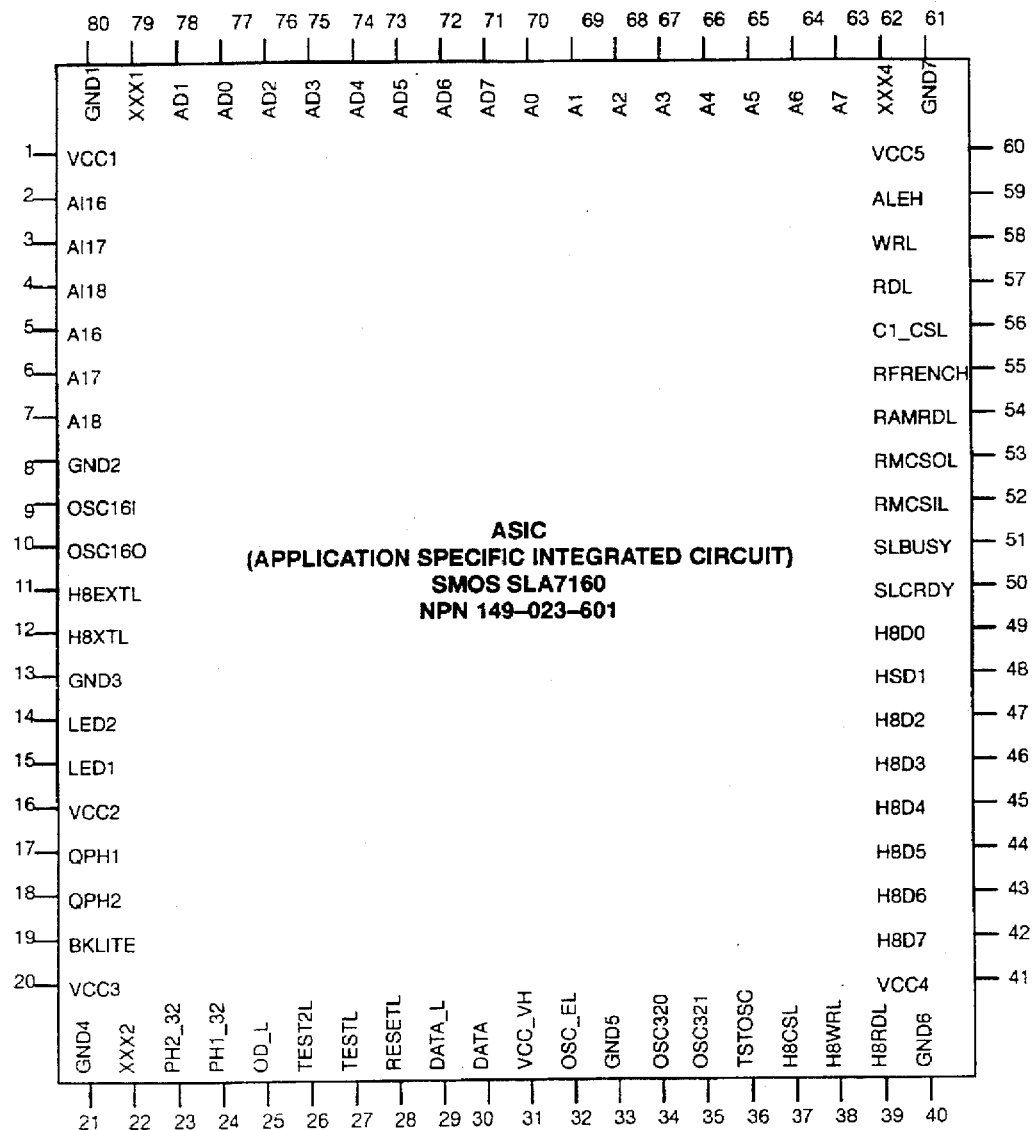
Figure 2-6 ASIC Outline theory of operation cillator and RTC are powered. The 18.432 MHz oscillator is stopped and the following inputs are pulled to logic 0 through pull down resistors:

| | | | |
|---|---|---|---|
| BKLITE | H8CSL | H8D (7:0) | WRL |
| DATA | AI16 | AD (7:0) | AI18 |
| H8WRL | C1_CSL | AI17 | RFRENH |
| H8RDL | RDL | RMCSIL | ALEH |

Table 2-8 *ASIC Pin Name Definitions and Descriptions*

| PIN | NAME | DESCRIPTION |
|---|---|---|
| 1, 16, 20, 41, 60 | VCC | tbd |
| 2 thru 4 | AI16 thru AI18 | Highest three bits of address data from the 80C188 processor |
| 5 thru 7 | A16 thru A18 | Highest three bits of address data applied to te 80C188 address bus (latched by ALEH—pin-59) |
| 8, 13, 21, 33, 40, 61, 80 | GND | Ground |
| 9 | OSC16I | Input from crystal for 18.432 MHz oscillator circuit |
| 10 | OSC16O | Output to crystal for 18.432 MHz oscillator circuit |
| 11 | H8EXTL | Inverted clock signal, referenced to pin-13 (H8XTL) |
| 12 | H8XTL | Clock signal for H8 processor. Frequecy equals 9.216 MHz, or one-half the 18.432 MHz oscillator frequency |
| 14 | LED2 | High source–current output for backlight power circuit (complimentry signal to LED1) |
| 15 | LED1 | High source–current output for backlight power circuit (complimentry signal to LED2) |
| 17 | QPH1 | Phase 1 drive signal for electroluminescent backlight transformer circuit (complimentry signal to QPH2). |
| 18 | QPH2 | Phase 2 drive signal for electroluminescent backlight transformer circuit (complimentry signal to QPH1). |
| 19 | BKLITE | Command signal from H8 processor that activates display backlight (active high). | theory of operation.

Table 2-9 *ASIC Pin Name Definitions and Descriptions (continued)*

| PIN | NAME | DESCRIPTION |
|---|---|---|
| 22 | XXX2 | Unused |
| 23 | PH2_32 | Buffered 32,768 Hz signal for −12 volt charge pump circuit (complimentry signal to PH1_32). |
| 24 | PH1_32 | Buffered 32,768 Hz signal for −12 volt charge pump circuit (complimentry signal to PH2_32). |
| 25 | OD_L | Disable signal for ASIC outputs except LED1, LED2, and oscillator outputs (active low). |
| 26 | TEST2L | Test input—used to inject clock signals. |
| 27 | TESTL | Test input—used as a control signal to configure internal ASIC circuitry for efficient testing. |
| 28 | RESETL | Reset signal used to initialize internal ASIC circuitry (active low). |
| 29 | DATA_L | Inverted output of input signal on pin-30 (DATA). |
| 30 | DATA | Received SCAN data (from bar code scanner). Signal is inverted in ASIC and output on pin-29 (DATA_L) |
| 31 | VCC_VH | VCC valid, active high. Indicates Main Power Bus is within specifications, and high power mode is available. |
| 32 | OSC_EL | Oscillator enable—connects test signal to 32KHz oscillator input to test oscillator operation. |
| 34 | OSC32O | Output to crystal from 32,768Hz oscillator circuit. |
| 35 | OSC32I | Input from crystal to 32,768Hz oscillator circuit. |
| 36 | TSTOSC | Test input to 32,768 Hz oscillator circuit—selected when OSC_EL is low. |
| 37 | H8CSL | H8 processor chip select signal (active low). |
| 38 | H8WRL | H8 processor write request (active low). |
| 39 | H8RDL | H8 processor read request (active low). |

Table 2-10 *ASIC Pin Name Definitions and Descriptions (continued)*

| PIN | NAME | DESCRIPTION |
|---|---|---|
| 42 thru 49 | H8D7 thru H8D0 | 8-bit data bus for H8 processor |
| 50 | SLCRDY | Indicates the H8 processor has written data (to be read by the C188 processor) to the latch (active high). |
| 51 | SLBUSY | Indicates the C188 processor has written data to the data latch. |
| 52 | RMCSIL | Psuedo-static RAM chip select request line from C188 processor (active low). |
| 53 | RMCSOL | Psuedo-static RAM chip select line to RAM chip (active low)—signal is active only when RMCSIL and VCC_VH are asserted and RFRS_EN is inactive (not asserted). |
| 54 | RAMRDL | RAM read request from C188 processor. |
| 55 | RFRENH | Prohibits psuedo-static RAM access during refresh (active high—generated by C188 processor). |
| 56 | C1_CSL | Strobe signal from C188 processor that latches the 3 least significant address bits of the C188 multiplexed data bus for the internal 1 of 8 decoder. |
| 57 | RDL | Read signal from C188 processor (active low). |
| 58 | WRL | Write signal from C188 processor (active low). |
| 59 | ALEH | Address latch strobe from C188 processor (active low). |
| 62 | XXX4 | Not used |
| 63 thru 70 | A7 thru A0 | 8 least significant bits latched from the C188 processor multiplexed data bus. |
| 71 thru 78 | AD7 thru AD0 | Multiplexed address/data bus for the C188 processor |
| 79 | XXX1 | Not used. |

2.23.1 H8 Interface

The H8 processor sends data to the 80C188 data bus by first placing the data on the H8 bus and asserting H8WRL and H8CSL. This latches the H8 data and asserts the SLCHRDY output, telling the 80C188 processor that data is ready for transfer.

The H8 processor receives data from the 80C188 when SLBUSY is asserted, indicating new data is in the data latch. When SLBUSY is asserted, the H8 processor asserts H8RDL and H8CSL, placing the new data on the H8 bus and clearing SLBUSY.

2.23.2 80C188 Interface

The 80C188 processor controls most functions performed by the ASIC. It can transfer data to or from the H8 processor, controls the operation of the backlight circuitry, and reads the RTC 32 bit value.

To send data to the H8, the 80C188 performs a two step function. The first step is to load address 06 into the address latch in the ASIC. In step two the 80C188 places data onto the bus and asserts C1_CSL and WRL. This latches the 80C188 data and asserts the SLBUSY output, telling the H8 processor data is ready for transfer.

To receive data from the H8 processor, SLCHRDY must be asserted, indicating new data is present in the address latch. When SLCHRDY is asserted, the 80C188 asserts RDL and C1_CSL. This places the data in the address latch onto the 80C188 data bus and clears SLCHRDY.

The 80C188 interface is memory mapped based on the three least significant address bits. Once the address is latched and C1_CSL is asserted, a read or write operation can occur.

*theory of operation*

The memory map for the 80C188 processor is shown in Table 2–11.

Table 2–11 *80C188 Memory Map*

| ADDRESS | OPERATION | FUNCTION |
|---|---|---|
| 0 | C188 read | Read byte0 of the RTC |
| 1 | C188 read | Read byte1 of the RTC |
| 2 | C188 read | Read byte2 of the RTC |
| 3 | C188 read | Read byte3 of the RTC |
| 4 | C188 write | Reset the RTC |
| 5 | C188 read | Read SLBUSY and SLCHRDY signals on data bus. |
| 6 | C188 read | Read latched H8 data and reset SLCHRDY signal. |
| 6 | C188 write | Latch C188 data bus and assert SLBUSY. |
| 7 | C188 read | Clear SLBUSY and SLCHRDY signals. |

2.23.3 Psuedo–static RAM Control

The ASIC controls the read and refresh operations of the psuedo–static RAM using its VCC_VH, RDL, and RNCSIL inputs, and its RAMRDL and RMCSOL outputs. Control of the psuedo–static RAM is described in Table 2–12, by showing the logic state of the ASIC psuedo–static RAM control lines for each RAM function.

2.23.4 Backlight Control

ASIC control of the electroluminescent backlight is accomplished with the ASIC's QPH1 and QPH2 outputs. QPH1 and QPH2 drive drive two FETS in the backlight power circuitry (refer to paragraph 3.6 Backlight), which then excite primary winding of the EL transformer.

The LED1 and LED2 outputs of the ASIC trigger the LED inputs on two optically isolated theory of operatio.

SCRs. The pump circuit creates the high voltage required by the backlight.

Table 2-12 *Logic Levels (by function) of ASIC Psuedo-static RAM Control Lines*

| ASIC INPUT LINES | | | | ASIC OUTPUT LINES | | |
|---|---|---|---|---|---|---|
| VCC_VH | RDL | RMCSIL | RFRENH | RAMRDL | RMCSOL | FUNCTION |
| 0 | x | x | x | 0 | 1 | Low power mode |
| 1 | 0 | 0 | 0 | 0 | 0 | Read RAM |
| 1 | 0 | 0 | 1 | 0 | 1 | Self refresh |
| 1 | 0 | 1 | 0 | 0 | 1 | Self refresh |
| 1 | 0 | 1 | 1 | 0 | 1 | Self refresh |
| 1 | 1 | 0 | 0 | 1 | 0 | Write RAM |
| 1 | 1 | 0 | 1 | 0 | 1 | Self refresh |
| 1 | 1 | 1 | 0 | 1 | 1 | Self refresh |
| 1 | 1 | 1 | 1 | 0 | 1 | Illegal operation | x = grounded   0 = logic low   1 = logic high

2.23.5 Real Time Clock

The real time clock in the ASIC consists of 8 four bit counters whose values are held in 32 latches. The 32 bit value of the RTC is read out as four seperate bytes. To prevent the output of the clock from being updated during a read, a second set of 32 latches is used to double buffer the clock output. The second set of latches, latches the clock value whenever the least significant byte is read. For a proper read to occur, the least significant byte of the RTC must be read before the remaining three bytes.

The RTC is updated every second, with its accuracy determined by the 32,768 Hz oscillator. A divide by 32,768 circuit in the ASIC determines the rate of the RTC.

The 80C188 processor can reset the RTC to zero by issuing a write to address04 (refer to the paragraph 80C188 Interface).

2.23.6 -12 Volt Pump Control

ASIC outputs PH1_32 and PH2_32 resonate at 32,768 Hz and are applied to a diode/capacitor pump circuit on the host circuit board (refer to paragraph 3.5 Display). The pump circuit uses these signals to produce a -12 volt supply.

APPENDIX C:

RT/DT 1100 RADIO DATA TERMINAL SPECIFICATIONS

©Copyright 1992 by NORAND CORPORATION

Compact, Pocket-sized Terminal Offers Scanning and Memory Capabilities Simply by Changing Modules The RT/DT1100 Terminals offer more options in a light weight, compact terminal that is one-third the size and half the weight of other terminals. The unique modular design allows the user to add capabilities simply by changing modules.

The base terminal can be purchased with your choice of modules to fit your specific needs. The integrated scanning version frees a user's hand for uninhibited key entry operation and for handling merchandise, while improving reliability.

The RT/DT1100 incorporates an LCD backlit display for high visibility in dark environments. The display can be programmed in a 4, 6, 8, or 9 line by 12 or 16 character format. This provides the user with the display screen flexibility to accommodate various applications.

The RT/DT1100 has dual processors for faster terminal performance and enhanced system distributed processing capability. This feature provides the end user with a tool for maximizing productivity.

Terminal emulation for 3270, 5250, 7527, NORAND* Native Mode (Async), and VT220 is supported by the RT1100 system. These emulations enable easy communications with networks operating SNA, TCP/IP, DECnet, and Async protocols. This allows easy integration into your existing system and gives you the freedom to work directly with host data from remote areas of your facility. You can also develop your own applications in MS-DOS compatible languages (MS-DOS V5.0 optional), or in Microsoft C.

The RT/DT1100 will support printers and other RS232 and multidrop RS485 interface devices. This connectivity provides the expansion capabilities to meet your changing needs.

If you only need batch data terminal functionality now, start with the DT1100, then upgrade to RF when you're ready. This modular architecture allows you to adapt to the changing demands of your environment while preserving your investment.

 +  OR 

TM1000 Terminal Module | Standard UHF Radio Module | Integrated Scanner UHF Radio Module

 +  OR  OR 

TM1100 Terminal Module | Standard UHF Radio Module | Integrated Scanner UHF Radio Module | Integrated Scanner SST Radio Module

 +  OR 

TM1100 Terminal Module | Standard Module | Integrated Scanner Module

Radio Data Terminal

FEATURES

* Flexible modular design provides added capabilities for less cost

* One-handed operation with integrated scanning options

* Terminal emulation for easy implementation

* MS-DOS compatible application environment

* Easy to install and service

NORAND
DATA SYSTEMS

*[Notice: ...tions Commission. The devices are not, and may not be, offered for sale or lease, or sold or leased until the approval of the FCC has been obtained.]*

PRODUCT FEATURES

Transceiver: Incorporates a 1 watt (UHF) frequency modulated (FM) radio transceiver controlled by the microprocessor. Type accepted per FCC Rules & Regulations, Parts 2 & 90. Private Land Mobile Radio Service

Liquid Crystal Display (LCD): 4, 6, 8, or 9 lines x 12 or 16 character with backlight and annunciators, plus full bit-mapped graphics capability

Keyboard: Elastomer 47-key alphanumeric

Annunciators: Fully programmable

Radio Module: Patented self-contained, interchangeable 1-channel radio module with built-in receiver self-test

Optional Modules: UHF or SST radio with CCD (up to 1" depth of field) or laser (0" to 30" depth of field) scanning

Radio Antenna: Screw-in antenna connects directly to the end of the radio module. Integrated scanning versions have an internal antenna

Processors: Two 16-bit microprocessors

ROM: 512 Masked plus 256K Flash

RAM: 512K Pseudo-static RAM

Terminal System Emulation: 3270, 5250, 7527, NORAND* Native Mode (Async), and VT220

Application Support: Microsoft "C" and "C" libraries; other languages with optional MS-DOS V5.0

Peripheral/Host Direct Connect Interface: 6-pin mini-DIN for RS232 and multi-drop RS485 interface devices

Drop Survival: Designed to withstand multiple 4-foot drops to concrete

Hand Strap: Incorporates a user replaceable, elastic hand strap to secure the terminal firmly in hand

Belt Attachment Point: Removable clip allows terminal to be fastened to the belt

Shielding: Conforms to FCC Part 15 for Class A computing devices

Audible Tone: Audible annunciator to alert operator of action

Scanner Interface: 9-pin D-subminiature connector for interface to 5-volt scanning peripherals with built-in scanning self-test

Electrostatic Discharge: Designed to withstand up to 20KV for Class C products

PHYSICAL DIMENSIONS

Size: 6.875" x 2.625" x 1.25" (LWD) (17.46cm x 6.68cm x 3.18cm)

Antenna Length: 2" (5.08cm)

Weight: 15.2 ounces (430.9g)

ENVIRONMENTAL CHARACTERISTICS

Operating Temperature: 32° to 122°F (-0° to 50°C)

Storage Temperature: -22° to 158°F (-30° to 70°C)

Recharging Temperature: 41° to 104°F (5° to 40°C)

Humidity: 10 to 90% noncondensing

Altitude: To 10,000 feet (3,048 meters) above sea level

INTERNAL POWER SOURCE

Battery Cells: Standard rechargeable nickel-cadmium battery pack

Voltage: 7.2 VDC (nominal)

Operating Time Between Charges: 8 hours typical, based on customer usage of 8 scans/transmissions per minute

RT1000 BATTERY PACK CHARACTERISTICS

Normal Recharge: 12 hours in terminal, 3-4 hours external

Pack Life: At least 500 discharge/charge cycles

Low Battery Indicator: Visual annunciator indicating low battery is displayed on the LCD

Charging Sources: AC adapter-type single terminal chargers and multi-battery pack chargers available

RADIO CHARACTERISTICS

Radiated Power: 1 watt (maximum)

Frequency Range: 450 to 470 MHz

RF Data Rate: 4800 baud

BAR CODE SCANNING SUPPORT

Bar Code Scanners Supported: CCD (5V), Visible Laser Diode (5V), Pen Wand (5V)

Bar Code Symbologies Supported: UPC, UPC with add-ons, EAN, EAN with add-ons, Code 39, Interleaved 2 of 5, Code 128, Plessey, Code 93, Codabar, ABC Codabar, Straight 2 of 5, Encoded Code 39, Extended Code 39

*The goal of Norand is 100% customer satisfaction. Customer Satisfaction Hot Line: 1-800-221-9236*

Norand Corporation
550 Second Street S.E.
Cedar Rapids, Iowa 52401
Phone: 319-369-3156
1-800-452-2757 toll free Norand International Corporation
and Norand (U.K.) Limited
5 Bennet Court, Bennet Road
Reading, Berkshire RG2 OQX
England
Phone: 44-734-861221
FAX: 44-734-861156

Norand Italia SRL
Via Caduti Di Melissa, 12
40033 Casalecchio Di Reno (BO)
Phone: 051-6130252
Fax: 051-6130254

Norand Data Systems, Ltd.
85 Citizen Court, Unit #1
Markham, Ontario
Canada L6G 1A8
Phone: 416-477-1818
1-800-633-6157 toll free
FAX: 416-477-2342

* Trademark Marca Registrada registered by Norand Corporation, Cedar Rapids, Iowa, U.S.A.
© Copyright 1992. All rights reserved. 960-353-205 Printed in U.S.A.

This document contains preliminary product specifications. In a continuing effort to improve our products, Norand Corporation reserves the right to change specifications and features without prior notice.

APPENDIX D:

A PORTION OF THE PROTOCOL STACK UTILIZED BY THE TM 1000

©Copyright 1992, 1993, by NORAND CORPORATION

```c
#define _DEBUG
/* ************************************************************* */
/*                                                                */
/*      ss_brid.c          rt1140/5940 sst bridge layer           */
/*      Phillip Miller                                            */
/*      version 24         7/1/94                                 */
/*                         post reset_error on tx_done            */
/*      version 23         6/28/93                                */
/*                         delete unnessary reset_error           */
/*      version 22         6/8/93                                 */
/*                         attach backoff only on detach          */
/*      version 21         6/4/93                                 */
/*                         post netword error in missing hello    */
/*      version 20         5/25/93                                */
/*                         do not rarp on base cost=0xffff        */
/*      version 19         5/19/93                                */
/*                         fix detach packet response             */
/*      version 18         5/10/93                                */
/*                         have h8 monitor bases                  */
/*      version 17         5/6/93                                 */
/*                         fix radio strength selection           */
/*      version 16         5/5/93                                 */
/*                         fix attach timeout sw                  */
/*      version 15         3/19/93                                */
/*                         lint version of version 14/msc ver 7   */
/*      version 14         3/11/93                                */
/*                         set high order bit on NETWORK_RESET    */
/*      version 13         3/5/93                                 */
/*                         move power management from hello to attach */
/*                         delete hello timers                    */
/*                         do not send attach to chan. acq err.   */
/*      version 12         3/3/93 fix TX DONE problems            */
/*      version 11         2/25/93 fix cost=0xffff logic          */
/*      version 10         2/18/93 require attach response        */
/*      version 9          2/16/93 fix radio strength selection   */
/*      version 8          2/12/93 fix version.base_adr           */
/*                                 remove self test 3             */
/*      version 7          1/28/93 change error handler           */
/*      version 6          1/15/93 remove test code               */
/*      version 5          1/14/93 fix tx_done                    */
/*                                 change init parms              */
/*                                 check for cost=0xffff in hello */
/*      version 4          1/11/93 check interprocessor data check */
/*      version 3          12/03/92 reset attach timer when data send */
/*      version 2          11/13/92 fix self test                 */
/*      Version 1          11/5/92 version control begins         */
/* ************************************************************* */
#define VERSION                                 24
#define BH_ROM_CODE_VERSION                     50
#define SPREAD_CODE                             0
#include         "bufpool.h"
#include         "ss_timer.h"
#include         "ss_brid.h"
#include         "errcodes.h"
#include         "brgerr.h"
#include         "llcbrg.h"
#include         "sst_ver.h"
#include         "say.h"
#define          RSSI_72DB_MARK         11
#define          RSSI_74DB_MARK         12
```

```c
#define         RSSI_76DB_MARK          13
#define         RSSI_78DB_MARK          14
#define         RSSI_80DB_MARK          15
/* ************************************************************ */
int             memcmp();
void *          memcpy();
unsigned int            strlen();
char *          strcpy();
void *          memset();
/* ************************************************************ */
static void             disable_mac();
static void             load_code();
static void             state_detach();
static void             enable_mac();
static void             send_hello();
static void             send_inquire();
static void             write_base_adr();
static void             sort_bases();
static void             write_terminal_adr();
static void             send_attach();
static void             send_rarp();
static int              find_rarp_optional_parm();
static void             post_llc();
static int              try_next_base();
static void             ck_for_out_data();
static void             process_attach_data();
static void             process_attach_timer_request();
static void             process_attach_write_request();
static void             process_attach_data_hello();
static void             process_attach_data_attach();
static void             process_attach_data_arp();
static void             process_attach_data_detach();
static void             wrt_int_buf();
extern int              _radio_write(unsigned char *,int);
static void             send_arp();
static void             send_data();
static void             write_lan_adr();
extern int              _radio_read();
static int              rd_long_id();
static int              rd_version();
extern void             _radio_ss();
extern void             _radio_ss_timer_init();
extern void             _radio_ss_update_timers();
static void             process_bridge();
static void             process_attach_data_data();
static void             set_power_management();
extern void             llc_evt_handler(T_EVENT _far *);
extern int              _sst_h8_code_load();
static void             small_delay();
static unsigned char    get_strength(unsigned char s);
/* ************************************************************ */ define DATA                    0
define TIMER                   1
#define WRITE_RESPONSE          2
#define ATTACH_TIMER            3
```

```
/* timeout const  all time are in .01 seconds */
#define HELLO_TIMEOUT_1             60
#define HELLO_TIMEOUT_2             200
#define RARP_TIMEOUT                300
#define ERROR_OFF_TIME              300
#define ATTACH_TIMEOUT              48000
#define ATTACH_SHORT_TIMEOUT        1000
#define ATTACH_BACKOFF_TIMEOUT      800
#define ARP_TIMEOUT                 500

/* retry const */
#define ARP_TRIES                   5
#define HELLO_TRIES                 3
define RARP_TRIES                  5 define MAC_DEST_ADDR               1
define MAC_SOURCE_ADDR             MAC_DEST_ADDR+2
#define RADIO_STRENGTH              MAC_SOURCE_ADDR+2
#define BRIDGE_CONTROL              RADIO_STRENGTH+1
#define BRIDGE_DEST_ADDR            BRIDGE_CONTROL+2
#define BRIDGE_SOURCE_ADDR          BRIDGE_DEST_ADDR+2
#define BRIDGE_PACKET_PARMS         BRIDGE_SOURCE_ADDR+2
#define BRIDGE_COST                 BRIDGE_PACKET_PARMS
#define BRIDGE_SEED_PRIORITY        BRIDGE_COST+2
#define RARP_NETWORK_ADR            BRIDGE_PACKET_PARMS+1
#define ARP_NETWORK_ADR             BRIDGE_PACKET_PARMS+1
#define BRIDGE_HELLO_OPTIONAL_FIELD BRIDGE_PACKET_PARMS+6
define BRIDGE_HELLO_ROOT_SEQ_NO    BRIDGE_PACKET_PARMS+5 static T_TIMER        bridge_timer;
static T_TIMER        attach_timer;
static T_TIMER        attach_backoff_timer;

static unsigned int   data_in_len;
static unsigned char  first_time_sw=0;

struct BASE_INFO
{
        unsigned char   strength;
        unsigned char   base_cost[2];
        unsigned char   radio_strength;
        unsigned char   base_priority;
        unsigned char   fil;
        unsigned int    base_short_adr;
};
static struct BASE_INFO bases[32];
static int              base_ptr;
static int              attach_timeout_type_sw;
static int              alias_len;
static char             alias_name[32];
static unsigned char    data_buf[1200];
static unsigned char    bridge_state=DETACH;
static unsigned char    terminal_long_id[6];
static unsigned int     terminal_short_adr;
static int              retry_cnt;
static int              arp_len;
static int              root_seq_number;
static unsigned int     root_id_len=0;
static unsigned char    root_id[32];
static unsigned char    attach_request_sw;
```

```
static unsigned char    write_request_sw=0;
static unsigned char    link_status_sw=LINK_DISABLED;
static unsigned char    inquire_sw=0;
static T_EVENT   _far   *tx_pending;
static SST_VERSION_CONTROL      sst_version;
static unsigned char    temp_out_buf[100];
static unsigned char    temp_in_buf[100];
static unsigned int     hello_reason_code;
static unsigned int     current_base=0;
static unsigned int     next_base;
static unsigned char    current_cost[2];
static unsigned char    next_cost[2];
static unsigned char    current_strength;
static unsigned char    next_strength;
static unsigned char    next_base_valid=0;
static char             rssi_valid=0;
static unsigned char    spread_code;
static unsigned char    rssi_tab[40];

/* ************************************************************ */
static void state_detach()
{
        disable_mac();
}
/* ************************************************************ */
/* ************************************************************ */
static void start_acquire_bases(int send_hello_sw)
{
        _radio_ss_timer_stop(&bridge_timer);
        _radio_ss_timer_stop(&attach_timer);
        retry_cnt=0;
        sst_version.base_short_addr=0;
        enable_mac();
        if(send_hello_sw)
        {
                send_hello();
        }
        else
        {
                bridge_timer.interval=HELLO_TIMEOUT_2;
                bridge_timer.periodic=0;
                bridge_timer.task_adr=0;
                say("BTS hw-1\n");
                _radio_ss_timer_start(&bridge_timer);
                bridge_state=DETACH_WAITING_FOR_HELLO;
                base_ptr=0;
        }
}
/* ************************************************************ */
static void state_detach_hello_write()
{
        bridge_timer.interval=HELLO_TIMEOUT_1;
        bridge_timer.periodic=0;
        bridge_timer.task_adr=0;
        say("BTS hw\n");
        _radio_ss_timer_start(&bridge_timer);
        bridge_state=DETACH_WAITING_FOR_HELLO;
        base_ptr=0;
}
/* ************************************************************ */
```

```
static void state_detach_waiting_for_hello(type)
        int     type;
{
        unsigned int    i;
        int             j;

if(type==DATA)
        {
                if(data_in_len < 14)return;

if(base_ptr > 31)return;

if((data_buf[BRIDGE_CONTROL] & 0x17) != 0x12)
                        return;                 /* return if not hello response i=data_buf[MAC_SOURCE_ADDR];
                i <<= 8;
                i |= (data_buf[MAC_SOURCE_ADDR+1] & 0x00ff);

for(j=0;j<base_ptr;j++)
                {
                        if(i==bases[j].base_short_adr)return;
                } bases[base_ptr].strength=get_strength(data_buf[RADIO_STRENGTH]);
                bases[base_ptr].radio_strength=(unsigned char)(unsigned int)(256
                bases[base_ptr].base_short_adr=i;;
                bases[base_ptr].base_cost[0]=data_buf[BRIDGE_COST];
                bases[base_ptr].base_cost[1] = data_buf[BRIDGE_COST+1];
                if(bases[base_ptr].base_cost[0] == 0xff)return;
                bases[base_ptr].base_priority=data_buf[BRIDGE_SEED_PRIORITY] & 3
                bases[base_ptr].fil=0;
                base_ptr++;
                return;
        }
        if(type==TIMER)
        {
                if(base_ptr==0)
                {
                        if(retry_cnt < HELLO_TRIES)
                        {
                                _radio_ss_timer_stop(&bridge_timer);
                                retry_cnt++;
                                bridge_timer.interval=HELLO_TIMEOUT_2;
                                bridge_timer.periodic=0;
                                bridge_timer.task_adr=0;
                                say("BTS hw 1\n");
                                _radio_ss_timer_start(&bridge_timer);
                                bridge_state=DETACH_WAITING_FOR_HELLO;
                                base_ptr=0;
                                return;
                        }
                        retry_cnt=0;
                        disable_mac();
                        bridge_state=DETACH_BACKOFF;
                        bridge_timer.interval=ERROR_OFF_TIME;
                        say("BTS backoff\n");
                        _radio_ss_timer_start(&bridge_timer);
                        if(write_request_sw && (link_status_sw==LINK_ENABLED))
                        {
```

```
                    evt_set_group(tx_pending,BRG_POST);
                    evt_set_type(tx_pending,TX_DONE);
                    evt_set_error(tx_pending,BRG_ERR_MAC);
                    write_request_sw=0;
                    say("TX DONE err-mac 1\n");
                    llc_evt_handler(tx_pending);
            }
            return;
        }
        sort_bases();
        say("Number of bases=");
        sayword(base_ptr);
        say("\n");
        if(rssi_valid)
        {
                say("72db=");
                sayword(rssi_tab[RSSI_72DB_MARK]);
                say(",76db=");
                sayword(rssi_tab[RSSI_76DB_MARK]);
                say(",80db=");
                sayword(rssi_tab[RSSI_80DB_MARK]);
                say("\n");
                for(j=0;j<base_ptr;j++)
                {
                        sayhex((unsigned char *)(&bases[j]),sizeof(struc
                        say("\n");
                }
        }
        else
        {
                say("rssi table invalid\n");
        }
        current_base=bases[0].base_short_adr;
        current_cost[0]=bases[0].base_cost[0];
        current_cost[1]=bases[0].base_cost[1];
        current_strength=256-bases[0].radio_strength;
        retry_cnt=0;
        if(link_status_sw != LINK_DISABLED)
        {
                write_terminal_adr(terminal_short_adr);
                send_attach();
                return;

}
        else
        {
                send_rarp();
                return;
        }
    }
}
/* ************************************************************ */
static unsigned char get_strength(unsigned char s)
{
    if(rssi_valid==0)return(0);
    if(s >= rssi_tab[RSSI_72DB_MARK])return(0);
    if(s >= rssi_tab[RSSI_76DB_MARK])return(1);
    if(s >= rssi_tab[RSSI_80DB_MARK])return(2);
    return(3);
}
```

```
/* ************************************************************ */
static void state_detach_backoff(type)
        int     type;
{
        if(type==TIMER)
        {
                hello_reason_code |= HELLO_REASON_DETACH_BACKOFF;
                start_acquire_bases(1);         /* send hello */
        }
}
/* ************************************************************ */
static void state_detach_waiting_for_rarp(type)
        int     type;
{
        unsigned int    i;
        int             j;

if(type==DATA)
        {
                if(data_in_len < 14)return;

if((data_buf[BRIDGE_CONTROL] & 0x17) != 0x16)
                        return;                 /* return if not rarp response * for(j=0;;)
                {
                        j=find_rarp_optional_parm(j);
                        if(j<0)return;
                        if((data_buf[j] & 0x7f)!=0x02)continue;
                        j=memcmp((unsigned char _far *)&data_buf[j+2],(unsigned
                        if(j)return;
                        _radio_ss_timer_stop(&bridge_timer);
                        i = data_buf[RARP_NETWORK_ADR] << 8;
                        i |= data_buf[RARP_NETWORK_ADR+1];
                        if(i==0xffff)
                        {
                                retry_cnt=0;
                                disable_mac();
                                bridge_state=DETACH_BACKOFF;
                                bridge_timer.interval=ERROR_OFF_TIME;
                                say("BTS backoff 1\n");
                                _radio_ss_timer_start(&bridge_timer);
                                if(write_request_sw && (link_status_sw==LINK_ENA
                                {
                                        evt_set_group(tx_pending,BRG_POST);
                                        evt_set_type(tx_pending,TX_DONE);
                                        evt_set_error(tx_pending,BRG_ERR_MAC);
                                        write_request_sw=0;
                                        say("tx done err-mac 2\n");
                                        llc_evt_handler(tx_pending);
                                }
                                else
                                {
                                        post_llc(BRG_ERR_AR_NO_ID);
                                }
                                return;
                        }
                        terminal_short_adr=i;
                        sst_version.term_short_addr=i;
                        write_terminal_adr(i);
```

```c
                        send_attach();
                        return;
                }
        }
        if(type==TIMER)
        {
                retry_cnt++;
                if(retry_cnt > RARP_TRIES)
                {
                        retry_cnt=0;
                        if(try_next_base())
                        {
                                hello_reason_code|=HELLO_REASON_RARP_FAILURE;
                                start_acquire_bases(0);
                                return;
                        }
                }
                send_rarp();
        }
}
/* ************************************************************ */
static void state_detach_waiting_for_attach(type)
        int     type;
{
        T_EVENT _far    *evt;

if(type==DATA)
        {
                if(link_status_sw==LINK_DISABLED)
                {
                        return;
                }
                sst_version.base_short_addr=current_base;
                process_attach_data();
                return;
        }
        if(type==WRITE_RESPONSE)
        {
                sst_version.base_short_addr=current_base;
                attach_request_sw=0;
                if(data_buf[1]==0)
                {
                        set_power_management(0);
                        attach_timeout_type_sw=1;
                        say("HTS attw\n");
                        attach_timer.interval=ATTACH_SHORT_TIMEOUT;
                        say("ATS attw\n");
                        _radio_ss_timer_start(&attach_timer);
                        bridge_state=ATTACH;
                        if(link_status_sw==LINK_DISABLED)
                        {
                                link_status_sw=LINK_ENABLED;
                                attach_request_sw=0;
                                write_request_sw=0;
                                evt=event_get();
                                if(evt==0)
                                {
                                        say("unable to get event pt1\n");
                                        link_status_sw=LINK_DISABLED;
                                        return;;
```

```
                        }
                        evt_set_group(evt,BRG_POST);
                        evt_set_type(evt,START);
                        say("BRIDGE_START\n");
                        llc_evt_handler(evt);
                }
                ck_for_out_data();
                return;
            }
            if(try_next_base())
            {
                    hello_reason_code|=HELLO_REASON_ATTACH_WRITE_ERROR;
                    start_acquire_bases(1);
                    return;
            }
            send_attach();
        }
}
/* *************************************************************** */
/* *************************************************************** */
static void state_attach(type)                                     */
        int     type;
{
        switch(type)
        {
                case DATA:
                            process_attach_data();
                            break;
                case TIMER:
                            process_attach_timer_request();
                            break;
                case WRITE_RESPONSE:
                            process_attach_write_request();
                            break;
                case ATTACH_TIMER:
                            if(attach_request_sw==0)
                            {
                                    if(attach_timeout_type_sw)
                                    {
                                            attach_request_sw =2;
                                            hello_reason_code |= HELLO_REASC
                                    }
                                    else
                                            attach_request_sw =1;
                            }
                            break;
                default:
                            break;
        }
        ck_for_out_data();
}
/* *************************************************************** */
static void process_attach_data()
{
        switch(data_buf[BRIDGE_CONTROL] & 0x07)
        {
                case 0:          /* data packet */
                        process_attach_data_data();
                        break;
                case 1:
```

```
                case 2:
                        break;
                                /* hello packet */
                        if(bridge_state != ATTACH)break;
                        process_attach_data_hello();
                        break;
                case 3:
                                /* attach packet */
                        process_attach_data_attach();
                        break;
                case 4:
                                /* detach packet */
                        if(bridge_state != ATTACH)break;
                        process_attach_data_detach();
                        break;
                case 5:
                                /* arp packet */
                        if(bridge_state != ATTACH)break;
                        process_attach_data_arp();
                        break;
                case 6:
                                /* rarp packet */
                        break;
                case 7:
                        break;
                default:
                        break;
        }
}
/* ***************************************************** */
static void process_attach_data_data()
{
        T_EVENT   far              *evt;
        T_PACKET  far              *pkt;
        unsigned int               j;
        unsigned char              type;
        unsigned char              size;
        unsigned int               len;
        unsigned int               adr;

len=data_in_len-1;
        j=len;
        if(j > 25)j=25;
        j=data_buf[BRIDGE_CONTROL+1];
        j >>= 3;
        j &= 0x07;
        if(j !=1)         /* j= data link type */
        {                 /* return if not llc */
                return;
        }
        if(link_status_sw==LINK_DISABLED)return;
        j=BRIDGE_PACKET_PARMS;
        if(data_buf[BRIDGE_CONTROL+1] & 0x80)    /* optional parms */
        {
                for(;;)
                {
                        type=data_buf[j++];
                        size=data_buf[j++];
                        j += size;
                        if(type & 0x80)break;
                        if(j > data_in_len)
                        {
                                return;
                        }
                }
```

```
            }
        evt=evt_pkt_buf_mac_get(1000);
        if(evt == 0)
        {
                return;
        }
        pkt=evt_pkt_ptr(evt);
        (void)pkt_mac_copy_to(pkt,(char _far *)&data_buf[1],len);
        (void)pkt_mac_del_hdr(pkt,BRIDGE_CONTROL-MAC_DEST_ADDR);
        j -= BRIDGE_CONTROL;
        (void)pkt_brg_del_hdr(pkt,j);
        if(data_buf[BRIDGE_CONTROL] & 0x10)
        {
                evt_set_group(evt,BRG_POST);
                evt_set_type(evt,ERROR);
                evt_set_error(evt,BRG_ERR_UNABLE_TO_SEND);
                say("unable to send\n");
                llc_evt_handler(evt);
        }
        else
        {
                adr=data_buf[BRIDGE_SOURCE_ADDR]<<8;
                adr|=data_buf[BRIDGE_SOURCE_ADDR+1];
                evt_set_group(evt,BRG_POST);
                pkt_set_addr(pkt,adr);
                evt_set_type(evt,RX_DONE);
                say("RX DONE\n");
                llc_evt_handler(evt);
        }
}
/* ****************************************************** */
static void process_attach_data_detach()
{
        unsigned int    j;
        unsigned int    i;
        unsigned int    k;
        unsigned int    l;
        unsigned int    m;

if(_radio_ss_timer_running(&attach_backoff_timer))return;
        if((data_buf[BRIDGE_CONTROL] & 0x07) != 0x04)
                return;         /* return if not detach req/response */
        if(data_buf[BRIDGE_CONTROL+1] & 0x80)
                return;         /* return no optional parms */
        j=BRIDGE_PACKET_PARMS;
        for(;;)
        {
                i=data_buf[j];
                switch(i & 0x7f)
                {
                        case 0x04:              /* detached list */
                                j++;
                                k=data_buf[j];
                                if(k & 1)return;
                                j++;
                                k >>= 1;
                                for(l=0;l<k;l++)
                                {
                                        m=data_buf[j++];
```

```
                                                m <<= 8;
                                                m |= (data_buf[j++] & 0x00ff);
                                                if(m==terminal_short_adr)
                                                {
                                                        if(attach_request_sw==0)
                                                        {
                                                                attach_request_s
                                                                _radio_ss_timer_
                                                        }
                                                }
                                        }
                        default:        break;
                                        j++;
                                        j +=data_buf[j];
                                        j++;
                                        break;
                        }
                        if(i & 0x80)break;
                        if(j > data_in_len)return;
                }
        }
}
/* ************************************************************* */
static void process_attach_data_hello()
{
        unsigned int    j;
        unsigned int    i;
        unsigned int    k;
        unsigned int    l;
        unsigned int    m;
        unsigned int    base_adr;

if((data_buf[BRIDGE_CONTROL] & 0x17) != 0x12)
                return; /* return if not attach response */
        base_adr=data_buf[MAC_SOURCE_ADDR];
        base_adr <<= 8;
        base_adr |= (data_buf[MAC_SOURCE_ADDR+1] & 0x00ff);
        base_adr &= 0x7fff;
        if((data_buf[BRIDGE_COST] == 0xff) && (data_buf[BRIDGE_COST+1] == 0xff))
        {
                if(base_adr == current_base)
                {
                        if(attach_request_sw != 0xff)attach_request_sw=2;
                        hello_reason_code |= HELLO_REASON_COST_FFFF;
                }
                return;
        }
        if(!(data_buf[BRIDGE_CONTROL+1] & 0x80))
                return; /* return no optional parms */
        if(root_seq_number < 0)
        {
                root_seq_number=data_buf[BRIDGE_HELLO_ROOT_SEQ_NO];
        }
        else
        {
                if(root_seq_number !=data_buf[BRIDGE_HELLO_ROOT_SEQ_NO])
                {
                        root_seq_number=data_buf[BRIDGE_HELLO_ROOT_SEQ_NO];
                        hello_reason_code |= HELLO_REASON_SEQ_NUMBER;
                        root_Id_len=0;
```

```
                    root_seq_number=-1;
                    link_status_sw=LINK_DISABLED;
                    say("Root seq changed\n");
                    if(write_request_sw)
                    {
                            evt_set_group(tx_pending,BRG_POST);
                            evt_set_type(tx_pending,ERROR);
                            evt_set_error(tx_pending,BRG_ERR_NET_RESET);
                            llc_evt_handler(tx_pending);
                    }
                    else
                    {
                            post_llc(BRG_ERR_NET_RESET);
                    }
                    return;
            }
    }
    j=BRIDGE_HELLO_OPTIONAL_FIELD;
    for(;;)
    {
            i=data_buf[j];
            switch(i & 0x7f)
            {
                    case 0x04:              /* detached list */
                            j++;
                            k=data_buf[j];
                            j++;
                            k >>= 1;
                            for(l=0;l<k;l++)
                            {
                                    m=data_buf[j++];
                                    m <<= 8;
                                    m |= (data_buf[j++] & 0x00ff);
                                    if(_radio_ss_timer_running(&atta
                                    {
                                            if(m==terminal_short_adr
                                            {
                                                    if(attach_reques
                                                    {
                                                            _radio_s
                                                            attach_r
                                                    }
                                                    break;
                                            }
                                    }
                            }
                            break;
                    case 0x05:              /* pending list */
                            j++;
                            k=data_buf[j];
                            j++;
                            k >>= 1;
                            for(l=0;l<k;l++)
                            {
                                    m=data_buf[j++];
                                    m <<= 8;
                                    m |= (data_buf[j++] & 0x00ff);
                                    if(m==terminal_short_adr)
                                    {
                                            if(inquire_sw==0)
```

```
                                                    {
                                                        if(base_adr ==
                                                        {
                                                                if(inqui }
                                                    }
                                                    break;
                                            }
                                    }
                                    break;
        case 0x0a:              /* root long id */
        case 0x0b:              /* root alais */
                                j++;
                                k=data_buf[j];
                                if(root_id_len==0)
                                {
                                        if(k > 20)break;
                                        root_id_len=k;
                                        j++;
                                        memcpy((unsigned char _far *)roc
                                        j += k;
                                        break;
                                }
                                if(k != root_id_len)
                                {
                                        hello_reason_code |= HELLO_REASO
                                        root_id_len=0;
                                        root_seq_number=-1;
                                        link_status_sw=LINK_DISABLED;
                                        say("Root id len not equal\n");
                                        if(write_request_sw)
                                        {
                                                evt_set_group(tx_pending
                                                evt_set_type(tx_pending,
                                                evt_set_error(tx_pending
                                                llc_evt_handler(tx_pendi
                                        }
                                        else
                                        {
                                                post_llc(BRG_ERR_NET_RE:
                                        }
                                        return;
                                }
                                j++;
                                for(l=0;l<k;l++)
                                {
                                        if(root_id[l] != data_buf[j++])
                                        {
                                                hello_reason_code |= HEL
                                                root_id_len=0;
                                                root_seq_number=-1;
                                                link_status_sw=LINK_DISA
                                                say("Root id changedd\n"
                                                if(write_request_sw)
                                                {
                                                        evt_set_group(tx
                                                        evt_set_type(tx_
                                                        evt_set_error(tx
                                                        llc_evt_handler(
```

/4

```
                                                            }
                                                            else
                                                            {
                                                                    post_llc(BRG_ERR
                                                            }
                                                            return;
                                                    }
                                            }
                                            break;
                            default:
                                            j++;
                                            j +=data_buf[j];
                                            j++;
                                            break;
                    }
                    if(i & 0x80)break;
                    if(j > data_in_len)return;
            }
            set_power_management(1);
}
/* ************************************************************ */
static void process_attach_data_attach()
{
            if((data_buf[BRIDGE_CONTROL] & 0x17) != 0x13)
                    return;                 /* return if not attach response */

_radio_ss_timer_stop(&attach_timer);
            attach_timer.interval=ATTACH_TIMEOUT;
            say("ATS da\n");
            _radio_ss_timer_start(&attach_timer);
            attach_timeout_type_sw=0;

if(!(data_buf[BRIDGE_CONTROL+1] & 0x04))
                    return;                 /* return if not ATTI */
            post_llc(BRG_ERR_ATTI);
}
/* ************************************************************ */
static void process_attach_data_arp()
{
            unsigned int    i;
            char    _far                            *arp_adr;
            T_BRG_LLC_FD _far                       *ptr;

ptr=(T_BRG_LLC_FD _far *)tx_pending->info;
            arp_adr=ptr->alias;

if(write_request_sw != 3)return;
            if(data_in_len < 14)return;

if((data_buf[BRIDGE_CONTROL] & 0x17) != 0x15)
                    return;                 /* return if not arp response */ if(memcmp((unsigned char _far *)&data_buf[ARP_NETWORK_ADR+7],(unsigned c
            _radio_ss_timer_stop(&bridge_timer);
            i = data_buf[ARP_NETWORK_ADR] << 8;
            i |= data_buf[ARP_NETWORK_ADR+1];
            if(i==0xffff)
            {
                    evt_set_group(tx_pending,BRG_POST);
                    evt_set_type(tx_pending,TX_DONE);
```

/5

```
            evt_set_error(tx_pending,BRG_ERR_AR_NOT_FOUND);
            write_request_sw=0;
            say("TX DONE AR_NOT_FOUND\n");
            llc_evt_handler(tx_pending);
            return;
        }
        ptr->address=i;
        write_request_sw=1;
        ck_for_out_data();

}
/* ************************************************************ */
static void process_attach_write_request()
{
        if(link_status_sw==LINK_DISABLED)
        {
                inquire_sw=0;
                write_request_sw=0;
                start_acquire_bases(1);      /* send hello */
                return;
        }
        if(inquire_sw==2)
        {
                inquire_sw=0;
                if(data_buf[1]==0)      /* good */
                {
                        return;
                }
                send_attach();
                return;
        }
        switch(write_request_sw)
        {
                case 2:            /* completion of arp write */
                        if(data_buf[1]==0)      /* good */
                        {
                                bridge_timer.interval=ARP_TIMEOUT;
```

```
                      if(try_next_base())
                      {
                              hello_reason_code|=HELLO_REASON_WRITE_ERROR;
                              start_acquire_bases(1);          /* send hello */
                              return;
                      }
                      send_attach();
                      return;
              default:
                      break;
      }

}
/* ************************************************************ */
static void process_attach_timer_request()
{
      if(write_request_sw==3)        /* arp timeout */
      {
              retry_cnt++;
              if(retry_cnt > ARP_TRIES)
              {
                      evt_set_group(tx_pending,BRG_POST);
                      evt_set_type(tx_pending,TX_DONE);
                      evt_set_error(tx_pending,BRG_ERR_AR_INV_ALIAS);
                      write_request_sw=0;
                      say("TX DONE INV ALIAS\n");
                      llc_evt_handler(tx_pending);
                      return;
              }
              write_request_sw=1;
              ck_for_out_data();
              return;
      }
}
/* ************************************************************ */
/* ************************************************************ */
static void send_rarp()
{
      write_base_adr(current_base);
      write_terminal_adr(0x0fff);
      data_buf[0]=BH_WRITE_MULTICAST;
      wrt_int_buf(1,0x06c0);
      wrt_int_buf(3,0x2000);
      wrt_int_buf(5,0x8fff);
      data_buf[7]=0x80;                        /* rarp operation */
      wrt_int_buf(8,0);
      data_buf[10]=2;
      data_buf[11]=6;
      memcpy((unsigned char _far *)&data_buf[12],(unsigned char _far *)termina
      bridge_timer.interval=RARP_TIMEOUT;
      bridge_timer.periodic=0;
      bridge_timer.task_adr=0;
      say("BTS rarp\n");
      radio_ss_timer_start(&bridge_timer);
      if(alias_len==0)
      {
              data_buf[10]=0x82;
              say("send rarp\n");
```

```
        }
        else
        {
                data_buf[18]=0x87;
                data_buf[19]=(unsigned char)alias_len;
                memcpy((unsigned char _far *)&data_buf[20],(unsigned char _far *
                say("send rarp\n");
                (void)_radio_write(data_buf,18+2+alias_len);
        }
        bridge_state=DETACH_WAITING_FOR_RARP;
}
/* ************************************************************ */
static void send_arp()
{
        char            _far            *arp_adr;
        T_BRG_LLC_FD _far               *ptr;

ptr=(T_BRG_LLC_FD _far *)tx_pending->info;
        arp_adr=ptr->alias;
        arp_len=(int)strlen(arp_adr);
        data_buf[0]=BH_WRITE_MODIFY;
        data_buf[1]=15;
        data_buf[2]=25;
        data_buf[3]=80;
        wrt_int_buf(4,0x05c0);
        wrt_int_buf(6,0x2000);
        wrt_int_buf(8,terminal_short_adr);
        data_buf[10]=0x00;                      /* arp operation */
        wrt_int_buf(11,0);
        data_buf[13]=0x0c;
        data_buf[14]=1;
        data_buf[15]=24;
        data_buf[16]=0x87;
        data_buf[17]=(unsigned char)arp_len;
        memcpy((unsigned char _far *)&data_buf[18],(unsigned char _far *)arp_adr
        write_request_sw=2;
        say("send arp\n");
        (void)_radio_write(data_buf,arp_len+18);
}
/* ************************************************************ */
static void send_inquire()
{
        data_buf[0]=BH_WRITE_MODIFY;
        data_buf[1]=12;
        data_buf[2]=25;
        data_buf[3]=80;
        wrt_int_buf(4,0x0088);
        wrt_int_buf(6,current_base);
        wrt_int_buf(8,terminal_short_adr);
        data_buf[10]=0x8c;
        data_buf[11]=1;
        data_buf[12]=24;
        inquire_sw=2;
        say("send inq\n");
        (void)_radio_write(data_buf,13);
}
/* ************************************************************ */
```

```
        T_BRG_LLC_FD _far        *ptr;
        T_PACKET _far            *pkt;
        unsigned int             len;

ptr=(T_BRG_LLC_FD _far *)tx_pending->info;
        pkt=evt_pkt_ptr(tx_pending);
        data_buf[0]=BH_WRITE_MODIFY;
        data_buf[1]=12;
        data_buf[2]=25;
        data_buf[3]=80;
        wrt_int_buf(4,0x0088);
        wrt_int_buf(6,ptr->address);
        wrt_int_buf(8,terminal_short_adr);
        data_buf[10]=0x8c;
        data_buf[11]=1;
        data_buf[12]=24;
        (void)pkt_llc_copy(pkt,(char _far *)&data_buf[13],1100);
        write_request_sw=4;
        len=(unsigned int)pkt_llc_tot_len(pkt);
        if(len > 1090)
        {
                write_request_sw=0;
                evt_set_group(tx_pending,BRG_POST);
                evt_set_type(tx_pending,TX_DONE);
                evt_set_error(tx_pending,BRG_ERR_INVALID_LENGTH);
                say("TX DONE INVALID LENGTH ");
                sayword(len);
                say("\n");
                llc_evt_handler(tx_pending);
                return;
        }
        say("send datalen=");
        sayword(len);
        say("\n");
        (void)_radio_write(data_buf,(int)(len+13));
}
/* ************************************************************** */
static void send_attach()
{
        _radio_ss_timer_stop(&bridge_timer);
        _radio_ss_timer_stop(&attach_timer);
        attach_request_sw=0xff;
        write_base_adr(current_base);
        data_buf[0]=BH_WRITE_MODIFY;
        data_buf[1]=15;
        data_buf[2]=25;
        data_buf[3]=80;
        wrt_int_buf(4,0x03c0);
        wrt_int_buf(6,0x2000);
        wrt_int_buf(8,terminal_short_adr);
        data_buf[10]=0x0f;       /* max mesg count */
        data_buf[11]=1;
        data_buf[12]=3;
        data_buf[13]=0x0c;
        data_buf[14]=1;
        data_buf[15]=24;
```

```
                data_buf[18]=2;
                say("send attach\n");
                (void)_radio_write(data_buf,19);
                attach_timeout_type_sw=0;
                bridge_state=DETACH_WAITING_FOR_ATTACH;
}
/* ************************************************************ */
static void send_hello()
{

_radio_ss_timer_stop(&bridge_timer);
                write_base_adr(0x27ff);         /* any base address */
                data_buf[0]=BH_WRITE_MULTICAST;
                wrt_int_buf(1,0x0280);
                wrt_int_buf(3,0xffff);
                wrt_int_buf(5,(0x8000 | hello_reason_code));
                data_buf[7]=0x8d;
                data_buf[8]=1;
                data_buf[9]=0;
                say("send hello\n");
                (void)_radio_write(data_buf,10);
                bridge_state=DETACH_WAITING_FOR_HELLO_WRITE;
                hello_reason_code=0;
}
/* ************************************************************ */
static int find_rarp_optional_parm(pos)
        int     pos;
{
        if(pos==0)
        {
                if(data_buf[BRIDGE_CONTROL+1] & 0x80)
                {
                        return(BRIDGE_PACKET_PARMS+3);
                }
                return(-1);
        }
        if(data_buf[pos] & 0x80)return(-1);
        return(pos+2+data_buf[pos+1]);
}
/* ************************************************************ */
static void ck_for_out_data()
{
        T_BRG_LLC_FD _far       *ptr;

if(inquire_sw > 1)return;
        if(write_request_sw > 1)return;
        if(attach_request_sw)
        {
                if(attach_request_sw==1)        /* normal attach request */
                {
                        if(link_status_sw==LINK_DISABLED)
                        {
                                inquire_sw=0;
                                write_request_sw=0;
                                start_acquire_bases(1);         /* send hello */
                                return;
                        }
                        send_attach();
                }
```

```c
                {
                        if(link_status_sw==LINK_DISABLED)
                        {
                                inquire_sw=0;
                                write_request_sw=0;
                                start_acquire_bases(1);        /* send hello */
                                return;
                        }
                        if(try_next_base())
                        {
                                attach_request_sw=0;
                                hello_reason_code|=HELLO_REASON_ATTACH_3;
                                start_acquire_bases(0);
                                return;
                        }
                        send_attach();
                }
                return;
        }
        if(link_status_sw==LINK_DISABLED)
        {
                inquire_sw=0;
                write_request_sw=0;
                start_acquire_bases(1);        /* send hello */
                return;
        }
        if(bridge_state != ATTACH)return;
        if(write_request_sw)
        {
                inquire_sw=0;
                ptr=(T_BRG_LLC_FD _far *)tx_pending->info;
                if(ptr->address==0)
                {
                        send_arp();
                        return;
                }
                send_data();
                return;
        }
        if(inquire_sw)
        {
                send_inquire();
                return;
        }
}
/* ************************************************************** */
static int try_next_base()
{
//      return 1 if no base available
//      return 0 if base available if(next_base_valid==0)return(1);
        next_base_valid=0;
        current_base=next_base;
        memcpy(current_cost,next_cost,2);
        current_strength=next_strength;
        return(0);
}
```

```c
        int             indx;
        unsigned int    data;
{
        data_buf[indx++]=(unsigned char)(data >> 8);
        data_buf[indx]=(unsigned char)(data & 0x00ff);
}
/* *********************************************************** */
static void sort_bases()
{
        int             i,j,k,sort_sw;
        unsigned char   buf[sizeof(struct BASE_INFO)];

if(base_ptr < 2)return;
        j=base_ptr-1;
        for(;;)
        {
                for(i=0,sort_sw=0;i<j;i++)
                {
                        k=memcmp((unsigned char _far *)&bases[i],(unsigned char
                        if(k > 0)
                        {
                                sort_sw=1;
                                memcpy((unsigned char _far *)buf,(unsigned char
                                memcpy((unsigned char _far *)&bases[i],(unsigned
                                memcpy((unsigned char _far *)&bases[i+1],(unsign
                        }
                }
                if(!(sort_sw))return;
                j--;
        }
}
/* *********************************************************** */
static void write_terminal_adr(adr)
        unsigned int    adr;
{ temp_out_buf[0]=BH_WRITE_SHORT_ADDR;
        temp_out_buf[1]=adr >> 8;
        temp_out_buf[2]=adr & 0x00ff;
        say("write term adr ");
        sayword(adr);
        say("\n");
        (void)_radio_write(temp_out_buf,3);
}
/* *********************************************************** */
static void write_base_adr(adr)
        unsigned int    adr;
{
        temp_out_buf[0]=BH_WRITE_BASE_ADDR;
        temp_out_buf[1]=adr >> 8;
        temp_out_buf[2]=adr & 0x00ff;
        memcpy(&temp_out_buf[3],current_cost,2);
        temp_out_buf[5]=current_strength;
        say("write base adr ");
        sayhex(temp_out_buf,6);
        say("\n");
        (void)_radio_write(temp_out_buf,6);
}
```

```c
static void write_lan_adr(adr)
        unsigned int     adr;
{ adr &=3;
        temp_out_buf[0]=BH_WRITE_LAN_ADDR;
        temp_out_buf[1]=(unsigned char)adr;
        say("write lan adr ");
        sayword(adr);
        say("\n");
        (void)_radio_write(temp_out_buf,2);
}
/* ************************************************************ */
static void disable_mac()
{ temp_out_buf[0]=BH_COMM_DISABLE;
        say("disable\n");
        (void)_radio_write(temp_out_buf,1);

}
/* ************************************************************ */
static void load_code(code)
        unsigned char    code;
{ temp_out_buf[0]=BH_CODE_LOAD;
        temp_out_buf[1]=code;
        (void)_radio_write(temp_out_buf,2);

}
/* ************************************************************ */
static void enable_mac()
{ temp_out_buf[0]=BH_COMM_ENABLE;
        say("enable\n");
        (void)_radio_write(temp_out_buf,1);

}
/* ************************************************************ */
static int rd_long_id()
{
        int      i;

temp_out_buf[0]=BH_RD_LONG_ID;
        i=_radio_write(temp_out_buf,1);
        if(i <0)return(-1);
        i=_radio_read(temp_in_buf,20);
        if(i < 0)return(-1);
        if(temp_in_buf[0]==BH_ROM_CODE_VERSION)return(1);
        if(temp_in_buf[0]!=BH_RD_LONG_ID)return(2);
        if(i != 10)return(3);
        if(temp_in_buf[8] != temp_in_buf[9])return(3);
        memcpy((unsigned char _far *)terminal_long_id,(unsigned char _far *)&tem
        memcpy((unsigned char _far *)sst_version.long_id,(unsigned char _far *)&
        return(0);

}
/* ************************************************************ */
static int rd_version()
```

```
        temp_out_buf[0]=BH_RD_VERSION;
        i=_radio_write(temp_out_buf,1);
        if(i <0)return(-1);
        i=_radio_read(temp_in_buf,20);
        if(i < 0)return(-1);
        if(temp_in_buf[0]==BH_ROM_CODE_VERSION)return(-2);
        if(temp_in_buf[0]!=BH_RD_VERSION)return(0);
        if(i != 3)return(0);
        j=temp_in_buf[2];
        j<<=8;
        j |= temp_in_buf[1];
        return((int)j);
}
/* *************************************************************** */
static int sst_self_test_1()
{
        int     i;

temp_out_buf[0]=BH_SELF_TEST_1;
        temp_out_buf[1]=spread_code;
        i=_radio_write(temp_out_buf,2);
        if(i <0)return(-1);
        small_delay();
        i=_radio_read(temp_in_buf,20);
        if(i < 0)return(-1);
        if(temp_in_buf[0]==BH_ROM_CODE_VERSION)return(-2);
        if(temp_in_buf[0]!=BH_SELF_TEST_1)return(1);
        if(i != 2)return(1);
        return((int)temp_in_buf[1]);
}
/* *************************************************************** */
static int sst_self_test_2()
{
        int     i;

temp_out_buf[0]=BH_SELF_TEST_2;
        temp_out_buf[1]=spread_code;
        i=_radio_write(temp_out_buf,2);
        if(i <0)return(-1);
        small_delay();
        i=_radio_read(temp_in_buf,20);
        if(i < 0)return(-1);
        if(temp_in_buf[0]==BH_ROM_CODE_VERSION)return(-2);
        if(temp_in_buf[0]!=BH_SELF_TEST_2)return(1);
        if(i != 2)return(1);
        return((int)temp_in_buf[1]);
}
/* *************************************************************** */
static int sst_rd_rssi_table()
{
        int             i;
        int             j;
        unsigned char   lrc;

for(i=0;i<31;i++)
        {
                temp_out_buf[0]=BH_RD_EEPROM;
```

```
                if(j <0)
                {
                        say("rssi write fault ");
                        sayword(i);
                        say("\n");
                        return(-1);
                }
                j=_radio_read(temp_in_buf,20);
                if(j < 0)
                {
                        say("rssi read fault ");
                        sayword(i);
                        say("\n");
                        return(-1);
                }
                if(temp_in_buf[0]==BH_ROM_CODE_VERSION)return(-2);
                if(temp_in_buf[0]!=BH_RD_EEPROM)return(1);
                if(j != 2)return(1);
                rssi_tab[i]=temp_in_buf[1];
        }
        for(i=0,lrc=47;i<30;i++)
        {
                lrc ^= rssi_tab[i];
        } if(lrc != rssi_tab[30])return(1);
        rssi_valid=1;
        return(0);
}
/* ************************************************************ */
static int sst_self_test_tx_power()
{
        int             j;

load_code(spread_code);
        temp_out_buf[0]=BH_RD_TX_POWER;
        j=_radio_write(temp_out_buf,1);
        if(j <0)
        {
                say("sst_self_test_tx_power-1\n");
                return(-1);
        }
        j=_radio_read(temp_in_buf,20);
        if(j < 0)
        {
                say("sst_self_test_tx_power-2\n");
                return(-1);
        }
        if(temp_in_buf[0]==BH_ROM_CODE_VERSION)
        {
                say("sst_self_test_tx_power-3\n");
                return(-2);
        }
        say("sst_self_test_tx_power-4\n");
        if(temp_in_buf[0]!=BH_RD_TX_POWER)return(1);
        say("sst_self_test_tx_power-5\n");
        if(rssi_tab[21]>temp_in_buf[1])return(1);
        say("sst_self_test_tx_power-6\n");
```

```c
/* ************************************************************ */
static void small_delay()
{
        int     i;

for(i=0;i<30000;i++)
        {
        }
}
/* ************************************************************ */
static void set_power_management(type)
        unsigned char   type;
{ temp_out_buf[0]=BH_HELLO_HANDLE;
        temp_out_buf[1]=type;
        temp_out_buf[2]=(unsigned char)root_seq_number;
        temp_out_buf[3]=(unsigned char)root_id_len;
        if(root_Id_len)
        {
                memcpy((unsigned char _far *)&temp_out_buf[4],(unsigned char _fa
        }
        say("power management ");
        sayword(type);
        say("\n");
        (void)_radio_write(temp_out_buf,(int)(root_id_len+4));
}
/* ************************************************************ */
static void post_llc(code)
        unsigned int    code;
{
        T_EVENT _far    *ptr;

ptr=event_get();
        if(ptr==0)
        {
                say("POST LLC event get error\n");
                return;
        }
        evt_set_group(ptr,BRG_POST);
        evt_set_type(ptr,ERROR);
        evt_set_error(ptr,code);
        say("POST LLC ");
        sayword(code);
        say("\n");
        llc_evt_handler(ptr);

* ************************************************************
*               call after SERIAL_READ from _wait              */
* ************************************************************ */
tatic void      (*state_table[])()=
                {
                        state_detach,
                        state_detach_hello_write,
                        state_detach_waiting_for_hello,
                        state_detach_waiting_for_rarp,
                        state_detach_waiting_for_attach,
                        state_detach_backoff,
                        state_attach
                };
```

```
/* ************************************************************ */
static void process_bridge(type)
        int     type;
{
        void    (*state_call)();

state_call=state_table[bridge_state];
        (*state_call)(type);
}
/* ************************************************************ */
void _radio_ss_bridge_shutdown()
{
        alias_len=0;
        disable_mac();
        _radio_ss_timer_stop(&bridge_timer);
        _radio_ss_timer_stop(&attach_timer);
        _radio_ss_timer_delete(&bridge_timer);
        _radio_ss_timer_delete(&attach_timer);
        attach_request_sw=0;
        write_request_sw=0;
        root_seq_number=-1;
        bridge_state=DETACH;
}
/* ************************************************************ */
SST_VERSION_CONTROL _far *_radio_ss_bridge_init(
        unsigned int            lan,
        unsigned char _far      *alias
        )
{
        int     i;
        int     j;
        T_EVENT _far    *evt;
        int     code_load_sw;

spread_code=SPREAD_CODE;
        alias_len=0;
        i=(int)strlen((char _far *)alias);
        _radio_ss_timer_init();
        if(i <= 16)
        {
                strcpy(alias_name,alias);
                alias_len=i;
        }
        _radio_ss();
        sst_version.sst_hardware_errors_major=0;
        if(!(first_time_sw))
        {
                first_time_sw=1;
                sst_version.sst_hardware_errors_minor=0;
                sst_version.sst_h8_rom_code_version=0;
                sst_version.sst_h8_ram_code_version=0;
                sst_version.sst_bridge_code_version=VERSION;
                say("Bridge version=");
                sayword(VERSION);
                say("\n");
                sst_version.sst_digital_board_type=0;
                sst_version.base_short_addr=0;
```

```
            sst_version.rssi_a_to_d_value=0;
            memset(sst_version.long_id,0,6);
    }
    code_load_sw=0;
    for(i=0;i<10;i++)
    {
            j=_radio_read(data_buf,1200);
            if(j < 0)
            {
                    say("rd ver i= ");
                    sayword(i);
                    say("\n");
                    sst_version.sst_hardware_errors_major=SST_ERROR_MODULE_N
                    return(&sst_version);
            }
            if(j==0)
            {
                    code_load_sw=1;
                    break;
            }
            if(data_buf[0]==BH_ROM_CODE_VERSION)
            {
                    sst_version.sst_h8_rom_code_version=data_buf[1];
                    say("H8 version=");
                    sayword(data_buf[1]);
                    say("\n");
                    break;
            }
    }
    if(i >= 10)
    {
            sst_version.sst_hardware_errors_major=SST_ERROR_UNABLE_TO_CLR_BU
            return(&sst_version);
    }
    say("h8 version=");
    sayword(sst_version.sst_h8_rom_code_version);
    say("\n");
    if(!(code_load_sw))
    {
            say("I1\n");
            i=_sst_h8_code_load();
            if(i != 0)
            {
                    sst_version.sst_hardware_errors_major=SST_ERROR_UNABLE_T
                    return(&sst_version);
            }
            i=rd_version();
            say("I2\n");
            if(i == -1)
            {
                    sst_version.sst_hardware_errors_major=SST_ERROR_MODULE_N
                    return(&sst_version);
            }
            if(i == -2)
            {
                    sst_version.sst_hardware_errors_major=SST_ERROR_UNABLE_T
                    return(&sst_version);
            }
            if(i == 0)
```

```
            sst_version.sst_hardware_errors_major=SST_ERROR_INVALID_
            return(&sst_version);
}
sst_version.sst_h8_ram_code_version=(unsigned char)(i & 0x00ff);
say("H8 ram code version = ");
sayword(i & 0x00ff);
say("\n");
sst_version.sst_digital_board_type=(unsigned char)((unsigned int
sst_version.sst_hardware_errors_minor=0;
if(sst_version.sst_digital_board_type >= 2)
{
        say("I3\n");
        i=sst_self_test_1();
        if(i == -1)
        {
                sst_version.sst_hardware_errors_major=SST_ERROR_
                return(&sst_version);
        }
        if(i == -2)
        {
                sst_version.sst_hardware_errors_major=SST_ERROR_
                return(&sst_version);
        }
        if(i)
        {
                sst_version.sst_hardware_errors_major=SST_ERROR_
                return(&sst_version);
        }
        say("I4\n");
        i=sst_self_test_2();
        if(i == -1)
        {
                sst_version.sst_hardware_errors_major=SST_ERROR_
                return(&sst_version);
        }
        if(i == -2)
        {
                sst_version.sst_hardware_errors_major=SST_ERROR_
                return(&sst_version);
        }
        if(i)
        {
                sst_version.sst_hardware_errors_minor |= SST_ERR
        }
        say("I5\n");
        i=sst_rd_rssi_table();
        if(i == -1)
        {
                sst_version.sst_hardware_errors_major=SST_ERROR_
                say("I5a\n");
                return(&sst_version);
        }
        if(i == -2)
        {
                sst_version.sst_hardware_errors_major=SST_ERROR_
                say("I5b\n");
                return(&sst_version);
        }
        if(i)
```

```
                            sst_version.sst_hardware_errors_minor |= SST_ERR
                    }
                    else
                    {
                            say("I6\n");
                            i=sst_self_test_tx_power();
                            if(i == -1)
                            {
                                    sst_version.sst_hardware_errors_major=SS
                                    say("I6a\n");
                                    return(&sst_version);
                            }
                            if(i == -2)
                            {
                                    sst_version.sst_hardware_errors_major=SS
                                    say("I6b\n");
                                    return(&sst_version);
                            }
                            if(i)
                            {
                                    sst_version.sst_hardware_errors_minor |=
                            }
                    }
            }
    }
    say("I7\n");
    i=rd_long_id();
    if(i < 0)
    {
            sst_version.sst_hardware_errors_major=SST_ERROR_MODULE_NON_RESPO
            return(&sst_version);
    }
    if(i == 1)
    {
            sst_version.sst_hardware_errors_major=SST_ERROR_UNABLE_TO_LOAD_C
            return(&sst_version);
    }
    if(i != 0)
    {
            sst_version.sst_hardware_errors_major=SST_ERROR_INVALID_LONG_ID;
            return(&sst_version);
    }
    load_code(spread_code);
    disable_mac();
    write_lan_adr(lan);
    attach_request_sw=0;
    write_request_sw=0;
    root_id_len=0;
    root_seq_number=-1;
    (void)_radio_ss_timer_create(&bridge_timer);
    (void)_radio_ss_timer_create(&attach_timer);
    (void)_radio_ss_timer_create(&attach_backoff_timer);
    attach_timer.interval=ATTACH_TIMEOUT;
    attach_timer.periodic=0;
    attach_timer.task_adr=0;
    attach_backoff_timer.interval=ATTACH_BACKOFF_TIMEOUT;
    attach_backoff_timer.periodic=0;
    attach_backoff_timer.task_adr=0;
    write_terminal_adr(0xffff);
```

```
        link_status_sw=LINK_DISABLED;
        start_acquire_bases(1);         /* send hello */
        return(&sst_version);
}
/* ************************************************************ */
void _radio_ss_bridge_interrupt()
{
        unsigned int    i;
        unsigned int    j;

for(;;)
        {
                i=(unsigned int)_radio_read(data_buf,1200);
                data_in_len=i;
                if(!(i & 0x8000))break;
                say("radio read--error ");
                sayword(i);
                say("\n");
        }
        if(i==0)
        {
                say(".");
                return;
        }
        j=20;
        say("s=");
        sayword(bridge_state);
        say(" len=");
        sayword(i);
        say(" LS=");
        sayword(link_status_sw);
        say("\n");
        if(i<j)j=i;
        sayhex(data_buf,j);
        say("\n");
        switch(data_buf[0])
        {
                case BH_TIMER:
                                _radio_ss_update_timers(data_buf[1]);
                                if(_radio_ss_timer_stopped(&bridge_timer))
                                {
                                        say("BT\n");
                                        process_bridge(TIMER);
                                }
                                if(_radio_ss_timer_stopped(&attach_timer))
                                {
                                        say("AT\n");
                                        process_bridge(ATTACH_TIMER);
                                }
                                break;
                case BH_READ:
                                sst_version.rssi_a_to_d_value=data_buf[5];
                                process_bridge(DATA);
                                break;
                case BH_WRITE:
                                process_bridge(WRITE_RESPONSE);
                                break;
                case BH_HELLO_TIMEOUT:
                                say("BH HELLO TIMEOUT\n");
```

```
                                {
                                        if(write_request_sw==0)
                                                post_llc(BRG_ERR_ATTI);
                                }
                                break;
                        case BH_BASE_INFO:
                                say("BH_BASE_INFO\n");
                                i=data_buf[1];
                                i <<= 8;
                                i |= data_buf[2];
                                if(i==0)
                                {
                                        next_base_valid=0;
                                        break;
                                }
                                next_base=i;
                                next_cost[0]=data_buf[3];
                                next_cost[1]=data_buf[4];
                                next_strength=data_buf[5];
                                next_base_valid=1;
                                say("next base=");
                                sayword(next_base);
                                say("\n");
                                break;
                        default:
                                say("UNKNOWN 1\n");
                                break;
                }
                say("ES=");
                sayword(bridge_state);
                say(" ");
                sayword(write_request_sw);
                say(" ");
                sayword(attach_request_sw);
                say("\n");
                switch(bridge_state)
                {
                        case DETACH:
                                sst_version.link_status=LINK_DETACH;
                                break;
                        case ATTACH:
                                sst_version.link_status=LINK_OK;
                                break;
                        default:
                                sst_version.link_status=LINK_QUESTIONABLE;
                                break;
                }
        }
}
/* ************************************************************** */
void _far brg_evt_handler(T_EVENT _far *evt)
{
        say("B1\n");
        if(evt_type(evt) == TX_REQ)
        {
                if(link_status_sw==LINK_DISABLED)
                {
                        say("tx_done--link disabled\n");
                        evt_set_group(tx pending,BRG POST);
```

```
                llc_evt_handler(evt);
                return;
        }
        if(write_request_sw)
        {
                say("tx_done--brg_err_busy\n");
                evt_set_group(tx_pending,BRG_POST);
                evt_set_type(tx_pending,TX_DONE);
                evt_set_error(evt,BRG_ERR_BUSY);
                llc_evt_handler(evt);
                return;
        }
        tx_pending=evt;
        write_request_sw=1;
        say("B1 state=");
        sayword(bridge_state);
        say("\n");
        if(bridge_state==ATTACH)
                ck_for_out_data();
        return;
    }
    say("B2\n");
}
/* **************************************************************** */
```

```c
/* *********************  *************************  * */
/*  MAC layer process                                 */
/* ************************************************** */
#define EXTERN
#include             "ssh8.h"
/* ************************************************** */
static void set_mac_backoff_time(unsigned int,unsigned int);
static int  mac_acquire_channel();
static void send_multicast_msg();
static void mac_send_rfp();
static void set_mac_timer();
static void reset_mac_timer();
static void send_ss_data();
extern void process_bridge_layer();
static void process_mac_idle();
static void process_mac_tx_machine();
static void process_mac_rx_machine();
static void process_mac_layer_data_entry();
static void process_mac_rx_timeout();
static void process_mac_layer_timeout();
static void process_mac_tx_ready();
static void process_mac_tx_s_data();
static void process_mac_tx_s_eod();
static void process_mac_tx_rdy_enq();
static void process_mac_tx_s_enq();
static void process_mac_tx_s_rfp();
static void process_tx_send_record();
static int  ck_tx_seq_state();
static void mac_send_enq();
static void mac_send_poll();
static void mac_send_clear();
static void mac_send_reject();
static void ss_write_control();
void ss_set_standby();
static unsigned char check_address();
void set_ignore_c188_timer(unsigned char);
/* ************************************************** */
extern void     (*hdlc_write_data_ptr)(unsigned char *,unsigned char *,unsigned
/* ************************************************** */
extern unsigned char    hdlc_data_in_buf[];
extern unsigned char    mac_timer_flag;
extern unsigned char              mac_rx_strength;
/* ************************************************** */
static void check_tx_pending()
{
        if(!(u.s.tx_pending_sw))return;
        u.s.mac_state=MAC_TX_MACHINE;
        u.s.mac_retry_cnt=0;
        u.s.mac_acq_retry_cnt=0;
        u.s.mac_wait_cnt=0;
        set_mac_backoff_time(0,T_4_MILLI);
        u.s.mac_tx_state=TX_READY;
}
/* ************************************************** */
static void process_mac_bridge_interface(size)
        int     size;
{
        if((size & 0x7fff) == 0)return;
```

```c
        if(u.s.mac_state==MAC_RX_MACHINE)
        {
                u.s.tx_pending_sw=1;
                return;
        }
        u.s.mac_state=MAC_TX_MACHINE;
        u.s.mac_retry_cnt=0;
        u.s.mac_acq_retry_cnt=0;
        set_mac_backoff_time(0,T_4_MILLI);
        u.s.mac_tx_state=TX_READY;
        return;
}
/* ************************************************************ */
static void send_multicast_msg()
{
        unsigned char   control;
        unsigned int    size;

reset_mac_timer();
        size=u.s.mac_tx_size & 0x7fff;
        if(size < 100)
        {
                control = u.s.lan_address;
                send_ss_data(control,(unsigned char)size,bridge_tx_buffer,(unsig
                u.s.mac_state=MAC_IDLE;
                process_bridge_layer(MAC,MAC_TX_COMPLETE,0);
        }
}
/* ************************************************************ */
static void process_mac_layer_data_entry(size)
        int             size;
{ switch(u.s.mac_state)
        {
                case MAC_IDLE:
                                if(u.s.mac_dest_adr & 0x8000)
                                {
                                        if((u.s.mac_source_adr & 0x7800) != 0x20
                                }
                                else
                                {
                                        if(check_address())return;
                                }
                                process_mac_idle(size);
                                break;
                case MAC_TX_MACHINE:
                                process_mac_tx_machine(DATA,size);
                                break;
                case MAC_RX_MACHINE:
                                if(check_address())return;
                                process_mac_rx_machine(size);
                                break;
                default:
                                return;
        }
}
/* ************************************************************ */
void set_ignore_c188_timer(unsigned char time)
```

```
        t0tcr=0;
        t0tcora=time;
        t0tcnt=0;
        t0tcsr &= 0x1f;
        t0tcr=0x03;
}
/* ************************************************************ */
static unsigned char check_address()
{
        if((u.s.short_address) != (u.s.mac_dest_adr & 0x7fff))
                return(1);
        if(u.s.mac_source_adr != u.s.base_address)
                return(1);
        return(0);
}
/* ************************************************************ */
static void process_mac_layer_timeout()
{
        switch(u.s.mac_state)
        {
                case MAC_IDLE:
                                reset_mac_timer();
                                break;
                case MAC_TX_MACHINE:
                                process_mac_tx_machine(TIMER,0);
                                break;
                case MAC_RX_MACHINE:
                                process_mac_rx_timeout();
                                break;
                default:
                                return;
        }
}
/* ************************************************************ */
static void process_mac_tx_machine(type,size)
        int     type;
        int     size;
{
        switch(u.s.mac_tx_state)
        {
                case TX_READY:
                                process_mac_tx_ready(type,size);
                                return;
                case TX_S_RFP:
                                process_mac_tx_s_rfp(type,size);
                                return;
                case TX_S_DATA:
                                process_mac_tx_s_data(type);
                                return;
                case TX_S_EOD:
                                process_mac_tx_s_eod(type,size);
                                return;
                case TX_RDY_ENQ:
                                process_mac_tx_rdy_enq(type,size);
                                return;
                case TX_S_ENQ:
                                process_mac_tx_s_enq(type,size);
                                return;
```

```
        }
}
/* *************************************************************** */
static void process_mac_tx_ready(type,size)
        int     type;
        int     size;
{
        unsigned int    time;
        unsigned int    rand_time;

if(type==TIMER)
        {
                reset_mac_timer();
                if(!(mac_acquire_channel()))
                {
                        u.s.mac_acq_retry_cnt++;
                        if(u.s.mac_acq_retry_cnt >= MAX_TX_ACQUIRE_TRIES)
                        {
                                u.s.tx_pending_sw=0;
                                u.s.mac_state=MAC_IDLE;
                                process_bridge_layer(MAC,MAC_TX_ACQUIRE_FAILURE,
                                return;
                        }
                        time=T_2_MILLI;
                        rand_time=T_4_MILLI;
                        if(u.s.mac_acq_retry_cnt > 4)
                        {
                                time=T_6_MILLI;
                                rand_time=T_10_MILLI;
                        }
                        if(u.s.mac_acq_retry_cnt > 10)
                        {
                                time=T_16_MILLI;
                                rand_time=T_16_MILLI;
                        } set_mac_backoff_time(time,rand_time);
                        return;
                }
                if(u.s.mac_tx_size & 0x8000)            /* multicast */
                {
                        u.s.tx_pending_sw=0;
                        send_multicast_msg();
                        return;
                }
                u.s.mac_tx_state=TX_S_RFP;
                mac_send_rfp();
                set_mac_timer(RSP_TIMEOUT);
                return;
        }
        if(type==DATA)
        {
                if(u.s.mac_dest_adr & 0x8000)
                {
                        if((u.s.mac_source_adr & 0x7800) != 0x2000)return;
                }
                else
                {
```

```
                                        return;
                        }
                }
                reset_mac_timer();
                u.s.tx_pending_sw=1;
                process_mac_idle(size);
        }
}
/* ************************************************************ */
static void process_mac_tx_s_rfp(type,size)
        int     type;
        int     size;
{
        if(type==TIMER)
        {
                u.s.mac_retry_cnt++;
                if(u.s.mac_retry_cnt >= MAX_TX_RFP_TRIES)
                {
                        u.s.tx_pending_sw=0;
                        reset_mac_timer();
                        u.s.mac_state=MAC_IDLE;
                        process_bridge_layer(MAC,MAC_TX_RFP_FAILURE,0);
                        return;
                }
                u.s.mac_tx_state=TX_READY;
                set_mac_backoff_time(0,T_4_MILLI);
                return;
        }
                                                        /* data record */
        if(check_address())return;

switch(u.s.mac_control & 0xe0)
        {
                case 0xe0:                              /* poll */
                                u.s.tx_pending_sw=0;
                                u.s.mac_retry_cnt=0;
                                process_tx_send_record();
                                return;
                case 0x60:                              /* rfp */
                                reset_mac_timer();
                                u.s.tx_pending_sw=1;
                                process_mac_idle(size);
                                return;
                default:
                                break;
        }
}
/* ************************************************************ */
static void process_mac_tx_s_data(type)
        int     type;
{
        if(type==TIMER)
        {
                reset_mac_timer();
                u.s.mac_retry_cnt++;
                if(u.s.mac_retry_cnt < MAX_TX_TRIES)
                {
```

```
                }
                u.s.mac_state=MAC_IDLE;
                process_bridge_layer(MAC,MAC_TX_FAILURE,0);
                return;
        }
        if(check_address())return;

if((u.s.mac_control & 0xe0) == 0xe0)              /* poll record */
        {
                if(ck_tx_seq_state())
                {
                        u.s.mac_retry_cnt=0;
                        u.s.mac_tx_seq_state++;
                        u.s.mac_tx_seq_state &= 1;
                        u.s.mac_tx_ptr += 100;
                }
                else
                {
                        u.s.mac_retry_cnt++;
                        if(u.s.mac_retry_cnt >= MAX_TX_TRIES)
                        {
                                reset_mac_timer();
                                u.s.mac_state=MAC_IDLE;
                                process_bridge_layer(MAC,MAC_TX_FAILURE,0);
                                return;
                        }
                }
                process_tx_send_record();
                return;
        }
        reset_mac_timer();
        u.s.mac_state=MAC_IDLE;
        process_bridge_layer(MAC,MAC_TX_SEQ_FAILURE,0);
}
/* ************************************************************ */
static void process_mac_tx_s_eod(type,size)
        int     type;
        int     size;
{
        if(type==TIMER)
        {
                u.s.mac_retry_cnt++;
                if(u.s.mac_retry_cnt >= MAX_IDLE_TRIES)
                {
                        reset_mac_timer();
                        u.s.mac_state=MAC_IDLE;
                        process_bridge_layer(MAC,MAC_TX_COMPLETE_QUESTION,0);
                        return;
                }
                u.s.mac_tx_state=TX_RDY_ENQ;
                set_mac_backoff_time(0,T_4_MILLI);
                return;
        }
        if(check_address())return;

if((u.s.mac_control & 0xe0) == 0xe0)              /* poll */
        {
                if(ck_tx_seq_state())
```

```
                u.s.mac_state=MAC_IDLE;
                process_bridge_layer(MAC,MAC_TX_EOD_FAILURE,0);
                return;
        }
        u.s.mac_retry_cnt++;
        if(u.s.mac_retry_cnt >= MAX_TX_TRIES)
        {
                reset_mac_timer();
                u.s.mac_state=MAC_IDLE;
                process_bridge_layer(MAC,MAC_TX_EOD_FAILURE,0);
                return;
        }
        process_tx_send_record();
        return;
    }
    if((u.s.mac_control & 0xe0) == 0xc0)            /* clear */
    {
        if(ck_tx_seq_state())
        {
                reset_mac_timer();
                u.s.mac_tx_seq_state++;
                u.s.mac_tx_seq_state &= 1;
                u.s.mac_state=MAC_IDLE;
                process_bridge_layer(MAC,MAC_TX_COMPLETE,0);
                return;
        }
        else
        {
                reset_mac_timer();
                u.s.mac_state=MAC_IDLE;
                process_bridge_layer(MAC,MAC_TX_EOD_FAILURE,0);
                return;
        }
    }
    if((u.s.mac_control & 0xe0)== 0x60)     /* rfp */
    {
        reset_mac_timer();
        u.s.mac_state=MAC_IDLE;
        process_bridge_layer(MAC,MAC_TX_COMPLETE,0);
        process_mac_idle(size);
        return;
    }
    reset_mac_timer();
    u.s.mac_state=MAC_IDLE;
    process_bridge_layer(MAC,MAC_TX_EOD_FAILURE,0);
}
/* ******************************************************** */
static int ck_tx_seq_state()
{
    if(u.s.mac_tx_seq_state & 1)
    {
        if(u.s.mac_control & 0x10)      /* seq */
                return(0);
        else
                return(1);
    }
    if(u.s.mac_control & 0x10)      /* seq */
        return(1);
    return(0);
```

```
/* ************************************************** ******** */
static void process_mac_tx_rdy_enq(type,size)
        int     type;
        int     size;
{
        if(type==TIMER)
        {
                u.s.mac_retry_cnt++;
                if(u.s.mac_retry_cnt >= MAX_TX_TRIES)
                {
                        reset_mac_timer();
                        u.s.mac_state=MAC_IDLE;
                        process_bridge_layer(MAC,MAC_TX_COMPLETE_QUESTION,0);
                        return;
                }
                if(!(mac_acquire_channel()))
                {
                        set_mac_backoff_time(0,T_4_MILLI);
                        return;
                }
                u.s.mac_retry_cnt++;
                mac_send_enq();
                set_mac_timer(RSP_TIMEOUT);
                u.s.mac_tx_state=TX_S_ENQ;
                return;
        }
        if(check_address())return;

if((u.s.mac_control & 0xe0) == 0xe0)              /* poll */
        {
                if(ck_tx_seq_state())
                {
                        reset_mac_timer();
                        u.s.mac_state=MAC_IDLE;
                        process_bridge_layer(MAC,MAC_TX_EOD_FAILURE,0);
                        return;
                }
                u.s.mac_retry_cnt++;
                if(u.s.mac_retry_cnt >= MAX_TX_TRIES)
                {
                        reset_mac_timer();
                        u.s.mac_state=MAC_IDLE;
                        process_bridge_layer(MAC,MAC_TX_EOD_FAILURE,0);
                        return;
                }
                process_tx_send_record();
                return;
        }
        if((u.s.mac_control & 0xe0) == 0xc0)              /* clear */
        {
                if(ck_tx_seq_state())
                {
                        reset_mac_timer();
                        u.s.mac_tx_seq_state++;
                        u.s.mac_tx_seq_state &= 1;
                        u.s.mac_state=MAC_IDLE;
                        process_bridge_layer(MAC,MAC_TX_COMPLETE,0);
                        return:
```

```
                {
                        reset_mac_timer();
                        u.s.mac_state=MAC_IDLE;
                        process_bridge_layer(MAC,MAC_TX_EOD_FAILURE,0);
                        return;
                }
        }
        if((u.s.mac_control & 0xe0)== 0x60)       /* rfp */
        {
                reset_mac_timer();
                u.s.mac_state=MAC_IDLE;
                process_bridge_layer(MAC,MAC_TX_COMPLETE,0);
                process_mac_idle(size);
                return;
        }
        reset_mac_timer();
        u.s.mac_state=MAC_IDLE;
        process_bridge_layer(MAC,MAC_TX_EOD_FAILURE,0);
}
/* ************************************************************* */
static void process_mac_tx_s_enq(type,size)
        int     type;
        int     size;
{
        if(type==TIMER)
        {
                u.s.mac_retry_cnt++;
                if(u.s.mac_retry_cnt >= MAX_TX_TRIES)
                {
                        reset_mac_timer();
                        u.s.mac_state=MAC_IDLE;
                        process_bridge_layer(MAC,MAC_TX_COMPLETE_QUESTION,0);
                        return;
                }
                if(!(mac_acquire_channel()))
                {
                        set_mac_backoff_time(0,T_4_MILLI);
                        return;
                }
                mac_send_enq();
                set_mac_timer(RSP_TIMEOUT);
                u.s.mac_tx_state=TX_S_ENQ;
                return;
        }
        if(check_address())return;

if((u.s.mac_control & 0xe0) == 0xe0)              /* poll */
        {
                if(ck_tx_seq_state())
                {
                        reset_mac_timer();
                        u.s.mac_state=MAC_IDLE;
                        process_bridge_layer(MAC,MAC_TX_EOD_FAILURE,0);
                        return;
                }
                u.s.mac_retry_cnt++;
                if(u.s.mac_retry_cnt >= MAX_TX_TRIES)
                {
```

```
                    process_bridge_layer(MAC,MAC_TX_EOD_FAILURE,0);
                    return;
            }
            process_tx_send_record();
            return;
        }
        if((u.s.mac_control & 0xe0) == 0xc0)           /* clear */
        {
            if(ck_tx_seq_state())
            {
                reset_mac_timer();
                u.s.mac_tx_seq_state++;
                u.s.mac_tx_seq_state &= 1;
                u.s.mac_state=MAC_IDLE;
                process_bridge_layer(MAC,MAC_TX_COMPLETE,0);
                return;
            }
            else
            {
                reset_mac_timer();
                u.s.mac_state=MAC_IDLE;
                process_bridge_layer(MAC,MAC_TX_EOD_FAILURE,0);
                return;
            }
        }
        if((u.s.mac_control & 0xe0)== 0x60)      /* rfp */
        {
            reset_mac_timer();
            u.s.mac_state=MAC_IDLE;
            process_bridge_layer(MAC,MAC_TX_COMPLETE,0);
            process_mac_idle(size);
            return;
        }
        reset_mac_timer();
        u.s.mac_state=MAC_IDLE;
        process_bridge_layer(MAC,MAC_TX_EOD_FAILURE,0);
}
/* ************************************************************ */
static void process_tx_send_record()
{
        int             control;
        int             size;
        unsigned char   data_rem;

data_rem=0;
        if((u.s.mac_tx_size - u.s.mac_tx_ptr) > 100)
        {
            u.s.mac_tx_state=TX_S_DATA;
            size=100;
            control=0x20;                           /* data */
            data_rem=(unsigned char)(((u.s.mac_tx_size - u.s.mac_tx_ptr) - 1
        }
        else
        {
            u.s.mac_tx_state=TX_S_EOD;
            size=(int)(u.s.mac_tx_size - u.s.mac_tx_ptr);
            control=0x00;                           /* eod */
        }
        if(u.s.mac_tx_seq_state)
```

```c
        control |= u.s.lan_address;
        send_ss_data(control,(unsigned char)size,&bridge_tx_buffer[u.s.mac_tx_pt
        set_mac_timer(POLL_TIMEOUT);
        set_ignore_c188_timer(C188_DELAY_TIME);
}
/* *************************************************** */
static void process_mac_rx_timeout()
{
        u.s.mac_retry_cnt++;
        if(u.s.mac_retry_cnt >= MAX_RX_TRIES)
        {
                reset_mac_timer();
                u.s.mac_state=MAC_IDLE;
                u.s.mac_rx_seq_state=SEQ_ACCEPT_ANY;
                check_tx_pending();
                return;
        }
        if(!(mac_acquire_channel()))
        {
                set_mac_backoff_time(0,T_4_MILLI);
                return;
        }
        switch(u.s.mac_rx_seq_state)
        {
                case SEQ_ACCEPT_ANY:
                case SEQ_ACCEPT_0:
                                mac_send_poll(0);
                                break;
                default:
                                mac_send_poll(1);
                                break;
        }
        set_mac_timer(RX_TIMEOUT);
}
/* *************************************************** */
static void process_mac_rx_machine(size)
        int     size;
{
        char            frame_accept_sw;
        int             i;
        unsigned char   *pt1;
        unsigned char   *pt2;

switch(u.s.mac_control & 0xe0)
        {
                case    0:                      /* eod */
                case    0x20:                   /* data */
                        switch(u.s.mac_rx_seq_state)
                        {
                                case SEQ_ACCEPT_0:
                                        if(u.s.mac_control & 0x10)
                                        {
                                                frame_accept_sw=0;
                                                u.s.mac_rx_seq_state=SEQ
                                        }
                                        else
                                        {
                                                frame_accept_sw=1;
                                                u.s.mac_rx_seq_state=SEQ
```

```
                    break;
            case SEQ_ACCEPT_1:
                    if(u.s.mac_control & 0x10)
                    {
                            frame_accept_sw=1;
                            u.s.mac_rx_seq_state=SEQ
                    }
                    else
                    {
                            frame_accept_sw=0;
                            u.s.mac_rx_seq_state=SEQ
                    }
                    break;
            default:
                    u.s.mac_state=MAC_IDLE;
                    reset_mac_timer();
                    check_tx_pending();
                    return;
    }
    if(frame_accept_sw)
    {
            if((u.s.mac_rx_ptr + (unsigned int)size)
            {
                    u.s.mac_state=MAC_IDLE;
                    reset_mac_timer();
                    check_tx_pending();
                    return;
            }
            u.s.mac_retry_cnt=0;
            pt1=mac_rx_buffer;
            pt2=&bridge_rx_buffer[u.s.mac_rx_ptr];
            u.s.mac_rx_ptr += (unsigned int)size;
            for(i=0;i<size;i++)*pt2++=*pt1++;
    }
    if(u.s.mac_control & 0x20)      /* data */
    {
            if(u.s.mac_rx_seq_state==SEQ_ACCEPT_0)
                    mac_send_poll(0);
            else
                    mac_send_poll(1);
            set_mac_timer(RX_TIMEOUT);
            return;
    }
    if(u.s.mac_rx_seq_state==SEQ_ACCEPT_0)
            mac_send_clear(0);
    else
            mac_send_clear(1);
    u.s.mac_state=MAC_IDLE;
    reset_mac_timer();
    process_bridge_layer(MAC,MAC_RECORD,u.s.mac_rx_p
    check_tx_pending();
    return;
case    0x60:            /* rfp */
    mac_send_poll(0);
    u.s.mac_rx_seq_state=SEQ_ACCEPT_0;
    set_mac_timer(RX_TIMEOUT);
    u.s.mac_rx_ptr=0;
    return;
default:
```

```
            }
            if(u.s.mac_rx_seq_state==SEQ_ACCEPT_1)
            {
                    mac_send_reject(1);
            }
            else
            {
                    mac_send_reject(0);
            }
            u.s.mac_state=MAC_IDLE;
            reset_mac_timer();
            check_tx_pending();
}
/* ************************************************************ */
static void process_mac_idle(size)
        int     size;
{
        unsigned char   *pt1;
        unsigned char   *pt2;
        int             i;

if((u.s.mac_control & 0xe0) == 0)               /* eod */
        {
                if(u.s.mac_dest_adr & 0x8000)
                {
                        pt1=mac_rx_buffer;
                        pt2=bridge_rx_buffer;
                        for(i=0;i<size;i++) *pt2++=*pt1++;
                        process_bridge_layer(MAC,MAC_RECORD,(unsigned int)size);
                        check_tx_pending();
                        return;
                }
        }
        if(u.s.mac_dest_adr & 0x8000)
        {
                check_tx_pending();
                return;
        }
        if((u.s.mac_control & 0xe0) == 0x60)    /* rfp  */
        {
                mac_send_poll(0);
                u.s.mac_rx_seq_state=SEQ_ACCEPT_0;
                u.s.mac_state=MAC_RX_MACHINE;
                set_mac_timer(RX_TIMEOUT);
                u.s.mac_retry_cnt=0;
                u.s.mac_rx_ptr=0;
                return;
        }
        if((u.s.mac_control & 0xe0) == 0x40)    /* enq  */
        {
                if(u.s.mac_rx_seq_state==SEQ_ACCEPT_0)
                {
                        mac_send_clear(0);
                        check_tx_pending();
                        return;
                }
                if(u.s.mac_rx_seq_state==SEQ_ACCEPT_1)
                {
```

```
                        return;
                }
        }
        check_tx_pending();
}
/* ************************************************************ */
static void mac_send_poll(seq)
        unsigned char   seq;
{
        unsigned char   data;

if(seq)
        {
                data=0xf0;
        }
        else
        {
                data=0xe0;
        }
        data |= u.s.lan_address;
        send_ss_data(data,0,0,0,u.s.mac_data_rem);
        set_ignore_c188_timer(C188_DELAY_TIME);
}
/* ************************************************************ */
static void mac_send_rfp()
{
        unsigned char   data;

u.s.mac_tx_seq_state=0;
        u.s.mac_tx_ptr=0;
        data=0x60;
        data |= u.s.lan_address;
        send_ss_data(data,0,0,0,(unsigned char)((u.s.mac_tx_size + 15)/16));
        set_ignore_c188_timer(C188_DELAY_TIME);
}
/* ************************************************************ */
static void mac_send_enq()
{
        unsigned char   data;

if(u.s.mac_tx_seq_state)
        {
                data=0x50;
        }
        else
        {
                data=0x40;
        }
        data |= u.s.lan_address;
        send_ss_data(data,0,0,0);
        set_ignore_c188_timer(C188_DELAY_TIME);
}
/* ************************************************************ */
static void mac_send_reject(seq)
        unsigned char   seq;
{
        unsigned char   data;

if(seq)
```

```
                data=0xb0;
        }
        else
        {
                data=0xa0;
        }
        data |= u.s.lan_address;
        send_ss_data(data,0,0,0,0);
}
/* ************************************************************ */
static void mac_send_clear(seq)
        unsigned char   seq;
{
        unsigned char   data;

if(seq)
        {
                data=0xd0;
        }
        else
        {
                data=0xc0;
        }
        data |= u.s.lan_address;
        send_ss_data(data,0,0,0,0);
}
/* ************************************************************ */
static void send_ss_data(control,size,buffer,multicast,data_rem)
        unsigned char   control;
        unsigned char   size;
        unsigned char   *buffer;
        unsigned char   multicast;
        unsigned char   data_rem;
{
        unsigned int    j;
        unsigned char   prelude[6];

j=u.s.base_address;
        if(multicast)j |= 0x8000;
        prelude[0]=(unsigned char)(j >> 8);
        prelude[1]=(unsigned char)j;
        j=u.s.short_address;
        if(multicast)j |= 0x8000;
        prelude[2]=(unsigned char)(j >> 8);
        prelude[3]=(unsigned char)j;
        prelude[4]=control;
        prelude[5]=data_rem;
        (*hdlc_write_data_ptr)(prelude,buffer,size);
}
/* ************************************************************ */
void ss_disable_rec()
{
        ss_write_control(3,0xc0);
}
/* ************************************************************ */
int ss_standby()
{
        if(p6dr & 0x08)return(0);
        return(1);
}
```

```c
/* ********************    ************************   ******** */
void ss_set_standby(type)
        int     type;
{
        unsigned char   i;

if(type==TRUE)
        {
                p6 &=0xfd;
                p6dr=p6;                /* make sure rts low */
                for(i=0;i<40;i++)       /* delay */
                {
                }
                p6 &= 0xf7;
                p6dr=p6;
        }
        else
        {
                p6 |= 8;
                p6dr=p6;
                ss_write_control(9,0x80);
                ss_write_control(4,0x20);       /* hard wired in macro */
                ss_write_control(10,0x80);
                ss_write_control(7,0x7e);
                ss_write_control(3,0xc0);
                ss_write_control(5,0x60);
                ss_write_control(1,0x00);
                ss_write_control(11,0x28);
                ss_write_control(14,0x00);
                ss_write_control(15,0x00);
                ss_write_control(0,0x30);
                ss_write_control(3,0xd9);
        }
}
/* ************************************************************** */
static void ss_write_control(adr,data)
        unsigned char   adr;
        unsigned char   data;
{
        hdlc_control_out=adr;
        hdlc_control_out=data;
}
/* ************************************************************** */
static char ss_read_process()
{
        int             i;
        unsigned int    j;

i=hdlc_data_in_buf[0];
        j=(unsigned int)i << 8;
        i=hdlc_data_in_buf[1];
        j |= (unsigned int)i;
        u.s.mac_dest_adr=j;
        i=hdlc_data_in_buf[2];
        j = (unsigned int)i << 8;
        i=hdlc_data_in_buf[3];
        u.s.mac_source_adr= (unsigned int)i | j;
        i=hdlc_data_in_buf[4];
```

```
        u.s.mac_control=(unsigned char)i;
        i=hdlc_data_in_buf[5];
        u.s.mac_data_rem=(unsigned char)i;
        return(0);
}
/* ************************************************************ */
static void reset_mac_timer()
{
        unsigned char   t;

mac_timer_flag=0;
        t=tftcsr;
        t &= 0xfb;
        tftcsr=t;
}
/* ************************************************************ */
static void set_mac_timer(time)
        unsigned int    time;
{
        unsigned char   t;

mac_timer_flag=1;
        tftocr=0x10;
        tfocr_a_b=tffrc + time;
        t=tftcsr;
        t &= 0xfb;
        tftcsr=t;
}
/* ************************************************************ */
static void set_mac_backoff_time(unsigned int time, unsigned int rand_time)
{
        unsigned char   t;

u.s.save_last_addr=0;
        mac_timer_flag=1;
        tftocr=0x10;
        tfocr_a_b = tffrc + ((tffrc ^ u.s.short_address)/rand_time)+time;
        t=tftcsr;
        t &= 0xfb;
        tftcsr=t;
}
/* ************************************************************ */
static int mac_acquire_channel()
{
        unsigned char   t;
        unsigned char   i;

tftocr=0x10;                    /* select ocr b */
        tfocr_a_b = tffrc + T_6_MILLI;
        t=tftcsr;
        t &= 0xfb;
        tftcsr=t;
        for(;(tftcsr & 0x04)==0;)
        {
                for(i=0;i<30;i++)               /* check for falsing */
                {
                        if(p6dr & 0x01)break;
                }
                if(i >=30)return(0);
```

```
        return(1);
}
/* ************************************************************ */
void process_mac_layer(type,size)
        unsigned char   type;
        int             size;
{
        if(type==DATA)
        {
                if(ss_read_process() < 0)return;
                if((u.s.mac_source_adr & 0x7fff) == u.s.save_base)
                {
                        if(mac_rx_strength >= (u.s.save_strength-2))
                        {
                                u.s.save_strength=mac_rx_strength;
                                u.s.save_base_timer=3000;
                        }
                }
                if((u.s.mac_source_adr & 0x7fff) == u.s.base_address)
                {
                        if(mac_rx_strength >= (u.s.strength-2))
                        {
                                u.s.strength=mac_rx_strength;
                        }
                }
                process_mac_layer_data_entry(size-6);
                return;
        }
        if(type==TIMER)
        {
                process_mac_layer_timeout();
                return;
        }
        if(type==BRIDGE_LOW)
        {
                process_mac_bridge_interface(size);
                return;
        }
        return;
}
/* ************************************************************ */
```

```c
/* ********************* ************************ */
/*                    bridge process                                      */
/* ********************************************************** */
#define EXTERN              extern
#include                    "ssh8.h"
#define DS2400_DATA         0x04
#define P5_CONFIG           0xfd
#define P5_CONFIG_DS_IN     (P5_CONFIG & (~DS2400_DATA))
#define SCL                 0x40
#define SDA                 0x20
#define CODLD               0x04
#define CODDAT              0x02
#define CODCLK              0x01
#define RETURN_NO           0
#define RETURN_YES          1
static void process_bridge_from_mac();
static unsigned char get_bridge_high_tx_buffer();
static void write_bridge_high_tx_buffer();
static void send_bridge_high_tx_buffer();
extern int ss_standby();
extern void ss_set_standby();
static void process_bridge_high();
static unsigned char process_low_bridge_hello();
void memcpy();
static void set_hello_timer();
static unsigned char check_on_charger();
static void process_rd_long_id();
static void process_rd_version();
static void process_rd_diag();
void process_mac_layer();
static void ds2400_reset();
static void ds2400_write();
static unsigned char ds2400_read();
static void do_crc();
static void int_c188();
static void int_high_speed();
static int get_high_speed();
static void put_high_speed();
static void init_code();
static void load_code();
static void prog_code();
static void high_speed_delay();
void process_bridge_layer();
int c188_read_process();
static void i2badr(unsigned char);
static void i2bend();
static void i2bwrt(unsigned char);
static unsigned char i2brd();
static void delay_5us();
static void sda_high();
static void sda_low();
static void scl_high();
static void scl_low();
static void sda_output_mode();
static void sda_input_mode();
static void wrt_eeprom(unsigned char,unsigned char);
static unsigned char rd_eeprom(unsigned char);
static unsigned char rd_agc(void);
```

```
static void bh_self_test_1(int);
static void bh_self_test_2(int);
static void bh_self_test_3(int);
static void bh_test_code_load(void);
void memset(void *to, unsigned char, unsigned int size);
extern void write_h8_com();
extern void set_ignore_c188_timer(unsigned char);
/* ******************************************************** */
extern unsigned char      mac_enable_sw;
extern void               (*process_mac_ptr)();
extern void               (*process_bridge_ptr)();
extern int                (*c188_read_process_ptr)();
extern void               (*ss_transmitter_setup_ptr)();
extern void               (*ss_write_ptr)();
extern unsigned int       (*write_c188_response_ptr)();
extern unsigned char      power_control_sw;
extern unsigned char      mac_rx_strength;
/* ******************************************************** */
static unsigned char      crc;
/* ******************************************************** */
const unsigned char       code_tab_type_2[]=
{
        0x02,0x76,0x8d,0x37,0x36,0xb8,0x67,0xd2,0x4b,0xe6,0x1d,0x6c,0xec,0xb1,0x
        0xa5,0x63,0x68,0x28,0xbb,0x23,0xdb,0xa6,0x65,0xdb,0xc4,0xdd,0x14,0x16,0x
        0xa1,0x25,0x71,0x38,0x80,0xc1,0x8d,0x5d,0xba,0xb1,0x83,0x01,0x1c,0x8e,0x
        0x5d,0x82,0x86,0xc6,0xdb,0x36,0x46,0x78,0x1e,0x62,0x6c,0xdb,0x63,0x61,0x
        0xde,0xdf,0xf8,0x39,0xb3,0xb8,0xd3,0x5f,0xfa,0xcb,0x1d,0xcd,0x9c,0x1f,0x
        0xc3,0xa1,0x29,0x1c,0xa6,0x9f,0x50,0x2c,0x34,0x0a,0xf9,0x65,0x38,0x94,0x
        0xff,0xff,0xff,0xff,0xff,0xff,0xff,0xff,0xff,0xff,0xff,0xff,0xff,0xff,0x
        0x00,0x00,0x00,0x00,0x00,0x00,0x00,0x00,0x00,0x00,0x00,0x00,0x00,0x00,0x
        0xaa,0xaa,0xaa,0xaa,0xaa,0xaa,0xaa,0xaa,0xaa,0xaa,0xaa,0xaa,0xaa,0xaa,0x
        0x02,0x76,0x8d,0x37,0x36,0xb8,0x67,0xd2,0x4b,0xe6,0x1d,0x6c,0xec,0xb1,0x
};
const unsigned char       code_tab_type_1[]=
{
        0x02,0x76,0x8d,0x37,0x36,0xb8,0x67,0xd3,0x4b,0xe6,0x1d,0x6c,0xec,0xb1,0x
        0xa5,0x63,0x68,0x28,0xbb,0x23,0xdb,0xa6,0x65,0xdb,0xc4,0xdd,0x14,0x16,0x
        0xa1,0x25,0x71,0x38,0x80,0xc1,0x8d,0x5d,0xba,0xb1,0x83,0x01,0x1c,0x8e,0x
        0x5d,0x82,0x86,0xc6,0xdb,0x36,0x46,0x78,0x1e,0x62,0x6c,0xdb,0x63,0x61,0x
        0xde,0xdf,0xf8,0x39,0xb3,0xb8,0xd3,0x5f,0xfa,0xcb,0x1d,0xcd,0x9c,0x1f,0x
        0xc3,0xa1,0x29,0x1c,0xa6,0x9f,0x50,0x2c,0x34,0x0a,0xf9,0x65,0x38,0x94,0x
        0xff,0xff,0xff,0xff,0xff,0xff,0xff,0xff,0xff,0xff,0xff,0xff,0xff,0xff,0x
        0x00,0x00,0x00,0x00,0x00,0x00,0x00,0x00,0x00,0x00,0x00,0x00,0x00,0x00,0x
        0xaa,0xaa,0xaa,0xaa,0xaa,0xaa,0xaa,0xaa,0xaa,0xaa,0xaa,0xaa,0xaa,0xaa,0x
        0x02,0x76,0x8d,0x37,0x36,0xb8,0x67,0xd2,0x4b,0xe6,0x1d,0x6c,0xec,0xb1,0x
};
/* ******************************************************** */
void memcpy(void *to, void *from, unsigned int size)
{
        if(!size)return;
        asm(void,"          mov.w   @(4,r6),r5      ;r5=to");
        asm(void,"          mov.w   @(6,r6),r4      ;r4=from");
        asm(void,"          mov.w   @(8,r6),r1      ;r1=size");
        asm(void,"          push    r2                      ");
        asm(void,"          sub.w   r2,r2                   ");
        asm(void,"          adds    #1,r2                   ");

asm(void,"memcpy1:");
        asm(void,"          mov.b   @r4+,r01");
```

```
            asm(void,"       adds    #1,r5     ");
            asm(void,"       sub.w   r2,r1     ");
            asm(void,"       bne     memcpy1   ");
            asm(void,"       pop     r2        ");
}
/* ************************************************************ */
void memset(void *to, unsigned char data, unsigned int size)
{
        if(!size)return;
        asm(void,"       mov.w   @(4,r6),r5    ;r5=to");
        asm(void,"       mov.w   @(6,r6),r4    ;r4=data");
        asm(void,"       mov.w   @(8,r6),r1    ;r1=size");
        asm(void,"       push    r2            ");
        asm(void,"       sub.w   r2,r2         ");
        asm(void,"       adds    #1,r2         ");
        asm(void,"memset1:");
        asm(void,"       mov.b   r4l,@r5");
        asm(void,"       adds    #1,r5     ");
        asm(void,"       sub.w   r2,r1     ");
        asm(void,"       bne     memset1   ");
        asm(void,"       pop     r2            ");
}
/* ************************************************************ */
void bridge_init()
{
        unsigned char   i;

disable;
        sda_output_mode();
        scl_low();
        sda_high();
        scl_high();
        memset(&u,0,sizeof(u));
        p8ddr=0xf2;
        p8  |= 1;
        p8dr=p8;
        u.s.board_type=2;
        if(p8dr & 1)
        {
                u.s.board_type=1;
        }
        u.s.interrupt_cnt=3;
        u.s.base_address=0xffff;
        iscr=0x77;
        ier=C188_INT_ENABLE+BRIDGE_LOW_INT_ENABLE;
        tftcr=TFTCR_INIT;                                       /* clock divided by 8 */
        for(i=0;i<48;i++)diag_cnt[i]=0;
        power_control_sw=TRUE;
        process_mac_ptr=process_mac_layer;
        process_bridge_ptr=process_bridge_layer;
        c188_read_process_ptr=c188_read_process;
        ss_set_standby(TRUE);
        enable;
}
/* ************************************************************ */
void process_bridge_layer(process,type,size)
        unsigned char   process;
        unsigned char   type;
```

```
                                                    P.30/32
      if(type >= 0x20)return;
      diag_cnt[type]++;
      if(type >= 0x10)                    /* rx machine */
      {
            if(type != MAC_RECORD)return;
            if(process_low_bridge_hello(size)==RETURN_NO)return;
            j=get_bridge_high_tx_buffer();
            if(!(j))
            {
                  diag_cnt[BUF_NOT_AVAIL]++;
                  return;
            }
            write_bridge_high_tx_buffer(BH_READ);
            write_bridge_high_tx_buffer((unsigned char)(u.s.mac_dest_adr >>
            write_bridge_high_tx_buffer((unsigned char)(u.s.mac_dest_adr & 0
            write_bridge_high_tx_buffer((unsigned char)(u.s.mac_source_adr >
            write_bridge_high_tx_buffer((unsigned char)(u.s.mac_source_adr &
            write_bridge_high_tx_buffer((unsigned char)(mac_rx_strength));
            memcpy(&bridge_high_tx_buffer[u.s.bridge_high_tx_buffer_lead][u.
            u.s.bridge_high_tx_buffer_ptr += size;

/* holdoff c188 if possible 3270 large s
            send_bridge_high_tx_buffer();
            if((size > 1030) && (u.s.bridge_high_tx_buffer_cnt==1))
            {
                  set_ignore_c188_timer(C188_LONG_DELAY_TIME);
            }
            return;
      }
      u.s.bridge_tx_notify_event=type | 0x80;
      int_c188();
}
/* ************************************************************ */
static unsigned char process_low_bridge_hello(size)
      unsigned int    size;
{
      unsigned char   i;
      unsigned int    j;
      unsigned char   k;
      int             l;
      unsigned int    m;
      unsigned int    n;
      unsigned char   seed;
      unsigned char   offset;
      unsigned int    cost;

if(u.s.bridge_hello_watch_enable==0)return(RETURN_YES);
      if((u.s.mac_dest_adr & 0x8000)==0)return(RETURN_YES);
      i=bridge_rx_buffer[0];
      if(size < 2)return(RETURN_NO);
      if(!(i & 0x10))return(RETURN_NO);
      if((i & 0x07) != 0x02)return(RETURN_YES);      /* make sure it response
      switch(i & 0xc0)                               /* not hello frame */
      {
            case 0:
                  j=6;
                  break;
            case 0x40:
```

```
                break;
        default:
                    return(RETURN_YES);
} cost=bridge_rx_buffer[j++];                 /* j pts to cost to root */
cost <<= 8;
cost |=bridge_rx_buffer[j++];
if(cost==0xffff)return(RETURN_YES);

seed = bridge_rx_buffer[j];                 /* j pts to seed/attach */
seed >>= 2;
seed &= 0x3f;
j++;

offset = bridge_rx_buffer[j];               /* j pts to offset */
j++;

j++;                                        /* j pts to priority */ if(u.s.root_id_seq_number < 0)              /* j pts to root id seq number *
{
        u.s.root_id_seq_number=bridge_rx_buffer[j];
}
else
{
        if(u.s.root_id_seq_number != bridge_rx_buffer[j])
                return(RETURN_YES);
}
j++;

for(;;)                                     /* j pts to optional fields */
{
        i=bridge_rx_buffer[j];
        switch(i & 0x7f)
        {
                case 0x04:                  /* detached list */
                case 0x05:                  /* pending list */
                        j++;
                        k=bridge_rx_buffer[j];
                        if(k & 1)return(RETURN_YES);
                        j++;
                        k >>= 1;
                        n=(u.s.short_address & 0x07ff) | 0x0800;
                        for(l=0;l<k;l++)
                        {
                                m=bridge_rx_buffer[j++];
                                m <<= 8;
                                m |= (bridge_rx_buffer[j++] & 0x
                                if(m==n)return(RETURN_YES);
                        }
                        break;
                case 0x0a:                  /* root long id */
                case 0x0b:                  /* root alais */
                        j++;
                        k=bridge_rx_buffer[j];
                        if(k != u.s.root_id_len)return(RETURN_YE
                        j++;
                        for(l=0;l<k;l++)
```

```
                                                   if(u.s.root_id[1] != bridge_rx_b
                                       }
                                       break;
                   default:
                                       j++;
                                       j +=bridge_rx_buffer[j];
                                       j++;
                                       break;
            }
            if(i & 0x80)break;
            if(j > size)break;
        }
        if((u.s.mac_source_adr & 0x7fff) != u.s.base_address)
        {
            if(cost > u.s.cost)return(RETURN_NO);
            if(mac_rx_strength <= u.s.strength)return(RETURN_NO);
            if((u.s.mac_source_adr & 0x7fff) != u.s.save_base)
            {
                    if(mac_rx_strength < u.s.save_strength)return(RETURN_NO)
                    u.s.save_cost=cost;
                    u.s.save_strength=mac_rx_strength;
                    u.s.save_base=u.s.mac_source_adr & 0x7fff;
                    u.s.save_base_timer=3000;
                    u.s.base_info_event=1;
            }
            return(RETURN_NO);
        }
        u.s.strength=mac_rx_strength;
        u.s.old_seed=seed;
        set_hello_timer(seed,offset);
        u.s.missing_hello_cnt=0;
        u.s.hello_off_timer_cnt=0;
        return(RETURN_NO);
}
/* ************************************************************ */
static unsigned char check_on_charger()
{
        if(p4dr & 0x10)return(0);
        return(1);
}
/* ************************************************************ */
/* compute next hello time                                      */
/* offset is in 10's of milliseconds                            */ static void set_hello_timer(seed,offset)
        unsigned char   seed;
        unsigned char   offset;
{
        unsigned int    next_slot;
        unsigned int    i;

i=u.s.base_address;
        i += seed;
        next_slot=(i % HELLO_MOD_VAL) + HELLO_MOD_VAL;
        i=next_slot * HELLO_SLOT_SIZE;
        i -= offset;                    /* time in 10's of milliseconds */
        i >>=1;                         /* time in 20 milliseconds */
        if(i >150)i=100;                /* time should never be greater then 3 s
        u.s.hello_on_timer_cnt=i;
```

```
switch(process)
{
        case MAC:
                                process_bridge_from_mac(type,size);
                                return;
        case TIMER_LOW:
                                if(u.s.save_base_timer)u.s.save_base_timer--;
                                if(u.s.save_base_timer==0)
                                {
                                        if( u.s.save_base != 0)
                                        {
                                                if(u.s.base_info_event==0)
                                                {
                                                        u.s.save_base=0;
                                                        u.s.base_info_event=1;
                                                }
                                        }
                                }
                                if(u.s.interrupt_cnt)u.s.interrupt_cnt--;
                                if(!(u.s.interrupt_cnt))
                                {
                                        if((u.s.bridge_high_tx_special_len) ||
                                           (u.s.bridge_tx_notify_event) ||
                                           (u.s.bridge_timer_event) ||
                                           (u.s.bridge_hello_event) ||
                                           (u.s.bridge_high_tx_buffer_cnt) ||
                                           (u.s.base_info_event))
                                        {
                                                int_c188();
                                        }
                                        u.s.interrupt_cnt=3;
                                }
                                if(u.s.bridge_hello_watch_enable)
                                {
                                        if(u.s.hello_on_timer_cnt)u.s.hello_on_t
                                        if(u.s.hello_on_timer_cnt==0)
                                        {
                                                mac_enable_sw=TRUE;
                                                u.s.missing_hello_cnt++;
                                                u.s.old_seed=((u.s.old_seed + 3)
                                                set_hello_timer(u.s.old_seed,0);
                                                u.s.hello_off_timer_cnt=HELLO_WA
                                                if(ss_standby())
                                                        ss_set_standby(FALSE);
                                                if(u.s.missing_hello_cnt > MAX_H
                                                {
                                                        u.s.missing_hello_cnt=0;
                                                        u.s.bridge_hello_event=1
                                                        int_c188();
                                                }
                                        }
                                        if(u.s.hello_off_timer_cnt)u.s.hello_off
                                        if(u.s.non_hello_off_timer_cnt)
                                        {
                                                u.s.non_hello_off_timer_cnt--;
                                        }
                                        else
                                        {
```

```
                                }
                                if((u.s.hello_off_timer_cnt==0) &&
                                   (u.s.non_hello_off_timer_cnt==0))
                                {
                                        ss_set_standby(TRUE);
                                        mac_enable_sw=FALSE;
                                }
                        }
                        return;
        case TIMER_HIGH:
                        disable;
                        ier &=~BRIDGE_HIGH_INT_ENABLE;
                        enable;
                        if(u.s.bh_timer_in_use_sw)
                        {
                                u.s.bh_timer_in_use_sw=0;
                                u.s.bridge_timer_event=1;
                                u.s.bridge_timer_opt=u.s.bh_timer_versio
                                int_c188();
                        }
                        return;
        case BRIDGE_HIGH:
                        process_bridge_high(size);
                        return;
        case BRIDGE_POWER_CONTROL:
                        if(u.s.c188_sent_sw)
                        {
                                u.s.c188_sent_sw=0;
                                tftocr=0;                /* select ocr a
                                tfocr_a_b=tffrc + T_250_MICRO;
                                tftcsr &= 0xf7;
                                for(;!(tftcsr & 0x08);)
                                {
                                        if((c188_sw) || (bridge_low_time
                                        {
                                                return;
                                        }
                                }
                        }
                        disable;
                        if((c188_sw) || (bridge_low_timer_sw) || (bridge
                        {
                                enable;
                                return;
                        }
                        enable;
                        sleep;
                        tftcr=TFTCR_INIT;
                        return;
        default:
                        break;
        }
}
/* ************************************************************ */
static void process_bridge_from_mac(type,size)
        unsigned char   type;
        unsigned int    size;
{
```

We claim:

1. A portable data collection terminal comprising:

a base module comprising a first processing unit and a first storage element that stores base module communication software;

a selected one of a plurality of communication modules, each communication module comprising a second processing unit, a second storage element that stores communication module software, and at least one of a plurality of radio transceivers, each of the plurality of radio transceivers being communicatively incompatible with the other of the plurality of radio transceivers;

said base module receiving said selected one of the plurality of communication modules in an assembled position which communicatively couples the first and second processing units enabling said base module to communicate using said communication module; and wherein the second processing unit, using the communication module software, enables time first processing unit, which uses the base module communication software, to communicate with at least one of the plurality of radio transceivers regardless of which of the plurality of communication modules is selected.

2. The portable data collection terminal of claim 1 further comprising:

a base connector, disposed on said base module, that is electrically connected to said first processing unit; and a common communication connector disposed on the selected one of the plurality of communication modules and electrically connected to the second processing unit, said common communication connector matingly engaging the base connector when said base module receives said selected one of the plurality of communication modules in the assembled position.

3. The portable data collection terminal of claim 1 further comprising:

a predetermined plurality of antennas connected to said base module; and means for selectively connecting at least one of said predetermined plurality of antennas to the selected one of the plurality of communication modules.

4. A portable data collection terminal comprising:

a base module operating per a first set of communication software routines;

a selected one of a plurality of radio transceiver modules, each of the plurality of radio transceiver modules being communicatively incompatibility with the other of the plurality of radio transceiver modules;

each of the plurality of radio transceiver modules having a processor which enables the base module to communicate via the selected one of the plurality of radio transceiver modules; and the base module communicates, using the first set of communication software routines, via the selected one of the plurality of radio transceiver modules without having to know which of the radio transceiver modules has been selected.

5. The portable data collection terminal of claim 4 further comprising:

a plurality of antennas connected to said base module; and means for selectively interconnecting at least one of said plurality of antennas to the selected one of the plurality of the radio transceiver modules.

6. The portable data collection terminal of claim 5 wherein the plurality of antennas are connected to said base module prior to selecting the selected one of the plurality of the radio transceiver modules.

7. The portable data collection terminal of claim 4 furor comprising:

a preinstalled antenna disposed on said base module;

an antenna connector disposed on said base module to couple to at least one of a variety of external antennas; and means for selectively interconnecting the preinstalled antenna or the antenna connector to the selected one of the plurality of radio transceiver modules.

8. In a communication network having a first and second subnetwork a data collection terminal comprising:

a base processing unit operating per a first set of communication software routines;

a first selected one of a plurality of radio transceivers, each of the plurality of radio transceiver having different operating characteristics such that each of the plurality of radio transceivers are communicatively incompatible with the other of the plurality of radio transceivers;

a second selected one of the plurality of radio transceivers; and a communication processor which enables the base processing unit to communicate via the first and second selected ones of the plurality of radio transceivers despite differences in the operating characteristics of the first and second selected ones of the plurality of radio transceivers.

9. The portable data collection terminal of claim 8 wherein the communication processor comprises:

a first processing unit permitting the base processing unit to communicate via the first selected one of the plurality of radio transceivers despite differences in operating characteristics between the first selected one of the plurality of radio transceivers and others of the plurality of radio transceivers; and a second processing unit permitting the base processing unit to communicate via the second selected one of the plurality of radio transceivers despite differences in operating characteristics between the second selected one of the plurality of radio transceivers and others of the plurality of radio transceivers.

10. The portable data collection terminal of claim 8 further comprising comprising:

a base module containing the base processing unit; and a communication module containing the communication processor and the first and second selected ones of the plurality of radio transceivers.

* * * * *